United States Patent
Ambrozy et al.

(10) Patent No.: US 9,182,292 B2
(45) Date of Patent: Nov. 10, 2015

(54) STIMULUS INDICATING DEVICE EMPLOYING POLYMER GELS

(75) Inventors: Rel S. Ambrozy, Arlington, VA (US); Jade Litcher, Raleigh, NC (US); Raymond C. Jones, Leesburg, VA (US); Chao Zhu, Denville, NJ (US); Bani H. Cipriano, Vernon, NJ (US); Srinivasa R. Raghavan, Silver Spring, MD (US); Jae-Ho Lee, Il San (KR)

(73) Assignee: Prasidiux, LLC, Arlington, VA (US)

(*) Notice: Subject to any disclaimer, the term of this patent is extended or adjusted under 35 U.S.C. 154(b) by 223 days.

(21) Appl. No.: 12/042,528

(22) Filed: Mar. 5, 2008

(65) Prior Publication Data

US 2009/0010803 A1    Jan. 8, 2009

Related U.S. Application Data

(63) Continuation-in-part of application No. 11/954,520, filed on Dec. 12, 2007, now Pat. No. 8,166,906, and a continuation-in-part of application No. 11/580,241, filed on Oct. 13, 2006, now Pat. No. 8,077,554, and a (Continued)

(51) Int. Cl.
| | | |
|---|---|---|
| *G01K 3/04* | (2006.01) | |
| *G01K 5/00* | (2006.01) | |
| *G01K 5/48* | (2006.01) | |
| *G01K 11/06* | (2006.01) | |
| *G04F 1/00* | (2006.01) | |

(52) U.S. Cl.
CPC .. *G01K 3/04* (2013.01); *G01K 5/00* (2013.01); *G01K 5/48* (2013.01); *G01K 11/06* (2013.01); *G04F 1/00* (2013.01)

(58) Field of Classification Search
CPC ............ G01K 5/00; G01K 1/00; G01K 11/06
See application file for complete search history.

(56) References Cited

U.S. PATENT DOCUMENTS

| | | |
|---|---|---|
| 2,850,393 A | 9/1958 | Romito |
| RE25,499 E | 12/1963 | Fenity et al. |
| 3,615,719 A | 10/1971 | Michel et al. |
| 3,665,770 A | 5/1972 | Sagi et al. |
| 3,695,903 A | 10/1972 | Telkes et al. |
| 3,888,631 A | 6/1975 | Sturzinger |

(Continued)

FOREIGN PATENT DOCUMENTS

| | | |
|---|---|---|
| GB | 1212859 | 11/1970 |
| GB | 2397022 | 7/2004 |

(Continued)

OTHER PUBLICATIONS

*Vitsab®: A Technical Short Course.* Available from website, 1998. Vitsab Indicator marketing information.

(Continued)

*Primary Examiner* — Jonathan Hurst
(74) *Attorney, Agent, or Firm* — Fox Rothschild LLP; Jeff E. Schwartz

(57) ABSTRACT

The present invention relates, for example, to a stimulus-indicating device. More particularly, the present invention includes an apparatus for evidencing when a stimulus sensitive product has been exposed to a designated or predetermined stimulus for a certain period of time, and the invention further may include a method for manufacturing aspects of that apparatus.

26 Claims, 17 Drawing Sheets

Related U.S. Application Data continuation-in-part of application No. 11/486,969, filed on Jul. 14, 2006, now Pat. No. 7,940,605, and a continuation-in-part of application No. 11/414,254, filed on May 1, 2006, now Pat. No. 9,063,015.

(60) Provisional application No. 60/904,881, filed on Mar. 5, 2007, provisional application No. 60/874,248, filed on Dec. 12, 2006, provisional application No. 60/725,648, filed on Oct. 13, 2005, provisional application No. 60/725,649, filed on Oct. 13, 2005, provisional application No. 60/698,984, filed on Jul. 14, 2005, provisional application No. 60/675,882, filed on Apr. 29, 2005.

(56) References Cited

U.S. PATENT DOCUMENTS

| | | | |
|---|---|---|---|
| 3,922,917 A | 12/1975 | Ayres | |
| 3,954,011 A | 5/1976 | Manske | |
| 3,962,920 A | 6/1976 | Manske | |
| 3,967,579 A | 7/1976 | Seiter | |
| 3,999,946 A | 12/1976 | Patel et al. | |
| 4,064,827 A | 12/1977 | Darringer et al. | |
| 4,118,370 A | 10/1978 | Sannes et al. | |
| 4,148,748 A | 4/1979 | Hanlon et al. | |
| 4,175,207 A | 11/1979 | Elliott | |
| 4,280,361 A | 7/1981 | Sala | |
| 4,327,117 A | 4/1982 | Lenack et al. | |
| 4,390,291 A | 6/1983 | Gaven, Jr. et al. | |
| 4,439,346 A | 3/1984 | Patel et al. | |
| 4,588,491 A | 5/1986 | Kreisher et al. | |
| 4,601,588 A | 7/1986 | Takahara et al. | |
| 4,657,409 A | 4/1987 | Wiggin et al. | |
| 4,732,930 A | 3/1988 | Tanaka et al. | |
| 4,737,463 A | 4/1988 | Bhattacharjee et al. | |
| 4,812,053 A | 3/1989 | Bhattacharjee | |
| 4,892,677 A | 1/1990 | Preziosi et al. | |
| 4,917,503 A | 4/1990 | Bhattacharjee | |
| 4,925,314 A | 5/1990 | Claudy et al. | |
| 5,000,579 A | 3/1991 | Kumada et al. | |
| 5,053,339 A | 10/1991 | Patel | |
| 5,057,434 A | 10/1991 | Prusik et al. | |
| 5,076,197 A | 12/1991 | Darringer et al. | |
| 5,077,033 A | 12/1991 | Viegas et al. | |
| 5,085,802 A | 2/1992 | Jalinski | |
| 5,100,933 A | 3/1992 | Tanaka et al. | |
| 5,153,036 A * | 10/1992 | Sugisawa et al. | 428/34.1 |
| 5,198,148 A | 3/1993 | Nakano | |
| 5,242,491 A | 9/1993 | Mamada et al. | |
| 5,267,794 A | 12/1993 | Holzer | |
| 5,274,018 A | 12/1993 | Tanaka et al. | |
| 5,281,570 A | 1/1994 | Hasegawa et al. | |
| 5,336,057 A | 8/1994 | Fukuda et al. | |
| 5,348,813 A | 9/1994 | Bohmer et al. | |
| 5,360,682 A | 11/1994 | Bohmer | |
| 5,403,893 A | 4/1995 | Tanaka et al. | |
| 5,404,834 A | 4/1995 | Murphy | |
| RE35,068 E | 10/1995 | Tanaka et al. | |
| 5,476,792 A | 12/1995 | Ezrielev et al. | |
| 5,580,929 A | 12/1996 | Tanaka et al. | |
| 5,602,804 A | 2/1997 | Haas | |
| 5,622,137 A | 4/1997 | Lupton, Jr. et al. | |
| 5,630,372 A | 5/1997 | Ramsey et al. | |
| 5,633,835 A | 5/1997 | Haas et al. | |
| 5,667,303 A | 9/1997 | Arens et al. | |
| 5,694,806 A | 12/1997 | Martin et al. | |
| 5,709,472 A * | 1/1998 | Prusik et al. | 374/106 |
| 5,922,186 A | 7/1999 | Shukla et al. | |
| 5,964,181 A | 10/1999 | Pereyra et al. | |
| 5,997,927 A | 12/1999 | Gics | |
| 6,030,442 A | 2/2000 | Kabra et al. | |
| 6,143,138 A | 11/2000 | Becker | |
| 6,180,288 B1 | 1/2001 | Everhart et al. | |
| 6,214,623 B1 | 4/2001 | Simons et al. | |
| 6,231,229 B1 | 5/2001 | Halderman | |
| 6,244,208 B1 | 6/2001 | Qiu et al. | |
| 6,287,485 B1 * | 9/2001 | Akashi et al. | 252/583 |
| 6,295,167 B1 | 9/2001 | Uematsu et al. | |
| 6,399,387 B1 | 6/2002 | Stenholm et al. | |
| 6,435,128 B2 | 8/2002 | Qiu et al. | |
| 6,472,214 B2 | 10/2002 | Patel | |
| 6,570,053 B2 | 5/2003 | Roe et al. | |
| 6,593,588 B1 | 7/2003 | Reimer | |
| 6,614,728 B2 | 9/2003 | Spevacek | |
| 6,694,913 B2 | 2/2004 | Cooperman | |
| 6,741,523 B1 | 5/2004 | Bommarito et al. | |
| 6,773,637 B1 | 8/2004 | DiSalvo et al. | |
| 6,782,909 B1 | 8/2004 | Ragless | |
| 6,863,437 B2 | 3/2005 | Ohnishi et al. | |
| 6,863,859 B2 | 3/2005 | Levy et al. | |
| 6,916,116 B2 | 7/2005 | Diekmann et al. | |
| 6,968,804 B1 * | 11/2005 | Barbieri et al. | 116/219 |
| 7,232,253 B2 | 6/2007 | Isbitsky et al. | |
| 7,313,917 B2 | 1/2008 | Yeghiazarian et al. | |
| 7,314,584 B2 | 1/2008 | Tsutsui et al. | |
| 7,343,872 B2 | 3/2008 | Taylor et al. | |
| 7,435,479 B2 | 10/2008 | Tsutsui et al. | |
| 7,571,695 B2 | 8/2009 | Taylor et al. | |
| 7,624,698 B2 | 12/2009 | Taylor et al. | |
| 7,940,605 B2 | 5/2011 | Ambrozy et al. | |
| 8,077,553 B2 | 12/2011 | Braunberger | |
| 2002/0031841 A1 | 3/2002 | Asher et al. | |
| 2002/0068019 A1 | 6/2002 | Fujiwara et al. | |
| 2003/0053377 A1 | 3/2003 | Spevacek | |
| 2003/0207466 A1 | 11/2003 | Lee | |
| 2004/0120384 A1 | 6/2004 | Shahinpoor | |
| 2004/0171740 A1 | 9/2004 | Ruberti et al. | |
| 2006/0262828 A1 | 11/2006 | Ambrozy et al. | |
| 2007/0036038 A1 | 2/2007 | Ambrozy et al. | |
| 2007/0195652 A1 | 8/2007 | Ambrozy et al. | |
| 2008/0295761 A1 | 12/2008 | Ambrozy et al. | |

FOREIGN PATENT DOCUMENTS

| | | | |
|---|---|---|---|
| JP | 2004301529 A | 10/2004 | |
| JP | 2004301530 A | 10/2004 | |
| JP | 2005003616 A | 1/2005 | |
| WO | WO-87/02163 | 4/1987 | |
| WO | WO 92/02005 | 2/1992 | |
| WO | WO/01/29525 | * 4/2001 | |
| WO | WO 2004/062699 | 7/2004 | |

OTHER PUBLICATIONS

Vitsab® The sign of freshness. *Time Temperature Indicator Tags—The Key to Consumer Involvement in Food Safety and Quality.* Telatemp. Vitsab Indicator marketing information. 1997. Accessed: Jan. 15, 1998.

*Vitsab® TTI Frequently Asked Questions.* Telatemp. Vitsab Indicator marketing information. 1997. Accessed: Oct. 17, 1998.

*TTI Indicators—The Time Has Come.* Telatemp. Vitsab Indicator marketing information. 1997. Accessed: Oct. 17, 1998.

*Vitsab® Freeze Temperature Checkers.* Vitsab Indicator marketing information. Telatemp. 1997. Accessed: Oct. 17, 1998.

*Temperature Labels.* Telatemp. Telatemp marketing information. 1993. Accessed: Oct. 17, 1998.

LifeLines Indicator Marketing information. LifeLines Technology. Oct. 17, 1998.

*Hallcrest: Leading the Way in Temperature-Indicating Technology.* Hallcrest, Inc. Hallcrest Indicator Marketing information. 1997. Accessed: Oct. 17, 1998.

*3M Monitor Mark: High Temperature and Customer Activated Threshold Indicators.* 3M. 3M Indicator Marketing information. 1997. Accessed: Oct. 17, 1998.

*Tempil Temperature Indicators.* Tempil, Inc. Tempil Indicator Marketing information. 1996.

*Measure-Tech Australia: Innovations in Measuring Technology.* Measure-Tech Indicator Marketing information. Measure-Tech Australia Pty Ltd. 1997. Accessed: Oct. 17, 1998.

*TempTales3®.* Sensitech, Inc. TempTales Indicator Marketing information. 1996-1997. Accessed: Oct. 17, 1998.

(56) References Cited

OTHER PUBLICATIONS

*IceWatch*. IceWatch Indicator Marketing information. Timeticket. 1997. Accessed: Oct. 17, 1998.
Marianne E. Harmon, Mary Tang, Curtis W. Frank; A Microfludic Actuator Based on Thermoresponsive Hydrogels; Polymer; vol. 44 (2003) 4547-4556; Elsevier Science Inc.; USA.
Stevin H. Gehrke, Julie Robeson; James Fred Johnson, and Nitin Vaid; Protein Isolation by Solution-Controlled Gel Sorption; Biotechnol. Prog.; vol. 7; No. 4 (1991); 355-358; American Chemical Society and American institute of Chemical Engineers; USA.
Bhagwati G. Kabra, Stevin H. Gehrke, and Richard J. Spontak; Microporous, Responsive Hydroxypropyl Cellulose Gels 1. Synthesis and Microstructure; Macromolecules; vol. 31; No. 7; (1998); 2166-2173; American Chemical Society; USA.
Seiji Katayama; Chemical Condition Responsible for Thermoswelling or Thermoshrinking Type of Volume Phase Transition in Gels—Effect of Relative Amounts of Hydrophobic to Hydrophilic Groups in the Side Chain; Journal Physical Chemistry; vol. 96; No. 13 (1992); 5209-5210; American Chemical Society; USA.
M.R. Guilherme, R. Silva, E.M. Girotto, A.F. Rubira, E.C. Muniz; Hydrogels Based on PAAm Network With PNIPAAm Included: Hydrophilic—Hydrophobic Transition Measured by the Partition of Orange II and Methylene Blue in Water; Polymer; 44 (2003); 4213-4219; Elsevier Science Ltd.
Tae Gwan Park, Allan S. Hoffman; Sodium Chloride-Induced Phase Transition in Nonionic Poly(N-isopropylacrylamide) Gel;.Macromolecules vol. 26; No. 19; (1993); 5045-5048; American Chemical Society; USA.
Yoshitsugu Hirokawa and Toyoichi Tanaka; Volume Phase Transition in a Nonionic Gel; Journal Chemical Physics; vol. 81, No. 12, Pt. 11; (1984); 6379-6380; American Institute of Physics; USA.
Toyoichi Tanaka; Gels; Scientific American; vol. 244; No. 1; (1981); pp. 124-138; USA.
Shunsuke Hirotsu, Yoshitsugu Hirokawa, and Toyoichi Tanaka; Volume-Phase Transitions of Ionized N-isopropylacrylamide Gels; Journal of Chemical Physics; vol. 87, No. 2 (1987); 1392-1395; The American Institute of Physics; USA.
Akira Mamda, Toyoichi Tanaka, Dawan Kungwatchakun, and Masahiro Irie; Photoinduced Phase Transition of Gels; Macromolecules; vol. 23; No. 5 (1990); 1517-1519; American Chemical Society; USA.
Etsuo Kokufuta and Toyoichi Tanaka; Biochemically Controlled Thermal Phase Transition Gels; Macromolecules; vol. 24; No.7 (1991); 1605-1607; American Chemical Society; USA.
Yanhie Zhang, Steven Furyk, David E. Bergbreiter and Paul S. Cremer; Specific Ion Effects on the Water Solubility of Macromolecules: PNIPPAm and Hofmeister Series; Journal of the American Chemical Society; vol. 127; No. 41; (2005); pp. 14505-14510; USA.
Franck Ilmain, Toyoichi Tanaka & Etsuo Kokufuta; Volume Transition in a Gel Driven by Hydrogen Bonding; Nature; vol. 349; (Jan. 1991); 400-401; USA.
Toyoichi Tanaka, David Fillmore, Shao-Tang Sun, Izumi Nishio, Gerald Swislow and Arati Shah; Phase Transitions in Ionic Gels; Physical Review Letters; vol. 45, No. 20; (1980); 1636-1639; The American Physical Society; USA.
Toyoichi Tanaka, David J. Filmore; Kinetics of Swelling of Gels; Journal of Chemical Physics; vol. 70; No. 3; (1979); pp. 1214-1218; American Institute of Physics; USA.
PCT/US06/16521 International Search Report, Jan. 30, 2007.
PCT/US06/27564 International Search Report, Apr. 27, 2007.
PCT/US06/39874 International Search Report, Sep. 13, 2007.
Abandoned U.S. Appl. No. 08/636,133; filed Apr. 22, 1996; first named inventor was Litcher (application not included).
Information Disclosure Statement for U.S. Appl. No. 08/636,133 dated Jun. 16, 1997.
Notice of References Cited for U.S. Appl. No. 08/636,133 dated Jun. 16, 1997.
Information Disclosure Statement for U.S. Appl. No. 08/636,133, dated Aug. 2, 1999.
Notice of References Cited for U.S. Appl. No. 08/636,133 dated Aug. 22, 1999.
Office Action for U.S. Appl. No. 11/486,969—Mailed Apr. 5, 2007.
Oct. 5, 2007 Reply to Office Action for U.S. Appl. No. 11/486,969.
Declaration of Bruce Hounsell, submitted in U.S. Appl. No. 11/486,969 (Mailed Jun. 20, 2008).
PCT/US07/87080 International Search Report Jun. 26, 2008.
PCT/US08/55880 International Search Report Aug. 29, 2008.
Office Action for U.S. Appl. No. 11/414,254 (Mailed Apr. 28, 2009).
Reply to Office Action for U.S. Appl. No. 11/414,254 (Mailed Oct. 28, 2009).
Final Office Action for U.S. Appl. No. 11/414,254 (Mailed Feb. 2, 2010).
Amendment/Reply to Office Action for U.S. Appl. No. 11/414,254 (Mailed Jul. 2, 2010).
Amendment/Reply to Office Action for U.S. Appl. No. 11/486,969 (Mailed Jul. 19, 2010).
Notice of Allowance for U.S. Appl. No. 11/486,969 (Mailed Dec. 29, 2010).
Office Action for U.S. Appl. No. 11/580,241 (Mailed Mar. 5, 2008).
Reply to Office Action for U.S. Appl. No. 11/580,241 (Mailed Sep. 4, 2008).
Office Action for U.S. Appl. No. 11/580,241 (Mailed Nov. 19, 2009).
Reply to Office Action for U.S. Appl. No. 11/580,241 (Mailed Apr. 19, 2010).
Notice of Allowance for U.S. Appl. No. 11/580,241 (Mailed Jan. 4, 2011).
Letter Requesting Acknowledgement of Previously Filed Amendments and Request for Issuance of Supplemental Notice of Allowability for U.S. Appl. No. 11/580,241 (Mailed Jan. 10, 2011).
Office Action for U.S. Appl. No. 11/954,520 (Mailed Dec. 30, 2009).
Reply to Office Action for U.S. Appl. No. 11/954,520 (Mailed Jun. 30, 2010).
Final Office Action for U.S. Appl. No. 11/954,520 (Mailed Sep. 14, 2010).
Amendment After Final for U.S. Appl. No. 11/954,520 (Mailed Jan. 14, 2011).
Notice of Non-Compliant Amendment for U.S. Appl. No. 11/414,254 (Mailed Jul. 6, 2010).
Response to Notice of Non-Compliant Amendment for U.S. Appl. No. 11/414,254 (Filed Jul. 27, 2010).
Response to Rule 312 Communication for U.S. Appl. No. 11/580,241—(Mailed Jan. 19, 2011).
Supplemental Amendment filed with RCE for U.S. Appl. No. 11/580,241 (Filed Apr. 1, 2011).
Notice of Allowance for U.S. Appl. No. 11/580,241 (Mailed Apr. 11, 2011).
Notice of Allowance for U.S. Appl. No. 11/580,241 (Mailed Jul. 19, 2011).
Non-Final Office Action for U.S. Appl. No. 11/954,520 (Mailed Apr. 8, 2011).
Amendment/Reply to Non-Final Office Action for U.S. Appl. No. 11/954,520 (Filed Oct. 7, 2011).
Notice of Allowance for U.S. Appl. No. 11/954,520 (Mailed Dec. 28, 2011).

\* cited by examiner

STIMULUS INDICATING DEVICE EMPLOYING POLYMER GELS

RELATED APPLICATIONS

This application is related to and claims the benefit under 35 U.S.C. §119, of U.S. provisional patent application Ser. No. 60/904,881 filed Mar. 5, 2007, which is hereby incorporated by reference in its entirety; and this application is a continuation-in-part, and claims the benefit under 35 U.S.C. §120, of U.S. patent application Ser. No. 11/954,520, Dec. 12, 2007 now U.S. Pat. No. 8,166,906, entitled "Stimulus Indicating Device Employing Polymer Gels" which is related to and claims the benefit under 35 U.S.C. §119, of U.S. provisional patent application Ser. No. 60/874,248, filed Dec. 12, 2006, which are all hereby incorporated by reference in their entirety; and this application is a continuation-in-part and claims the benefit under 35 U.S.C. §120, of U.S. patent application Ser. No. 11/580,241 filed Oct. 13, 2006 now U.S. Pat. No. 8,077,554, entitled "Stimulus Indicating Device Employing Polymer Gels" which is related to and claims the benefit under 35 U.S.C. §119, of both U.S. provisional patent application Ser. No. 60/725,648, and U.S. provisional patent application Ser. No. 60,725,649, both filed Oct. 13, 2005, which are all hereby incorporated by reference in their entirety; and this application is a continuation-in-part, and claims the benefit under 35 U.S.C. §120, of U.S. patent application Ser. No. 11/486,969, filed Jul. 14, 2006, entitled "Stimulus Indicating Device Employing Polymer Gels" which issued as U.S. Pat. No. 7,940,605, and which is related to and claims the benefit under 35 U.S.C. §119, of U.S. provisional patent application Ser. No. 60/698,984, filed Jul. 14, 2005, which are all hereby incorporated by reference in their entirety; and this application is a continuation-in-part, and claims the benefit under 35 U.S.C. §120, of U.S. patent application Ser. No. 11/414,254, filed May 1, 2006 now U.S. Pat. No. 9,063,015, entitled "Stimulus Indication Employing Polymer Gels," which is related to and claims the benefit under 35 U.S.C. §119, of U.S. provisional patent application No. 60/675,882, filed Apr. 29, 2005, which are all hereby incorporated by reference in their entirety.

FIELD OF THE INVENTION

The present invention relates, for example, to a stimulus-indicating device. More particularly, the present invention may include an apparatus for evidencing when a stimulus sensitive product has been exposed to a designated or predetermined stimulus for a certain period of time, and the invention may further include a method for manufacturing aspects of that apparatus.

RELATED PRIOR ART

It is well known in the art that the useful life of a perishable product is a function of its cumulative exposure to a harmful stimulus over a period of time. The types of stimuli that advance the degradation of stimulus-sensitive products over time include not only temperature, but also light, pH, humidity, electromagnetic radiation, visible light, radiation, solvent composition, ionic strength, etc.

The useful life of a temperature sensitive product is a function of its cumulative time-temperature exposure—a combination of the temperature to which a product is exposed and the duration of the exposure. For stimulus sensitive products, degradation generally occurs faster at a higher stimulus (i.e., temperature) than at a lower stimulus (i.e., temperature). For example, often a temperature-perishable product will typically have a longer useful life if it is exposed to lower temperatures than if it is exposed to higher temperatures. In particular, pre-packaged chicken will spoil if it is exposed to a temperature of 40-41° F. or above for an extended period of time. However, exposure to high temperatures is not always the cause of the problem because certain stimulus sensitive products will degrade sooner at a lower stimulus (especially freezing temperatures) than at a higher stimulus. For example, a malaria vaccine will degrade faster below 2° C. than if stored in the range of 3° C. to 7° C. Thus the rate of degradation is often stimulus and product specific.

Stimulus perishable products susceptible to degradation due to cumulative time-stimulus exposure include, but are not limited to, food, food additives, chemicals, biological materials, drugs, cosmetics, photographic supplies and vaccines. Many manufacturers mark their products with printed expiration dates in an attempt to provide an indication of when the useful life of a perishable product lapses. These dates, however, are only estimates and may be unreliable because they are based on assumptions about the stimulus history of the product that may not be true with respect to the particular unit or product in the package on which the expiration date appears. Specifically, manufacturers compute expiration dates by assuming that the product will be kept within a specified stimulus range during the product's useful life. The manufacturer cannot always predict or control, however, the stimulus exposure of a product through each step of the supply chain that delivers the product to the consumer. If the product is actually exposed to a stimulus higher than those on which the expiration date is based, the perishable product may degrade or spoil before the printed expiration date. When this happens, the expiration date may mislead the consumer into believing that the perishable product is still usable when, in fact, its useful life has lapsed.

Marking a stimulus sensitive product with an expiration date is useful nonetheless, because often a visual inspection of the perishable product does not warn a potential user that the exposure of the product to a harmful stimulus has caused it to degrade or spoil. Although there are certain time-stimulus indicators currently available, most are focused on temperature, and not on the other types of stimuli. Additionally, many of these time-temperature indicators require the active agents to be kept separate from one another until the indicator is attached to the product it is monitoring. If the active ingredients are not kept separate they will begin to interact prematurely, thereby giving a premature indication of spoilage. As a result, these types of indicators require manual activation, but manual activation is not always feasible when the indicator is being used with a product that is mass-produced in high-volume.

It is also well known that certain polymer gels exhibit reversible phase transition in that they reversibly swell and collapse (i.e., expand and shrink) upon exposure to and removal of predetermined stimuli. By way of example only, a swollen stimulus sensitive gel can be made to undergo its phase transition and shrink upon decreasing its temperature below its predetermined temperature (i.e., its predetermined stimulus or its trigger stimulus). Typically, once the gel has undergone its phase transition and collapsed or shrunk in volume, that shrunken stimulus sensitive gel can be made to expand or swell again by removing the predetermined stimulus (i.e., increase the temperature of the shrunken stimulus sensitive gel to or past the temperature that caused it to collapse or shrink). Accordingly, it is necessary to develop indicating devices with irreversibility built into the stimulus sensitive or stimulus indicating or stimulus reactive operation of the indicator. Such irreversibility would provide a permanent indication of exposure to a predetermined stimulus, regardless of whether the predetermined stimulus is later removed.

Thus, there is a need for an indicator that indicates when a stimulus sensitive product has been exposed to a deleterious stimulus extreme (i.e., a predetermined stimulus). There is also a need for an indicator that indicates when a stimulus sensitive product has been exposed to a deleterious stimulus extreme (i.e., a predetermined stimulus) for a predetermined amount of time.

SUMMARY OF THE INVENTION

The present invention includes, for example, a stimulus indicator device, which substantially overcomes one or more of the above-mentioned problems arising from limitations and disadvantages of the related art.

1. Embodiments with Single Compartment with Non-Reversible Gel

To achieve these and other advantages and in accordance with the purpose of certain embodiments of the invention, as embodied and broadly described, and as shown, for example, in FIG. 1A and FIG. 1B, one preferred embodiment of the invention may be a single compartment device, with the single compartment containing a stimulus sensitive gel that undergoes its phase transition upon exposure to a predetermined stimulus, and containing an indicator spot.

One of ordinary skill will appreciate and understand that if the stimulus sensitive gel in this embodiment is swollen at the beginning of its use as it undergoes its phase transition, it will collapse or shrink, thereby uncovering the indicator spot. Alternatively, the stimulus sensitive gel could start out collapsed or shrunken, but upon exposure to its predetermined stimulus it would permanently expand or swell and cover the indicator spot. By way of example only and as disclosed herein and in prior applications, a stimulus sensitive gel may be of the "Upper Critical Solution Temperature" or UCST type or of the "Lower Critical Solution Temperature" or LCST type gel. As one of ordinary skill in the art will appreciate, a UCST type stimulus sensitive gel may be used when one wishes to have an initially shrunken stimulus sensitive gel expand or swell when it is heated beyond a predetermined stimulus, and thereby cover a previously uncovered indicator spot. A UCST type stimulus sensitive gel may also be used when it is desired to have an initially swollen stimulus sensitive gel collapse or shrink when it is cooled beyond a predetermined stimulus, and thereby reveal an indicator spot. Alternatively, an LCST type stimulus sensitive gel may be used when one wishes to have an initially shrunken stimulus sensitive gel expand or swell when it is cooled beyond a predetermined stimulus, and thereby cover an indicator spot. An LCST type stimulus sensitive gel may also be used when it is desired to have an initially swollen stimulus sensitive gel collapse or shrink when it is heated beyond a predetermined stimulus, and thereby reveal an indicator spot.

For purposes of disclosing this preferred embodiment and by way of example only, this preferred embodiment may be initially expanded or swollen, and permanently collapses or shrinks upon exposure to its predetermined stimulus. An indicator window may be provided through which a color change may be seen as a result of the swollen stimulus-sensitive gel undergoing its phase transition in reaction to a predetermined stimulus (i.e., the volume of the stimulus sensitive gel changes by collapsing or shrinking in reaction to the predetermined stimulus). Specifically, as the swollen stimulus-sensitive gel collapses or shrinks in response to the predetermined stimulus, the indicator spot contained in the first compartment may be revealed, and this change in color due to the revealing of the indicator spot may be viewed through the indicator window. By way of example only, as the stimulus-sensitive gel collapses or shrinks it may reveal the indicator spot contained in the first compartment. As the stimulus sensitive gel collapses or shrinks in response to the predetermined stimulus, a liquid and/or constituent parts within the stimulus sensitive gel may be expelled into the first compartment.

Notably, this exemplary preferred embodiment of this invention may not follow the typical reversibility pattern of a stimulus sensitive gel (i.e., the collapsed or shrunken stimulus sensitive gel of this preferred embodiment may not expand or swell back to or near its original volume when the predetermined stimulus is removed) because so long as the shrunken stimulus sensitive gel is maintained in a system that is closed to tangible substances (i.e., the shrunken stimulus sensitive gel and the liquid surrounding it are contained in a sealed compartment that prevents any liquids or constituent parts from passing into or out of that sealed compartment), but is open to intangible stimuli (i.e., the sealed compartment allows stimuli that cause the stimulus sensitive gel to undergo a phase transition to pass in and out of the sealed compartment), the shrunken stimulus sensitive gel may not expand or swell back to its original size, even when the predetermined stimulus is removed (by way of example only, even if the subsequent temperature of the shrunken stimulus sensitive gel far exceeds the temperature at which the same stimulus sensitive gel collapsed or shrunk in reaction to that predetermined stimulus when it was swollen).

For example, the stimulus sensitive gel of this preferred embodiment may only undergo its reverse phase transition and return to its original volume when: i) the predetermined stimulus is removed; and ii) the sealed compartment in which the stimulus sensitive gel is contained is no longer closed to tangible substances. By way of example only, if the predetermined stimulus is removed and the acetone-water mixture inside the polymer matrix of the shrunken stimulus sensitive gel of the preferred embodiment is replaced with pure distilled and deionized water, the shrunken stimulus sensitive gel may undergo its reverse phase transition and may, for example, expand or swell back to its original swollen stimulus sensitive gel volume.

By way of example only, if the swollen stimulus sensitive gel of the preferred embodiment collapses or shrinks in response to a predetermined stimulus of a temperature dropping below 2° C., that shrunken stimulus sensitive gel may not expand or swell back to or near its original volume or size even when the temperature of the shrunken stimulus sensitive gel is increased to ambient temperature (25° C. or 77° F.) or higher for a period of months.

Because of the method of manufacture of the stimulus sensitive gel in this preferred embodiment, the shrunken stimulus sensitive gel may remain collapsed or shrunken so long as the system remains closed (i.e., no liquid or constituent parts are withdrawn from the first compartment nor are they inserted into the first compartment). Thus, the collapsed or shrunken gel may be unable to expand or swell when the predetermined trigger stimulus (by way of example only, if the temperature of the stimulus sensitive gel goes below 2° C.) is removed. Accordingly, the indicator spot that is visible upon the collapsing or shrinking of the previously swollen stimulus sensitive gel may now be permanently visible due to the shrunken stimulus sensitive gel being permanently collapsed or shrunken in volume. It will be appreciated that the embodiment discussed herein teaching the stimulus sensitive gel as containing acetone and water as constituent parts is illustrative only, and those constituent parts could be replaced by any other fluids and/or constituent parts that work for the same purpose, such as mixtures of ethanol and water, or mixtures of water and other non-polar solvents, polar solvents, etc.

It should be noted that the predetermined temperature discussed herein that causes the stimulus sensitive gel to undergo its phase transition is only one example of a predetermined stimulus or trigger stimulus that may cause the inventive stimulus sensitive gel to undergo its phase transition. For example, the swollen stimulus sensitive gel of this preferred embodiment may trigger or undergo its phase transition upon exposure to a predetermined stimulus such as a predetermined pH level, or the swollen stimulus sensitive gel of this preferred embodiment may, for example, trigger or undergo its phase transition upon exposure to a predetermined level of electromagnetic radiation.

The single compartment of the preferred embodiment containing the stimulus sensitive gel may be formed by the backing layer on the bottom of the device and an upper layer (also referred to herein as the top layer) on the top of the stimulus indicating device. The top layer of the stimulus indicating device may be formed by at least the indicator window and the top portion of the top layer. Both the backing layer and the upper layer may be constructed of a strong, resilient leakproof material, such as plastic or other polymer material, so as to provide for the twisting or bending that might occur during transportation of or application to the stimulus sensitive product without tearing, breaking or leaking. The backing layer and the upper layer may also be made of a material that preferably allows them to be joined and sealed together, such as by heat stamping or other suitable means. The backing layer and the upper layer may both approximate the length and width of the compartment, although variations in these dimensions are within the scope of various examples of the present invention. The upper layer may preferably be made of a clear material, such as plastic, so that the user of the stimulus indicating device may view at least some portion of the backing material or color changing absorbent material. The upper layer may also be able to accept paint or ink so as to allow for coloring or concealing at least some portion of the first compartment.

Although at least some portion of the upper layer may also accept paint or ink for coloring, it may be preferable that the indicator window portion of the upper layer remain free from ink or coloring so that the user of the stimulus indicating device may observe the first compartment through the indicator window as explained herein. The backing layer may also be able to accept paste, glue or other suitable adhesive on the surface not facing the first compartment, so as to allow it to be attached to a stimulus sensitive product.

Preferably the stimulus sensitive gel may be attached at an attachment point that may be preferably located opposite the location of the indicator window. This way, the stimulus sensitive gel may, for example, be secured to one location and may not float or move within the first compartment and cover up the indicator spot at any time.

2. Embodiments with Single Compartment and Silica

To achieve these and other advantages and in accordance with the purpose of various embodiments of the invention, as embodied and broadly described, and as shown in FIG. 3A and FIG. 3B, another embodiment of the invention may be a single compartment device, with the single or first compartment containing a stimulus sensitive gel and an absorbent material, such as hygroscopic silica or an equivalent absorbent material that has an affinity for and permanently binds to the liquid and or constituent parts expelled from the stimulus sensitive gel (such as sodium polyacrylate or a polyacrylamide derivatives).

One of ordinary skill will appreciate and understand that if the stimulus sensitive gel in this embodiment is swollen at the beginning of its use as it undergoes its phase transition, it may collapse or shrink, thereby uncovering the indicator spot. Alternatively, the stimulus sensitive gel may start out collapsed or shrunken, but upon exposure to its predetermined stimulus it may permanently expand or swell and cover the indicator spot. By way of example only and as disclosed herein and in prior applications, a stimulus sensitive gel may be of the UCST type or of the LCST type. As one of ordinary skill in the art will appreciate, a UCST type stimulus sensitive gel may be used when one wishes to have an initially shrunken stimulus sensitive gel expand or swell when it is heated beyond a predetermined stimulus, and thereby cover an indicator spot. A UCST type stimulus sensitive gel may also be used when it is desired to have an initially swollen stimulus sensitive gel collapse or shrink when it is cooled beyond a predetermined stimulus, and thereby reveal an indicator spot. Alternatively, an LCST type stimulus sensitive gel may be used when one wishes to have an initially shrunken stimulus sensitive gel expand or swell when it is cooled beyond a predetermined stimulus, and thereby cover an indicator spot. An LCST type stimulus sensitive gel may also be used when it is desired to have an initially swollen stimulus sensitive gel collapse or shrink when it is heated beyond a predetermined stimulus, and thereby reveal an indicator spot.

For purposes of disclosing this alternative embodiment and by way of example only, this alternative embodiment may, for example, be initially expanded or swollen, and may permanently collapse or shrink upon exposure to its predetermined stimulus. An indicator window may be provided through which a color change may be seen as a result of the swollen stimulus sensitive gel undergoing its phase transition in reaction to a predetermined stimulus (i.e., the volume of the stimulus sensitive gel changes by collapsing or shrinking in reaction to the predetermined stimulus). Specifically, as the swollen stimulus sensitive gel collapses or shrinks in response to the predetermined stimulus, the indicator spot may be revealed, and this change in color due to the revealing of the indicator spot may be viewed through the indicator window. By way of example only, as the stimulus sensitive gel collapses or shrinks it may reveal the indicator spot.

As the stimulus sensitive gel collapses or shrinks in response to the predetermined stimulus, a liquid and/or constituent parts within the stimulus sensitive gel may, for example, be expelled into the first compartment and may then be absorbed and permanently trapped or held by the absorbent material. Trapping and/or binding the expelled liquid and/or constituent parts in the absorbent material may result in a constant volume of freely available expelled liquid and constituent parts as well as stimulus sensitive gel in the single compartment from that point forward. And because the shrunken stimulus sensitive gel may not access the expelled liquid and/or constituent parts absorbed by the absorbent material, the shrunken stimulus sensitive gel may be prevented from undergoing its reverse phase transition and re-expanding or re-swelling to its original or near original volume when the predetermined stimulus is removed.

The absorbent material may, for example, be selected to ensure that it has an affinity for the liquid and/or constituent parts expelled from the swollen stimulus sensitive gel as the swollen stimulus sensitive gel undergoes its phase transition. Moreover, the absorbent material may permanently bind to and trap the expelled liquid and/or constituent parts. By way of example only, if the expelled liquid were water, the absorbent material may be a silica gel. Because some or all of the volume of expelled liquid available to interact with the collapsed or shrunken gel may be fixed or constant due to the expelled liquid being bound to and/or trapped by the absorbent material, the collapsed or shrunken gel may be permanently prevented from re-expanding and re-covering the indicator spot, even when the predetermined stimulus condition is removed. In this way the stimulus indicating device may permanently show that it, and the stimulus sensitive product attached to it, had been exposed to a deleterious predetermined stimulus.

The single compartment of this alternative embodiment containing the stimulus sensitive gel may, for example, be formed by the backing layer on the bottom of the device and an upper layer on the top of the stimulus indicating device. The top layer of the stimulus indicating device may be formed by at least the indicator window and the top portion of the top layer. Both the backing layer and the upper layer may, for example, be constructed of a strong, resilient leak-proof material, such as plastic or other polymer material, so as to provide for the twisting or bending that might occur during transportation of or application to the stimulus sensitive product without tearing, breaking or leaking. The backing layer and the upper layer may also be made of a material that preferably allows them to be joined and sealed together, such as by heat stamping or other suitable means. The backing layer and the upper layer may both approximate the length and width of the compartment, although variations in these dimensions are within the scope of certain embodiments of the present invention. The upper layer may preferably be made of a clear material, such as plastic, so that the user of the stimulus indicating device may view at least some portion of the backing material or color changing absorbent material. The upper layer may also be able to accept paint or ink so as to allow for coloring or concealing at least some portion of the first compartment.

Although at least some portion of the upper layer may also accept paint or ink for coloring, it is preferable that the indicator window portion of the upper layer remain free from ink or coloring so that the user of the stimulus indicating device may observe the first compartment through the indicator window as explained herein. The backing layer may, for example, also be able to accept paste, glue or other suitable adhesive on the surface not facing the first compartment, so as to allow it to be attached to a stimulus sensitive product.

Preferably the stimulus sensitive gel may be attached at an attachment point that is preferably located opposite the location of the indicator window. This way, the stimulus sensitive gel may, for example, be secured to one location and may not float or move within the first compartment and cover up the indicator spot at any time.

3. Embodiments with Permeable Membrane

To achieve these and other advantages and in accordance with the purpose of certain embodiments of the invention, as embodied and broadly described and as shown in FIG. 4A and FIG. 4B, another alternative embodiment of the invention may, for example, be a multi-compartment device that includes at least a first compartment and a second compartment that are separated by a permeable membrane, which allows a liquid to pass through it in either direction. The first compartment may contain an indicator spot, a stimulus sensitive gel and a display portion or indicator window that allows the user of the stimulus sensitive device to see a color change occur when the stimulus sensitive gel is exposed to a predetermined stimulus, such exposure causing the stimulus sensitive gel to undergo its phase transition. As a result of the stimulus sensitive gel reacting to the predetermined stimulus, it undergoes its phase transition, causing the volume of the stimulus sensitive gel to change in that it collapses or shrinks, or alternatively the stimulus sensitive gel expands or swells.

One of ordinary skill will appreciate and understand that if the stimulus sensitive gel in this embodiment is swollen at the beginning of its use as it undergoes its phase transition, it may collapse or shrink, thereby uncovering the indicator spot. Alternatively, the stimulus sensitive gel may start out collapsed or shrunken, but upon exposure to its predetermined stimulus it may permanently expand or swell and cover the indicator spot. By way of example only and as disclosed herein and in prior applications, a stimulus sensitive gel may be of the UCST type or of the LCST type. As one of ordinary skill in the art will appreciate, a UCST type stimulus sensitive gel may be used when one wishes to have an initially shrunken stimulus sensitive gel expand or swell when it is heated beyond a predetermined stimulus, and thereby cover an indicator spot. A UCST type stimulus sensitive gel may also be used when it is desired to have an initially swollen stimulus sensitive gel collapse or shrink when it is cooled beyond a predetermined stimulus, and thereby reveal an indicator spot. Alternatively, an LCST type stimulus sensitive gel may be used when one wishes to have an initially shrunken stimulus sensitive gel expand or swell when it is cooled beyond a predetermined stimulus, and thereby cover an indicator spot. An LCST type stimulus sensitive gel may also be used when it is desired to have an initially swollen stimulus sensitive gel collapse or shrink when it is heated beyond a predetermined stimulus, and thereby reveal an indicator spot.

For purposes of disclosing this alternative embodiment and by way of example only, this alternative embodiment may be initially expanded or swollen, and permanently collapses or shrinks upon exposure to its predetermined stimulus. An indicator window may be provided through which a color change can be seen as a result of the swollen stimulus sensitive gel undergoing its phase transition in reaction to a predetermined stimulus (i.e., the volume of the stimulus sensitive gel changes by collapsing or shrinking in reaction to the predetermined stimulus). Specifically, as the swollen stimulus sensitive gel collapses or shrinks in response to the predetermined stimulus, the indicator spot contained in the first compartment may be revealed, and this change in color due to the revealing of the indicator spot can be viewed through the indicator window. By way of example only, as the stimulus sensitive gel collapses or shrinks it may reveal the indicator spot contained in the first compartment. As the stimulus sensitive gel collapses or shrinks in response to the predetermined stimulus, a liquid and/or constituent parts within the stimulus sensitive gel may be expelled into the first compartment, and pass into the second compartment though the permeable membrane that separates the at least two compartments.

Because the permeable membrane separating the at least two compartment embodiment may allow the expelled liquid and/or constituent parts to pass in both directions, the expelled liquid and/or constituent parts may, for example, subsequently pass back into the first compartment. And when the predetermined stimulus is removed, the shrunken stimulus sensitive gel may then have the ability to reabsorb the previously expelled liquid once the predetermined stimulus is removed, thereby expanding or swelling to its original or near original volume. In doing so, the now re-swollen stimulus sensitive gel may cover up the indicator spot. Accordingly, the second compartment may preferably contain an absorbent material that has an affinity for the expelled liquid and/or constituent parts (as described herein or as understood in the art), so as to permanently bind to and trap the expelled liquid and/or constituent parts in the second compartment. By way of example only, if the expelled liquid were water, the absorbent material may be a silica gel.

Trapping the expelled liquid in the second compartment with the absorbent material may result in a constant or fixed volume of liquid and gel in the first compartment from that point forward. Because the volume of liquid and gel in the first compartment may be fixed due to the expelled liquid and/or constituent parts being trapped in the second compartment by the absorbent material, the collapsed or shrunken stimulus sensitive gel may be permanently prevented from re-expanding and re-covering the indicator spot even when the predetermined stimulus condition is removed. In this way the stimulus indicating device may permanently show that it, and the stimulus sensitive product attached to it, had been exposed to a deleterious predetermined stimulus.

The at least two compartments of this alternative embodiment may, for example, be formed by the backing layer on the bottom of the device and an upper layer on the top of the stimulus indicating device. The top layer of the stimulus indicating device may be formed by at least the indicator window and the top portion of the top layer. Both the backing layer and the upper layer may, for example, be constructed of a strong, resilient leak-proof material, such as plastic or other polymer material, so as to provide for the twisting or bending that might occur during transportation of or application to the stimulus sensitive product without tearing, breaking or leaking. The backing layer and the upper layer may also be made of a material that preferably allows them to be joined and sealed together, such as by heat stamping or other suitable means. The backing layer and the upper layer may both approximate the length and width of the compartment, although variations in these dimensions are within the scope of certain embodiments of the present invention. The upper layer may preferably be made of a clear material, such as plastic, so that the user of the stimulus indicating device can view at least some portion of the backing material or color changing absorbent material. The upper layer may also be able to accept paint or ink so as to allow for coloring or concealing at least some portion of the first compartment.

Although at least some portion of the upper layer may also accept paint or ink for coloring, it is preferable that the indicator window portion of the upper layer remain free from ink or coloring so that the user of the stimulus indicating device may observe the first compartment through the indicator window as explained herein. The backing layer may, for example, also be able to accept paste, glue or other suitable adhesive on the surface not facing the first compartment, so as to allow it to be attached to a stimulus sensitive product.

Preferably the stimulus sensitive gel may be attached at an attachment point that is preferably located opposite the location of the indicator window. This way, the stimulus sensitive gel may be secured to one location and cannot float or move within the first compartment and cover up the indicator spot at any time.

4. Embodiments with Semi-Permeable Membrane

To achieve these and other advantages and in accordance with the purpose of certain embodiments of the invention, as embodied and broadly described and as shown in FIG. 5A and FIG. 5B, another alternative embodiment of the invention may be a multi-compartment device that includes at least a first compartment and a second compartment that are separated by a semi-permeable membrane, which only allows a certain liquid to pass through it in only one direction. The first compartment may, for example, contain an indicator spot, a stimulus sensitive gel and a display portion or indicator window that allows the user of the stimulus sensitive device to see a color change occur when the stimulus sensitive gel is exposed to a predetermined stimulus, such exposure causing the stimulus sensitive gel to undergo its phase transition. As a result of the stimulus sensitive gel reacting to the predetermined stimulus, it may undergo its phase transition, causing the volume of the stimulus sensitive gel to change in that it collapses or shrinks.

One of ordinary skill will appreciate and understand that if the stimulus sensitive gel in this embodiment is swollen at the beginning of its use as it undergoes its phase transition, it may collapse or shrink, thereby uncovering the indicator spot. Alternatively, the stimulus sensitive gel may start out collapsed or shrunken, but upon exposure to its predetermined stimulus it may permanently expand or swell and cover the indicator spot. By way of example only and as disclosed herein and in prior applications, a stimulus sensitive gel may be of the UCST type or of the LCST type. As one of ordinary skill in the art will appreciate, a UCST type stimulus sensitive gel may be used when one wishes to have an initially shrunken stimulus sensitive gel expand or swell when it is heated beyond a predetermined stimulus, and thereby cover an indicator spot. A UCST type stimulus sensitive gel may also be used when it is desired to have an initially swollen stimulus sensitive gel collapse or shrink when it is cooled beyond a predetermined stimulus, and thereby reveal an indicator spot. Alternatively, an LCST type stimulus sensitive gel may be used when one wishes to have an initially shrunken stimulus sensitive gel expand or swell when it is cooled beyond a predetermined stimulus, and thereby cover an indicator spot. An LCST type stimulus sensitive gel may also be used when it is desired to have an initially swollen stimulus sensitive gel collapse or shrink when it is heated beyond a predetermined stimulus, and thereby reveal an indicator spot.

For purposes of disclosing this alternative embodiment and by way of example only, this alternative embodiment may be initially expanded or swollen, and permanently collapses or shrinks upon exposure to its predetermined stimulus. An indicator window may, for example, be provided through which a color change can be seen as a result of the swollen stimulus sensitive gel undergoing its phase transition in reaction to a predetermined stimulus (i.e., the volume of the stimulus sensitive gel changes by collapsing or shrinking in reaction to the predetermined stimulus). Specifically, as the swollen stimulus sensitive gel collapses or shrinks in response to the predetermined stimulus, the indicator spot contained in the first compartment may be revealed, and this change in color due to the revealing of the indicator spot may be viewed through the indicator window. By way of example only, as the stimulus sensitive gel collapses or shrinks it may reveal the indicator spot contained in the first compartment. As the stimulus sensitive gel collapses or shrinks in response to the predetermined stimulus, a liquid and/or constituent parts within the stimulus sensitive gel may be expelled into the first compartment, and pass into the second compartment through the semi-permeable membrane that separates the at least two compartments.

Because the semi-permeable membrane only allows the expelled liquid and/or constituent parts to pass in one direction, the expelled liquid and/or constituent parts may be trapped outside the first compartment, preferably in the second compartment, resulting in a constant volume of liquid and gel in the first compartment from that point forward. Alternatively, the second compartment may also contain an absorbent material that has an affinity for the expelled liquid (as described herein or as understood in the art), so as to permanently bind to and trap the expelled liquid and/or constituent parts in the second compartment. By way of example only, if the expelled liquid were water, the absorbent material may be a silica gel.

Trapping the expelled liquid in the second compartment with the semi-permeable membrane alone or in combination with the absorbent material may result in a constant or fixed volume of liquid and gel in the first compartment from that point forward. Because the volume of liquid and gel in the first compartment may be fixed due to the expelled liquid and/or constituent parts being trapped in the second compartment by the semi-permeable membrane alone or in combination with absorbent material, the collapsed or shrunken stimulus sensitive gel may be permanently prevented from re-expanding and re-covering the indicator spot, even when the predetermined stimulus condition is removed. In this way the stimulus indicating device may permanently show that it, and the stimulus sensitive product attached to it, had been exposed to a deleterious predetermined stimulus.

The at least two compartments of this alternative embodiment may, for example, be formed by the backing layer on the bottom of the device and an upper layer on the top of the stimulus indicating device. The top layer of the stimulus indicating device may be formed by at least the indicator window and the top portion of the top layer. Both the backing layer and the upper layer may, for example, be constructed of a strong, resilient leak-proof material, such as plastic or other polymer material, so as to provide for the twisting or bending that might occur during transportation of or application to the stimulus sensitive product without tearing, breaking or leaking. The backing layer and the upper layer may also be made of a material that preferably allows them to be joined and sealed together, such as by heat stamping or other suitable means. The backing layer and the upper layer may both approximate the length and width of the compartment, although variations in these dimensions are within the scope of certain embodiments of the present invention. The upper layer may preferably be made of a clear material, such as plastic, so that the user of the stimulus indicating device can view at least some portion of the backing material or color changing absorbent material. The upper layer may also be able to accept paint or ink so as to allow for coloring or concealing at least some portion of the first compartment.

Although at least some portion of the upper layer may also accept paint or ink for coloring, it may be preferable that the indicator window portion of the upper layer remain free from ink or coloring so that the user of the stimulus indicating device may observe the first compartment through the indicator window as explained herein. The backing layer may, for example, also be able to accept paste, glue or other suitable adhesive on the surface not facing the first compartment, so as to allow it to be attached to a stimulus sensitive product.

Preferably the stimulus sensitive gel is attached at an attachment point that may be preferably located opposite the location of the indicator window. This way, the stimulus sensitive gel may be secured to one location and cannot float or move within the first compartment and cover up the indicator spot at any time.

5. Embodiments with Constricting Portion

To achieve these and other advantages and in accordance with the purpose of certain embodiments of the invention, as embodied and broadly described and as shown in FIG. 6A and FIG. 6B, another alternative embodiment of the invention may be a multi-compartment device that may include at least a first compartment and a second compartment that are separated by a constricting portion or neck portion. By way of example only, this constricting portion is described herein and in prior applications as a nozzle portion, a neck portion, a constricting portion, or any combination thereof. Prior to exposure to a predetermined stimulus, in this embodiment a stimulus sensitive gel may be contained in either: i) only the first compartment; ii) only the second compartment; or iii) both the first compartment and the second compartment. This type of stimulus sensitive gel and its location in the first, second or both compartments may, for example, be dependant on the application of the stimulus indicator device.

As one of ordinary skill in the art will appreciate, a UCST type stimulus sensitive gel may be used when one wishes to have an initially shrunken stimulus sensitive gel expand or swell when it is heated beyond a predetermined stimulus, and thereby cover an indicator spot. A UCST type stimulus sensitive gel may also be used when it is desired to have an initially swollen stimulus sensitive gel collapse or shrink when it is cooled beyond a predetermined stimulus, and thereby reveal an indicator spot. Alternatively, an LCST type stimulus sensitive gel may be used when one wishes to have an initially shrunken stimulus sensitive gel expand or swell when it is cooled beyond a predetermined stimulus, and thereby cover an indicator spot. An LCST type stimulus sensitive gel may also be used when it is desired to have an initially swollen stimulus sensitive gel collapse or shrink when it is heated beyond a predetermined stimulus, and thereby reveal an indicator spot.

For purposes of disclosing this alternative embodiment and by way of example only, this alternative embodiment may be initially expanded or swollen, and permanently collapses or shrinks upon exposure to its predetermined stimulus. An indicator window may be provided through which a color change can be seen as a result of the swollen stimulus sensitive gel undergoing its phase transition in reaction to a predetermined stimulus (i.e., the volume of the stimulus sensitive gel changes by collapsing or shrinking in reaction to the predetermined stimulus). Specifically, as the swollen stimulus sensitive gel collapses or shrinks in response to the predetermined stimulus, the indicator spot contained in the first compartment may be revealed, and this change in color due to the revealing of the indicator spot in the first compartment may, for example, be viewed through the indicator window. As the stimulus sensitive gel collapses or shrinks in response to the predetermined stimulus and passes out of the first compartment so as to collect in the second compartment, the constricting portion or neck portion keeps the shrunken stimulus sensitive gel away from the somewhat or fully revealed indicator spot.

By way of example only, a display portion may be provided through which a color change can be seen when the stimulus sensitive gel is exposed to a predetermined stimulus, thereby causing the stimulus sensitive gel to undergo its phase transition. As a result of the stimulus sensitive gel undergoing its phase transition in response to the predetermined stimulus, the volume of the stimulus sensitive gel may change and reveal or cover the indicator spot positioned in the first compartment. By way of example only, although the descriptions herein of this alternative embodiment employing a neck portion describe a stimulus sensitive gel that collapses to reveal an indicator spot it is for explanatory purposes only and is not intended in anyway to be limiting. In the preferred version of this alternative embodiment, as the swollen stimulus sensitive gel collapses or shrinks in response to the predetermined stimulus, a liquid within the stimulus sensitive gel may be expelled throughout the at least first compartment and second compartment. As the stimulus sensitive gel collapses or shrinks, it may withdraw from the first compartment containing an indicator spot, which may preferably be located below the indicator window. As the stimulus sensitive gel withdraws from the first compartment, it passes through the constricting or neck portion that connects the first compartment and second compartment.

Because of the shape of the constricting or neck portion, once the stimulus sensitive gel has begun to collect outside the first compartment, the constricting or neck portion permanently prevents the stimulus sensitive gel from re-entering the first compartment and re-covering the indicator spot when the predetermined stimulus is removed. In this way the stimulus indicating device permanently shows that it, and the stimulus sensitive product attached to it, had been exposed to a deleterious predetermined stimulus. In a more particular version of this embodiment, the neck portion may, for example, have angled ribs or teeth that allow the collapsing or shrinking gel to move out of the first compartment but aid in preventing the gel from moving back into the first compartment. These angled ribs or teeth may operate on the same principle used by a snake or shark when it feeds—its teeth are angled backward so that the food (in regard to certain embodiments of the present invention, the collapsing or shrinking stimulus sensitive gel) may move easily in the desired direction, but is prevented from moving in the opposite direction.

The at least two compartments of this alternative embodiment may, for example, be formed by the backing layer on the bottom of the device and an upper layer on the top of the stimulus indicating device. The top layer of the stimulus indicating device may be formed by at least the indicator window and the top portion of the top layer. Both the backing layer and the upper layer may, for example, be constructed of a strong, resilient leak-proof material, such as plastic or other polymer material, so as to provide for the twisting or bending that might occur during transportation of or application to the stimulus sensitive product without tearing, breaking or leaking. The backing layer and the upper layer may also be made of a material that preferably allows them to be joined and sealed together, such as by heat stamping or other suitable means. The backing layer and the upper layer may both approximate the length and width of the compartment, although variations in these dimensions are within the scope of certain embodiments of the present invention. The upper layer may preferably be made of a clear material, such as plastic, so that the user of the stimulus indicating device can view at least some portion of the backing material or color changing absorbent material. The upper layer may also be able to accept paint or ink so as to allow for coloring or concealing at least some portion of the first compartment.

Although at least some portion of the upper layer may also accept paint or ink for coloring, it is preferable that the indicator window portion of the upper layer remain free from ink or coloring so that the user of the stimulus indicating device may observe the first compartment through the indicator window as explained herein. The backing layer may, for example, also be able to accept paste, glue or other suitable adhesive on the surface not facing the first compartment, so as to allow it to be attached to a stimulus sensitive product.

Preferably the stimulus sensitive gel is attached at an attachment point that may preferably be located opposite the location of the indicator window. This way, the stimulus sensitive gel may be secured to one location and cannot float or move within the first compartment and cover up the indicator spot at any time.

6. Embodiments with Single Compartment with Color Changing Material

To achieve these and other advantages and in accordance with the purpose of certain embodiments of the invention, as embodied and broadly described, and as shown in FIG. 7A and FIG. 7B, another alternative embodiment of the invention may be a single compartment device, with the single compartment containing a stimulus sensitive gel and a color changing absorbent material. Prior to exposure of the stimulus indicating device to a predetermined stimulus, the color changing absorbent material may be a first color, visible through the indicator window or display portion.

One of ordinary skill will appreciate and understand that if the stimulus sensitive gel in this embodiment is swollen at the beginning of its use as it undergoes its phase transition, it may collapse or shrink, thereby causing a color changing absorbent material to change color. Alternatively, the stimulus sensitive gel may start out collapsed or shrunken, but upon exposure to its predetermined stimulus it may permanently expand or swell and cause a color changing absorbent material to change color. By way of example only and as disclosed herein and in prior applications, a stimulus sensitive gel may be of the UCST type or of the LCST type. As one of ordinary skill in the art will appreciate, a UCST type stimulus sensitive gel may be used when one wishes to have an initially shrunken stimulus sensitive gel expand or sell when it is heated beyond a predetermined stimulus, and thereby cause a color changing absorbent material to change color. A UCST type stimulus sensitive gel may also be used when it is desired to have an initially swollen stimulus sensitive gel collapse or shrink when it is cooled beyond a predetermined stimulus, and thereby cause a color changing absorbent material to change color. Alternatively, an LCST type stimulus sensitive gel may be used when one wishes to have an initially shrunken stimulus sensitive gel expand or sell when it is cooled beyond a predetermined stimulus, and thereby cause a color changing absorbent material to change color. An LCST type stimulus sensitive gel may also be used when it is desired to have an initially swollen stimulus sensitive gel collapse or shrink when it is heated beyond a predetermined stimulus, and thereby may cause a color changing absorbent material to change color.

For purposes of disclosing this alternative embodiment and by way of example only, this alternative embodiment may initially be expanded or swollen, and permanently collapses or shrinks upon exposure to its predetermined stimulus. An indicator window may be provided through which a color change can be seen as a result of the swollen stimulus sensitive gel undergoing its phase transition in reaction to a predetermined stimulus (i.e., the volume of the stimulus sensitive gel changes by collapsing or shrinking in reaction to the predetermined stimulus). Specifically, as the swollen stimulus sensitive gel collapses or shrinks in response to the predetermined stimulus, it may expel the liquid and/or constituent parts contained in the matrix of the stimulus sensitive gel. This expelled liquid and/or constituent parts subsequently may come into contact with the color changing absorbent material, causing it to undergo a color change which may be viewed through the indicator window.

The single compartment of the alternative embodiment may, for example, be formed by the backing layer on the bottom of the device and an upper layer on the top of the stimulus indicating device. The top layer of the stimulus indicating device may be formed by at least the indicator window and the top portion of the top layer. Both the backing layer and the upper layer may, for example, be constructed of a strong, resilient leak-proof material, such as plastic or other polymer material, so as to provide for the twisting or bending that might occur during transportation of the stimulus sensitive product without tearing, breaking or leaking. The backing layer and the upper layer may also be made of a material that preferably allows them to be joined and sealed together, such as by heat stamping or other suitable means. The backing layer and the upper layer may both approximate the length and width of the compartment, although variations in these dimensions are within the scope of certain embodiments of the present invention. The upper layer may preferably be made of a clear material, such as plastic, so that the user of the stimulus indicating device can view at least some portion of the backing material or color changing absorbent material. The upper layer may also be able to accept paint or ink so as to allow for coloring or concealing at least some portion of the first compartment.

Although at least some portion of the upper layer may also accept paint or ink for coloring, it is preferable that the indicator window portion of the upper layer remain free from ink or coloring so that the use of the stimulus indicating device can observe the first compartment through the indicator window as explained herein. The backing layer may also be able to accept paste, glue or other suitable adhesive on the surface not facing the first compartment, so as to allow it to be attached to a stimulus sensitive product.

Upon exposure of the stimulus sensitive gel to a predetermined stimulus, the stimulus sensitive gel may undergo its phase transition in reaction to the predetermined stimulus. As the swollen stimulus sensitive gel undergoes its phase transition, the volume of the swollen stimulus sensitive gel may change by collapsing or shrinking due at least to a portion of the liquid contained in the polymer network being expelled. Along with this liquid, at least some of the constituent parts required for detection of unfavorable stimulus exposure, which are incorporated into the polymer network during the initial preparation, may be expelled as well.

By way of example only, the color changing absorbent material may be divalent cation test paper, litmus paper or any equivalent color changing absorbent material. What is important is that the color changing absorbent material may, for example, have: 1) an affinity for the liquid and constituent parts contained in, and then expelled from, the stimulus sensitive gel; and 2) that at least a portion of the color changing absorbent material changes color upon coming into contact with the expelled liquid and/or constituent parts. More specifically, at least some of the constituent parts carried by the expelled liquid may permanently bind onto the color changing absorbent material so as to cause the color changing absorbent material to change color so that even if the expelled liquid is subsequently reabsorbed by the shrunken stimulus sensitive gel when the predetermined stimulus is removed, those constituent parts may remain bound or trapped in the color changing absorbent material.

By way of example only, the constituent parts contained in the polymer matrix of the swollen stimulus sensitive gel, and then expelled along with and carried by the expelled liquid until both come into contact with the color changing absorbent material, may be divalent cations (by way of example, $Mg^{2+}$ or $Ca^+$). More specifically, as the stimulus sensitive gel undergoes its phase transition due to exposure to a predetermined stimulus, the swollen stimulus sensitive gel may not only expel the liquid contained in the polymer matrix, but may also expel the constituent parts, such as divalent cations (by way of example only, $Mg^{2+}$ or $Ca^+$) also contained in the polymer matrix of the swollen stimulus sensitive gel.

Then, when the expelled constituent parts (e.g., divalent citations (by way of example only, $Mg^{2+}$ or $Ca^{2+}$)) carried by the expelled liquid came into contact with the color changing absorbent material, at least a portion of the color changing absorbent material may not only change from a first color to a second color, but the constituent parts may also permanently bind to the color changing absorbent material. It is important that that the color changing absorbent materials be reactive to the expelled constituent parts. Thus, because the constituent parts in the preferred embodiment preferably consist of divalent cations, the color changing absorbent material may preferably be reactive to those divalent cations, and may include by way of example only, divalent cationic paper. Examples of such divalent cationic paper that may be used as the color changing absorbent material includes a total-hardness indicator paper or test stick that is available from Sigma-Aldrich under the tradename QUANTOFIX®, is manufactured by Macherey-Nagel under the trade name Aquador®, and that changes color from blue to red upon coming into contact with expelled liquid containing the constituent parts (by way of example only, $Mg^{2+}$ or $Ca^{2+}$). Preferably the color changing absorbent material may operate in at least a semi-quantitative capacity.

By the expelled constituent parts (e.g., divalent cations by way of example only, $Mg^{2+}$ or $Ca^{2+}$) permanently binding to the color changing absorbent material (e.g., by way of example only, divalent cationic paper), even if the expelled liquid were ultimately reabsorbed by the collapsed or shrunken stimulus sensitive gel so as to become a partially or fully re-swollen stimulus sensitive gel, the expelled constituent parts may remain permanently bound to the color changing absorbent material or cationic paper, and the color changing absorbent material (by way of example only cationic paper) may remain permanently colored the second color.

Although the alternative embodiment discussed herein employs divalent cation test paper as the color changing absorbent material, alternative color changing absorbent materials may also be used, so long as they are reactive to the expelled constituent parts. By way of example only, the liquid held in the polymer matrix of the swollen stimulus sensitive gel may contain protons ($H^{2+}$). And as the swollen stimulus sensitive gel undergoes its phase transition due to exposure to a predetermined stimulus, the liquid may not only be expelled from the swollen stimulus sensitive gel, but the $H^+$ may also be expelled along with that liquid. Then when the expelled constituent parts (by way of example, only $H^+$) contained in the expelled liquid subsequently come into physical contact with the color changing absorbent material, such as litmus paper (by way of example only, $H^+$ concentration indicator), at least a portion of the color changing absorbent material may react to the expelled constituent parts (by way of example only, $H^+$), and change from a first color to a second color. Such litmus paper that is suitable for use as a color changing absorbent material may include, by way of example only, the pH-indicator strips manufactured by EMD Chemicals Inc. What is important is that the litmus paper changes from a first color to a second color upon coming into contact with the constituent parts.

In addition to changing from a first color to a second color, the expelled constituent parts (by way of example only, $H^+$) may permanently bind to the color changing absorbent material. Accordingly, even if the expelled liquid were ultimately reabsorbed by the collapsed or shrunken stimulus sensitive gel, so as to become a partially or fully re-swollen stimulus sensitive gel, the expelled constituent parts (by way of example only, $H^+$) may remain permanently bound to the color changing absorbent material, and the color changing absorbent material may permanently remain colored the second color.

Preferably the stimulus sensitive gel is attached at an attachment point that may preferably be located opposite the location of the indicator window. In this way, the stimulus sensitive gel may be secured to one location and cannot float or move within the first compartment and cover up the color changing absorbent material at any time. In addition, if the color changing absorbent material is capable of wicking the liquid and constituent parts out of the polymer matrix of the swollen stimulus sensitive gel, simply by being in physical contact with the swollen stimulus sensitive gel, then the color changing absorbent material may be physically separated from the swollen stimulus sensitive gel. Otherwise, the color changing absorbent material would wick and absorb the constituent parts (e.g., divalent cations or protons) from the swollen stimulus sensitive gel even if the stimulus indicating device had not been exposed to a predetermined stimulus, resulting in a false indication that the stimulus sensitive product attached to the stimulus indicating device had been exposed to a predetermined stimulus, when in fact it had not.

7. Embodiments with Two Compartments with Permeable Membrane and Absorbent Material To achieve these and other advantages and in accordance with the purpose of certain embodiments of the invention, as embodied and broadly described, another embodiment of the invention, as shown in FIG. 8A and FIG. 8B, may be a multi-compartment device that includes a first compartment with an indicator window through which a color changing absorbent material is visible, and at least a second compartment containing a stimulus sensitive gel. The first compartment and the second compartment may, for example, be formed by the backing layer on the bottom of the stimulus indicating device and an upper layer on the top of the stimulus indicating device, as shown in FIG. 8A and FIG. 8B. The first compartment and the second compartment may additionally be formed and differentiated from one another by a permeable membrane that is strong and resilient to twisting, bending and breaking. Alternately, as shown in FIG. 8C, an alternative embodiment may position the first compartment above the second compartment separated by the permeable membrane. Other shapes may also be contemplated within the scope of certain embodiments of the invention as previously described in prior applications.

Prior to exposure to a predetermined stimulus, in this embodiment, a stimulus sensitive gel may be preferably contained in just the second compartment. And, prior to exposure of the stimulus indicting device to the predetermined stimulus, the color changing absorbent material may be a first color, visible through the indicator window or display portion.

One of ordinary skill will appreciate and understand that if the stimulus sensitive gel in this embodiment is swollen at the beginning of its use as it undergoes its phase transition, it may collapse or shrink, thereby causing a color changing absorbent material to change color. Alternatively, the stimulus sensitive gel may start out collapsed or shrunken, but upon exposure to its predetermined stimulus it may permanently expand or swell and cause a color changing absorbent material to change color. By way of example only and as disclosed herein and in prior applications, a stimulus sensitive gel may, for example, be of the UCST type or of the LCST type. As one of ordinary skill in the art will appreciate, a UCST type stimulus sensitive gel may be used when one wishes to have an initially shrunken stimulus sensitive gel expand or swell when it is heated beyond a predetermined stimulus, and thereby cause a color changing absorbent material to change color. A UCST type stimulus sensitive gel may also be used when it is desired to have an initially swollen stimulus sensitive gel collapse or shrink when it is cooled beyond a predetermined stimulus, and thereby cause a color changing absorbent material to change color. Alternatively, an LCST type stimulus sensitive gel may be used when one wishes to have an initially shrunken stimulus sensitive gel expand or swell when it is cooled beyond a predetermined stimulus, and thereby cause a color changing absorbent material to change color. An LCST type stimulus sensitive gel may also be used when it is desired to have an initially swollen stimulus sensitive gel collapse or shrink when it is heated beyond a predetermined stimulus, and thereby cause a color changing absorbent material to change color.

For purposes of disclosing this alternative embodiment and by way of example only, this alternative embodiment may be initially expanded or swollen, and may permanently collapse or shrink upon exposure to its predetermined stimulus. An indicator window may be provided through which a color change can be seen as a result of the swollen stimulus sensitive gel undergoing its phase transition in reaction to a predetermined stimulus (i.e., the volume of the stimulus sensitive gel changes by collapsing or shrinking in reaction to the predetermined stimulus). Specifically, as the swollen stimulus sensitive gel collapses or shrinks in response to the predetermined stimulus, it may expels the liquid and/or constituent parts contained in the matrix of the stimulus sensitive gel. This expelled liquid and/or constituent parts may subsequently pass through the permeable membrane and ultimately may subsequently come into contact with the color changing absorbent material, causing it to undergo a color change which may be viewed through the indicator window.

Both the backing layer and the upper layer may, for example, be constructed of a strong, resilient leak-proof material, such as plastic or other polymer material, so as to provide for the twisting or bending that might occur during transportation of the stimulus sensitive product without tearing, breaking or leaking. The backing layer and the upper layer may also be made of a material that preferably allows them to be joined and sealed together, such as by heat stamping or other suitable means. The backing layer and the upper layer may both approximate the length and width of the compartment, although variations in these dimensions are within the scope of certain embodiments of the present invention. The upper layer may preferably be made of a clear material, such as plastic, so that the user of the stimulus indicating device can view at least some portion of the backing material or color changing absorbent material. The upper layer may also be able to accept paint or ink so as to allow for coloring or concealing at least some portion of the first compartment.

Although at least some portion of the upper layer may also accept paint or ink for coloring, it is preferable that the indicator window portion of the upper layer remain free from ink or coloring so that the use of the stimulus indicating device can observe the first compartment through the indicator window as explained herein. The backing layer may also be able to accept paste, glue or other suitable adhesive on the surface not facing the first compartment, so as to allow it to be attached to a stimulus sensitive product.

Upon exposure of the stimulus sensitive gel to a predetermined stimulus, the stimulus sensitive gel may undergo its phase transition in reaction to the predetermined stimulus. As the swollen stimulus sensitive gel undergoes its phase transition, the volume of the swollen stimulus sensitive gel may change by collapsing or shrinking due at least to a portion of the liquid contained in the polymer network being expelled. Along with this liquid, at least some of the constituent parts required for detection of unfavorable stimulus exposure, which are incorporated into the polymer network during the initial preparation, may be expelled as well.

By way of example only, the color changing absorbent material may be divalent cation test paper, litmus paper or any equivalent color changing absorbent material. What is important is that the color changing absorbent materials may, for example, have: 1) an affinity for the liquid and constituent parts contained in, and then expelled from, the stimulus sensitive gel; and 2) that at least a portion of the color changing absorbent material may change color upon coming into contact with the expelled liquid and/or constituent parts. More specifically, at least some of the constituent parts carried by the expelled liquid may permanently bind onto the color changing absorbent material so as to cause the color changing absorbent material to change color so that even if the expelled liquid is subsequently reabsorbed by the shrunken stimulus sensitive gel when the predetermined stimulus is removed, those constituent parts may remain bound or trapped in the color changing absorbent material.

By way of example only, the constituent parts contained in the polymer matrix of the swollen stimulus sensitive gel, and then expelled along with and carried by the expelled liquid until both come into contact with the color changing absorbent material, may be divalent cations (by way of example, $Mg^{2+}$ or $Ca^{2+}$). More specifically, as the stimulus sensitive gel undergoes its phase transition due to exposure to a predetermined stimulus, the swollen stimulus sensitive gel may not only expel the liquid contained in the polymer matrix, but may also expel the constituent parts, such as divalent cations (by way of example only, $Mg^{2+}$ or $Ca^{2+}$) also contained in the polymer matrix of the swollen stimulus sensitive gel.

Then, when the expelled constituent parts (e.g., divalent citations (by way of example only, $Mg^{2+}$ or $Ca^{2+}$)) carried by the expelled liquid came into contact with the color changing absorbent material, at least a portion of the color changing absorbent material may not only change from a first color to a second color, but the constituent parts may also permanently bind to the color changing absorbent material. It is important that that the color changing absorbent materials be reactive to the expelled constituent parts. Thus, because the constituent parts in the preferred embodiment preferably consist of divalent cations, the color changing absorbent material may preferably be reactive to those divalent cations, and may include by way of example only, divalent cationic paper. Examples of such divalent cationic paper that may be used as the color changing absorbent material include a total-hardness indicator paper or test stick that is available from Sigma-Aldrich under the tradename QUANTOFIX®, is manufactured by Macherey-Nagel under the trade name Aquador®, and that changes color from blue to red upon coming into contact with expelled liquid containing the constituent parts (by way of example only, $Mg^{2+}$ or $Ca^{2+}$). Preferably the color changing absorbent material may operate in at least a semi-quantitative capacity.

By the expelled constituent parts (e.g., divalent cations by way of example only, $Mg^{2+}$ or $Ca^{2+}$) permanently binding to the color changing absorbent material (e.g., by way of example only, divalent cationic paper), even if the expelled liquid were ultimately reabsorbed by the collapsed or shrunken stimulus sensitive gel so as to become a partially or fully re-swollen stimulus sensitive gel, the expelled constituent parts may remain permanently bound to the color changing absorbent material or cationic paper, and the color changing absorbent material (by way of example only cationic paper) may remain permanently colored the second color.

Although the alternative embodiment discussed herein employs divalent cation test paper as the color changing absorbent material, alternative color changing absorbent materials may also be used, so long as they are reactive to the expelled constituent parts. By way of example only, the liquid held in the polymer matrix of the swollen stimulus sensitive gel could contain protons ($H^+$). And as the swollen stimulus sensitive gel undergoes its phase transition due to exposure to a predetermined stimulus, the liquid may not only be expelled from the swollen stimulus sensitive gel, but the $H^+$ may also be expelled along with that liquid. Then when the expelled constituent parts (by way of example, only $H^+$) contained in the expelled liquid subsequently come into physical contact with the color changing absorbent material, such as litmus paper (by way of example only, $H^+$ concentration indicator), at least a portion of the color changing absorbent material may react to the expelled constituent parts (by way of example only, $H^+$), and may change from a first color to a second color. Such litmus paper that is suitable for use as a color changing absorbent material may include by way of example only, the pH-indicator strips manufactured by EMD Chemicals Inc. What is important is that the litmus paper changes from a first color to a second color upon coming into contact with the constituent parts.

In addition to changing from a first color to a second color, the expelled constituent parts (by way of example only, $H^+$) may permanently bind to the color changing absorbent material. Accordingly, even if the expelled liquid were ultimately reabsorbed by the collapsed or shrunken stimulus sensitive gel, so as to become a partially or fully re-swollen stimulus sensitive gel, the expelled constituent parts (by way of example only, $H^+$) may remain permanently bound to the color changing absorbent material, and the color changing absorbent material may permanently remain colored the second color.

Moreover, because the permeable membrane keeps the stimulus sensitive gel in the second compartment, the stimulus sensitive gel preferably may not move into the first compartment at any time, and may thereby be prevented from covering up the color changing absorbent material at all times. Preferably, the stimulus sensitive gel may also be held in the second compartment by an attachment point. In addition, if the color changing absorbent material is capable of wicking the liquid and constituent part out of the polymer matrix of the swollen stimulus sensitive gel, simply by being in physical contact with the swollen stimulus sensitive gel, then the color changing absorbent material may be physically separated from the swollen stimulus sensitive gel. Otherwise, the color changing absorbent material may wick and absorb the constituent parts (divalent cations or hydrogen ions) from the swollen stimulus sensitive gel even if the stimulus indicating device had not been exposed to a predetermined stimulus, resulting in a false indication that the stimulus sensitive product attached to the stimulus indicating device had been exposed to a predetermined stimulus, when in fact it had not. Because the permeable membrane keeps the stimulus sensitive gel and the color changing absorbent material physically separated, such false indications may be avoided.

It should be noted that, by manipulating the permeability of the permeable membrane connecting the first compartment to the second compartment, the time required for the expelled liquid to move from the second compartment into the first compartment may be varied. Such manipulation of the permeable membrane may include increasing or decreasing its thickness and/or increasing or decreasing its surface area facing the first compartment and/or second compartment and/or increasing or decreasing its wicking ability, so as to control the speed at which the expelled liquid and the constituent parts travel from the second compartment, through the permeable membrane, and enter the first compartment.

An advantage of using such an embodiment is that both the exposure to a predetermined stimulus as well as the time of exposure may be indicated. As an example, if the predetermined stimulus occurs for just a short period of time, and is removed before the expelled liquid and constituent parts have completely moved from the second compartment through the permeable membrane and into the first compartment, then the expelled liquid and constituent parts may be wicked or drawn back into the second compartment by the shrunken stimulus sensitive gel as the shrunken stimulus sensitive gel re-expands. The reason this happens is because the permeable membrane may allow the expelled liquid and expelled constituent parts to pass in both directions. And so in this case, no irreversible indication of exposure to the predetermined stimulus may then be indicated by color changing absorbent material because the time of exposure to the predetermined stimulus was too brief to enable enough expelled liquid and constituent parts to pass completely through the permeable membrane, react with the color changing absorbent material, and cause it to change from a first color to a second color.

8. Embodiments with Two Compartments with Semi-Permeable Membrane and Absorbent Material To achieve these and other advantages and in accordance with the purpose of certain embodiments of the invention, as embodied and broadly described, another embodiment of the invention may be, as shown in FIG. 9A and FIG. 9B, a multi-compartment device that includes a first compartment with an indicator window through which a color changing absorbent material is visible, and at least a second compartment containing a stimulus sensitive gel. The first compartment and the second compartment may, for example, be formed by the backing layer on the bottom of the stimulus indicating device and an upper layer on the top of the stimulus indicating device, as shown in FIG. 9A and FIG. 9B. The first compartment and the second compartment may additionally be formed and differentiated from one another by a semi-permeable membrane that is strong and resilient to twisting, bending and breaking. Alternatively, as shown in FIG. 9C an alternative embodiment may position the first compartment above the second compartment separated by the permeable membrane. Other shapes may be contemplated within the scope of certain embodiments of the invention as previously described in prior applications.

Prior to exposure to a predetermined stimulus, in this embodiment a stimulus sensitive gel may preferably be contained in just the second compartment. And prior to the exposure of the stimulus indicating device to the predetermined stimulus the color changing absorbent material may be a first color, visible through the indicator window or display portion.

One of ordinary skill will appreciate and understand that if the stimulus sensitive gel in this embodiment is swollen at the beginning of its use as it undergoes its phase transition, it may collapse or shrink, thereby causing a color changing absorbent material to change color. Alternatively, the stimulus sensitive gel may start out collapsed or shrunken, but upon exposure to its predetermined stimulus it may permanently expand or swell and cause a color changing absorbent material to change color. By way of example only and as disclosed herein and in prior applications, a stimulus sensitive gel may be of the UCST type or of the LCST type. As one of ordinary skill in the art will appreciate, a UCST type stimulus sensitive gel may be used when one wishes to have an initially shrunken stimulus sensitive gel expand or swell when it is heated beyond a predetermined stimulus, and thereby cause a color changing absorbent material to change color. A UCST type stimulus sensitive gel may also be used when it is desired to have an initially swollen stimulus sensitive gel collapse or shrink when it is cooled beyond a predetermined stimulus, and thereby cause a color changing absorbent material to change color. Alternatively, an LCST type stimulus sensitive gel may be used when one wishes to have an initially shrunken stimulus sensitive gel expand or swell when it is cooled beyond a predetermined stimulus, and thereby cause a color changing absorbent material to change color. An LCST type stimulus sensitive gel may also be used when it is desired to have an initially swollen stimulus sensitive gel collapse or shrink when it is heated beyond a predetermined stimulus, and thereby cause a color changing absorbent material to change color.

For purposes of disclosing this alternative embodiment and by way of example only, this alternative embodiment may initially be expanded or swollen, and permanently collapse or shrink upon exposure to its predetermined stimulus. An indicator window may be provided through which a color change can be seen as a result of the swollen stimulus sensitive gel undergoing its phase transition in reaction to a predetermined stimulus (i.e., the volume of the stimulus sensitive gel changes by collapsing or shrinking in reaction to the predetermined stimulus). Specifically, as the swollen stimulus sensitive gel collapses or shrinks in response to the predetermined stimulus, it may expel the liquid and/or constituent parts contained in the matrix of the stimulus sensitive gel. This expelled liquid and/or constituent parts may subsequently pass through the semi-permeable membrane and ultimately come into contact with the color changing absorbent material, causing it to undergo a color change which can be viewed through the indicator window.

Both the backing layer and the upper layer may, for example, be constructed of a strong, resilient leak-proof material, such as plastic or other polymer material, so as to provide for the twisting or bending that might occur during transportation of the stimulus sensitive product without tearing, breaking or leaking. The backing layer and the upper layer may also be made of a material that preferably allows them to be joined and sealed together, such as by heat stamping or other suitable means. The backing layer and the upper layer may both approximate the length and width of the compartment, although variations in these dimensions are within the scope of certain embodiments of the present invention. The upper layer may preferably be made of a clear material, such as plastic, so that the user of the stimulus indicating device may view at least some portion of the backing material or color changing absorbent material. The upper layer may also be able to accept paint or ink so as to allow for coloring or concealing at least some portion of the first compartment.

Although a least some portion of the upper layer may also accept paint or ink for coloring, it is preferable that the indicator window portion of the upper layer remain free from ink or coloring so that the use of the stimulus indicating device may observe the first compartment through the indicator window as explained herein. The backing layer may, for example, also be able to accept paste, glue or other suitable adhesive on the surface not facing the first compartment, so as to allow it to be attached to a stimulus sensitive product.

Upon exposure of the stimulus sensitive gel to a predetermined stimulus, the stimulus sensitive gel may undergo its phase transition in reaction to the predetermined stimulus. As the swollen stimulus sensitive gel undergoes its phase transition, the volume of the swollen stimulus sensitive gel may change by collapsing or shrinking due at least to a portion of the liquid contained in the polymer network being expelled. Along with this liquid, at least some of the constituent parts required for detection of unfavorable stimulus exposure, which are incorporated into the polymer network during the initial preparation, may be expelled as well.

By way of example only, the color changing absorbent material may be divalent cation test paper, litmus paper or any equivalent color changing absorbent material. What is important is that the color changing absorbent materials may, for example, have: 1) an affinity for the liquid and constituent parts contained in, and then expelled from, the stimulus sensitive gel; and 2) that at least a portion of the color changing absorbent material changes color upon coming into contact with the expelled liquid and/or constituent parts. More specifically, at least some of the constituent parts carried by the expelled liquid may permanently bind onto the color changing absorbent material so as to cause the color changing absorbent material to change color so that even if the expelled liquid is subsequently reabsorbed by the shrunken stimulus sensitive gel when the predetermined stimulus is removed, those constituent parts may remain bound or trapped in the color changing absorbent material.

By way of example only, the constituent parts contained in the polymer matrix of the swollen stimulus sensitive gel, and then expelled along with and carried by the expelled liquid until both come into contact with the color changing absorbent material, may be divalent cations (by way of example, $Mg^{2+}$ or $Ca^{2+}$). More specifically, as the stimulus sensitive gel undergoes its phase transition due to exposure to a predetermined stimulus, the swollen stimulus sensitive gel may not only expel the liquid contained in the polymer matrix, but may also expel the constituent parts, such as divalent cations (by way of example only, $Mg^{2+}$ or $Ca^{2+}$) also contained in the polymer matrix of the swollen stimulus sensitive gel.

Then, when the expelled constituent parts (e.g., divalent citations (by way of example only, $Mg^{2+}$ or $Ca^{2+}$)) carried by the expelled liquid came into contact with the color changing absorbent material, at least a portion of the color changing absorbent material may not only change from a first color to a second color, but the constituent parts may permanently bind to the color changing absorbent material. It is important that that the color changing absorbent materials be reactive to the expelled constituent parts. Thus, because the constituent parts in the preferred embodiment preferably consist of divalent cations, the color changing absorbent material may be reactive to those divalent cations, and may include by way of example only, divalent cationic paper. Examples of such divalent cationic paper that can be used as the color changing absorbent material may, for example, include a total-hardness indicator paper or test stick that is available from Sigma-Aldrich under the tradename QUANTOFIX®, is manufactured by Macherey-Nagel under the trade name Aquador®, and that changes color from blue to red upon coming into contact with expelled liquid containing the constituent parts (by way of example only, $Mg^{2+}$ or $Ca^{2+}$). Preferably the color changing absorbent material may operate in at least a semi-quantitative capacity.

By the expelled constituent parts (e.g., divalent cations by way of example only, $Mg^{2+}$ or $Ca^{2+}$) permanently binding to the color changing absorbent material (e.g., by way of example only, divalent cationic paper), even if the expelled liquid were ultimately reabsorbed by the collapsed or shrunken stimulus sensitive gel so as to become a partially or fully re-swollen stimulus sensitive gel, the expelled constituent parts may remain permanently bound to the color changing absorbent material or cationic paper, and the color changing absorbent material (by way of example only cationic paper) may remain permanently colored the second color.

Although the preferred embodiment discussed herein employs divalent cation test paper as the color changing absorbent material, alternative color changing absorbent materials may also be used, so long as they are reactive to the expelled constituent parts. By way of example only, the liquid held in the polymer matrix of the swollen stimulus sensitive gel may contain protons ($H^+$). And as the swollen stimulus sensitive gel undergoes its phase transition due to exposure to a predetermined stimulus, the liquid may not only be expelled from the swollen stimulus sensitive gel, but the $H^+$ may also be expelled along with that liquid. Then when the expelled constituent parts (by way of example, only $H^+$) contained in the expelled liquid subsequently come into physical contact with the color changing absorbent material, such as litmus paper (by way of example only, $H^+$ concentration indicator), at least a portion of the color changing absorbent material may react to the expelled constituent parts (by way of example only, $H^+$), and may change from a first color to a second color. Such litmus paper that is suitable for use as a color changing absorbent material may include by way of example only, the pH-indicator strips manufactured by EMD Chemicals Inc. What is important is that the litmus paper changes from a first color to a second color upon coming into contact with the constituent parts.

In addition to changing from a first color to a second color, the expelled constituent parts (by way of example only, $H^+$) may permanently bind to the color changing absorbent material. Accordingly, even if the expelled liquid were ultimately reabsorbed by the collapsed or shrunken stimulus sensitive gel, so as to become a partially or fully re-swollen stimulus sensitive gel, the expelled constituent parts (by way of example only, $H^+$) may remain permanently bound to the color changing absorbent material, and the color changing absorbent material may permanently remain colored the second color.

Moreover, because the semi-permeable membrane keeps the stimulus sensitive gel in the second compartment, the stimulus sensitive gel preferably may not move into the first compartment at any time, and is thereby prevented from covering up the color changing absorbent material at all times. Preferably, the stimulus sensitive gel may also be held in the second compartment by an attachment point. In addition, if the color changing absorbent material is capable of wicking the liquid and constituent parts out of the polymer matrix of the swollen stimulus sensitive gel, simply by being in physical contact with the swollen stimulus sensitive gel, then the color changing absorbent material may, for example, be physically separated from the swollen stimulus sensitive gel. Otherwise, the color changing absorbent material may wick and absorb the constituent parts (divalent cations or hydrogen ions) from the swollen stimulus sensitive gel even if the stimulus indicating device had not been exposed to a predetermined stimulus, resulting in a false indication that the stimulus sensitive produce attached to the stimulus indicating device had been exposed to a predetermined stimulus, when in fact it had not. Because the semi-permeable membrane keeps the stimulus sensitive gel and the color changing absorbent material physically separated, such false indication may be avoided.

It should be noted that by manipulating the permeability of the semi-permeable membrane connecting the first compartment to the second compartment the time required for the expelled liquid to move from the second compartment into the first compartment can be varied. Such manipulation of the semi-permeable membrane may, for example, include increasing or decreasing its thickness and/or increasing or decreasing its surface area facing the first compartment and/or second compartment and/or increasing or decreasing its wicking ability, so as to control the speed at which the expelled liquid and the constituent parts travel from the second compartment, through the semi-permeable membrane, and enter the first compartment.

There is a difference between the permeable membrane discussed herein and the semi-permeable membrane discussed herein that needs to be appreciated. The permeable membrane may allow the expelled liquid and constituent parts to repeatedly travel from the second compartment into the first compartment, and then back again into the second compartment. In comparison, the semi-permeable membrane may preferably be designed so that it not only allows the constituent parts of the expelled liquid (by way of example only, the $Mg^{2+}$) to pass from the at least second compartment into the first compartment, but it would prevent the constituent parts (by way of example only, the $Mg^{2+}$) from passing back into the at least second compartment from the first compartment. The semi-permeable membrane may also prohibit the expelled liquid from traveling back into the second compartment, but doing so is not as important as trapping the constituent parts in the first compartment.

An advantage of using such an embodiment is that both the exposure to a predetermined stimulus as well as the time of exposure may be indicated. As an example, if the predetermined stimulus occurs for just a short period of time, and is removed before the expelled liquid and constituent parts have been completely moved from the second compartment through the semi-permeable membrane and into the first compartment, then the expelled liquid and constituent parts may remain within the semi-permeable membrane. Only when the predetermined stimulus returns and causes the stimulus sensitive gel to continue to undergo its phase transition may additional liquid be expelled along with additional constituent parts. When enough expelled liquid and enough constituent parts are present so as to completely pass through the semi-permeable membrane, contact and react with the color changing absorbent material, the color changing absorbent material may change from the first color to the second color, thereby indicating the stimulus sensitive product attached to the stimulus indicating device had been exposed to a predetermined stimulus.

9. Embodiments with Absorbent Material as the Permeable or Semi-Permeable Membrane To achieve these and other advantages and in accordance with the purpose of certain embodiments of the invention, as embodied and broadly described, another embodiment of the invention may be as shown in FIG. 10A and FIG. 10B, a device with at least a single compartment that includes an indicator window through which a color changing absorbent material is visible, as well as a stimulus sensitive gel. The at least single compartment may, for example, be formed by the backing layer on the bottom of the stimulus indicating device and an upper layer on the top of the stimulus indicating device. As shown in FIG. 10A the indicator window may be positioned above the color changing absorbent material, wherein the color changing absorbent material may be comprised of either a permeable or a semi-permeable material, which is strong and resilient to twisting, bending and breaking. Alternatively, as shown in FIG. 10C, an alternative embodiment may position a first compartment above a second compartment separated by the permeable membrane. Other shapes may be contemplated within the scope of certain embodiments of the invention as previously described in prior applications.

Prior to exposure to a predetermined stimulus, in this embodiment the color changing absorbent material may be a first color, visible through the indicator window or display portion.

One of ordinary skill will appreciate and understand that if the stimulus sensitive gel in this embodiment is swollen at the beginning of its use as it undergoes its phase transition, it may collapse or shrink, thereby causing a color changing absorbent material to change color. Alternatively, the stimulus sensitive gel could start out collapsed or shrunken, but upon exposure to its predetermined stimulus it may permanently expand or swell and cause a color changing absorbent material to change color. By way of example only and as disclosed herein and in prior applications, a stimulus sensitive gel may be of the UCST type or of the LCST type. As one of ordinary skill in the art will appreciate, a UCST type stimulus sensitive gel may be used when one wishes to have an initially shrunken stimulus sensitive gel expand or swell when it is heated beyond a predetermined stimulus, and thereby cause a color changing absorbent material to change color. A UCST type stimulus sensitive gel may also be used when it is desired to have an initially swollen stimulus sensitive gel collapse or shrink when it is cooled beyond a predetermined stimulus, and thereby cause a color changing absorbent material to change color. Alternatively, an LCST type stimulus sensitive gel may be used when one wishes to have an initially shrunken stimulus sensitive gel expand or swell when it is cooled beyond a predetermined stimulus, and thereby cause a color changing absorbent material to change color. An LCST type stimulus sensitive gel may also be used when it is desired to have an initially swollen stimulus sensitive gel collapse or shrink when it is heated beyond a predetermined stimulus, and thereby cause a color changing absorbent material to change color.

For purposes of disclosing this alternative embodiment and by way of example only, this alternative embodiment may be initially expanded or swollen, and permanently collapses or shrinks upon exposure to its predetermined stimulus. An indicator window may be provided through which a color change can be seen as a result of the swollen stimulus sensitive gel undergoing its phase transition in reaction to a predetermined stimulus (i.e., the volume of the stimulus sensitive gel changes by collapsing or shrinking in reaction to the predetermined stimulus). Specifically, as the swollen stimulus sensitive gel collapses or shrinks in response to the predetermined stimulus, it may expel the liquid and/or constituent parts contained in the matrix of the stimulus sensitive gel. This expelled liquid and/or constituent parts may subsequently pass through the permeable or semi-permeable membrane that may result in the color change visible through the indicator window.

Both the backing layer and the upper layer may, for example, be constructed of a strong, resilient leak-proof material, such as plastic or other polymer material, so as to provide for the twisting or bending that might occur during transportation of the stimulus sensitive product without tearing, breaking or leaking. The backing layer and the upper layer may also be made of a material that preferably allows them to be joined and sealed together, such as by heat stamping or other suitable means. The backing layer and the upper layer may both approximate the length and width of the first compartment, although variations in these dimensions are within the scope of certain embodiments of the present invention. The upper layer may preferably be made of a clear material, such as plastic, so that the user of the stimulus indicating device can view at least some portion of the backing material or color changing absorbent material. The upper layer may also be able to accept paint or ink so as to allow for coloring or concealing at least some portion of the first compartment.

Although at least some portion of the upper layer may also accept paint or ink for coloring, it is preferable that the indicator window portion of the upper layer remain free from ink or coloring so that the user of the stimulus indicating device may observe the first compartment through the indicator window as explained herein. The backing layer may, for example, also be able to accept paste, glue or other suitable adhesive on the surface not facing the first compartment, so as to allow it to be attached to a stimulus sensitive product.

Upon exposure of the stimulus sensitive gel to a predetermined stimulus, the stimulus sensitive gel may undergo its phase transition in reaction to the predetermined stimulus. As the swollen stimulus sensitive gel undergoes its phase transition, the volume of the swollen stimulus sensitive gel may change by collapsing or shrinking due at least to a portion of the liquid contained in the polymer network being expelled, and at least some of the constituent parts contained in the polymer network being expelled as well. Along with this liquid, at least some of the constituent parts required for detection of unfavorable stimulus exposure, which are incorporated into the polymer network during the initial preparation, may be expelled as well.

By way of example only, the color changing absorbent material may be any permeable or semi-permeable material that allows the expelled liquid and the constituent parts to pass through it, and more particularly to migrate through it, from one end of the permeable or semi-permeable material to the other. What is important is that the color changing absorbent material may, for example, have: 1) an affinity for the liquid and constituent parts contained in, and then expelled from, the stimulus sensitive gel; and 2) that at least a portion of the color changing absorbent material changes color upon coming into contact with that expelled liquid and/or constituent parts. More specifically, at least some of the constituent parts carried by the expelled liquid may become trapped in the permeable or semi-permeable membrane.

The permeable or semi-permeable membrane when it is used as the color changing absorbing material may change color by any number of ways. For example, the expelled constituent parts may be colored a color different from the color of the permeable or semi-permeable membrane. And as the expelled constituent parts migrate through the permeable or semi-permeable membrane, they may change it from a first color to a second color. Alternatively, the permeable or semi-permeable membrane may be reactive to the expelled constituent parts and as the constituent parts migrate through the permeable membrane which is also referred to as the semi-permeable membrane, and which is also referred to as the color changing absorbent material, it may change from a first color to a second color. For convenience, this permeable membrane which is also referred to as the semi-permeable membrane, and which is also referred to as the color changing absorbent material are referred to collectively herein as either the semi-permeable membrane or the color changing absorbent material.

By way of example only, the constituent parts contained in the polymer matrix of the swollen stimulus sensitive gel, and then expelled along with and carried by the expelled liquid through the semi-permeable membrane may be divalent cations (by way of example, $Mg^{2+}$ or $Ca^{2+}$). More specifically, as the stimulus sensitive gel undergoes its phase transition due to exposure to a predetermined stimulus, the swollen stimulus sensitive gel may not only expel the liquid contained in the polymer matrix, but may also expel the constituent parts, such as divalent cations (by way of example only, $Mg^{2+}$ or $Ca^+$) also contained in the polymer matrix of the swollen stimulus sensitive gel.

Then as the expelled constituent parts (e.g., divalent cations (by way of example only, $Mg^{2+}$ or $Ca^{2+}$)) carried by the expelled liquid came into contact with the color changing absorbent material which is the semi-permeable membrane, at least a portion of the color changing absorbent material may not only change from a first color to a second color, but the constituent parts may also permanently bind to the color changing absorbent material. It is important that the color changing absorbent material/semi-permeable membrane be reactive to the expelled constituent parts. Thus, because the constituent parts in the preferred embodiment preferably consist of divalent cations, the color changing absorbent material may be reactive to those divalent cations.

By the expelled constituent parts (e.g., divalent cations by way of example only, $Mg^{2+}$ or $Ca^{2+}$) permanently binding to the color changing absorbent material as the expelled constituent parts migrate through the semi-permeable membrane (e.g., divalent cationic paper), even if the expelled liquid were ultimately reabsorbed by the collapsed or shrunken stimulus sensitive gel so as to become a partially or fully re-swollen stimulus sensitive gel, the expelled constituent parts may remain permanently bound to the color changing absorbent material/semi-permeable membrane, and the color changing absorbent material/semi-permeable membrane may remain permanently colored the second color.

Preferably, the stimulus sensitive gel may also be held in place by an attachment point. In addition, if the color changing absorbent material/permeable membrane is capable of wicking the liquid and constituent parts out of the polymer matrix of the swollen stimulus sensitive gel, simply by being in physical contact with the swollen stimulus sensitive gel, then the color changing absorbent material may be physically separated from the swollen stimulus sensitive gel. Otherwise, the color changing absorbent material may wick and absorb the constituent parts (divalent cations or hydrogen ions) from the swollen stimulus sensitive gel even if the stimulus indicating device had not been exposed to a predetermined stimulus, resulting in a false indication that the stimulus sensitive product attached to the stimulus indicating device had been exposed to a predetermined stimulus, when in fact it had not. If the color changing absorbent material/semi-permeable membrane may not wick the constituent parts out of the swollen stimulus sensitive gel, then the color changing absorbent material/semi-permeable membrane may be in physical contact with the swollen stimulus sensitive gel.

It should be noted that by manipulating the permeability of the semi-permeable membrane the time required for the expelled liquid to move through the length of the semi-permeable membrane and into the indicator window may be varied. Such manipulation of the semi-permeable membrane may, for example, include increasing or decreasing its thickness and/or increasing or decreasing its surface area facing the first compartment and/or second compartment and/or increasing or decreasing its wicking ability, so as to control the speed at which the expelled liquid and expelled constituent parts travel through the semi-permeable membrane, and enter the indicator window.

It should also be noted that the semi-permeable membrane/color changing absorbent material may preferably be designed so that it not only allows the constituent parts of the expelled liquid (by way of example only, the $Mg^{2+}$) to pass through the length of the semi-permeable membrane, but it may also prevent the constituent parts (by way of example only, the $Mg^{2+}$) from passing in reverse and away from the indicator window.

An advantage of using such an embodiment is that both the exposure to a predetermined stimulus as well as the time of exposure may be indicated. As an example, if the predetermined stimulus occurs for just a short period of time, and is removed before the expelled liquid and constituent parts have moved completely through the semi-permeable membrane and into the indicator window, then the expelled liquid and constituent parts may remain within the semi-permeable membrane. Only when the predetermined stimulus returns and causes the stimulus sensitive gel to continue to undergo its phase transition will additional liquid be expelled along with additional constituent parts. When enough expelled liquid and enough constituent parts are expelled and present so as to completely pass though the semi-permeable membrane, the indicator window may show the change from a first color to a second color, thereby indicating the stimulus sensitive product attached to the stimulus indicating device had been exposed to a predetermined stimulus.

10. Embodiments with Capillaries

To achieve these and other advantages and in accordance with the purpose of certain embodiments of the invention, as embodied and broadly described, another embodiment of the invention may be as shown in FIG. 11A and FIG. 11B, a multi-compartment device that includes a first compartment with an indicator window through which a color changing absorbent material is visible, and at least a second compartment containing a stimulus sensitive gel. The first compartment and the second compartment may, for example, be formed by the backing layer on the bottom of the stimulus indicating device and an upper layer on the top of the stimulus indicating device, as shown in FIG. 11A and FIG. 11B. The first compartment and the second compartment may additionally be formed and differentiated from one another by small channel(s), capillary(-ies) or tube(s), such as capillary tubes that are strong and resilient to twisting, bending and breaking. Alternatively, an alternate embodiment may position the first compartment above the second compartment separated by the small channel(s), capillary(-ies) or tube(s). Other shapes may be contemplated within the scope of the invention as previously described in prior applications.

One of ordinary skill will appreciate and understand that if the stimulus sensitive gel in this embodiment is swollen at the beginning of its use as it undergoes its phase transition, it may collapse or shrink, thereby causing a color changing absorbent material to change color. Alternatively, the stimulus sensitive gel may start out collapsed or shrunken, but upon exposure to its predetermined stimulus it may permanently expand or swell and cause a color changing absorbent material to change color. By way of example only and as disclosed herein and in prior applications, a stimulus sensitive gel may be of the UCST type or of the LCST type. As one of ordinary skill in the art will appreciate, a UCST type stimulus sensitive gel may be used when one wishes to have an initially shrunken stimulus sensitive gel expand or swell when it is heated beyond a predetermined stimulus, and thereby cause a color changing absorbent material to change color. A UCST type stimulus sensitive gel may also be used when it is desired to have an initially swollen stimulus sensitive gel collapse or shrink when it is cooled beyond a predetermined stimulus, and thereby cause a color changing absorbent material to change color. Alternatively, an LCST type stimulus sensitive gel may be used when one wishes to have an initially shrunken stimulus sensitive gel expand or swell when it is cooled beyond a predetermined stimulus, and thereby cause a color changing absorbent material to change color. An LCST type stimulus sensitive gel may also be used when it is desired to have an initially swollen stimulus sensitive gel collapse or shrink when it is heated beyond a predetermined stimulus, and thereby cause a color changing absorbent material to change color.

For purposes of disclosing this alternative embodiment and by way of example only, this alternative embodiment may be initially expanded or swollen, and permanently collapse or shrink upon exposure to its predetermined stimulus. An indicator window may be provided through which a color change can be seen as a result of the swollen stimulus sensitive gel undergoing its phase transition in reaction to a predetermined stimulus (i.e., the volume of the stimulus sensitive gel changes by collapsing or shrinking in reaction to the predetermined stimulus). Specifically, as the swollen stimulus sensitive gel collapses or shrinks in response to the predetermined stimulus, it may expel the liquid and/or constituent parts contained in the matrix of the stimulus sensitive gel. This expelled liquid and/or constituent parts may subsequently pass through the small channel(s), capillary(-ies) or tube(s) and ultimately may come into contact with the color changing absorbent material, causing it to undergo a color change which may then be viewed through the indicator window.

Prior to exposure to a predetermined stimulus, in this embodiment a stimulus sensitive gel may preferably be contained in just the second compartment. And prior to exposure of the stimulus indicating device to a predetermined stimulus the color changing absorbent materials may be a first color, visible through the indicator window or display portion.

Both the backing layer and the upper layer may, for example, be constructed of a strong, resilient leak-proof material, such as plastic or other polymer material, so as to provide for the twisting or bending that might occur during transportation of the stimulus sensitive product without tearing, breaking or leaking. The backing layer and the upper layer may also be made of a material that preferably allows them to be joined and sealed together, such as by heat stamping or other suitable means. The backing layer and the upper layer may both approximate the length and width of the compartment, although variations in these dimensions are within the scope of certain embodiments of the present invention. The upper layer may preferably be made of a clear material, such as plastic, so that the user of the stimulus indicating device can view at least some portion of the backing material or color changing absorbent material. The upper layer may also be able to accept paint or ink so as to allow for coloring or concealing at least some portion of the first compartment.

Although a least some portion of the upper layer may also accept paint or ink for coloring, it is preferable that the indicator window portion of the upper layer remain free from ink or coloring so that the user of the stimulus indicating device may observe the first compartment through the indicator window as explained herein. The backing layer may, for example, also be able to accept paste, glue or other suitable adhesive on the surface not facing the first compartment, so as to allow it to be attached to a stimulus sensitive product.

Upon exposure of the stimulus sensitive gel to a predetermined stimulus, the stimulus sensitive gel may undergo its phase transition in reaction to the predetermined stimulus. As the swollen stimulus sensitive gel undergoes its phase transition, the volume of the swollen stimulus sensitive gel changes by collapsing or shrinking due at least to a portion of the liquid contained in the polymer network being expelled. Along with this liquid, at least some of the constituent parts required for detection of unfavorable stimulus exposure, which are incorporated into the polymer network during the initial preparation, may be expelled as well.

By way of example only, the color changing absorbent material may be divalent cation test paper, litmus paper or any equivalent color changing absorbent material. What is important is that the color changing absorbent materials may, for example, have: 1) an affinity for the liquid and constituent parts contained in, and then expelled from, the stimulus sensitive gel; and 2) that at least a portion of the color changing absorbent material changes color upon coming into contact with the expelled liquid and/or constituent parts. More specifically, at least some of the constituent parts carried by the expelled liquid may permanently bind onto the color changing absorbent material so as to cause the color changing absorbent material to change color so that even if the expelled liquid is subsequently reabsorbed by the shrunken stimulus sensitive gel when the predetermined stimulus is removed, those constituent parts may remain bound or trapped in the color changing absorbent material.

By way of example only, the constituent parts contained in the polymer matrix of the swollen stimulus sensitive gel, and then expelled along with and carried by the expelled liquid until both come into contact with the color changing absorbent material, may be divalent cations (by way of example, $Mg^{2+}$ or $Ca^{2+}$). More specifically, as the stimulus sensitive gel undergoes its phase transition due to exposure to a predetermined stimulus, the swollen stimulus sensitive gel may not only expel the liquid contained in the polymer matrix, but may also expel the constituent parts, such as divalent cations (by way of example only, $Mg^{2+}$ or $Ca^{2+}$) also contained in the polymer matrix of the swollen stimulus sensitive gel.

Then, when the expelled constituent parts (e.g., divalent citations (by way of example only, $Mg^{2+}$ or $Ca^{2+}$)) carried by the expelled liquid come into contact with the color changing absorbent material, at least a portion of the color changing absorbent material may not only change from a first color to a second color, but the constituent parts may permanently bind to the color changing absorbent material. It is important that the color changing absorbent materials be reactive to the expelled constituent parts. Thus, because the constituent parts in the preferred embodiment preferably consist of divalent cations, the color changing absorbent material may preferably be reactive to those divalent cations, and may include by way of example only, divalent cationic paper. Examples of such divalent cationic paper that may be used as the color changing absorbent material includes a total-hardness indicator paper or test stick that is available from Sigma-Aldrich under the tradename QUANTOFIX®, is manufactured by Macherey-Nagel under the trade name Aquador®, and that changes color from blue to red upon coming into contact with expelled liquid containing the constituent parts (by way of example only, $Mg^{2+}$ or $Ca^{2+}$). Preferably the color changing absorbent material may operate in at least a semi-quantitative capacity.

By the expelled constituent parts (e.g., divalent cations by way of example only, $Mg^{2+}$ or $Ca^{2+}$) permanently binding to the color changing absorbent material (e.g., by way of example only, divalent cationic paper), even if the expelled liquid were ultimately reabsorbed by the collapsed or shrunken stimulus sensitive gel so as to become a partially or fully re-swollen stimulus sensitive gel, the expelled constituent parts may remain permanently bound to the color changing absorbent material or cationic paper, and the color changing absorbent material (by way of example only cationic paper) may remain permanently colored the second color.

Although the alternative embodiment discussed herein employs divalent cation test paper as the color changing absorbent material, alternative color changing absorbent materials may also be used, so long as they are reactive to the expelled constituent parts. By way of example only, the liquid held in the polymer matrix of the swollen stimulus sensitive gel may contain protons ($H^+$). And as the swollen stimulus sensitive gel undergoes its phase transition due to exposure to a predetermined stimulus, the liquid may not only be expelled from the swollen stimulus sensitive gel, but the $H^+$ may also be expelled along with that liquid. Then when the expelled constituent parts (by way of example, only $H^+$) contained in the expelled liquid subsequently come into physical contact with the color changing absorbent material, such as litmus paper (by way of example only, $H^+$ concentration indicator), at least a portion of the color changing absorbent material may react to the expelled constituent parts (by way of example only, $H^+$), and change from a first color to a second color. Such litmus paper that is suitable for use as a color changing absorbent material may include by way of example only, the pH-indicator strips manufactured by EMD Chemicals Inc. What is important is that the litmus paper changes from a first color to a second color upon coming into contact with the constituent parts.

In addition to changing from a first color to a second color, the expelled constituent parts (by way of example only, $H^+$) may permanently bind to the color changing absorbent material. Accordingly, even if the expelled liquid were ultimately reabsorbed by the collapsed or shrunken stimulus sensitive gel, so as to become a partially or fully re-swollen stimulus sensitive gel, the expelled constituent parts (by way of example only, $H^+$) may remain permanently bound to the color changing absorbent material, and the color changing absorbent material may permanently remain colored the second color.

Moreover, because the small channel(s), capillary(-ies) or tube(s) keep the stimulus sensitive gel in the second compartment, the stimulus sensitive gel preferably may not move into the first compartment at any time, and is thereby prevented from covering up the color changing absorbent material at all times. Preferably, the stimulus sensitive gel may also be held in the second compartment by an attachment point. In addition, if the color changing absorbent material is capable of wicking the liquid and constituent parts out of the polymer matrix of the swollen stimulus sensitive gel, simply by being in physical contact with the swollen stimulus sensitive gel, then the color changing absorbent material may be physically separated from the swollen stimulus sensitive gel. Otherwise, the color changing absorbent material may wick and absorb the constituent parts (e.g., divalent cations or protons) from the swollen stimulus sensitive gel even if the stimulus indicating device had not been exposed to a predetermined stimulus, resulting in a false indication that the stimulus sensitive product attached to the stimulus indicating device had been exposed to a predetermined stimulus, when in fact it had not. Because the channel(s), capillary(-ies) or tube(s) keep the stimulus sensitive gel and the color changing absorbent material physically separated, such false indications may be avoided.

It should be noted that by manipulating the geometry of the channel(s), capillary(-ies) or tube(s) connecting the first compartment to the second compartment the time required for the expelled liquid to move from the second compartment into the first compartment may be varied. Such manipulation of the geometry of the channel(s), capillary(-ies) or tube(s) may, for example, include increasing or decreasing its length and/or increasing or decreasing its width and/or increasing or decreasing the wicking ability of the material that makes up the channel(s), capillary(-ies) or tube(s), so as to control the speed at which the expelled liquid and the constituent parts travel from the second compartment, through the channel(s), capillary(-ies) or tube(s), and enter the first compartment.

An advantage of suing such an embodiment is that both the exposure to a predetermined stimulus as well as the time of exposure may be indicated. As an example, if the predetermined stimulus occurs for just a short period of time, and is removed before the expelled liquid and constituent parts have completely moved from the second compartment through the channel(s), capillary(-ies) or tube(s) and into the first compartment, then the expelled liquid and constituent parts may be wicked or drawn back into the second compartment by the shrunken stimulus sensitive gel as the shrunken stimulus sensitive gel re-expands or swells. In this case, no irreversible indication of exposure to the predetermined stimulus may be indicated by color changing absorbent material because the time of exposure to the predetermined stimulus was too brief to enable enough expelled liquid and constituent parts to pass completely through the channel(s), capillary(-ies) or tube(s), react with the color changing absorbent material, and cause it to change from a first color to a second color.

As embodied and broadly described, another embodiment of the invention may, for example, be a device that indicates when a stimulus sensitive product has potentially or conclusively undergone a physical change in response to exposure to a predetermined stimulus extreme.

As embodied and broadly described, another embodiment of the invention may, for example, be a device that indicates when a stimulus sensitive product has potentially or conclusively undergone a physical change in response to exposure to a predetermined stimulus extreme over a predetermined period of time.

As embodied and broadly described, other embodiments of the invention may, for example, include methods to manufacture stimulus sensitive gels that indicate exposure to a predetermined stimulus extreme.

It is to be understood that both the general descriptions above and the detailed descriptions below are exemplary and are intended to provide further explanation of the various embodiments of the inventions as claimed. As such it is understood that any and/or all of the aspects or portions of the various and alternative embodiments described herein or described in prior applications are able to be combined, mixed and matched, etc., so that although a certain embodiment is not described herein, it is understood to be included in this or previous disclosures.

BRIEF DESCRIPTION OF THE DRAWINGS

The foregoing and other objects, aspects and advantages will be better understood from the following detailed description of an exemplary preferred embodiment of the invention with reference to the drawings in which.

DETAILED DESCRIPTION OF CERTAIN EMBODIMENTS OF THE INVENTION

Figure 1A:
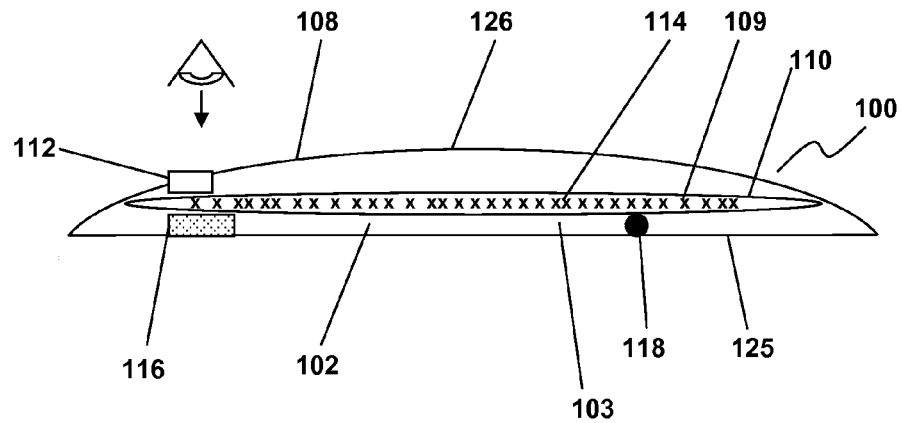
FIG. 1A is a side cross-sectional view of an embodiment of the invention before exposure to a predetermined trigger stimulus.

It is well known that the expansion or swelling as well as the collapsing or shrinking of polymer gels is dictated by equilibrium thermodynamics. Therefore, a swollen stimulus sensitive gel that collapses or shrinks when undergoing its phase transition in reaction to a predetermined trigger stimulus will expand or swell back to its original volume if that predetermined trigger stimulus is removed. For example, when a swollen stimulus sensitive gel is exposed to a predetermined trigger stimulus, such as a temperature extreme, it undergoes its phase transition and collapses or shrinks in volume due to the expulsion or leaking of the fluid contained in the gel. It is also well known that when the predetermined trigger stimulus is removed, the stimulus sensitive gel will undergo the reverse phase transition and collect the previously expelled liquid, thereby expanding or swelling in volume. It is also well known that the reverse is true—a shrunken stimulus sensitive gel that expands or swells when undergoing its phase transition in reaction to a predetermined trigger stimulus will collapse or shrink back to its original volume if that predetermined trigger stimulus is removed. For example, when a certain type of shrunken stimulus sensitive gel is exposed to a predetermined trigger stimulus, such as a temperature extreme, it undergoes its phase transition and expands or swells in volume due to the collection or absorption of the fluid surrounding the shrunken stimulus sensitive gel. It is also well known that when the predetermined stimulus is removed, the now expanded or swollen stimulus sensitive gel will undergo the reverse phase transition and expel the previously collected liquid, thereby collapsing or shrinking in volume.

Thus, the problem with the known stimulus sensitive gels is that they are reversible. Accordingly, it is necessary to develop stimulus indicating devices that are irreversible. Disclosed herein are embodiments that ensure an irreversible, reliable visual indication of a stimulus sensitive gel undergoing a phase transition in response to a predetermined stimulus, and either permanently remain in that transitioned state, or permanently indicate that exposure to a predetermined stimulus occurred. The predetermined trigger stimulus could be exposure of the stimulus sensitive gel to a certain temperature, or it could be exposure of the stimulus sensitive gel to other stimuli such as light, pH, humidity, radiation, electromagnetic radiation, visible light, radiation, solvent composition, ionic strength, etc. For sake of clarity this application will focus on exposure of the stimulus sensitive gel to a predetermined temperature stimulus.

Also, it is to be understood that both the general descriptions above and the following detailed descriptions are exemplary and are intended to provide further explanation of certain embodiments of the inventions as claimed. As such it is understood that any and/or all of the aspects or portions of the various and alternative embodiments described herein or described in prior applications are able to be combined, mixed and matched, etc., so that although a certain embodiment is not described herein, it is understood to be included in this or previous disclosures.

In accordance with the purpose of certain embodiments of the invention, as embodied and broadly described herein, there are multiple categories of embodiments of the stimulus indicating device.

One such category pertains to a stimulus indicating device that employs the use of a stimulus sensitive gel that does not require the interaction of a secondary aspect to permanently indicate exposure to a predetermined stimulus. More particularly, this category pertains to a stimulus indicating device that, as embodied and broadly described herein and in conjunction with at least the preferred embodiment as disclosed in conjunction with FIG. 1A and FIG. 1B, which may employ a stimulus sensitive gel in conjunction with an indicator spot, but does not require a secondary aspect (by way of example only, this means it does so, for example, without the need for another substance to absorb the liquid expelled from the gel; or without the need for another aspect to react to the expelled constituent parts; or does not require a constricting portion to block the movement of the stimulus sensitive gel) to enable it to permanently indicate to a user that the product attached to the stimulus indicating device had been exposed to a predetermined stimulus.

This ability to singularly and permanently indicate exposure to a predetermined stimulus results from attractive forces at the molecular level inside the stimulus sensitive gel. These attractive forces are the result of the strong affinity the polymer chains have for each other, which is caused in part by the hydrogen bonding and electrostatic attractions among the polymer chains of the stimulus sensitive gel used in the preferred embodiment. In the preferred embodiment discussed herein, the stimulus sensitive gel is of the UCST type of gel, and more preferably is of the polyacrylamide-co-sodium 3-butenoate type of UCST type gel. As such, the preferred UCST type gels normally possess electrostatic interactions and hydrogen bonding between the acrylamide, acrylic acid and sodium 3-butenoate monomers forming the polymer chains. These are all weak forces when compared to the permanent covalent bonds, which link repeating units in a polymer chain.

When these weak forces found in the preferred stimulus sensitive gel are multiplied by the myriad of such interactions taking place upon undergoing its phase transition in reaction to a predetermined stimulus so as to collapse or shrink, that collapsed or shrunken state is permanently stabilized, even when the predetermined stimulus is removed.

The fact that the collapsed or shrunken stimulus sensitive gel is stabilized by weak forces, and is not stabilized by permanent bonds, is evidenced by the ability of the collapsed or shrunken stimulus sensitive gel employed in the preferred embodiment to undergo its reverse phase transition and returns to its expanded or swollen state only when the solvent is replaced by fresh water. A discussion of how these forces may interact to stabilize the collapsed or shrunken state of the preferred stimulus sensitive gel is disclosed by Ilmain et al., "Volume Transition in a Gel Driven by Hydrogen Bonding," Nature volume 349 at 400 to 401, and is incorporated herein.

In contrast, there are other types of stimulus sensitive gels, such as LCST types gels and in particular the PNIPAAm type of stimulus sensitive gels, that when they collapse or shrink in response to a predetermined stimulus, will undergo reverse phase transition when the predetermined stimulus is removed because PNIPAAm chains have a limited ability to interact electrostatically since they are not electrically charged, nor form hydrogen bonds since carboxylic acid groups are absent. Consequently, the reverse transition occurs quite easily.

In one preferred embodiment the stimulus sensitive gel is kept in a bath of liquid that bathes the swollen stimulus sensitive gel and prevents it from prematurely undergoing its phase transition due to the volatile liquid or constituent parts contained in the swollen stimulus sensitive gel (by way of example only, the acetone) evaporating before the stimulus sensitive gel could be sealed in its container. The scope of the preferred embodiment, however, includes the use of proper manufacturing procedures and precautions so that the preferred swollen stimulus sensitive gel could be manufactured without being contained in a liquid bath.

Accordingly, when the swollen stimulus sensitive gel of this preferred embodiment collapses or shrinks to become the shrunken stimulus sensitive gel, the attractive forces are so strong that the shrunken stimulus sensitive gel remains collapsed or shrunken post-phase transition so long as the shrunken stimulus sensitive gel remains in the closed environment and no tangible substances are allowed to enter or leave the compartment, thereby maintaining the fluid surrounding the shrunken stimulus sensitive gel in a constant state. Thus, so long as the liquid surrounding the post-phase transition stimulus sensitive gel remains constant, the shrunken stimulus sensitive gel will remain collapsed or shrunken and the indicator spot will remain visible through the indicator window, even if the predetermined stimulus is subsequently removed.

As embodied and broadly described herein and in conjunction with at least FIG. 3A and FIG. 3B, FIG. 4A, FIG. 4B and FIG. 4C FIG. 5A, FIG. 5B and FIG. 5C and FIG. 6A, FIG. 6B and FIG. 6C there are alternate embodiments of the preferred "permanently collapsed embodiment," which may employ a stimulus sensitive gel that requires additional aspects in order to ensure that the stimulus sensitive gel remains in its post-phase transition state so as to ensure that the indicator spot is permanently covered or permanently revealed (depending on whether the stimulus sensitive gel is of the UCST type or of the LCST type) and permanently indicates to a user that the product attached to the stimulus indicating device had been exposed to a predetermined stimulus.

Also as discussed herein and in and in conjunction with at least FIG. 7A, FIG. 7B, FIG. 7C, FIG. 7D, FIG. 7E and FIG. 7F, and FIG. 8A, FIG. 8B and FIG. 8C, and FIG. 9A, FIG. 9B and FIG. 9C, and FIG. 10A, FIG. 10B and FIG. 10C, and FIG. 11A and FIG. 11B, there are alternate embodiments of one preferred "permanently collapsed embodiment," which may require an additional aspect, such as a color changing absorbent material, in order to ensure that the stimulus indicating device permanently indicates to a user that the stimulus indicating device had been exposed to a predetermined stimulus.

It will be understood by one of ordinary skill in the art that, for example, the three broad types of embodiments can be combined with one another to arrive at another embodiment of a stimulus indicating device that, via the use of a stimulus sensitive gel, indicates to a user that the stimulus indicating device had been exposed to a predetermined stimulus. It will also be understood that the type of stimulus sensitive gel employed in the stimulus indicating device can be either of the UCST type stimulus sensitive gel, or of the LCST type stimulus sensitive gel. For sake of convenience and by way of explanation only, the embodiments discussed herein are discussed in terms of the UCST type stimulus sensitive gels. And as is well known, when a UCST type stimulus sensitive gel is put in contact with a good solvent or is exposed to increasing temperature, the polymer chains of the UCST type stimulus sensitive gel extend to maximize contact with the solvent molecules. As a result of the extension of the polymer chains, the UCST type stimulus sensitive gel made from such polymer chains swell because they absorb the solvent molecules. Conversely, when a UCST type stimulus sensitive gel is put in contact with a poor solvent or is exposed to decreasing temperature, the polymer chains of that UCST type stimulus sensitive gel will shrink in order to shield themselves from the solvent molecules. The preferred embodiment discussed herein takes advantage of these operating principles, although one of ordinary skill in the art will understand that other types of stimulus sensitive gels, such as LCST type stimulus sensitive gels can be substituted for the UCST type stimulus sensitive gels.

Preferably the stimulus sensitive gels employed in the embodiments discussed herein are of the Polyacrylamide (PAAm) type gels with its derivatives, and as such will shrink and expel its solvent and constituent parts when exposed to a predetermined stimulus. In the case of stimulus sensitive gels prepared from PAAm type gels with its derivatives, water is a good solvent whereas acetone, ethanol and their mixtures, with water, are poor solvents. Thus, as the swollen stimulus sensitive gel is exposed to a predetermined stimulus, such as temperature, the swollen stimulus sensitive gel expels acetone and water and accordingly collapses or shrinks in volume.

As a result of the collapsing or shrinking in volume and the corresponding expulsion of the constituent parts (such as solvent and water) the indication of exposure to a predetermined stimulus occurs by either: i) partially or fully revealing an indicator spot; or ii) causing a color changing absorbent material to change color.

It will be appreciated that the embodiments discussed herein employing stimulus sensitive gels that contain acetone and water as constituent parts is illustrative only, and those constituent parts could be replaced by any other fluids that work for the same purpose, such as ethanol and water, or with acetone or other non-polar solvents, polar solvents, etc.

1. Embodiments with Single Compartment with Non-Reversible Gel

Figure 1B:
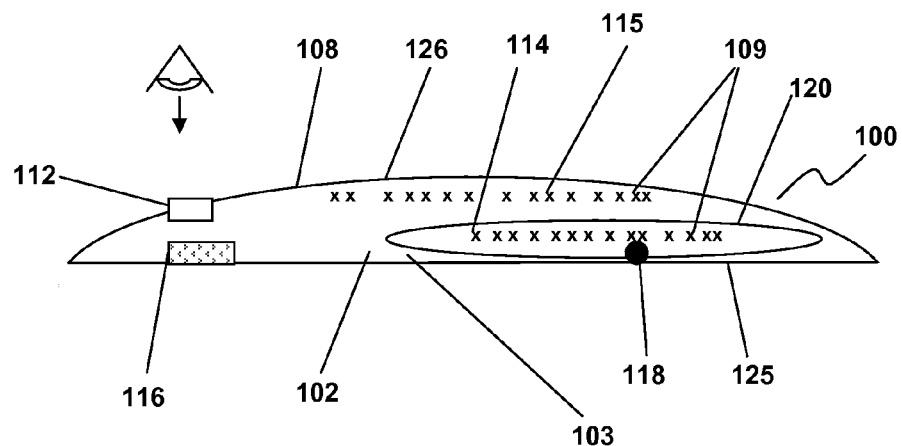
FIG. 1B is a side cross-sectional view of the embodiment in FIG. 1A after exposure to a predetermined trigger stimulus.

In accordance with the purpose of certain embodiments of the invention, as embodied and broadly described herein and in conjunction with FIG. 1A and FIG. 1B, the preferred embodiment of the inventive stimulus indicating devices described herein preferably has a single compartment or first compartment 102 containing a preferably swollen stimulus sensitive gel 110, and indicator spot 116, and a liquid bath 103. Although this embodiment is described in terms of the stimulus sensitive gel preferably being swollen initially, as discussed herein in regard to stimulus sensitive gels, one of ordinary skill in the art would appreciate that the same invention can be achieved with an initially shrunken stimulus sensitive gel that expands or swells upon exposure to a predetermined stimulus so as to cover an indicator spot. In this preferred embodiment the first compartment 102 is formed by the backing layer 125 on the bottom of the stimulus indicating device 100 and an upper layer 126 on the top of the stimulus indicating device 100. The top layer 126 of the stimulus indicating device 100 is formed by at least the indicator window 112 and the top portion 108 of the top layer 126. The indicator spot 116 can be viewed through an indicator window 112 located in the top layer 126 of the stimulus indicating device 100. The swollen stimulus sensitive gel 110 is surrounded by the liquid bath 103.

Prior to being exposed to a predetermined trigger stimulus, the swollen stimulus sensitive gel 110 has not yet undergone a phase transition and preferably covers the entire indicator spot 116. The indicator spot 116 is positioned below the indicator window 112, but is preferably not visible through the indicator window 112 prior to the stimulus indicating device 100 being exposed to the predetermined stimulus because it is preferably entirely covered by the swollen stimulus sensitive gel 110. As shown in FIG. 1A, only a portion of the swollen stimulus sensitive gel 110 is visible through the indicator window 112, with the remaining portion of the swollen stimulus sensitive gel 110 hidden from the view of the user by the top portion 108 of the stimulus indicating device 100.

The swollen stimulus sensitive gel 110 contains fluid 114 and constituent parts 109, which allow the swollen stimulus sensitive gel 110 to maintain its expanded or swollen volume. When the swollen stimulus sensitive gel 110 is exposed to a predetermined stimulus, however, it undergoes its phase transition and the fluid 114 and constituent parts 109 contained in the swollen stimulus sensitive gel 110 are expelled from the swollen stimulus sensitive gel 110 and enter the liquid bath 103.

As the expelled fluid 115 and constituent parts 109 leave the swollen stimulus sensitive gel 110, the swollen stimulus sensitive gel 110 collapses or shrinks in volume, so as to result in the shrunken stimulus gel 120 shown in FIG. 1B. As shown in FIG. 1B, as the swollen stimulus sensitive gel 110 collapses or shrinks in volume, it preferably moves towards the attachment point 118, and in a direction away from the indicator spot 116 and indicator window 112. Thus, by decreasing the volume of the swollen stimulus sensitive gel 110 to result in the shrunken stimulus sensitive gel 120, the indicator spot 116 is visible to the user through the indicator window 112. Thus, as the volume of the swollen stimulus sensitive gel 110 decreases it begins to resemble the shrunken stimulus sensitive gel 120, and reveals the indicator spot 116 to the user through the indicator window 112.

It should be noted that it is not necessary for the swollen stimulus sensitive gel 110 to collapse or shrink entirely in order for the indicator spot 116 to be visible to the user. Instead, if even a portion of the indicator spot 116 is visible to the user through the indicator window 112, that is enough to signal to the user that the product attached to the stimulus indicating device 100 had been exposed to a potentially harmful stimulus. More specifically, although the decrease in volume of the swollen stimulus sensitive gel 110 in all of the embodiments of the stimulus indicating device 100 discussed herein can be by any amount so long as it is registerable, preferably the decrease in volume of the swollen stimulus sensitive gel 110 would be between at least a 1/10 reduction in original volume, and up to a 500 times decrease in original volume. In regard to all embodiments of the stimulus indicating device 100 discussed herein as they pertain to the decrease in the volume being "registerable" what is meant is that the volume change of the swollen stimulus sensitive gel 110 expels enough liquid 114 and/or constituent parts 109 from the swollen stimulus sensitive gel 110 to cause the swollen stimulus sensitive gel 110 to collapse or shrink enough so that it reveals enough of the indicator spot 116 so that a registerable change in color (e.g., a change in color from a first color to a second color) or indication (e.g., an indicator spot 116 that is the same color as the stimulus sensitive gel 110 and 120 but is a glyph, such as an "X" or "skull and cross bones") occurs in the stimulus indicating device 100, and is visible via the indicator window 112, and indicates to the user that the product had been exposed to a predetermined stimulus. Of course, one of ordinary skill in the art understands the reverse is true, and that if a stimulus sensitive gel 110 and 120 is employed that covers up the indicator spot upon exposure to a predetermined stimulus, then it need only cover a portion or enough of the indicator spot 116 so that a registerable change in color (e.g., a change in color from a first color to a second color) occurs in the stimulus indicating device 100, and is visible via the indicator window 112.

As discussed herein, the preferred embodiment of the stimulus indicating device 100 initially contains a swollen stimulus sensitive gel 110 that uses the attractive forces within the stimulus sensitive gel 110 and 120 to permanently indicate exposure to a predetermined stimulus. These attractive forces are the result of the strong affinity the polymer chains in the shrunken stimulus sensitive gel 120 have for each other, which is caused in part by the hydrogen bonding and electrostatic attractions among the polymer chains of the shrunken stimulus sensitive gel 120 used in the preferred embodiment. In this preferred embodiment, the stimulus sensitive gel 110 and 120 is of the UCST type of gel, and more preferably is of the polyacrylamide-co-sodium 3-butenoate type of UCST type gel. As such, the preferred UCST type gels normally possess electrostatic interactions and hydrogen bonding between the acrylamide, acrylic acid and sodium 3-butenoate monomers forming the polymer chains. These are all weak forces when compared to the permanent covalent bonds, which link repeating units in a polymer chain.

When these weak forces found in the preferred stimulus sensitive gel 110 and 120 are multiplied by the myriad of interactions that occur when the swollen stimulus sensitive gel 110 undergoes its phase transition in reaction to a predetermined stimulus and collapses or shrinks so as to become (even partially) the shrunken stimulus sensitive gel 120, that collapsed or shrunken stimulus sensitive gel 120 is permanently stabilized, even when the predetermined stimulus is removed. A discussion of how these forces may interact to stabilize the collapsed or shrunken state of the preferred stimulus sensitive gel is disclosed by Ilmain et al., "Volume Transition in a Gel Driven by Hydrogen Bonding," Nature volume 349 at 400 to 401, and is incorporated herein.

The collapsed or shrunken stimulus sensitive gel 120 will remain stabilized and in its collapsed state, and will not undergo its reverse phase transition and thereby expand or swell to its original volume unless the solvent is replaced by fresh water.

Whether or not the combined strength of the weak attractions present in the shrunken stimulus sensitive gel is sufficient to stabilize the shrunken state and prevent it from expanding to the swollen state once the harmful stimulus is removed is dependent on: (i) the monomers building the chains themselves and (ii) the type of solvent and constituent parts and the relative amounts of them contained within the stimulus sensitive gel. For example and as explained herein, manipulating the amount of water and acetone in a swollen stimulus sensitive gel 110 will cause the swollen stimulus sensitive gel 110 to require either greater or lesser intensity of its predetermined stimulus in order to undergo its phase transition and collapse or shrink.

For example, if the predetermined stimulus was (by way of example only) temperature, decreasing the concentration of the acetone in the swollen stimulus sensitive gel 110 during its manufacture will cause that swollen stimulus sensitive gel 110 to require a cooler temperature in order to undergo its phase transition and collapse or shrink so as to become the permanently shrunken stimulus sensitive gel 120, and remain permanently collapsed or shrunken until the solvent is replaced by fresh water.

For example, if the swollen stimulus sensitive gel 110 is a 10% crosslinked poly (AAm-co-SB) gel that has a acetone concentration of 59.5%, the transition temperature would be 2° C. However, if the swollen stimulus sensitive gel 110 is a 10% crosslinked poly (AAm-co-SB) gel that has a acetone concentration of 61%, the transition temperature would occur at room temperature or roughly 22° C.

As the stimulus sensitive gel is exposed to a predetermined stimulus, by way of example only a certain temperature, and it undergoes its phase transition by collapsing or shrinking in volume, it not only uncovers the indicator spot 116 visible through the display portion or indicator window 112, but it expels the fluid (by way of example only, water) and constituent parts 109 (by way of example only, acetone) from within the matrix of the swollen stimulus sensitive gel 110 and into the fluid 103 contained in the single compartment 102 of the stimulus indicator 100 that surrounds and bathes the swollen stimulus sensitive gel 110. Importantly, as the fluid 114 and constituent parts 111 are expelled from within the matrix of the swollen stimulus sensitive gel 110 and into the fluid 103 contained in the single compartment 102, the attractive forces within the matrix of the swollen stimulus sensitive gel 110 and 120 cause the partially or fully shrunken stimulus sensitive gel 120 to remain permanently collapsed or shrunken (even partially). Thus, the attractive forces resulting from the strong affinity the polymer chains in the shrunken stimulus sensitive gel 120 have for each other, which is caused in part by the hydrogen bonding and electrostatic attractions among the polymer chains of the shrunken stimulus sensitive gel 120 keeps the shrunken stimulus sensitive gel 120 collapsed or shrunken. Thus, one preferred embodiment of this invention does not follow the typical reversibility pattern of a stimulus sensitive gel 110 and 120 (i.e., the collapsed or shrunken stimulus sensitive gel 120 of this preferred embodiment will not expand or swell back to or near its original volume when the predetermined stimulus is removed) because so long as the shrunken stimulus sensitive gel 120 is maintained in a stimulus indicating device 100 in which the first compartment 102 is closed to tangible substances (i.e., the shrunken stimulus sensitive gel 120 and the fluid 103 surrounding the shrunken stimulus sensitive gel 120 are contained in the first compartment 102 that is sealed and that prevents any outside liquids or constituent parts from passing into or out of that sealed first compartment 102), but is open to intangible stimuli (i.e., the sealed first compartment 102 still allows stimuli that cause the stimulus sensitive gel 110 and 120 to undergo a phase transition, to pass in and out of the sealed first compartment 102), the shrunken stimulus sensitive gel 120 will not expand or swell back to (or near to) its original swollen stimulus sensitive gel 110 volume, even when the predetermined stimulus is removed (by way of example only, even if the subsequent temperature of the shrunken stimulus sensitive gel 120 far exceeds the temperature at which the previously swollen stimulus sensitive gel 110 collapsed or shrunk in reaction to that predetermined stimulus). Because the shrunken stimulus sensitive gel 120 in the preferred embodiment remains collapsed or shrunken even when the predetermined stimulus is removed, so long as the shrunken stimulus sensitive gel 120 remains in a closed environment, the indicator spot 116 in the stimulus indicating device 100 will remain permanently visible to the user of the stimulus indicating device 100.

More particularly, shrunken stimulus sensitive gel 120 of this preferred embodiment will only undergo its reverse phase transition and expand or swell back to the swollen stimulus sensitive gel's 110 original volume when: i) the predetermined stimulus is removed; and ii) the sealed first compartment 102 in which the shrunken stimulus sensitive gel 120 is contained is no longer closed to tangible substances (by way of example only, distilled water is added to the first compartment 102).

By way of example only, if predetermined stimulus is removed and the acetone-water mixture inside the polymer matrix of the shrunken stimulus sensitive gel 120 of the preferred embodiment is replaced with pure distilled and deionized water, the shrunken stimulus sensitive gel will undergo its reverse phase transition and will expand or swell back to its original swollen stimulus sensitive gel 110 volume. By way of example only, if the swollen stimulus sensitive gel 110 of the preferred embodiment collapses or shrinks in response to a predetermined stimulus of a temperature dropping below 2° C., that then shrunken stimulus sensitive gel 120 will not expand or swell back to or near its original volume or size even when the temperature of the shrunken stimulus sensitive gel 110 is increased to ambient temperature (25° C. or 77° F.) or higher for a period of months.

Thus, because of the method of manufacture of the stimulus sensitive gel 110 and 120 in this preferred embodiment as disclosed herein, the shrunken stimulus sensitive gel 120 remains collapsed or shrunken so long as the first compartment 102 of the stimulus indicating device 100 system remains closed or sealed (by way of example only, no distilled liquid or constituent parts 111 are withdrawn from the first compartment 102 nor are they inserted into the first compartment 102), the collapsed or shrunken stimulus sensitive gel 120 is unable to expand or swell when the predetermined trigger stimulus (by way of example only, the temperature of the stimulus sensitive gel goes below 2° C.) is removed. Thus, the indicator spot 116 that is visible upon the collapsing or shrinking of the previously swollen stimulus sensitive gel 110 is now permanently visible due to the shrunken stimulus sensitive gel 120 being permanently collapsed or shrunken in volume.

It will be appreciated that the embodiment discussed herein teaching the stimulus sensitive gel 110 and 120 as containing water as the liquid 114 and acetone as the constituent parts 109 is illustrative only; and it will be appreciated that the liquid 114 and those constituent parts 109 could be replaced by any other substances or mixtures or elements or ions that work for the same purpose, such as mixtures of ethanol and water, or mixtures of water and other non-polar and polar solvents, etc.

It should be noted that the predetermined temperature discussed herein that causes the swollen stimulus sensitive gel 110 to undergo its phase transition is only one example of a predetermined stimulus or trigger stimulus that will cause the inventive stimulus sensitive gel 110 and 120 to undergo its phase transition. For example, the swollen stimulus sensitive gel 110 of this preferred embodiment could trigger or undergo its phase transition upon exposure to a predetermined stimulus such as a predetermined pH level, or the swollen stimulus sensitive gel 110 of this preferred embodiment could trigger or undergo its phase transition upon exposure to a predetermined level of electromagnetic radiation.

In regard to all the embodiments of the stimulus indicating device discussed herein being "irreversible" and "permanent," what is meant is that once the stimulus indicating device provides an indication of exposure to an adverse stimulus extreme (which is also referred to herein as a predetermined stimulus), that exposure indication does not change, even though the adverse stimulus extreme or predetermined stimulus might be removed in the future.

Both the backing layer 125 and the upper layer 126 may be constructed of a strong, resilient leak-proof material, such as plastic or other polymer material, so as to provide for the twisting or bending that might occur during transportation of or application to the stimulus sensitive product without tearing, breaking or leaking. The backing layer 125 and the upper layer 126 may also be made of a material that preferably allows them to be joined and sealed together, such as by heat stamping or other suitable means. The backing layer 125 and the upper layer 126 can both approximate the length and width of the first compartment 102, although variations in these dimensions are within the scope of the present invention. The upper layer 126 can preferably be made of a clear material, such as plastic, so that the user of the stimulus indicating device 100 can view at least some portion of the backing material or indicator spot 116 through the indicator window 112. The upper layer 126 can also be able to accept paint or ink so as to allow for coloring or concealing at least some portion of the first compartment 102.

Although some portion of the upper layer 126 can also accept paint or ink for coloring, it is preferable that the indicator window 112 portion of the upper layer 126 remain free from ink or coloring so that the user of the stimulus indicating device 100 can observe the first compartment 102 through the indicator window 112 as explained herein.

The stimulus sensitive gel 110 and 120 employed by the preferred embodiment, as shown in FIG. 1A and FIG. 1B, is preferably manufactured so as to contain a dye or colorant that is different from the color of the indicator spot 116. In this way the color of the stimulus sensitive gel 110 and 120 in both its swollen and collapsed state, is different from the color of the indicator spot 116. Thus, when the swollen stimulus sensitive gel 110 collapses or shrinks in response to the predetermined stimulus, by even a partial amount, the change or decrease in volume will result in the stimulus indicating device 100 changing, at least partially, from a first color to a second color, wherein the color change is visible to the user of the stimulus indicating device 100 through the indicator window 112.

Figure 2A:
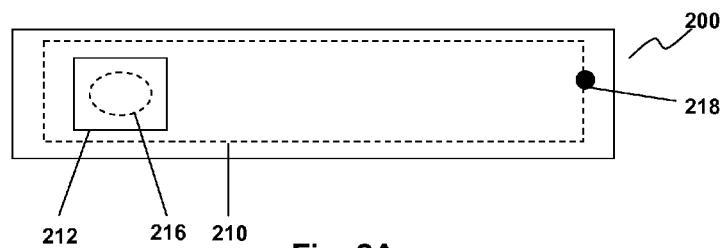
FIG. 2A is a top view of an embodiment of the invention before exposure to a predetermined trigger stimulus.
Figure 2B:
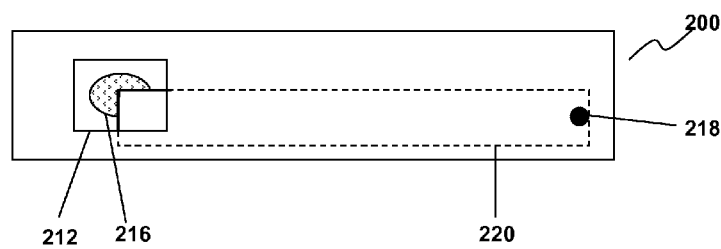
FIG. 2B is a top view of the embodiment in FIG. 2A after exposure to a predetermined trigger stimulus.

More particularly, as shown in FIG. 2A in conjunction with FIG. 1A and FIG. 1B, by coloring the swollen stimulus sensitive gel 110 and 210 a different color than the indicator spot 116 and 216 as well as making it opaque enough, the swollen stimulus sensitive gel 110 and 210 can hide that indicator spot 116 and 216 from the view of the user prior to being exposed to the predetermined trigger stimulus. By way of example only, the swollen stimulus sensitive gel 110 and 210 may contain a suitable dye or color additive such as green. When that green colored swollen stimulus sensitive gel 110 and 210 is viewed pre-phase transition through the indicator window 112 and 212, it informs the user (perhaps in conjunction with a legend or color key) that the product attached to the stimulus indicating device 100 and 200 had not been exposed to a potentially harmful stimulus. But as shown in FIG. 2B in conjunction with FIG. 1A and FIG. 1B, because the colors of the swollen stimulus sensitive gel 110 and 210 and the indicator spot 116 and 216 are different, once the swollen stimulus sensitive gel 110 and 210 undergoes its phase transition and collapses or shrinks even partially, the indicator spot 116 and 216 is at least partially revealed. In this way the user is warned that the product attached to the stimulus indicating device 100 and 200 had been exposed to a potentially harmful stimulus.

Figure 2C:
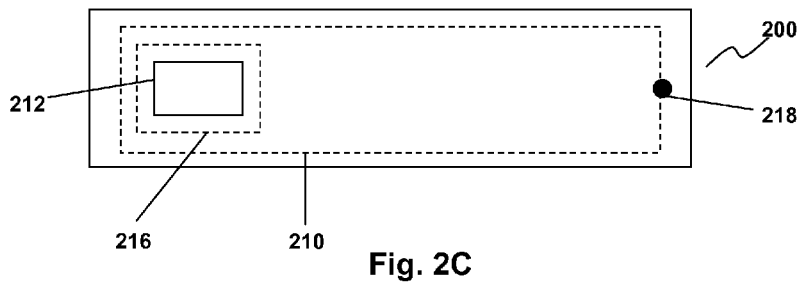
FIG. 2C is a top view of an alternate embodiment of the invention before exposure to a predetermined trigger stimulus.
Figure 2D:
FIG. 2D is a top view of an alternate embodiment in FIG. 2C after exposure to a predetermined trigger stimulus.

In an alternate embodiment shown in FIG. 2C and FIG. 2D in conjunction with FIG. 1A and FIG. 1B, the swollen stimulus sensitive gel 110 and 210 need not be opaque, but instead could be thin enough so that the color of the swollen stimulus sensitive gel 110 and 210 in combination with the color of the indicator spot 116 and 216 could result in a third color. By way of example only, if the swollen stimulus sensitive gel 110 and 210 were colored blue, and the indicator spot 116 and 216 were colored yellow, and if the swollen stimulus sensitive gel 110 and 210 were thin enough, the combination of the two colors would result in the creation of a third color—green. Thus, even though the stimulus indicating device 100 and 200 could potentially show: i) green prior exposure to the predetermined stimulus; ii) only yellow after exposure to the predetermined stimulus; and/or iii) three colors simultaneously (i.e., the blue of the swollen stimulus sensitive gel 110 and 210, and the yellow of the indicator spot 116 and 216, and the green resulting from the combination of the blue and yellow), such potential colors are irrelevant because the stimulus indicating device 100 and 200 would definitively indicate that the stimulus sensitive product to which it is attached had been exposed to a predetermined stimulus.

Figure 2E:
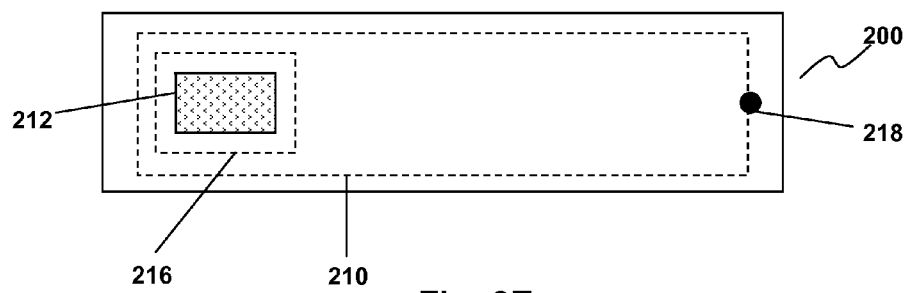
FIG. 2E is a top view of an alternate embodiment of the invention before exposure to a predetermined trigger stimulus.
Figure 2F:
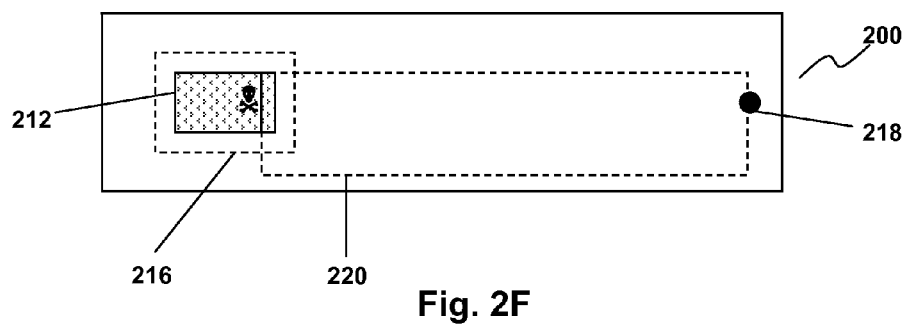
FIG. 2F is a top view of an alternate embodiment in FIG. 2E after exposure to a predetermined trigger stimulus.

In an alternative embodiment of the present invention, as shown in FIG. 2E and FIG. 2F in conjunction with FIG. 1A and FIG. 1B, the swollen stimulus sensitive gel 110 and 210 can be dyed the same color as the indicator spot 116 and 216. In doing so the swollen stimulus sensitive gel 110 and 210 does not need to be significantly opaque. Instead the visual impression through the indicator window 112 and 212 of the swollen stimulus sensitive gel 110 and 210 in combination with the indicator spot 116 and 216 simply needs to appear uniform in color so that the indicator spot 116 and 216 cannot be discerned through the swollen stimulus sensitive gel 110 and 210. Because in this alternate embodiment of the preferred embodiment, the swollen stimulus sensitive gel 110 and 210 and the indicator spot 116 and 216 are the same color, as shown in FIG. 2F the indicator spot 116 and 216 is preferably a design or glyph (by way of example only, an "X" or a skull and cross bones) that, once revealed due to the shrunken stimulus sensitive gel 120 and 220 moving away from the indicator window 112 and 212 and no longer covering some or all of the indicator spot 116 and 216, the stimulus indicating device 100 and 200 will warn the user that the product attached to it had been exposed to a potentially harmful stimulus.

It should be noted that the indicator spot 216 embodiments discussed in regard to FIG. 2A through FIG. 2F are compatible with all embodiments of stimulus indicator devices discussed herein and discussed in prior applications.

Preferably, the stimulus sensitive gel 110 and 120 would be fixed or secured at the attachment point 118, or at more than one attachment point desired. The stimulus sensitive gel 110 and 120 may be fixed to the attachment point 118 with a suitable epoxy, glue, or it could be heat stamped upon creation of the stimulus indicating device 100. The attachment point 118 is preferably positioned at a point opposite the indicator spot 116 and indicator window 112. Attaching the stimulus sensitive gel 110 and 120 to the attachment point 118 helps to ensure that the swollen stimulus sensitive gel 110 collapses or shrinks in a desired direction—preferably toward the attachment point 118, and away from the indicator spot 116 and away from the indicator window 112, so that the indicator spot 116 is at least partially revealed upon exposure to a predetermined stimulus. Securing or fixing the stimulus sensitive gel 110 and 120 to the attachment point 118 prevents the stimulus sensitive gel 110 and 120 from floating or moving within the compartment and covering up the indicator spot 116 after the swollen stimulus sensitive gel 110 had undergone its phase transition, thereby preventing a false indication that the product attached to the stimulus indicator device 100 had not been exposed to a predetermined stimulus.

All embodiments discussed herein of the stimulus indicating device 100 containing the swollen stimulus sensitive gel 110 and the shrunken stimulus sensitive gel 120 may be based on any type of stimulus sensitive gel that undergoes a phase transition upon exposure of the stimulus sensitive gel to a predetermined stimulus. The preferred types of stimulus sensitive gels include polyacrylic acid (PAA) gel, a polyacrylamide (PAAm) gel, and/or its variations such as poly(N-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the direction of the volume change in the stimulus sensitive gel 110 and 120 used in all the embodiments of the stimulus indicating device 100 discussed herein can be selected so as to correlate to a specific situation. For example, one of ordinary skill will appreciate and understand that if the stimulus sensitive gel in this embodiment is swollen at the beginning of its use as it undergoes its phase transition, it will collapse or shrink, thereby causing a change in color or indication in the stimulus indicator 100. Alternatively, the stimulus sensitive gel could start out collapsed or shrunken, but upon exposure to its predetermined stimulus it would permanently expand or swell and cause a change in color or indication in the stimulus indicator 100. By way of example only and as disclosed herein and in prior applications, a stimulus sensitive gel 110 and 120 can be of the UCST or the LCST type gel. As one of ordinary skill in the art will appreciate, a UCST type stimulus sensitive gel, such as PAAm gels, could be used when one wishes to have an initially swollen stimulus sensitive gel collapse or shrink when cooled below a predetermined or trigger temperature and thereby: i) reveal an indicator spot; or ii) expel liquid and/or constituent parts, both of which result in the stimulus indicating device exhibiting a change in color or indication. A UCST type gel could also be used when one wishes to have an initially shrunken stimulus sensitive gel expand or swell when it is heated beyond a predetermined stimulus, and thereby: i) cover an indicator spot; or ii) collect liquid and/or constituent parts, both of which result in the stimulus indicating device exhibiting a change in color or indication. Alternatively, an LCST type stimulus sensitive gel, such as PNIPAAm gels, could be used when one wishes to have an initially swollen stimulus sensitive gel collapse or shrink when heated above a predetermined or trigger temperature and thereby: i) reveal an indicator spot; or ii) expel liquid and/or constituent parts, both of which result in the stimulus indicating device exhibiting a change in color or indication. An LCST type gel could also be used when one wishes to have an initially shrunken stimulus sensitive gel expand or swell when it is cooled below a predetermined stimulus, and thereby: i) cover an indicator spot; or ii) collect liquid and/or constituent parts, both of which result in the stimulus indicating device exhibiting a change in color or indication.

One of ordinary skill in the art will understand that although the stimulus sensitive gel 110 and 120 discussed herein in regard to all embodiments of the stimulus indicating device 100 may be of the UCST type of gel (i.e., the swollen stimulus sensitive gel 110 will collapse or shrink upon exposure to its predetermined stimulus of a cooler temperature, and become the shrunken stimulus sensitive gel 120; as well as expand or swell upon exposure to its predetermined stimulus of a warmer temperature, and become the swollen stimulus sensitive gel 110), the range and scope of this invention includes, for example, and envisions the swollen stimulus sensitive gel 110 and the shrunken stimulus sensitive gel 120 also being of the LCST type of gel. Moreover, it should be noted that all the variations of the different embodiments discussed herein can be combined with the variations of other embodiments described herein and that are known in the art, as would be understood to one of ordinary skill in the art.

The behavior of the UCST gels and the LCST gels depends on their chemical structure. Many examples of both kinds of polymers are known in the literature. For example, if the stimulus sensitive gel 110 and 120 employed in all the embodiments of the stimulus indicating device 100 discussed herein were made of UCST type stimulus sensitive gels, it could be any number of such UCST gels, including: i) polyacrylic acid (PAA) gel combined with polyacrylamide (PAAm) gel; or ii) PAAm gel combined with poly sodium 3-butenoate (SB) gel to result in the creation of poly(AAm-co-SB) gel; or iii) their derivates, and as described in Tanaka, "Gels," Scientific American 244 (1981) at 124-138 and Tanaka, "Phase Transitions in Ionic Gels," Physical Review Letters 45 (1980) at 1636-1639, the predetermined "trigger" stimulus at which a UCST gel undergoes its phase transition, and thereby expels the liquid 114 and constituent parts 111 and thus collapses or shrinks in volume, can be "tuned" to a particular value by changing the solvent trapped in the gel polymer matrix in addition to introducing salts, surfactants, or other substances to the gel matrix. Such "tuning" in regard to UCST type gels is discussed herein. Similarly, if the stimulus sensitive gel 110 and 120 employed in all the embodiments of the stimulus indicating device 100 discussed herein were made of LSCT type stimulus sensitive gels, it could be any number of such LSCT gels, including PNIPAAm and as described in U.S. Pat. No. 4,732,930 in regard to PNIPAAm or LCST type gels the predetermined stimulus, such as temperature at which a stimulus sensitive gel 110 and 120 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Nonionic Poly(N-isopropylacrylamide) Gel" Macromolecules volume 26 at 5045 to 5048.

Regardless of whether LCST type stimulus sensitive gels or UCST type stimulus sensitive gels are used to indicate exposure to a predetermined stimulus, what is important is that the change in volume of the stimulus sensitive gel be tailored to the application in which the stimulus indicator is being used. For example, a change in volume of the stimulus sensitive gel 110 and 120, and thus the corresponding expulsion of liquid 114 and constituent parts 109 can be insignificant or it can be dramatic. If the desired visual indication is the result of the swollen stimulus sensitive gel 110 moving completely out of the indicator window 112 and revealing the indicator spot 116, then a large change in volume is preferred.

2. Embodiments with Single Compartment and Absorbent Material

Figure 3A:
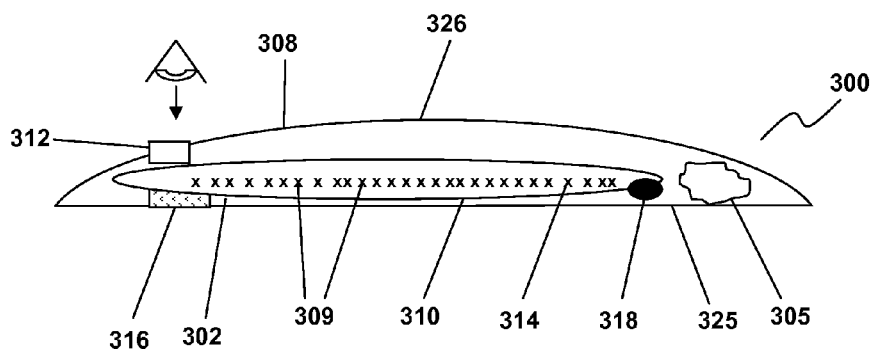
FIG. 3A is a side cross-sectional view of an embodiment of the invention before exposure to a predetermined trigger stimulus.
Figure 3B:
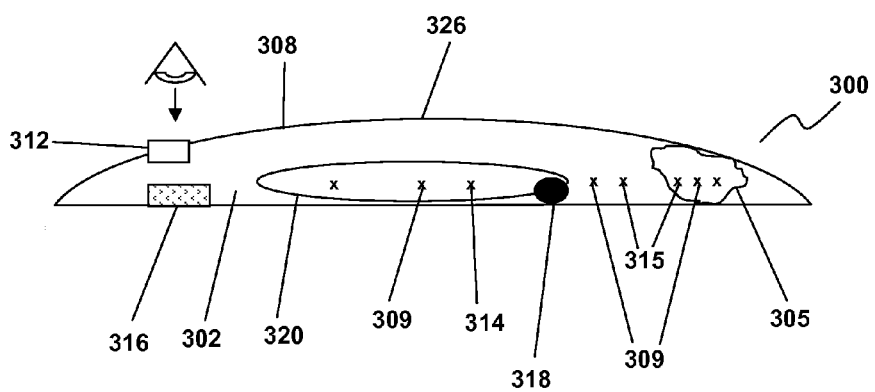
FIG. 3B is a side cross-sectional view of the embodiment in FIG. 3A after exposure to a predetermined trigger stimulus.

In accordance with the purpose of certain embodiments of the invention, as embodied and broadly described herein and in conjunction with FIG. 3A and FIG. 3B as well as FIG. 2A through FIG. 2F, an alternative embodiment of the inventive stimulus indicating device 300 preferably has a single compartment containing the swollen stimulus sensitive gel 310, and indicator spot 316 and absorbent material 305, but there is no need for the liquid bath of the preferred embodiment. Although this embodiment is described in terms of the stimulus sensitive gel preferably being swollen initially, as discussed herein in regard to stimulus sensitive gels, one of ordinary skill in the art would appreciate that the same embodiment of the invention can be achieved with an initially shrunken stimulus sensitive gel that expands or swells upon exposure to a predetermined stimulus so as to cover an indicator spot.

The single or first compartment 302 is formed by the backing layer 325 on the bottom of the stimulus indicating device 300 and an upper layer 326 on the top of the stimulus indicating device 300. The top layer 326 of the stimulus indicating device 300 is formed by at least the indicator window 312 and the top portion 308 of the top layer 326. The indicator spot 316 can be viewed through an indicator window 312 located in the top layer 326 of the stimulus indicating device 300.

Prior to being exposed to a predetermined trigger stimulus, the swollen stimulus sensitive gel 310 has not yet undergone a phase transition and preferably covers the entire indicator spot 316. The indicator spot 316 is positioned below the indicator window 312, but is preferably not visible through the indicator window 312 prior to the stimulus indicating device 300 being exposed to the predetermined stimulus because it is preferably entirely covered by the swollen stimulus sensitive gel 310. As shown in FIG. 3A, only a portion of the swollen stimulus sensitive gel 310 is visible through the indicator window 312, with the remaining portion of the swollen stimulus sensitive gel 310 hidden from the view of the user by the top portion 308 of the stimulus indicating device 300.

The swollen stimulus sensitive gel 310 contains fluid 314 and constituent parts 309, which allow the swollen stimulus sensitive gel 310 to maintain its expanded or swollen volume. When the swollen stimulus sensitive gel 310 is exposed to a predetermined stimulus, however, it undergoes its phase transition and the fluid 314 and constituent parts 309 contained in the swollen stimulus sensitive gel 310 are expelled from the swollen stimulus sensitive gel 310 and enter the first compartment 302.

As discussed herein, this alternative embodiment of the stimulus indicating device 300 contains a stimulus sensitive gel 310 and 320 described herein in regard to FIG. 3A and FIG. 3B. As the stimulus sensitive gel is exposed to a predetermined stimulus, by way of example only, a certain temperature, and it undergoes its phase transition by collapsing or shrinking in volume, it not only uncovers the indicator spot 316 visible through the display portion or indicator window 312, but it expels the fluid 314 (by way of example only, water) and constituent parts 309 (by way of example only, dye particles that can be absorbed and/or trapped by absorbent material) from within the matrix of the swollen stimulus sensitive gel 310 and into the single compartment 302 of the stimulus indicator 300.

Upon exposure of the stimulus sensitive product to its predetermined phase transition stimulus, such as temperature, the swollen stimulus sensitive gel 310 would undergo its phase transition and collapse or shrink to become the shrunken stimulus sensitive gel 320 due to the loss of the water or liquid 314 and constituent parts 309 contained in its matrix. As the swollen stimulus sensitive gel collapses or shrinks, it partially or wholly withdraws from the indicator window 312, so that it is either only partially visible through the indicator window 312, or would be hidden completely from the user because it is covered completely by the top portion 308 of the device 300, and thus is not visible through the indicator window 312. The more the swollen stimulus sensitive gel 310 collapses or shrinks the more it reveals the indicator spot 316, and the more it becomes like the collapsed or shrunken stimulus sensitive gel 320 in FIG. 3B. Such partial or full exposure of the indicator spot 316 by the collapse or shrinking of the swollen stimulus sensitive gel 310 to become the collapsed or shrunken stimulus sensitive gel 320 is the same for all variations of this embodiment discussed herein.

The swollen stimulus sensitive gel 310 can be made to undergo its phase transition when it is exposed to the proper or predetermined stimulus, such as and by way of example only, when it is heated or cooled to a designated temperature, depending on whether the polymer gel was of the LCST or UCST type. Regardless, as the swollen stimulus sensitive gel 310 collapses or shrinks, the water (or other liquid or mixture) 314 and possibly the constituent parts 309 contained in the matrix of the swollen stimulus sensitive gel 310, are expelled. Consequently, as shown in FIG. 3A and FIG. 3B, the expelled liquid 315 and/or constituent parts 309 would be absorbed by a suitable absorbent material 305.

The collapsing or shrinking of the swollen stimulus sensitive gel 310 (caused by the loss of the liquid 314 and possibly constituent parts 309 contained in the matrix of the swollen stimulus sensitive gel 310 when the swollen stimulus sensitive gel 310 undergoes its phase transition), thereby resulting in the shrunken stimulus sensitive gel 320 preferably collecting under the top portion 308 of the stimulus indicating device 300, would expose the colored indicator spot 316 through the indicator window 312 (which would now present a red color, for example), indicating to the user of the stimulus sensitive product that the product had been exposed to a harmful stimulus, such as an extreme temperature.

Referring again to FIG. 3A and FIG. 3B, the shrunken stimulus sensitive gel 320 would remain permanently in its collapsed or shrunken state, even if the predetermined stimulus, such as temperature, were removed, because the shrunken stimulus sensitive gel 320 would not come back into contact with the expelled water 315 and/or constituent parts 309 because they had been bound to and/or trapped by the absorbent material 305, thereby permanently preventing the shrunken stimulus sensitive gel 320 from expanding back to its original volume once the predetermined stimulus had been removed. The shrunken stimulus sensitive gel is permanently prevented from expanding back to its original volume because either the absorbent material 305 has a stronger affinity for the expelled water than the shrunken stimulus sensitive gel 320, or because the absorbent material would not physically touch the shrunken stimulus sensitive gel 320. Either way the absorbent material, which is for example a hygroscopic silica or an equivalent absorbent material (such as sodium polyacrylate or a polyacrylamide derivatives), has an affinity for and permanently and irreversibly binds to and traps the expelled liquid 315 and/or constituent parts 309, which would be expelled from the swollen stimulus sensitive 310 as it collapsed or shrunk. By permanently trapping the expelled liquid 315 and/or constituent parts 309 in the absorbent material 305, the shrunken stimulus sensitive gel 320 would be permanently prevented from expanding or swelling and re-covering the indicator spot 316, even when the predetermined stimulus condition is removed.

It should be noted that the predetermined temperature discussed herein that causes the swollen stimulus sensitive gel 310 to undergo its phase transition is only one example of a predetermined stimulus or trigger stimulus that will cause the inventive stimulus sensitive gel 310 and 320 to undergo its phase transition. For example, the swollen stimulus sensitive gel 310 of this preferred embodiment could trigger or undergo its phase transition upon exposure to a predetermined stimulus such as a predetermined pH level, or the swollen stimulus sensitive gel 310 of this preferred embodiment could trigger or undergo its phase transition upon exposure to a predetermined level of electromagnetic radiation.

As the expelled fluid 315 and constituent parts 311 leave the swollen stimulus sensitive gel 310, the swollen stimulus sensitive gel 310 collapses or shrinks in volume, so as to result in the shrunken stimulus gel 320 shown in FIG. 3B. As shown in FIG. 3B, as the swollen stimulus sensitive gel 310 collapses or shrinks in volume, it preferably moves towards the attachment point 318, and in a direction away from the indicator spot 316 and indicator window 312. Thus, by decreasing the volume of the swollen stimulus sensitive gel 310 to result in the shrunken stimulus sensitive gel 320, the indicator spot 316 is visible to the user through the indicator window 312. Thus, as the volume of the swollen stimulus sensitive gel 310 decreases it begins to resemble the shrunken stimulus sensitive gel 320, and reveals the indicator spot 316 to the user through the indicator window 312.

It should be noted that it is not necessary for the swollen stimulus sensitive gel 310 to collapse or shrink entirely in order for the indicator spot 316 to be visible to the user. Instead, if even a portion of the indicator spot 316 is visible to the user through the indicator window 312, which is enough to signal to the user that the product attached to the stimulus indicating device 300 had been exposed to a potentially harmful stimulus. More specifically, although the decrease in volume of the swollen stimulus sensitive gel 310 in all of the embodiments of the stimulus indicating device 300 discussed herein can be by any amount so long as it is registerable, preferably the decrease in volume of the swollen stimulus sensitive gel 310 would be between at least a 1/10 reduction in original volume, and up to a 500 times decrease in original volume. In regard to all embodiments of the stimulus indicating device 300 discussed herein as they pertain to the decrease in the volume being "registerable" what is meant is that the volume change of the swollen stimulus sensitive gel 310 expels enough liquid 314 and constituent parts 309 from the swollen stimulus sensitive gel 310 to cause the swollen stimulus sensitive gel 310 to collapse or shrink enough so that it reveals enough of the indicator spot 316 so that a registerable change in color (e.g., a change in color from a first color to a second color) or indication (e.g., an indicator spot 316 that is the same color as the stimulus sensitive gel 310 and 320 but is a glyph, such as an "X" or "skull and cross bones") occurs in the stimulus indicating device 300, and is visible via the indicator window 312, and indicates to the user that the product had been exposed to a predetermined stimulus. Of course, one of ordinary skill in the art understands the reverse is true, and that is a stimulus sensitive gel 310 and 320 is employed that covers up the indicator spot upon exposure to a predetermined stimulus, then it need only cover a portion or enough of the indicator spot 316 so that a registerable change in color (e.g., a change in color from a first color to a second color) occurs in the stimulus indicating device 300, and is visible via the indicator window 312.

In regard to all the embodiments of the stimulus indicating device discussed herein being "irreversible" and "permanent," what is meant is that once the stimulus indicating device provides an indication of exposure to an adverse stimulus extreme (which is also referred to herein as a predetermined stimulus), that exposure indication does not change, even though the adverse stimulus extreme or predetermined stimulus might be removed in the future.

Both the backing layer 325 and the upper layer 326 may be constructed of a strong, resilient leak-proof material, such as plastic or other polymer material, so as to provide for the twisting or bending that might occur during transportation of or application to the stimulus sensitive product without tearing, breaking or leaking. The backing layer 325 and the upper layer 326 may also be made of a material that preferably allows them to be joined and sealed together, such as by heat stamping or other suitable means. The backing layer 325 and the upper layer 326 can both approximate the length and width of the first compartment 302, although variations in these dimensions are within the scope of the present invention. The upper layer 326 can preferably be made of a clear material, such as plastic, so that the user of the stimulus indicating device 300 can view at least some portion of the backing material or indicator spot 316 through the indicator window 312. The upper layer 326 can also be able to accept paint or ink so as to allow for coloring or concealing at least some portion of the first compartment 302.

Although some portion of the upper layer 326 can also accept paint or ink for coloring, it is preferable that the indicator window 312 portion of the upper layer 326 remain free from ink or coloring so that the user of the stimulus indicating device 300 can observe the first compartment 302 through the indicator window 312 as explained herein.

The stimulus sensitive gel 310 and 320 employed by the preferred variations of this embodiment, as shown in FIG. 3A and FIG. 3B, is preferably manufactured so as to contain a dye or colorant that is different from the color of the indicator spot 316. In this way the color of the stimulus sensitive gel 310 and 320 in both its swollen and collapsed state, is different from the color of the indicator spot 316. Thus, when the swollen stimulus sensitive gel 310 collapses or shrinks in response to the predetermined stimulus, by even a partial amount, the change or decrease in volume will result in the stimulus indicating device 300 changing, at least partially, from a first color to a second color, wherein the color change is visible to the user of the stimulus indicating device 300 through the indicator window 312. This alternative embodiment of the stimulus indicating device 300 as disclosed herein and in conjunction with FIG. 3A and FIG. 3B, this alternative embodiment can be combined in conjunction with all the embodiments shown in FIG. 2A through FIG. 2F to disclose to the user of the stimulus indicating device 300 that the product to which it is attached had been exposed to a predetermined stimulus.

Preferably, the stimulus sensitive gel 310 and 320 would be fixed or secured at the attachment point 318, or at more than one attachment point desired. The stimulus sensitive gel 310 and 320 may be fixed to the attachment point 318 with a suitable epoxy, glue, or it could be heat stamped upon creation of the stimulus indicating device 300. The attachment point 318 is preferably positioned at a point opposite the indicator spot 316 and indicator window 312. Attaching the stimulus sensitive gel 310 and 320 to the attachment point 318 helps to ensure that the swollen stimulus sensitive gel 310 collapses or shrinks in a desired direction—preferably toward the attachment point 318, and away from the indicator spot 316 and away from the indicator window 312, so that the indicator spot 116 is revealed upon exposure to a predetermined stimulus. Securing or fixing the stimulus sensitive gel 310 and 320 to the attachment point 318 prevents the stimulus sensitive gel 310 and 320 from floating or moving within the compartment and covering up the indicator spot 316 after the swollen stimulus sensitive gel 310 had undergone its phase transition, thereby preventing a false indication that the product attached to the stimulus indicator device 100 had not been exposed to a predetermined stimulus.

All embodiments discussed herein of the stimulus indicating device 300 containing the swollen stimulus sensitive gel 310 and the shrunken stimulus sensitive gel 320 may be based on any type of stimulus sensitive gel that undergoes a phase transition upon exposure of the stimulus sensitive gel to a predetermined stimulus. The preferred types of stimulus sensitive gels include polyacrylic acid (PAA) gel, a polyacrylamide (PAAm) gel, and/or its variations such as poly(N-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the direction of the volume change in the stimulus sensitive gel 310 and 320 used in all the embodiments of the stimulus indicating device 300 discussed herein can be selected so as to correlate to a specific situation. For example, one of ordinary skill will appreciate and understand that if the stimulus sensitive gel in this embodiment is swollen at the beginning of its use as it undergoes its phase transition, it will collapse or shrink, thereby causing a change in color or indication in the stimulus indicator 300. Alternatively, the stimulus sensitive gel could start out collapsed or shrunken, but upon exposure to its predetermined stimulus it would permanently expand or swell and cause a change in color or indication in the stimulus indicator 100. By way of example only and as disclosed herein and in prior applications, a stimulus sensitive gel 310 and 320 can be of the UCST type gel or the LCST type gel. As one of ordinary skill in the art will appreciate, a UCST type stimulus sensitive gel, such as PAAm gels, could be used when one wishes to have an initially swollen stimulus sensitive gel collapse or shrink when cooled below a predetermined or trigger temperature and thereby: i) reveal an indicator spot; or ii) expel liquid and/or constituent parts, both of which result in the stimulus indicating device exhibiting a change in color or indication. A UCST type gel could also be used when one wishes to have an initially shrunken stimulus sensitive gel expand or swell when it is heated beyond a predetermined stimulus, and thereby: i) cover an indicator spot; or ii) collect liquid and/or constituent parts, both of which result in the stimulus indicating device exhibiting a change in color or indication. Alternatively, an LCST type stimulus sensitive gel, such as PNIPAAm gels, could be used when one wishes to have an initially swollen stimulus sensitive gel collapse or shrink when heated above a predetermined or trigger temperature and thereby: i) reveal an indicator spot; or ii) expel liquid and/or constituent parts, both of which result in the stimulus indicating device exhibiting a change in color or indication. An LCST type gel could also be used when one wishes to have an initially shrunken stimulus sensitive gel expand or swell when it is cooled below a predetermined stimulus, and thereby: i) cover an indicator spot; or ii) collect liquid and/or constituent parts, both of which result in the stimulus indicating device exhibiting a change in color or indication.

One of ordinary skill in the art will understand that although the stimulus sensitive gel 310 and 320 discussed herein in regard to all embodiments of the stimulus indicating device 300 may be of the UCST type of gel (i.e., the swollen stimulus sensitive gel 310 will collapse or shrink upon exposure to its predetermined stimulus of a cooler temperature, and become the shrunken stimulus sensitive gel 320; as well as expand or swell upon exposure to its predetermined stimulus of a warmer temperature, and become the swollen stimulus sensitive gel 310), the range and scope of this invention includes and envisions the swollen stimulus sensitive gel 310 and the shrunken stimulus sensitive gel 320 also being of the LCST type of gel. Moreover, it should be noted that all the variations of the different embodiments discussed herein can be combined with the variations of other embodiments described herein and that are known in the art, as would be understood to one of ordinary skill in the art.

The behavior of the UCST gels and the LCST gels depends on their chemical structure. Many examples of both kinds of polymers are known in the literature. For example, if the stimulus sensitive gel 310 and 320 employed in all the embodiments of the stimulus indicating device 300 discussed herein were made of UCST type stimulus sensitive gels, it could be any number of such UCST gels, including: i) polyacrylic acid (PAA) gel combined with polyacrylamide (PAAm) gel; or ii) PAAm gel combined with poly sodium 3-butenoate (SB) gel to result in the creation of poly(AAm-co-SB) gel; or iii) their derivates, and as described in Tanaka, "Gels," Scientific American 244 (1981) at 124-138 and Tanaka, "Phase Transitions in Ionic Gels," Physical Review Letters 45 (1980) at 1636-1639, the predetermined "trigger" stimulus at which a UCST gel undergoes its phase transition, and thereby expels the liquid 314 and constituent parts 311 and thus collapses or shrinks in volume, can be "tuned" to a particular value by changing the solvent trapped in the gel polymer matrix in addition to introducing salts, surfactants, or other substances to the gel matrix. Such "tuning" in regard to UCST type gels is discussed herein and in U.S. Pat. No. 5,100,933. Similarly, if the stimulus sensitive gel 310 and 320 employed in all the embodiments of the stimulus indicating device 300 discussed herein were made of LSCT type stimulus sensitive gels, it could be any number of such LCST gels, including PNIPAAm gels, and as described in U.S. Pat. No. 4,732,930 in regard to PNIPAAm LCST type gels, the predetermined stimulus, such as temperature at which a stimulus sensitive gel 310 and 320 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Nonionic Poly(N-isopropylacrylamide) Gel" Macromolecules volume 26 at 5045 to 5048.

Regardless of whether LCST type stimulus sensitive gels or UCST type stimulus sensitive gels are used to indicate exposure to a predetermined stimulus, what is important is that the change in volume of the stimulus sensitive gel be tailored to the application in which the stimulus indicator is being used. For example, a change in volume of the stimulus sensitive gel 310 and 320, and thus the corresponding expulsion of liquid 314 and constituent parts 309 can be insignificant or it can be dramatic. If the desired visual indication is the result of the swollen stimulus sensitive gel 310 moving completely out of the indicator window 312 and revealing the indicator spot 316, then a large change in volume is preferred.

3. Embodiments with Permeable Membrane

Figure 4A:
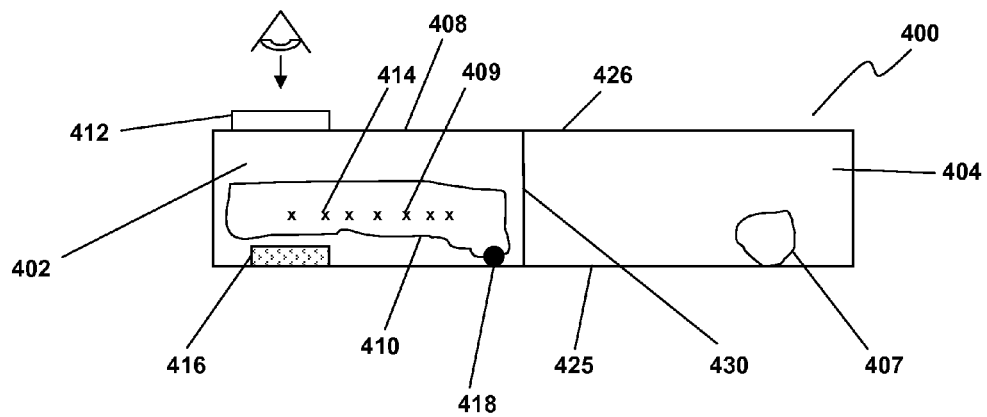
FIG. 4A is a side cross-sectional view of an embodiment of the invention before exposure to a predetermined trigger stimulus.
Figure 4B:
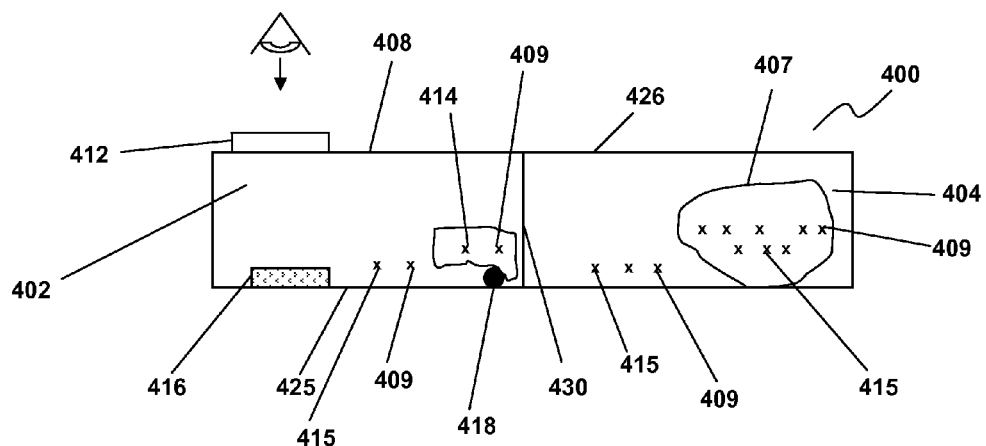
FIG. 4B is a side cross-sectional view of the embodiment in FIG. 4A after exposure to a predetermined trigger stimulus.

In accordance with the purpose of certain embodiments of the invention, as embodied and broadly described herein and in conjunction with FIG. 4A and FIG. 4B, an alternative embodiment of the inventive stimulus indicating devices described herein has at least two compartments which contain in the first compartment 402 a preferably swollen stimulus sensitive gel 410 and indicator spot 416, but does not require the liquid bath of the preferred embodiment, and contains a second compartment 404 that preferably contains an absorbent material 407, which would be any substance that could absorb the fluid 414 and/or constituent parts 409 contained in and then expelled by the swollen stimulus sensitive gel 410, thereby permanently keeping the then shrunken stimulus sensitive gel 420 from re-expanding or re-swelling, and thereby preventing the then shrunken stimulus sensitive gel 420 from re-covering the indicator spot 416. Although this embodiment is described in terms of the stimulus sensitive gel preferably being swollen initially 410, as discussed herein in regard to stimulus sensitive gels, one of ordinary skill in the art would appreciate that the same invention can be achieved with an initially shrunken stimulus sensitive gel that expands or swells upon exposure to a predetermined stimulus so as to cover an indicator spot.

The first compartment 402 and second compartment 404 are formed in part by the backing layer 425 on the bottom of the stimulus indicating device 400, and an upper layer 426 on the top of the stimulus indicating device 400. The top layer 426 of the stimulus indicating device 400 is formed by at least the indicator window 412 and the top portion 408 of the top layer 426. The indicator spot 416 can be viewed through an indicator window 412 located in the top layer 426 of the stimulus indicating device 400. The first compartment 402 and the second compartment 404 are additionally formed and differentiated from one another by a permeable membrane 430. The permeable membrane 430 is designed to allow the expelled liquid 415 and/or constituent parts 409 to pass from the first compartment 402 into the second compartment 404, as well as from the second compartment 404 into the first compartment 402.

Figure 4C:
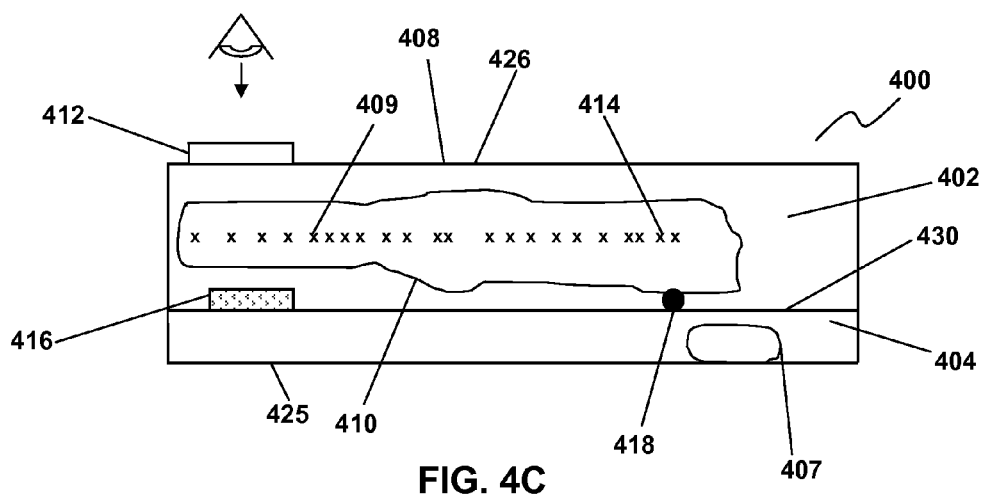
FIG. 4C is a side view of an additional embodiment of the invention before exposure to a predetermined trigger stimulus.

Alternatively, as shown in FIG. 4C an alternate embodiment could position the first compartment 402 above the second compartment 404 separated by the permeable membrane 430. Other shapes are contemplated within the scope of certain embodiments of the invention as would be understood by one of ordinary skill in the art and/or as previously described in prior applications.

Prior to being exposed to a predetermined trigger stimulus, the swollen stimulus sensitive gel 410 has not yet undergone a phase transition and preferably covers the entire indicator spot 416. The indicator spot 416 is positioned below the indicator window 412, but is preferably not visible through the indicator window 412 prior to the stimulus indicating device 400 being exposed to the predetermined stimulus because it is preferably entirely covered by the swollen stimulus sensitive gel 410. As shown in FIG. 4A, only a portion of the swollen stimulus sensitive gel 410 is visible through the indicator window 412, with the remaining portion of the swollen stimulus sensitive gel 410 hidden from the view of the user by the top portion 408 of the stimulus indicating device 400.

The swollen stimulus sensitive gel 410 contains fluid 414 and constituent parts 409, which allow the swollen stimulus sensitive gel 410 to maintain its expanded or swollen volume. When the swollen stimulus sensitive gel 410 is exposed to a predetermined stimulus, however, it undergoes its phase transition and the fluid 414 and constituent parts 409 contained in the swollen stimulus sensitive gel 410 are expelled from the swollen stimulus sensitive gel 410 and enter the first compartment 402.

As discussed herein, this alternative embodiment of the stimulus indicating device 400 contains a stimulus sensitive gel 410 and 420 described herein in regard to FIG. 4A and FIG. 4B. As the stimulus sensitive gel is exposed to a predetermined stimulus, by way of example only, a certain temperature, and it undergoes its phase transition by collapsing or shrinking in volume, it not only uncovers the indicator spot 416 visible through the display portion or indicator window 412, but it expels the fluid 414 (by way of example only, water) and constituent parts 409 (by way of example only, dye particles that can be absorbed and/or trapped by an absorbent material) from within the matrix of the swollen stimulus sensitive gel 410 and into the single compartment 402 of the stimulus indicator 400.

Upon exposure of the stimulus sensitive product to its predetermined phase transition stimulus, such as temperature, the swollen stimulus sensitive gel 410 would undergo its phase transition and collapse or shrink to become the shrunken stimulus sensitive gel 420 due to the loss of the water or liquid 414 and constituent parts 409 contained in its matrix. As the swollen stimulus sensitive gel collapses or shrinks, it partially or wholly withdraws from the indicator window 412, so that it is either only partially visible through the indicator window 412, or would be hidden completely from the user because it is covered completely by the top portion 408 of the device 400, and thus is not visible through the indicator window 412. The more the swollen stimulus sensitive gel 410 collapses or shrinks the more it reveals the indicator spot 416, and the more it becomes like the collapsed or shrunken stimulus sensitive gel 420 in FIG. 4B. Such partial or full exposure of the indicator spot 416 by the collapse or shrinking of the swollen stimulus sensitive gel 410 to become the collapsed or shrunken stimulus sensitive gel 420 is the same for all variations of this embodiment discussed herein.

Also, as the stimulus sensitive gel 410 collapses or shrinks in response to the predetermined stimulus, the expelled liquid 415 and/or constituent parts 409 within the swollen stimulus sensitive gel 410 are expelled into the first compartment 402, and pass into the second compartment 404 though the permeable membrane 430 that separates the at least two compartments 402 and 404.

Because the permeable membrane 430 separating the at least first compartment 402 and second compartment 404 allows the expelled liquid 415 and/or constituent parts 409 to pass in both directions, the expelled liquid 415 and/or constituent parts 409 could subsequently pass back from the second compartment 404 into the first compartment 402. And when the predetermined stimulus is removed, the shrunken stimulus sensitive gel 410 would then have the ability to reabsorb the previously expelled liquid 415 and/or constituent parts 409 once the predetermined stimulus is removed, thereby expanding or swelling to its original or near original volume. In doing so, the now re-swollen stimulus sensitive gel 410 could re-cover the indicator spot 416. Accordingly, the second compartment 404 preferably contains an absorbent material 407 that has an affinity for the expelled liquid 415 and/or constituent parts 411 (as described herein or as understood in the art), so as to permanently bind to and trap the expelled liquid 415 and/or constituent parts 409 in the second compartment 404. By way of example only, if the expelled liquid 415 were water, the absorbent material 407 could be a silica gel, such as hygroscopic silica or another absorbent material (such as sodium polyacrylate or polyacrylamide derivatives or a natural absorbent) that permanently binds to the expelled liquid 415 and or constituent parts 409 expelled from the stimulus sensitive gel 410.

Trapping the expelled liquid 415 in the second compartment 404 with the absorbent material 407 results in a constant or fixed volume of liquid 414 and 415 and shrunken stimulus sensitive gel 420 in the first compartment 402 from that point forward. Because the volume of liquid 414 and 415 and shrunken stimulus sensitive gel 420 in the first compartment 402 is fixed due to the expelled liquid 415 and/or constituent parts 409 being trapped in the second compartment 404 by the absorbent material 407, the collapsed or shrunken stimulus sensitive gel 420 is permanently prevented from re-expanding and re-covering the indicator spot 416 even when the predetermined stimulus condition is removed. In this way the stimulus indicating device 400 will permanently show that it, and the stimulus sensitive product attached to it, had been exposed to a deleterious predetermined stimulus.

It should be noted that by manipulating the permeability of the permeable membrane 430 connecting the first compartment 402 to the second compartment 404, the time required for expelled liquid 415 to move from the second compartment 404 into the first compartment 402 can be varied. Such manipulation of the permeable membrane 430 includes increasing or decreasing its thickness and/or increasing or decreasing its surface area facing the first compartment 402 and/or second compartment 404 and/or increasing or decreasing its wicking ability, so as to control the speed at which the expelled liquid 415 and the constituent parts 409 travel from the second compartment 404, through the permeable membrane 430, and enter the first compartment 402 or visa versa.

An advantage of using such an embodiment of the stimulus indicating device 400 is that both the exposure to a predetermined stimulus as well as the time of exposure can be indicated. As an example, if the predetermined stimulus occurs for just a short period of time, and is removed before the expelled liquid 415 and constituent parts 409 have completely moved from the first compartment 402 through the permeable membrane 430 and into the second compartment 404, then the expelled liquid 415 and constituent parts 409 will be wicked or drawn back into the first compartment 402 by and into the shrunken stimulus sensitive gel 420 as the shrunken stimulus sensitive gel 420 re-expands or swells as a result of undergoing its reverse phase transition, or simply removing the predetermined stimulus. The reason this happens is because the permeable membrane 430 allows the expelled liquid 415 and expelled constituent parts 409 to pass in both directions. And so in this case, no irreversible indication of exposure to the predetermined stimulus will be indicated by stimulus indicating device 400 because the time of exposure to the predetermined stimulus was too brief to enable enough expelled liquid 415 and enough constituent parts 409 to pass completely through the permeable membrane 430, be bound by the absorbent material 407, and cause the stimulus indicating device 400 to change from a first color 413 to a second color 417.

The swollen stimulus sensitive gel 410 can be made to undergo its phase transition when it is exposed to the proper or predetermined stimulus, such as and by way of example only, when it is heated or cooled to a designated temperature, depending on whether the polymer gel was of the LCST or UCST type. Regardless, as the swollen stimulus sensitive gel 410 collapses or shrinks, the water (or other liquid or mixture) 414 and possibly the constituent parts 409 contained in the matrix of the swollen stimulus sensitive gel 410, are expelled. Consequently, as shown in FIG. 4A and FIG. 4B, the expelled liquid 415 and/or constituent parts 411 would be absorbed by a suitable absorbent material 407, such as hygroscopic silica or another absorbent material such as sodium polyacrylate or polyacrylamide derivatives or a natural absorbent) that permanently binds to the expelled liquid 415 and or constituent parts 409 expelled from the stimulus sensitive gel 410.

The collapsing or shrinking of the swollen stimulus sensitive gel 410 (caused by the loss of the liquid 414 and possibly constituent parts 409 contained in the matrix of the swollen stimulus sensitive gel 410 when the swollen stimulus sensitive gel 410 undergoes its phase transition), thereby resulting in the shrunken stimulus sensitive gel 420 preferably collecting under the top portion 408 of the stimulus indicating device 400, would expose the colored indicator spot 416 through the indicator window 412 (which would now present a red color, for example), indicating to the user of the stimulus sensitive product that the product had been exposed to a harmful stimulus, such as an extreme temperature.

Referring again to FIG. 4A and FIG. 4B, the shrunken stimulus sensitive gel 420 would remain permanently in its collapsed or shrunken state, even if the predetermined stimulus, such as temperature, were removed, because the shrunken stimulus sensitive gel 420 would not come back into contact with the expelled liquid 415 and/or constituent parts 411 because they had been bound to and/or trapped by the absorbent material 407, thereby permanently preventing the shrunken stimulus sensitive gel 420 from expanding back to its original volume once the predetermined stimulus had been removed. The shrunken stimulus sensitive gel 420 is permanently prevented from expanding back to original volume because either the absorbent material 407 has a stronger affinity for the expelled liquid 415 than the shrunken stimulus sensitive gel 420, or because the absorbent material 407 would not physically touch the shrunken stimulus sensitive gel 420. Either way the absorbent material 407, which is for example a silica gel such as hygroscopic silica 407 or another absorbent material (such as sodium polyacrylate or polyacrylamide derivatives or a natural absorbent) that permanently binds to the expelled liquid 415 and or constituent parts 411 expelled from the stimulus sensitive gel 410, which would be expelled from the swollen stimulus sensitive 410 as it collapsed or shrunk. By permanently trapping the expelled liquid 415 and/or constituent parts 409 in the absorbent material 405, the shrunken stimulus sensitive gel 420 would be permanently prevented from expanding or swelling and re-covering the indicator spot 416, even when the predetermined stimulus condition is removed.

It should be noted that the predetermined temperature discussed herein that causes the swollen stimulus sensitive gel 410 to undergo its phase transition is only one example of a predetermined stimulus or trigger stimulus that will cause the inventive stimulus sensitive gel 410 and 420 to undergo its phase transition. For example, the swollen stimulus sensitive gel 410 of this preferred embodiment could trigger or undergo its phase transition upon exposure to a predetermined stimulus such as a predetermined pH level, or the swollen stimulus sensitive gel 410 of this preferred embodiment could trigger or undergo its phase transition upon exposure to a predetermined level of electromagnetic radiation.

As the expelled fluid 415 and constituent parts 409 leave the swollen stimulus sensitive gel 410, the swollen stimulus sensitive gel 410 collapses or shrinks in volume, so as to result in the shrunken stimulus gel 420 shown in FIG. 4B. As shown in FIG. 4B, as the swollen stimulus sensitive gel 410 collapses or shrinks in volume, it preferably moves towards the attachment point 418, and in a direction away from the indicator spot 416 and indicator window 412. Thus, by decreasing the volume of the swollen stimulus sensitive gel 410 to result in the shrunken stimulus sensitive gel 420, the indicator spot 416 is visible to the user through the indicator window 412. Thus, as the volume of the swollen stimulus sensitive gel 410 decreases it begins to resemble the shrunken stimulus sensitive gel 420, and reveals the indicator spot 416 to the user through the indicator window 412.

It should be noted that it is not necessary for the swollen stimulus sensitive gel 410 to collapse or shrink entirely in order for the indicator spot 416 to be visible to the user. Instead, if even a portion of the indicator spot 416 is visible to the user through the indicator window 412, which is enough to signal to the user that the product attached to the stimulus indicating device 400 had been exposed to a potentially harmful stimulus. More specifically, although the decrease in volume of the swollen stimulus sensitive gel 410 in all of the embodiments of the stimulus indicating device 400 discussed herein can be by any amount so long as it is registerable, preferably the decrease in volume of the swollen stimulus sensitive gel 410 would be between at least a 1/10 reduction in original volume, and up to a 500 times decrease in original volume. In regard to all embodiments of the stimulus indicating device 400 discussed herein as they pertain to the decrease in the volume being "registerable" what is meant is that the volume change of the swollen stimulus sensitive gel 410 expels enough liquid 414 and constituent parts 409 from the swollen stimulus sensitive gel 410 to cause the swollen stimulus sensitive gel 410 to collapse or shrink enough so that it reveals enough of the indicator spot 416 so that a registerable change in color (e.g., a change in color from a first color to a second color) or indication (e.g., an indicator spot 416 that is the same color as the stimulus sensitive gel 410 and 420 but is a glyph, such as an "X" or "skull and cross bones") occurs in the stimulus indicating device 400, and is visible via the indicator window 412, and indicates to the user that the product had been exposed to a predetermined stimulus. Of course, one of ordinary skill in the art understands the reverse is true, and that is a stimulus sensitive gel 410 and 420 is employed that covers up the indicator spot upon exposure to a predetermined stimulus, then it need only cover a portion or enough of the indicator spot 416 so that a registerable change in color (e.g., a change in color from a first color to a second color) occurs in the stimulus indicating device 400, and is visible via the indicator window 412.

In regard to all the embodiments of the stimulus indicating device discussed herein being "irreversible" and "permanent," what is meant is that once the stimulus indicating device provides an indication of exposure to an adverse stimulus extreme (which is also referred to herein as a predetermined stimulus), that exposure indication does not change, even though the adverse stimulus extreme or predetermined stimulus might be removed in the future.

Both the backing layer 425 and the upper layer 426 may be constructed of a strong, resilient leak-proof material, such as plastic or other polymer material, so as to provide for the twisting or bending that might occur during transportation of or application to the stimulus sensitive product without tearing, breaking or leaking. The backing layer 425 and the upper layer 426 may also be made of a material that preferably allows them to be joined and sealed together, such as by heat stamping or other suitable means. The backing layer 425 and the upper layer 426 can both approximate the length and width of the first compartment 402 plus the length and width of the second compartment 404, although variations in these dimensions are within the scope of the present invention. The upper layer 426 can preferably be made of a clear material, such as plastic, so that the user of the stimulus indicating device 400 can view at least some portion of the backing material or indicator spot 416 through the indicator window 412. The upper layer 426 can also be able to accept paint or ink so as to allow for coloring or concealing at least some portion of the first compartment 402.

Although some portion of the upper layer 426 can also accept paint or ink for coloring, it is preferable that the indicator window 412 portion of the upper layer 426 remain free from ink or coloring so that the user of the stimulus indicating device 400 can observe the first compartment 402 through the indicator window 412 as explained herein.

The stimulus sensitive gel 410 and 420 employed by the preferred variations of this embodiment, as shown in FIG. 4A and FIG. 4B, is preferably manufactured so as to contain a dye or colorant that is different from the color of the indicator spot 416. In this way the color of the stimulus sensitive gel 410 and 420 in both its swollen and collapsed state, is different from the color of the indicator spot 416. Thus, when the swollen stimulus sensitive gel 410 collapses or shrinks in response to the predetermined stimulus, by even a partial amount, the change or decrease in volume will result in the stimulus indicating device 400 changing, at least partially, from a first color to a second color, wherein the color change is visible to the user of the stimulus indicating device 400 through the indicator window 412. This alternative embodiment of the stimulus indicating device 400 as disclosed herein and in conjunction with FIG. 4A, FIG. 4B and FIG. 4C this alternative embodiment can be combined in conjunction with all the embodiments shown in FIG. 2A through FIG. 2F to disclose to the user of the stimulus indicating device 400 that the product to which it is attached had been exposed to a predetermined stimulus.

Preferably, the stimulus sensitive gel 410 and 420 would be fixed or secured at the attachment point 418, or at more than one attachment point if desired. The stimulus sensitive gel 410 and 420 may be fixed to the attachment point 418 with a suitable epoxy, glue, or it could be heat stamped upon creation of the stimulus indicating device 400. The attachment point 418 is preferably positioned at a point opposite the indicator spot 416 and indicator window 412. Attaching the stimulus sensitive gel 410 and 420 to the attachment point 418 helps to ensure that the swollen stimulus sensitive gel 410 collapses or shrinks in a desired direction—preferably toward the attachment point 418, and away from the indicator spot 416 and away from the indicator window 412, so that the indicator spot 116 is revealed upon exposure to a predetermined stimulus. Securing or fixing the stimulus sensitive gel 410 and 420 to the attachment point 418 prevents the stimulus sensitive gel 410 and 420 from floating or moving within the compartment and covering up the indicator spot 416 after the swollen stimulus sensitive gel 410 had undergone its phase transition, thereby preventing a false indication that the product attached to the stimulus indicator device 400 had not been exposed to a predetermined stimulus.

All embodiments discussed herein of the stimulus indicating device 400 containing the swollen stimulus sensitive gel 410 and the shrunken stimulus sensitive gel 420 may be based on any type of stimulus sensitive gel that undergoes a phase transition upon exposure of the stimulus sensitive gel to a predetermined stimulus. The preferred types of stimulus sensitive gels include polyacrylic acid (PAA) gel, a polyacrylamide (PAAm) gel, and/or its variations such as poly(N-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the direction of the volume change in the stimulus sensitive gel 410 and 420 used in all the embodiments of the stimulus indicating device 400 discussed herein can be selected so as to correlate to a specific situation. For example, one of ordinary skill will appreciate and understand that if the stimulus sensitive gel in this embodiment is swollen at the beginning of its use as it undergoes its phase transition, it will collapse or shrink, thereby causing a change in color or indication in the stimulus indicator 400. Alternatively, the stimulus sensitive gel could start out collapsed or shrunken, but upon exposure to its predetermined stimulus it would permanently expand or swell and cause a change in color or indication in the stimulus indicator 400. By way of example only and as disclosed herein and in prior applications, a stimulus sensitive gel 410 and 420 can be of the UCST type or the LCST type gel. As one of ordinary skill in the art will appreciate, a UCST type stimulus sensitive gel, such as PAAm gels, could be used when one wishes to have an initially swollen stimulus sensitive gel collapse or shrink when cooled below a predetermined or trigger temperature and thereby: i) reveal an indicator spot; or ii) expel liquid and/or constituent parts, both of which result in the stimulus indicating device exhibiting a change in color or indication. A UCST type gel could also be used when one wishes to have an initially shrunken stimulus sensitive gel expand or swell when it is heated beyond a predetermined stimulus, and thereby: i) cover an indicator spot; or ii) collect liquid and/or constituent parts, both of which result in the stimulus indicating device exhibiting a change in color or indication. Alternatively, an LCST type stimulus sensitive gel, such as PNIPAAm gels, could be used when one wishes to have an initially swollen stimulus sensitive gel collapse or shrink when heated above a predetermined or trigger temperature and thereby: i) reveal an indicator spot; or ii) expel liquid and/or constituent parts, both of which result in the stimulus indicating device exhibiting a change in color or indication. An LCST type gel could also be used when one wishes to have an initially shrunken stimulus sensitive gel expand or swell when it is cooled below a predetermined stimulus, and thereby: i) cover an indicator spot; or ii) collect liquid and/or constituent parts, both of which result in the stimulus indicating device exhibiting a change in color or indication.

One of ordinary skill in the art will understand that although the stimulus sensitive gel 410 and 420 discussed herein in regard to all embodiments of the stimulus indicating device 400 may be of the UCST type of gel (i.e., the swollen stimulus sensitive gel 410 will collapse or shrink upon exposure to its predetermined stimulus of a cooler temperature, and become the shrunken stimulus sensitive gel 420; as well as expand or swell upon exposure to its predetermined stimulus of a warmer temperature, and become the swollen stimulus sensitive gel 410), the range and scope of this invention includes and envisions the swollen stimulus sensitive gel 410 and the shrunken stimulus sensitive gel 420 also being of the LCST type of gel. Moreover, it should be noted that all the variations of the different embodiments discussed herein can be combined with the variations of other embodiments described herein and that are known in the art, as would be understood to one of ordinary skill in the art.

The behavior of the UCST gels and the LCST gels depends on their chemical structure. Many examples of both kinds of polymers are known in the literature. For example, if the stimulus sensitive gel 410 and 420 employed in all the embodiments of the stimulus indicating device 400 discussed herein were made of UCST type stimulus sensitive gels, it could be any number of such UCST gels, including: i) polyacrylic acid (PAA) gel combined with polyacrylamide (PAAm) gel; or ii) PAAm gel combined with poly sodium 3-butenoate (SB) gel to result in the creation of poly(AAm-co-SB) gel; or iii) their derivates, and as described in Tanaka, "Gels," Scientific American 244 (1981) at 124-138 and Tanaka, "Phase Transitions in Ionic Gels," Physical Review Letters 45 (1980) at 1636-1639, the predetermined "trigger" stimulus at which a UCST gel undergoes its phase transition, and thereby expels the liquid 414 and constituent parts 409 and thus collapses or shrinks in volume, can be "tuned" to a particular value by changing the solvent trapped in the gel polymer matrix in addition to introducing salts, surfactants, or other substances to the gel matrix. Such "tuning" in regard to UCST type gels is discussed herein. Similarly, if the stimulus sensitive gel 410 and 420 employed in all the embodiments of the stimulus indicating device 400 discussed herein were made of LSCT type stimulus sensitive gels, it could be any number of such LCST gels, including PNIPAAm gels, and as described in U.S. Pat. No. 4,732,930 in regard to PNIPAAm, the predetermined stimulus, such as temperature at which a stimulus sensitive gel 410 and 420 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Nonionic 65 Gel Macromolecules volume 26 at 5045 to 5048.

Regardless of whether LCST type stimulus sensitive gels or UCST type stimulus sensitive gels are used to indicate exposure to a predetermined stimulus, what is important is that the change in volume of the stimulus sensitive gel be tailored to the application in which the stimulus indicator is being used. For example, a change in volume of the stimulus sensitive gel 410 and 420, and thus the corresponding expulsion of liquid 414 and constituent parts 409 can be insignificant or it can be dramatic. If the desired visual indication is the result of the swollen stimulus sensitive gel 410 moving completely out of the indicator window 412 and revealing the indicator spot 416, then a large change in volume is preferred.

4. Embodiments with Semi-Permeable Membrane

Figure 5A:
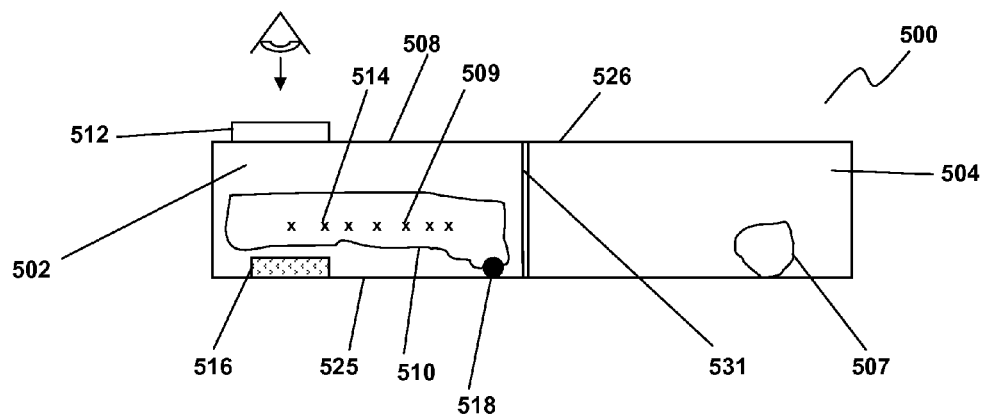
FIG. 5A is a side cross-sectional view of an embodiment of the invention before exposure to a predetermined trigger stimulus.
Figure 5B:
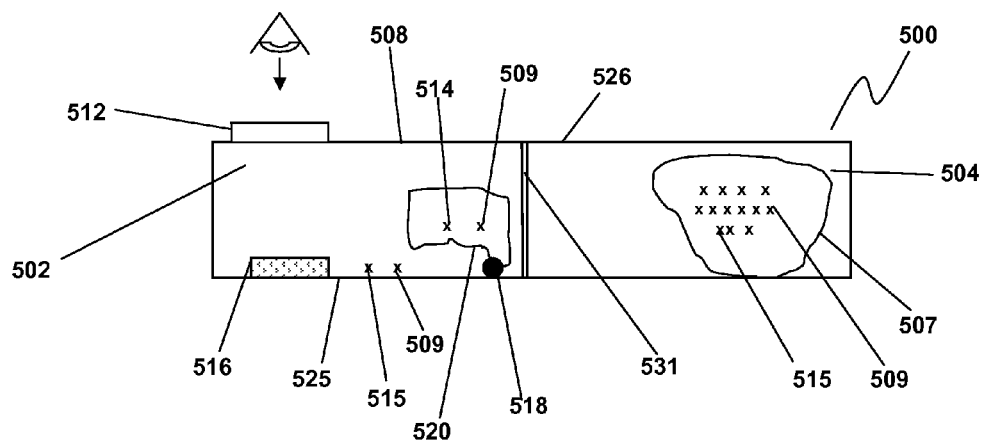
FIG. 5B is a side cross-sectional view of the embodiment in FIG. 5A after exposure to a predetermined trigger stimulus.

In accordance with the purpose of certain embodiments of the invention, as embodied and broadly described herein and in conjunction with FIG. 5A and FIG. 5B, an alternative embodiment of the inventive stimulus indicating devices described herein has at least two compartments which contain in the first compartment 502 a preferably swollen stimulus sensitive gel 510 and indicator spot 516, but does not require the liquid bath of the preferred embodiment. The stimulus indicating device 500 also contains a second compartment 504 for collecting expelled fluid 515 and expelled constituent parts 509 that are expelled from the swollen stimulus sensitive gel 510, and possibly contains an absorbent material 507 for absorbing and binding the expelled fluid 515 and/or constituent parts 509 as described herein. The first compartment 502 and second compartment 504 are separated by a semi-permeable membrane 531 that traps expelled fluid 515 and/or constituent parts 509 in the second compartment 504, thereby permanently keeping the then shrunken stimulus sensitive gel 520 from re-expanding or re-swelling, and thereby preventing the then shrunken stimulus sensitive gel 520 from re-covering the indicator spot 516.

Although this embodiment is described in terms of the stimulus sensitive gel preferably being swollen initially 510, as discussed herein in regard to stimulus sensitive gels, one of ordinary skill in the art would appreciate that the same invention can be achieved with an initially shrunken stimulus sensitive gel that expands or swells upon exposure to a predetermined stimulus so as to cover an indicator spot.

The first compartment 502 and second compartment 504 are formed in part by the backing layer 525 on the bottom of the stimulus indicating device 500, and an upper layer 526 on the top of the stimulus indicating device 500. The top layer 526 of the stimulus indicating device 500 is formed by at least the indicator window 512 and the top portion 508 of the top layer 526. The indicator spot 516 can be viewed through an indicator window 512 located in the top layer 526 of the stimulus indicating device 500. The first compartment 502 and the second compartment 504 are additionally formed and differentiated from one another by a semi-permeable membrane 531. The semi-permeable membrane 531 is designed to allow the expelled liquid 515 and/or constituent parts 509 to pass from the first compartment 502 into the second first compartment 504 only, and to block the expelled liquid 515 and/or constituent parts 511 from passing back into the first compartment 502.

Figure 5C:
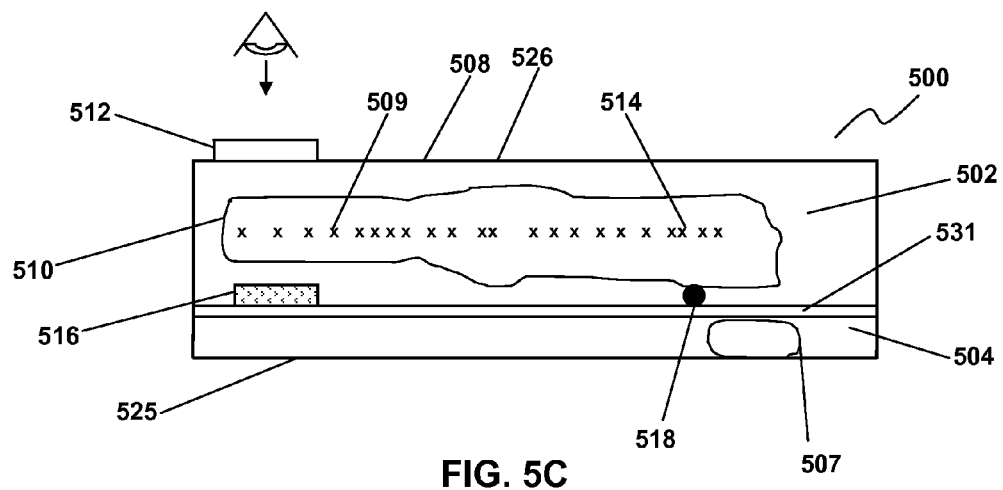
FIG. 5C is a side view of an additional embodiment of the invention before exposure to a predetermined trigger stimulus.

Alternatively, as shown in FIG. 5C an alternate embodiment could position the first compartment 502 above the second compartment 504 separated by the semi-permeable membrane 531. Other shapes are contemplated within the scope of the invention as would be understood by one of ordinary skill in the art and/or as previously described in prior applications.

Prior to being exposed to a predetermined trigger stimulus, the swollen stimulus sensitive gel 510 has not yet undergone a phase transition and preferably covers the entire indicator spot 516. The indicator spot 516 is positioned below the indicator window 512, but is preferably not visible through the indicator window 508 prior to the stimulus indicating device 500 being exposed to the predetermined stimulus because it is preferably entirely covered by the swollen stimulus sensitive gel 510. As shown in FIG. 5A, only a portion of the swollen stimulus sensitive gel 510 is visible through the indicator window 512, with the remaining portion of the swollen stimulus sensitive gel 510 hidden from the view of the user by the top portion 508 of the stimulus indicating device 500.

The swollen stimulus sensitive gel 510 contains fluid 514 and/or constituent parts 509, which allow the swollen stimulus sensitive gel 510 to maintain its expanded or swollen volume. When the swollen stimulus sensitive gel 510 is exposed to a predetermined stimulus, however, it undergoes its phase transition and the fluid 514 and constituent parts 509 contained in the swollen stimulus sensitive gel 510 are expelled from the swollen stimulus sensitive gel 510 and enter the first compartment 502.

As discussed herein, this alternative embodiment of the stimulus indicating device 500 contains a stimulus sensitive gel 510 and 520 described herein in regard to FIG. 5A and FIG. 5B. As the stimulus sensitive gel 510 and 520 is exposed to a predetermined stimulus, by way of example only, a certain temperature, and it undergoes its phase transition by collapsing or shrinking in volume, it not only uncovers the indicator spot 516 visible through the display portion or indicator window 512, but it expels the fluid 514 (by way of example only, water) and/or constituent parts 509 (by way of example only, dye particles that can be absorbed and/or trapped by an absorbent material) from within the matrix of the swollen stimulus sensitive gel 510 and into the single compartment 502 of the stimulus indicator 500.

Upon exposure of the stimulus sensitive product to its predetermined phase transition stimulus, such as temperature, the swollen stimulus sensitive gel 510 would undergo its phase transition and collapse or shrink to become the shrunken stimulus sensitive gel 520 due to the loss of the water or liquid 514 and constituent parts 509 contained in its matrix. As the swollen stimulus sensitive gel collapses or shrinks, it partially or wholly withdraws from the indicator window 512, so that it is either only partially visible through the indicator window 512, or would be hidden completely from the user because it is covered completely by the top portion 508 of the device 500, and thus is not visible through the indicator window 512. The more the swollen stimulus sensitive gel 510 collapses or shrinks the more it reveals the indicator spot 516, and the more it becomes like the collapsed or shrunken stimulus sensitive gel 520 in FIG. 5B. Such partial or full exposure of the indicator spot 516 by the collapse or shrinking of the swollen stimulus sensitive gel 510 to become the collapsed or shrunken stimulus sensitive gel 520 is the same for all variations of this embodiment discussed herein.

Also, as the stimulus sensitive gel 510 collapses or shrinks in response to the predetermined stimulus, the expelled liquid 515 and/or constituent parts 509 within the swollen stimulus sensitive gel 510 are expelled into the first compartment 502, and pass into the second compartment 504 though the semi-permeable membrane 531 that separates the at least two compartments 502 and 504.

Because the semi-permeable membrane 531 separating the at least first compartment 502 and second compartment 504 allows the expelled liquid 515 and/or constituent parts 509 to only pass from the first compartment 502 into the second compartment 504, the expelled liquid 515 and/or constituent parts 509 are trapped outside the first compartment 502, preferably in the second compartment 504, resulting in a constant volume of liquid 514 and shrunken stimulus sensitive gel 520 in the first compartment 502 from that point forward. Alternatively, the second compartment 504 could also contain an absorbent material that has an affinity for the expelled liquid (as described herein, in particular in regard to FIGS. 3A, 3B, 4A and 4B or as understood in the art), so as to permanently bind to and trap the expelled liquid 515 and/or constituent parts 509 in the second compartment 504. By way of example only, if the expelled liquid 515 were water, the absorbent material could be a silica gel, such as hygroscopic silica or another absorbent material such as sodium polyacrylate or polyacrylamide derivatives or a natural absorbent) that permanently binds to the expelled liquid 515 and or constituent parts 509 expelled from the stimulus sensitive gel 510.

Trapping the expelled liquid 515 in the second compartment 504 via the semi-permeable membrane 531 alone or in combination with an absorbent material 507 results in a constant or fixed volume of liquid 514 and 515 and shrunken stimulus sensitive gel 520 in the first compartment 502 from that point forward. Because the volume of liquid 514 and 515 and shrunken stimulus sensitive gel 520 in the first compartment 502 is fixed due to the expelled liquid 515 and/or constituent parts 509 being trapped in the second compartment 504 by the semi-permeable membrane 531 alone or in combination with absorbent material, the collapsed or shrunken stimulus sensitive gel 520 is permanently prevented from re-expanding and re-covering the indicator spot 516, even when the predetermined stimulus condition is removed. In this way the stimulus indicating device 500 will permanently show that it, and the stimulus sensitive product attached to it, had been exposed to a deleterious predetermined stimulus.

It should be noted that by manipulating the permeability of the semi-permeable membrane 531 connecting the first compartment 502 to the second compartment 504, the time required for expelled liquid 515 to move from the first compartment 502 into the second compartment 504 can be varied. Such manipulation of the semi-permeable membrane 531 includes increasing or decreasing its thickness and/or increasing or decreasing its surface area facing the first compartment 502 and/or second compartment 504 and/or increasing or decreasing its wicking ability, so as to control the speed at which the expelled liquid 515 and the constituent parts 509 travel from the first compartment 504, through the semi-permeable membrane 531, and enter the second compartment 502.

An advantage of using such an embodiment of the stimulus indicating device 500 is that both the exposure to a predetermined stimulus as well as the time of exposure can be indicated. As an example, if the predetermined stimulus occurs for just a short period of time, and is removed before the expelled liquid 515 and constituent parts 509 have completely moved from the first compartment 502 through the semi-permeable membrane 531 and into the second compartment 504 because the semi-permeable membrane 531 prevents the expelled liquid 515 and constituent parts 509 from freely flowing into the second compartment 504, then the expelled liquid 515 and constituent parts 509 will be wicked or drawn back into the shrunken stimulus sensitive gel 520 as the shrunken stimulus sensitive gel 520 re-expands or swells as a result of undergoing its reverse phase transition because for example the predetermined stimulus had been removed, and thereby preventing the stimulus indicating device 500 from changing from a first color 513 to a second color 517.

The swollen stimulus sensitive gel 510 can be made to undergo its phase transition when it is exposed to the proper or predetermined stimulus, such as and by way of example only, when it is heated or cooled to a designated temperature, depending on whether the polymer gel was of the LCST or UCST type. Regardless, as the swollen stimulus sensitive gel 510 collapses or shrinks, the water (or other liquid or mixture) 514 and possibly the constituent parts 509 contained in the matrix of the swollen stimulus sensitive gel 510, are expelled. Consequently, as shown in FIG. 5A and FIG. 5B, the expelled liquid 515 and/or constituent parts 509 would be absorbed by a suitable absorbent material 507 such as a silica gel, such as hygroscopic silica or another absorbent material such as sodium polyacrylate or polyacrylamide derivatives or a natural absorbent) that permanently binds to the expelled liquid 515 and or constituent parts 509 expelled from the stimulus sensitive gel 510.

The collapsing or shrinking of the swollen stimulus sensitive gel 510 (caused by the loss of the liquid 514 and possibly constituent parts 511 contained in the matrix of the swollen stimulus sensitive gel 510 when the swollen stimulus sensitive gel 510 undergoes its phase transition), thereby resulting in the shrunken stimulus sensitive gel 520 preferably collecting under the top portion 508 of the stimulus indicating device 500, would expose the colored indicator spot 516 through the indicator window 512 (which would now present a red color, for example), indicating to the user of the stimulus sensitive product that the product had been exposed to a harmful stimulus, such as an extreme temperature.

Referring again to FIG. 5A and FIG. 5B, the shrunken stimulus sensitive gel 520 would remain permanently in its collapsed or shrunken state, even if the predetermined stimulus, such as temperature, were removed, because the shrunken stimulus sensitive gel 520 would not come back into contact with the expelled water 515 and/or constituent parts 509 because they had been bound to and/or trapped by the semi-permeable membrane 531 and possibly absorbent material 507 (as disclosed herein), thereby permanently preventing the shrunken stimulus sensitive gel 520 from expanding back to its original volume once the predetermined stimulus had been removed. By permanently trapping the expelled liquid 515 and/or constituent parts 509 via the semi-permeable membrane 531 and possibly the absorbent material 507, the shrunken stimulus sensitive gel 520 would be permanently prevented from expanding or swelling and re-covering the indicator spot 516, even when the predetermined stimulus condition is removed.

It should be noted that the predetermined temperature discussed herein that causes the swollen stimulus sensitive gel 510 to undergo its phase transition is only one example of a predetermined stimulus or trigger stimulus that will cause the inventive stimulus sensitive gel 510 and 520 to undergo its phase transition. For example, the swollen stimulus sensitive gel 510 of this preferred embodiment could trigger or undergo its phase transition upon exposure to a predetermined stimulus such as a predetermined pH level, or the swollen stimulus sensitive gel 510 of this preferred embodiment could trigger or undergo its phase transition upon exposure to a predetermined level of electromagnetic radiation.

As the expelled fluid 515 and constituent parts 509 leave the swollen stimulus sensitive gel 510, the swollen stimulus sensitive gel 510 collapses or shrinks in volume, so as to result in the shrunken stimulus gel 520 shown in FIG. 5B. As shown in FIG. 5B, as the swollen stimulus sensitive gel 510 collapses or shrinks in volume, it preferably moves towards the attachment point 518, and in a direction away from the indicator spot 516 and indicator window 512. Thus, by decreasing the volume of the swollen stimulus sensitive gel 510 to result in the shrunken stimulus sensitive gel 520, the indicator spot 516 is visible to the user through the indicator window 512. Thus, as the volume of the swollen stimulus sensitive gel 510 decreases it begins to resemble the shrunken stimulus sensitive gel 520, and reveals the indicator spot 516 to the user through the indicator window 512.

It should be noted that it is not necessary for the swollen stimulus sensitive gel 510 to collapse or shrink entirely in order for the indicator spot 516 to be visible to the user. Instead, if even a portion of the indicator spot 516 is visible to the user through the indicator window 512, which is enough to signal to the user that the product attached to the stimulus indicating device 500 had been exposed to a potentially harmful stimulus. More specifically, although the decrease in volume of the swollen stimulus sensitive gel 510 in all of the embodiments of the stimulus indicating device 500 discussed herein can be by any amount so long as it is registerable, preferably the decrease in volume of the swollen stimulus sensitive gel 510 would be between at least a $\frac{1}{10}$ reduction in original volume, and up to a 500 times decrease in original volume. In regard to all embodiments of the stimulus indicating device 500 discussed herein as they pertain to the decrease in the volume being "registerable" what is meant is that the volume change of the swollen stimulus sensitive gel 510 expels enough liquid 514 and constituent parts 509 from the swollen stimulus sensitive gel 510 to cause the swollen stimulus sensitive gel 510 to collapse or shrink enough so that it reveals enough of the indicator spot 516 so that a registerable change in color (e.g., a change in color from a first color to a second color) or indication (e.g., an indicator spot 516 that is the same color as the stimulus sensitive gel 510 and 520 but is a glyph, such as an "X" or "skull and cross bones") occurs in the stimulus indicating device 500, and is visible via the indicator window 512, and indicates to the user that the product had been exposed to a predetermined stimulus. Of course, one of ordinary skill in the art understands the reverse is true, and that is a stimulus sensitive gel 510 and 520 is employed that covers up the indicator spot 516 upon exposure to a predetermined stimulus, then it need only cover a portion or enough of the indicator spot 516 so that a registerable change in color (e.g., a change in color from a first color to a second color) occurs in the stimulus indicating device 500, and is visible via the indicator window 512.

In regard to all the embodiments of the stimulus indicating device discussed herein being "irreversible" and "permanent," what is meant is that once the stimulus indicating device provides an indication of exposure to an adverse stimulus extreme (which is also referred to herein as a predetermined stimulus), that exposure indication does not change, even though the adverse stimulus extreme or predetermined stimulus might be removed in the future.

Both the backing layer 525 and the upper layer 526 may be constructed of a strong, resilient leak-proof material, such as plastic or other polymer material, so as to provide for the twisting or bending that might occur during transportation of or application to the stimulus sensitive product without tearing, breaking or leaking. The backing layer 525 and the upper layer 526 may also be made of a material that preferably allows them to be joined and sealed together, such as by heat stamping or other suitable means. The backing layer 525 and the upper layer 526 can both approximate the length and width of the first compartment 502 plus the length and width of the second compartment 504, although variations in these dimensions are within the scope of the present invention. The upper layer 526 can preferably be made of a clear material, such as plastic, so that the user of the stimulus indicating device 500 can view at least some portion of the backing material or indicator spot 516 through the indicator window 512. The upper layer 526 can also be able to accept paint or ink so as to allow for coloring or concealing at least some portion of the first compartment 502.

Although some portion of the upper layer 526 can also accept paint or ink for coloring, it is preferable that the indicator window 512 portion of the upper layer 526 remain free from ink or coloring so that the user of the stimulus indicating device 500 can observe the first compartment 502 through the indicator window 512 as explained herein.

The stimulus sensitive gel 510 and 520 employed by the preferred variations of this embodiment, as shown in FIG. 5A and FIG. 5B, is preferably manufactured so as to contain a dye or colorant that is different from the color of the indicator spot 516. In this way the color of the stimulus sensitive gel 510 and 520 in both its swollen and collapsed state, is different from the color of the indicator spot 516. Thus, when the swollen stimulus sensitive gel 510 collapses or shrinks in response to the predetermined stimulus, by even a partial amount, the change or decrease in volume will result in the stimulus indicating device 500 changing, at least partially, from a first color to a second color, wherein the color change is visible to the user of the stimulus indicating device 500 through the indicator window 512. This alternative embodiment of the stimulus indicating device 500 as disclosed herein and in conjunction with FIG. 5A, FIG. 5B and FIG. 5C this alternative embodiment can be combined in conjunction with all the embodiments shown in FIG. 2A through FIG. 2F to disclose to the user of the stimulus indicating device 500 that the product to which it is attached had been exposed to a predetermined stimulus.

Preferably, the stimulus sensitive gel 510 and 520 would be fixed or secured at the attachment point 518, or at more than one attachment point desired. The stimulus sensitive gel 510 and 520 may be fixed to the attachment point 518 with a suitable epoxy, glue, or it could be heat stamped upon creation of the stimulus indicating device 500. The attachment point 518 is preferably positioned at a point opposite the indicator spot 516 and indicator window 512. Attaching the stimulus sensitive gel 510 and 520 to the attachment point 518 helps to ensure that the swollen stimulus sensitive gel 510 collapses or shrinks in a desired direction—preferably toward the attachment point 518, and away from the indicator spot 516 and away from the indicator window 512, so that the indicator spot 116 is revealed upon exposure to a predetermined stimulus. Securing or fixing the stimulus sensitive gel 510 and 520 to the attachment point 518 prevents the stimulus sensitive gel 510 and 520 from floating or moving within the compartment and covering up the indicator spot 516 after the swollen stimulus sensitive gel 510 had undergone its phase transition, thereby preventing a false indication that the product attached to the stimulus indicator device 500 had not been exposed to a predetermined stimulus.

All embodiments discussed herein of the stimulus indicating device 500 containing the swollen stimulus sensitive gel 510 and the shrunken stimulus sensitive gel 520 may be based on any type of stimulus sensitive gel that undergoes a phase transition upon exposure of the stimulus sensitive gel to a predetermined stimulus. The preferred types of stimulus sensitive gels include polyacrylic acid (PAA) gel, a polyacrylamide (PAAm) gel, and/or its variations such as poly(N-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the direction of the volume change in the stimulus sensitive gel 510 and 520 used in all the embodiments of the stimulus indicating device 500 discussed herein can be selected so as to correlate to a specific situation. For example, one of ordinary skill will appreciate and understand that if the stimulus sensitive gel in this embodiment is swollen at the beginning of its use as it undergoes its phase transition, it will collapse or shrink, thereby causing a change in color or indication in the stimulus indicator 500. Alternatively, the stimulus sensitive gel could start out collapsed or shrunken, but upon exposure to its predetermined stimulus it would permanently expand or swell and cause a change in color or indication in the stimulus indicator 500. By way of example only and as disclosed herein and in prior applications, a stimulus sensitive gel 510 and 520 can be of the UCST type or the LCST type gel. As one of ordinary skill in the art will appreciate, a UCST type stimulus sensitive gel, such as PAAm gels, could be used when one wishes to have an initially swollen stimulus sensitive gel collapse or shrink when cooled below a predetermined or trigger temperature and thereby: i) reveal an indicator spot; or ii) expel liquid and/or constituent parts, both of which result in the stimulus indicating device exhibiting a change in color or indication. A UCST type gel could also be used when one wishes to have an initially shrunken stimulus sensitive gel expand or swell when it is heated beyond a predetermined stimulus, and thereby: i) cover an indicator spot; or ii) collect liquid and/or constituent parts, both of which result in the stimulus indicating device exhibiting a change in color or indication. Alternatively, an LCST type stimulus sensitive gel, such as PNIPAAm gels, could be used when one wishes to have an initially swollen stimulus sensitive gel collapse or shrink when heated above a predetermined or trigger temperature and thereby: i) reveal an indicator spot; or ii) expel liquid and/or constituent parts, both of which result in the stimulus indicating device exhibiting a change in color or indication. An LCST type gel could also be used when one wishes to have an initially shrunken stimulus sensitive gel expand or swell when it is cooled below a predetermined stimulus, and thereby: i) cover an indicator spot; or ii) collect liquid and/or constituent parts, both of which result in the stimulus indicating device exhibiting a change in color or indication.

One of ordinary skill in the art will understand that although the stimulus sensitive gel 510 and 520 discussed herein in regard to all embodiments of the stimulus indicating device 500 may be of the UCST type of gel (i.e., the swollen stimulus sensitive gel 510 will collapse or shrink upon exposure to its predetermined stimulus of a cooler temperature, and become the shrunken stimulus sensitive gel 520; as well as expand or swell upon exposure to its predetermined stimulus of a warmer temperature, and become the swollen stimulus sensitive gel 510), the range and scope of this invention includes and envisions the swollen stimulus sensitive gel 510 and the shrunken stimulus sensitive gel 520 also being of the LCST type of gel. Moreover, it should be noted that all the variations of the different embodiments discussed herein can be combined with the variations of other embodiments described herein and that are known in the art, as would be understood to one of ordinary skill in the art.

The behavior of the UCST gels and the LCST gels depends on their chemical structure. Many examples of both kinds of polymers are known in the literature. For example, if the stimulus sensitive gel 510 and 520 employed in all the embodiments of the stimulus indicating device 500 discussed herein were made of UCST type stimulus sensitive gels, it could be any number of such UCST gels, including: i) polyacrylic acid (PAA) gel combined with polyacrylamide (PAAm) gel; or ii) PAAm gel combined with poly sodium 3-butenoate (SB) gel to result in the creation of poly(AAm-co-SB) gel; or iii) their derivates, and as described in Tanaka, "Gels," Scientific American 244 (1981) at 124-138 and Tanaka, "Phase Transitions in Ionic Gels," Physical Review Letters 45 (1980) at 1636-1639, the predetermined "trigger" stimulus at which a UCST gel undergoes its phase transition, and thereby expels the liquid 514 and constituent parts 509 and thus collapses or shrinks in volume, can be "tuned" to a particular value by changing the solvent trapped in the gel polymer matrix in addition to introducing salts, surfactants, or other substances to the gel matrix. Such "tuning" in regard to UCST type gels is discussed herein. Similarly, if the stimulus sensitive gel 510 and 520 employed in all the embodiments of the stimulus indicating device 500 discussed herein were made of LSCT type stimulus sensitive gels, it could be any number of such LCST gels, including PNIPAAm gels, and as described in U.S. Pat. No. 4,732,930 in regard to PNIPAAm, the predetermined stimulus, such as temperature at which a stimulus sensitive gel 510 and 520 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Nonionic Poly(N-isopropylacrylamide) Gel Macromolecules volume 26 at 5045 to 5048.

Regardless of whether LCST type stimulus sensitive gels or UCST type stimulus sensitive gels are used to indicate exposure to a predetermined stimulus, what is important is that the change in volume of the stimulus sensitive gel be tailored to the application in which the stimulus indicator is being used. For example, a change in volume of the stimulus sensitive gel 510 and 520, and thus the corresponding expulsion of liquid 514 and constituent parts 509 can be insignificant or it can be dramatic. If the desired visual indication is the result of the swollen stimulus sensitive gel 510 moving completely out of the indicator window 512 and revealing the indicator spot 516, then a large change in volume is preferred.

5. Embodiments with Constricting Portion

Figure 6A:
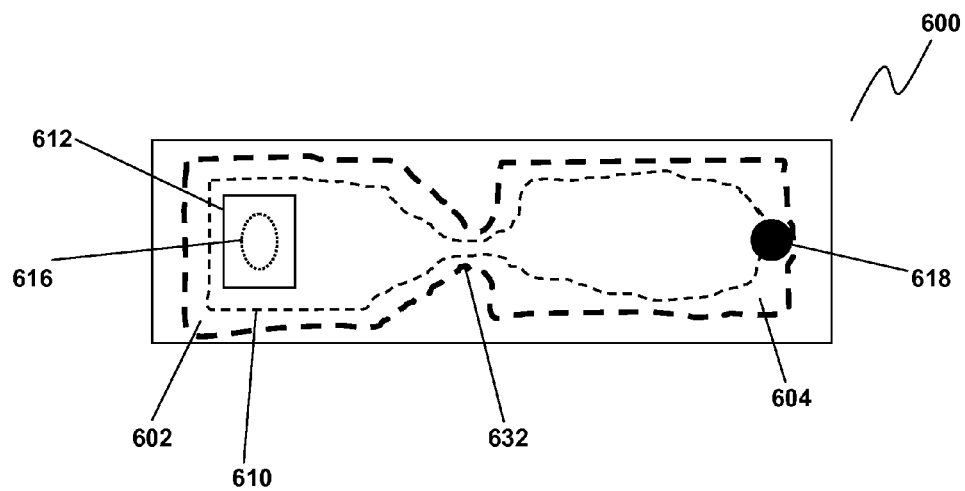
FIG. 6A is a side cross-sectional view of an embodiment of the invention before exposure to a predetermined trigger stimulus.
Figure 6B:
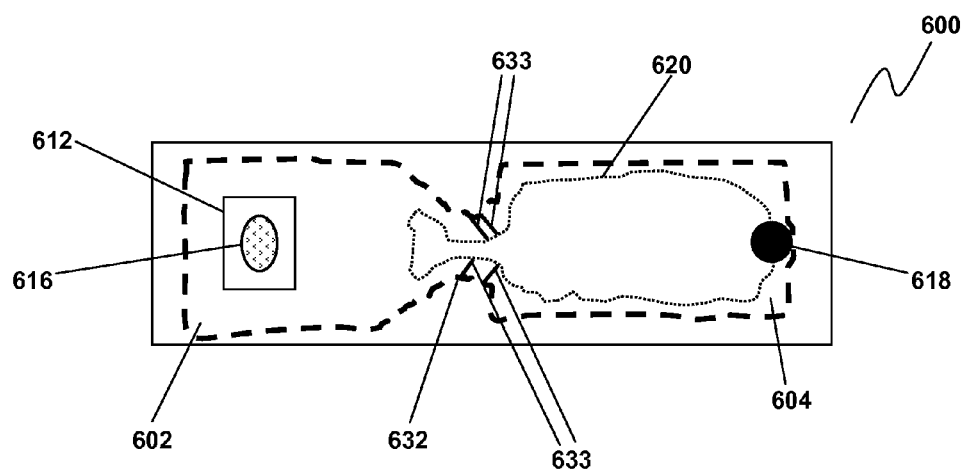
FIG. 6B is a side cross-sectional view of the embodiment in FIG. 6A after exposure to a predetermined trigger stimulus.

In accordance with the purpose of certain embodiments of the invention, as embodied and broadly described herein and in conjunction with FIG. 6A and FIG. 6B, an alternative embodiment of the inventive stimulus indicating devices described herein has at least two compartments, a first compartment 602 and a second compartment 604. The first compartment 602 and second compartment 604 are separated by a constricting portion 632 or neck portion 632 or any other type of choke portion 632 understood by one of ordinary skill in the art or as described in prior applications that constricts the flow of the stimulus sensitive gel 610 and 620. By way of example only, this constricting portion 632 is described herein and in prior applications as a nozzle portion 632, a neck portion 632, a constricting portion 632, or any combination thereof. In this alternative embodiment the liquid bath as found in the preferred embodiment is not necessarily needed. Prior to exposure to a predetermined stimulus the swollen stimulus sensitive gel 610 is contained in either: i) only the first compartment; ii) only the second compartment; or iii) both the first compartment and the second compartment. This type of stimulus sensitive gel and its location in the first, second or both compartments is dependant on the application of the stimulus indicator device.

In the preferred variation of this alternative embodiment, the swollen stimulus sensitive gel 610 is preferably contained in both the first compartment 602 and second compartment 604. More particularly, the first compartment 602 contains at least enough of the swollen stimulus sensitive gel 610 so as to cover at least a portion and preferably all of the indicator spot 616 which is also contained in the first compartment 602. The second compartment 604 collects and serves as a reservoir for the stimulus sensitive gel 610 and 620 as it collapses and shrinks due to exposure to a predetermined stimulus, as well as possibly collects the expelled fluid 615 and expelled constituent parts 609 that are expelled from the swollen stimulus sensitive gel 610, and possibly contains an absorbent material for absorbing and binding the expelled fluid 615 and/or constituent parts 609 as described herein.

The neck portion 632 constricts and binds the shrunken stimulus sensitive gel 620, even when it is only partially collapsed or shrunken because of its shape. More specifically, as shown in at least FIG. 6A and FIG. 6B and as described in prior applications, the side of the neck portion 632 that faces the first compartment 602 is wider than the portion that faces the second compartment 604, so that it acts as a funnel as the swollen stimulus sensitive gel 610 collapses and shrinks and moves into the second compartment 604 upon exposure to a predetermined stimulus, but prevents that shrunken stimulus sensitive gel 620 from expanding back into the first compartment 602 and re-covering the indicator spot 616 if the predetermined stimulus is removed and the shrunken stimulus sensitive gel 620 undergoes its reverse phase transition.

Although this alternate embodiment is described in terms of the stimulus sensitive gel preferably being swollen initially 610, as discussed herein in regard to stimulus sensitive gels, one of ordinary skill in the art would appreciate that the same invention can be achieved with an initially shrunken stimulus sensitive gel that expands or swells upon exposure to a predetermined stimulus so as to cover an indicator spot.

The first compartment 602 and second compartment 604 are formed in part by the backing layer 625 on the bottom of the stimulus indicating device 600, and an upper layer 626 on the top of the stimulus indicating device 600. The top layer 626 of the stimulus indicating device 600 is formed by at least the indicator window 612 and the top portion 608 of the top layer 626. The indicator spot 616 can be viewed through an indicator window 612 located in the top layer 626 of the stimulus indicating device 600. The first compartment 602 and the second compartment 604 are additionally formed and differentiated from one another by the neck portion 632.

Figure 6C:
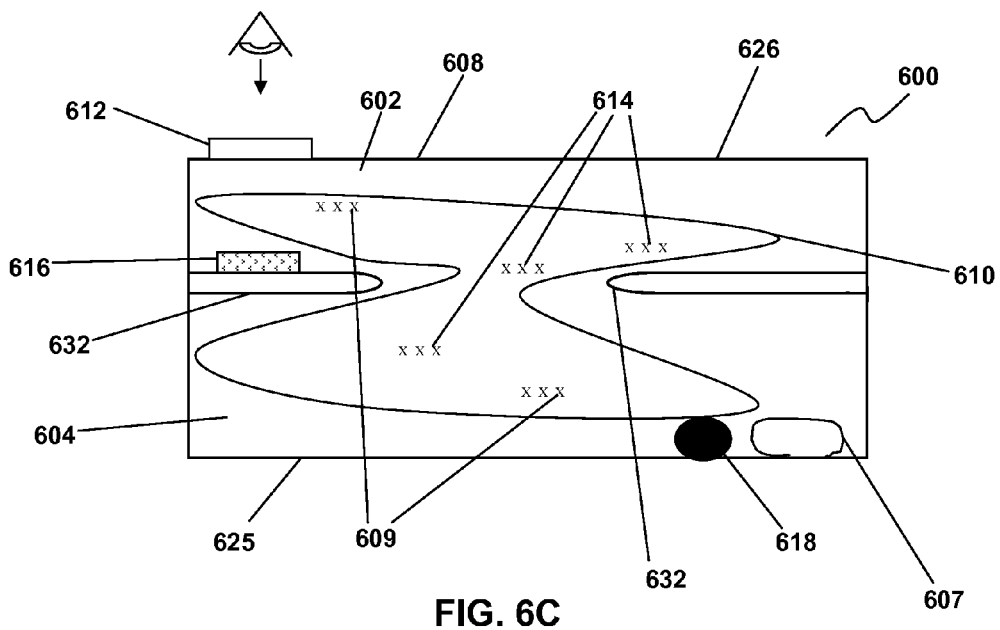
FIG. 6C is a side cross-sectional view of an additional embodiment of the invention before exposure to a predetermined stimulus.

Alternatively, as shown in FIG. 6C an alternate embodiment could position the first compartment 602 above the second compartment 604 separated by the neck portion 632. Other shapes are contemplated within the scope of the invention as would be understood by one of ordinary skill in the art and/or as previously described in prior applications.

Prior to being exposed to a predetermined trigger stimulus, the swollen stimulus sensitive gel 610 has not yet undergone a phase transition and preferably covers the entire indicator spot 616. The indicator spot 616 is positioned below the indicator window 612, but is preferably not visible through the indicator window 612 prior to the stimulus indicating device 600 being exposed to the predetermined stimulus because it is preferably entirely covered by the swollen stimulus sensitive gel 610. As shown in FIG. 6A, only a portion of the swollen stimulus sensitive gel 610 is visible through the indicator window 612, with the remaining portion of the swollen stimulus sensitive gel 610 hidden from the view of the user by the top portion 608 of the stimulus indicating device 600.

The swollen stimulus sensitive gel 610 contains fluid 614 and/or constituent parts 609, which allow the swollen stimulus sensitive gel 610 to maintain its expanded or swollen volume. When the swollen stimulus sensitive gel 610 is exposed to a predetermined stimulus, however, it undergoes its phase transition and the fluid 614 and constituent parts 609 contained in the swollen stimulus sensitive gel 610 are expelled from the swollen stimulus sensitive gel 610 and enter the first compartment 602.

As discussed herein, this alternative embodiment of the stimulus indicating device 600 contains a stimulus sensitive gel 610 and 620 described herein in regard to FIG. 6A and FIG. 6B. As the stimulus sensitive gel 610 and 620 is exposed to a predetermined stimulus, by way of example only, a certain temperature, and it undergoes its phase transition by collapsing or shrinking in volume, it not only uncovers the indicator spot 616 visible through the display portion or indicator window 612, but it expels the fluid 614 (by way of example only, water) and/or constituent parts 609 (by way of example only, dye particles that can be absorbed and/or trapped by an absorbent material) from within the matrix of the swollen stimulus sensitive gel 610 and into the single compartment 602 of the stimulus indicator 600.

Upon exposure of the stimulus sensitive product to its predetermined phase transition stimulus, such as temperature, the swollen stimulus sensitive gel 610 would undergo its phase transition and collapse or shrink to become the shrunken stimulus sensitive gel 620 due to the loss of the water or liquid 614 and constituent parts 609 contained in its matrix. As the swollen stimulus sensitive gel collapses or shrinks, it partially or wholly withdraws from not only the indicator window 612 but from the first compartment 602, so that it is either only partially visible through the indicator window 612, or would be hidden completely from the user because it is covered completely by the top portion 608 of the device 600 which in this alternative embodiment covers both the first compartment 602 and second compartment 604, and thus is not visible through the indicator window 612. The more the swollen stimulus sensitive gel 610 collapses or shrinks the more it reveals the indicator spot 616, and the more it becomes like the collapsed or shrunken stimulus sensitive gel 620 in FIG. 6B. Such partial or full exposure of the indicator spot 616 by the collapse or shrinking of the swollen stimulus sensitive gel 610 to become the collapsed or shrunken stimulus sensitive gel 620 is the same for all variations of this embodiment discussed herein.

Alternatively, the second compartment 604 could also contain an absorbent material that has an affinity for the expelled liquid (as described herein, in particular in regard to FIGS. 3A, 3B, 4A and 4B or as understood in the art), so as to permanently bind to and trap the expelled liquid 615 and/or constituent parts 611 in the second compartment 604. By way of example only, if the expelled liquid 614 were water, the absorbent material could be a silica gel, such as hygroscopic silica or another absorbent material such as sodium polyacrylate or polyacrylamide derivatives or a natural absorbent) that permanently binds to the expelled liquid 615 and or constituent parts 609 expelled from the stimulus sensitive gel 610.

It should be noted that by manipulating the size of the neck portion 632 (e.g., the opening that faces the first compartment 602 and the opening that faces the second compartment 604) and/or manipulating the angle at which the neck portion travels from the first compartment 602 to the second compartment 604, the time required for stimulus sensitive gel 610 and 620 to move from the first compartment 602 into the second compartment 604, and thereby expose or uncover the indicator spot 616 can be varied. Such manipulation of the neck portion 632 includes increasing or decreasing its openings of the neck portion 632 and/or increasing or decreasing the angle of the neck portion 632, so as to control the speed at which the stimulus sensitive gel 610 and 620 moves from the first compartment 602 into the second compartment 604.

An advantage of using such an embodiment of the stimulus indicating device 600 is that both the exposure to a predetermined stimulus as well as the time of exposure can be indicated. As an example, if the predetermined stimulus occurs for just a short period of time, and is removed before the stimulus sensitive gel 610 and 620 have completely moved from the first compartment 602 into the second compartment 604 because the neck portion 632 prevents the stimulus sensitive gel 610 and 620 from freely flowing into the second compartment 604, then the expelled liquid 615 and constituent parts 609 will be wicked or drawn back into the portion of the shrunken stimulus sensitive gel 620 that remains in the first compartment 602 so as to re-expand or re-swell as a result of undergoing its reverse phase transition because for example the predetermined stimulus had been removed, and thereby preventing the stimulus indicating device 600 from changing from a first color 613 to a second color 617.

The swollen stimulus sensitive gel 610 can be made to undergo its phase transition when it is exposed to the proper or predetermined stimulus, such as and by way of example only, when it is heated or cooled to a designated temperature, depending on whether the polymer gel was of the LCST or the UCST type gel. Regardless, as the swollen stimulus sensitive gel 610 collapses or shrinks, the water (or other liquid or mixture) 614 and possibly the constituent parts 609 contained in the matrix of the swollen stimulus sensitive gel 610, are expelled. Consequently, as shown in FIG. 6A and FIG. 6B, the expelled liquid 615 and/or constituent parts 609 would be absorbed by a suitable absorbent material 607, such as could be a silica gel, such as hygroscopic silica or another absorbent material such as sodium polyacrylate or polyacrylamide derivatives or a natural absorbent) that permanently binds to the expelled liquid 615 and or constituent parts 609 expelled from the stimulus sensitive gel 610.

The collapsing or shrinking of the swollen stimulus sensitive gel 610 (caused by the loss of the liquid 614 and possibly constituent parts 609 contained in the matrix of the swollen stimulus sensitive gel 610 when the swollen stimulus sensitive gel 610 undergoes its phase transition), thereby resulting in the shrunken stimulus sensitive gel 620 preferably collecting under the top portion 608 of the stimulus indicating device 600, would expose the colored indicator spot 616 through the indicator window 612 (which would now present a red color, for example), indicating to the user of the stimulus sensitive product that the product had been exposed to a harmful stimulus, such as an extreme temperature.

It should be noted that the predetermined temperature discussed herein that causes the swollen stimulus sensitive gel 610 to undergo its phase transition is only one example of a predetermined stimulus or trigger stimulus that will cause the inventive stimulus sensitive gel 610 and 620 to undergo its phase transition. For example, the swollen stimulus sensitive gel 610 of this preferred embodiment could trigger or undergo its phase transition upon exposure to a predetermined stimulus such as a predetermined pH level, or the swollen stimulus sensitive gel 610 of this preferred embodiment could trigger or undergo its phase transition upon exposure to a predetermined level of electromagnetic radiation.

As the expelled fluid 615 and constituent parts 609 leave the swollen stimulus sensitive gel 610, the swollen stimulus sensitive gel 610 collapses or shrinks in volume, so as to result in the shrunken stimulus gel 620 shown in FIG. 6B. As shown in FIG. 6B, as the swollen stimulus sensitive gel 610 collapses or shrinks in volume, it preferably moves towards the attachment point 618, and in a direction away from the indicator spot 616 and indicator window 612. Thus, by decreasing the volume of the swollen stimulus sensitive gel 610 to result in the shrunken stimulus sensitive gel 620, the indicator spot 616 is visible to the user through the indicator window 612. Thus, as the volume of the swollen stimulus sensitive gel 610 decreases it begins to resemble the shrunken stimulus sensitive gel 620, and reveals the indicator spot 616 to the user through the indicator window 612.

It should be noted that it is not necessary for the swollen stimulus sensitive gel 610 to collapse or shrink entirely in order for the indicator spot 616 to be visible to the user. Instead, if even a portion of the indicator spot 616 is visible to the user through the indicator window 612, that is enough to signal to the user that the product attached to the stimulus indicating device 600 had been exposed to a potentially harmful stimulus. More specifically, although the decrease in volume of the swollen stimulus sensitive gel 610 in all of the embodiments of the stimulus indicating device 600 discussed herein can be by any amount so long as it is registerable, preferably the decrease in volume of the swollen stimulus sensitive gel 610 would be between at least a 1/10 reduction in original volume, and up to a 500 times decrease in original volume. In regard to all embodiments of the stimulus indicating device 600 discussed herein as they pertain to the decrease in the volume being "registerable" what is meant is that the volume change of the swollen stimulus sensitive gel 610 expels enough liquid 614 and constituent parts 609 from the swollen stimulus sensitive gel 610 to cause the swollen stimulus sensitive gel 610 to collapse or shrink enough so that it reveals enough of the indicator spot 616 so that a registerable change in color (e.g., a change in color from a first color to a second color) or indication (e.g., an indicator spot 616 that is the same color as the stimulus sensitive gel 610 and 620 but is a glyph, such as an "X" or "skull and cross bones") occurs in the stimulus indicating device 600, and is visible via the indicator window 612, and indicates to the user that the product had been exposed to a predetermined stimulus. Of course, one of ordinary skill in the art understands the reverse is true, and that is a stimulus sensitive gel 610 and 620 is employed that covers up the indicator spot 616 upon exposure to a predetermined stimulus, then it need only cover a portion or enough of the indicator spot 616 so that a registerable change in color (e.g., a change in color from a first color to a second color) occurs in the stimulus indicating device 600, and is visible via the indicator window 612.

In regard to all the embodiments of the stimulus indicating device discussed herein being "irreversible" and "permanent," what is meant is that once the stimulus indicating device provides an indication of exposure to an adverse stimulus extreme (which is also referred to herein as a predetermined stimulus), that exposure indication does not change, even though the adverse stimulus extreme or predetermined stimulus might be removed in the future.

Both the backing layer 625 and the upper layer 626 may be constructed of a strong, resilient leak-proof material, such as plastic or other polymer material, so as to provide for the twisting or bending that might occur during transportation of or application to the stimulus sensitive product without tearing, breaking or leaking. The backing layer 625 and the upper layer 626 may also be made of a material that preferably allows them to be joined and sealed together, such as by heat stamping or other suitable means. The backing layer 625 and the upper layer 626 can both approximate the length and width of the first compartment 602 plus the length and width of the second compartment 604, although variations in these dimensions are within the scope of the present invention. The upper layer 626 can preferably be made of a clear material, such as plastic, so that the user of the stimulus indicating device 600 can view at least some portion of the backing material or indicator spot 616 through the indicator window 612. The upper layer 626 can also be able to accept paint or ink so as to allow for coloring or concealing at least some portion of the first compartment 602.

Although some portion of the upper layer 626 can also accept paint or ink for coloring, it is preferable that the indicator window 612 portion of the upper layer 626 remain free from ink or coloring so that the user of the stimulus indicating device 600 can observe the first compartment 602 through the indicator window 612 as explained herein.

The stimulus sensitive gel 610 and 620 employed by the preferred variations of this embodiment, as shown in FIG. 6A and FIG. 6B, is preferably manufactured so as to contain a dye or colorant that is different from the color of the indicator spot 616. In this way the color of the stimulus sensitive gel 610 and 620 in both its swollen and collapsed state, is different from the color of the indicator spot 616. Thus, when the swollen stimulus sensitive gel 610 collapses or shrinks in response to the predetermined stimulus, by even a partial amount, the change or decrease in volume will result in the stimulus indicating device 600 changing, at least partially, from a first color to a second color, wherein the color change is visible to the user of the stimulus indicating device 600 through the indicator window 612. This alternative embodiment of the stimulus indicating device 600 as disclosed herein and in conjunction with FIG. 6A, FIG. 6B and FIG. 6C this alternative embodiment can be combined in conjunction with all the embodiments shown in FIG. 2A through FIG. 2F to disclose to the user of the stimulus indicating device 600 that the product to which it is attached had been exposed to a predetermined stimulus.

Preferably, the stimulus sensitive gel 610 and 620 would be fixed or secured at the attachment point 618, or at more than one attachment point desired. The stimulus sensitive gel 610 and 620 may be fixed to the attachment point 618 with a suitable epoxy, glue, or it could be heat stamped upon creation of the stimulus indicating device 600. The attachment point 618 is preferably positioned at a point opposite the indicator spot 616 and indicator window 612. Attaching the stimulus sensitive gel 610 and 620 to the attachment point 618 helps to ensure that the swollen stimulus sensitive gel 610 collapses or shrinks in a desired direction—preferably toward the attachment point 618, and away from the indicator spot 616 and away from the indicator window 612, so that the indicator spot 116 is revealed upon exposure to a predetermined stimulus. Securing or fixing the stimulus sensitive gel 610 and 620 to the attachment point 618 prevents the stimulus sensitive gel 610 and 620 from floating or moving within the compartment and covering up the indicator spot 616 after the swollen stimulus sensitive gel 610 had undergone its phase transition, thereby preventing a false indication that the product attached to the stimulus indicator device 600 had not been exposed to a predetermined stimulus.

All embodiments discussed herein of the stimulus indicating device 600 containing the swollen stimulus sensitive gel 610 and the shrunken stimulus sensitive gel 620 may be based on any type of stimulus sensitive gel that undergoes a phase transition upon exposure of the stimulus sensitive gel to a predetermined stimulus. The preferred types of stimulus sensitive gels include polyacrylic acid (PAA) gel, a polyacrylamide (PAAm) gel, and/or its variations such as poly n-isopropylacrylamide (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the direction of the volume change in the stimulus sensitive gel 610 and 620 used in all the embodiments of the stimulus indicating device 600 discussed herein can be selected so as to correlate to a specific situation. For example, one of ordinary skill will appreciate and understand that if the stimulus sensitive gel in this embodiment is swollen at the beginning of its use as it undergoes its phase transition, it will collapse or shrink, thereby causing a change in color or indication in the stimulus indicator 600. Alternatively, the stimulus sensitive gel could start out collapsed or shrunken, but upon exposure to its predetermined stimulus it would permanently expand or swell and cause a change in color or indication in the stimulus indicator 600. By way of example only and as disclosed herein and in prior applications, a stimulus sensitive gel 610 and 620 can be of the UCST type or the LCST type gel. As one of ordinary skill in the art will appreciate, a UCST type stimulus sensitive gel, such as PAAm gels, could be used when one wishes to have an initially swollen stimulus sensitive gel collapse or shrink when cooled below a predetermined or trigger temperature and thereby: i) reveal an indicator spot; or ii) expel liquid and/or constituent parts, both of which result in the stimulus indicating device exhibiting a change in color or indication. A UCST type gel could also be used when one wishes to have an initially shrunken stimulus sensitive gel expand or swell when it is heated beyond a predetermined stimulus, and thereby: i) cover an indicator spot; or ii) collect liquid and/or constituent parts, both of which result in the stimulus indicating device exhibiting a change in color or indication. Alternatively, an LCST type stimulus sensitive gel, such as PNIPAAm gels, could be used when one wishes to have an initially swollen stimulus sensitive gel collapse or shrink when heated above a predetermined or trigger temperature and thereby: i) reveal an indicator spot; or ii) expel liquid and/or constituent parts, both of which result in the stimulus indicating device exhibiting a change in color or indication. An LCST type gel could also be used when one wishes to have an initially shrunken stimulus sensitive gel expand or swell when it is cooled below a predetermined stimulus, and thereby: i) cover an indicator spot; or ii) collect liquid and/or constituent parts, both of which result in the stimulus indicating device exhibiting a change in color or indication.

One of ordinary skill in the art will understand that although the stimulus sensitive gel 610 and 620 discussed herein in regard to all embodiments of the stimulus indicating device 600 may be of the UCST type of gel (i.e., the swollen stimulus sensitive gel 610 will collapse or shrink upon exposure to its predetermined stimulus of a cooler temperature, and become the shrunken stimulus sensitive gel 620; as well as expand or swell upon exposure to its predetermined stimulus of a warmer temperature, and become the swollen stimulus sensitive gel 610), the range and scope of this invention includes and envisions the swollen stimulus sensitive gel 610 and the shrunken stimulus sensitive gel 620 also being of the LCST type of gel. Moreover, it should be noted that all the variations of the different embodiments discussed herein can be combined with the variations of other embodiments described herein and that are known in the art, as would be understood to one of ordinary skill in the art.

The behavior of the UCST gels and the LCST gels depends on their chemical structure. Many examples of both kinds of polymers are known in the literature. For example, if the stimulus sensitive gel 610 and 620 employed in all the embodiments of the stimulus indicating device 600 discussed herein were made of UCST type stimulus sensitive gels, it could be any number of such UCST gels, including: i) polyacrylic acid (PAA) gel combined with polyacrylamide (PAAm) gel; or ii) PAAm gel combined with poly sodium 3-butenoate (SB) gel to result in the creation of poly(AAm-co-SB) gel; or iii) their derivates, and as described in Tanaka, "Gels," Scientific American 244 (1981) at 124-138 and Tanaka, "Phase Transitions in Ionic Gels," Physical Review Letters 45 (1980) at 1636-1639, the predetermined "trigger" stimulus at which a UCST gel undergoes its phase transition, and thereby expels the liquid 614 and constituent parts 609 and thus collapses or shrinks in volume, can be "tuned" to a particular value by changing the solvent trapped in the gel polymer matrix in addition to introducing salts, surfactants, or other substances to the gel matrix. Such "tuning" in regard to UCST type gels is discussed herein. Similarly, if the stimulus sensitive gel 610 and 620 employed in all the embodiments of the stimulus indicating device 600 discussed herein were made of LSCT type stimulus sensitive gels, it could be any number of such LCST gels, including PNIPAAm gels, and as described in U.S. Pat. No. 4,732,930 in regard to PNIPAAm, the predetermined stimulus, such as temperature at which a stimulus sensitive gel 610 and 620 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Nonionic Poly(N-isopropylacrylamide) Gel" Macromolecules volume 26 at 5045 to 5048.

Regardless of whether LCST type stimulus sensitive gels or UCST type stimulus sensitive gels are used to indicate exposure to a predetermined stimulus, what is important is that the change in volume of the stimulus sensitive gel be tailored to the application in which the stimulus indicator is being used. For example, a change in volume of the stimulus sensitive gel 610 and 620, and thus the corresponding expulsion of liquid 614 and constituent parts 609 can be insignificant or it can be dramatic. If the desired visual indication is the result of the swollen stimulus sensitive gel 610 moving completely out of the indicator window 612 and revealing the indicator spot 616, then a large change in volume is preferred.

6. Embodiments with Single Compartment with Color Changing Material

In accordance with the purpose of certain embodiments of the invention, as embodied and broadly described herein and in conjunction with FIG. 7A through FIG. 7F as well as FIG. 2A through FIG. 2F, an alternative embodiment of the inventive stimulus indicating device 700 preferably has a single compartment containing the swollen stimulus sensitive gel 710, and a color changing absorbent material 707, and preferably it does not contain the liquid bath of the preferred embodiment. Although this embodiment is described in terms of the stimulus sensitive gel preferably being swollen initially, as discussed herein in regard to stimulus sensitive gels, one of ordinary skill in the art would appreciate that the same invention can be achieved with an initially shrunken stimulus sensitive gel that draws out constituent parts from the color changing absorbent material and uses them to expand or swell upon exposure to a predetermined stimulus so as to result in a color change.

The first compartment 702 is formed by the backing layer 725 on the bottom of the stimulus indicating device 700 and an upper layer 726 on top of the stimulus indicating device 700. The top layer 726 of the stimulus indicating device 700 is formed by at least the indicator window 712 and the top portion 716 of the top layer 726. The color changing absorbent material 707 can be viewed through an indicator window 712 located in the top layer 726 of the stimulus indicating device 700.

Both the backing layer 725 and the upper layer 726 may be constructed of a strong, resilient leak-proof material, such as plastic or other polymer material, so as to provide for the twisting or bending that might occur during transportation of the stimulus sensitive product without tearing, breaking or leaking. The backing layer 725 and the upper layer 726 may also be made of a material that preferably allows them to be joined and sealed together, such as by heat stamping or other suitable means. The backing layer 725 and the upper layer 726 can both approximate the length and width of the first compartment 702, although variations in these dimensions are within the scope of the present invention. The upper layer 726 can preferably be made of a clear material, such as plastic, so that the user of the stimulus indicating device 700 can view at least some portion of the backing material or color changing absorbent material 707. The upper layer 726 can also be able to accept paint or ink so as to allow for coloring or concealing at least some portion of the first compartment 702.

Although some portion of the upper layer 726 can also accept paint or ink for coloring, it is preferable that the indicator window 712 portion of the upper layer 726 remains free from ink or coloring so that the user of the stimulus indicating device 700 can observe the first compartment 702 through the indicator window 712 as explained herein. The backing layer 725 should also be able to accept paste, glue or other suitable adhesive on the surface not facing the first compartment 702, so as to allow it to be directly or indirectly attached to a stimulus sensitive product.

By way of example only, the color changing absorbent material 707 could be divalent cation indicator paper, litmus paper or any equivalent absorbent material that is reactive to a certain ion, element or similar substance. In regard to all the embodiments of the stimulus indicating device discussed herein being "reactive," what is meant is that the color changing absorbent material 707 should change its observable properties (by way of example only, its size, its color, etc.) in reaction to coming into contact with the constituent parts 711 expelled from the swollen stimulus sensitive gel 710 as described herein. Thus it is important that the color changing absorbent material 707 has both an affinity for the expelled liquid 715 and constituent parts 711 previously contained in, and expelled from, the swollen stimulus sensitive gel 710; and that at least a portion of the color changing absorbent material 707 changes properties upon coming into contact with the expelled liquid 715 and constituent parts 711, so as to change from a first color to a second color. Preferably the color changing absorbent material 707 can operate in a semi-quantitative capacity.

In the preferred variation of this alternative embodiment, the color changing absorbent material 707 is a divalent cationic paper that is reactive to constituent parts 711 such as by way of example only, divalent cations (by way of example only, $Mg^{2+}$ or $Ca^{2+}$). As discussed herein, a suitable color changing absorbent material 707, such as a total-hardness indicator paper or test stick will indicate a change from a first color 713 to a second color 717 upon exposure to constituent parts 711 carried by the expelled liquid 715 after both are expelled from the swollen stimulus sensitive gel 710. Examples of such divalent cationic paper that can be used as the color changing absorbent material 707 includes a total-hardness indicator paper or test stick that is available from Sigma-Aldrich under the trade name QUANTOFIX®, is manufactured by Macherey-Nagel under the trade name Acquadur®, and that changes color from blue to red upon coming into contact with expelled liquid 715 containing the constituent parts 711 (by way of example only, $Mg^{2+}$ or $Ca^{2+}$). Preferably the color changing absorbent material 707 operates in at least a semi-quantitative capacity.

As discussed herein, one method for incorporating the constituent parts 711 that are reactive with the color changing absorbent material 707 is to swell the swollen stimulus sensitive gel 710 in a bath containing constituent parts 711 that are specifically reactive with the selected color changing absorbent material 707, including by way of example only, divalent cation salts (by way of example only $Mg^{2+}$ or $Ca^{2+}$ salts), and/or varying concentrations of $H^+$.

In the preferred variation of the alternative embodiment, as the swollen stimulus sensitive gel 710 undergoes its phase transition in reaction to exposure to a predetermined stimulus, its volume changes by collapsing or shrinking due at least to a portion of the liquid 714 and constituent parts 711 (by way of example only $Mg^{2+}$) contained in the polymer network of the swollen stimulus sensitive gel 710 being expelled. As the swollen stimulus sensitive gel 710 expels even a portion of the liquid 714 and the constituent parts 711, it collapses and shrinks so that it resembles the shrunken stimulus sensitive gel 720 shown in FIG. 7B. Once a portion of the liquid 714 and the constituent parts 711 are expelled from the swollen stimulus sensitive gel 710, the expelled liquid 715 and the expelled constituent parts 711 subsequently come into contact with and are absorbed by the color changing absorbent material 707. Because of the design of the color changing absorbent material 707, as the constituent parts 711 are absorbed by the color changing absorbent material 707, the color changing absorbent material 707 changes from a first color 713 to a second color 717 due to the reaction between chemical moieties on the color changing absorbent material 707 and the constituent parts 711 carried by the expelled liquid 715. Because of the design of the color changing absorbent material 707, at least part of the color changing absorbent material 707, and preferably all of the color changing absorbent material 707 will change from a first color 713 to a second color 717 upon coming into contact with the constituent parts 711.

Moreover, upon being absorbed by the color changing absorbent material 707, the constituent parts 711 are permanently bound to the color changing absorbent material 707 thereafter. Thus, even if the predetermined stimulus is removed and the expelled liquid 715 is subsequently reabsorbed by the shrunken stimulus sensitive gel 720 so as to become a partially or fully re-swollen stimulus sensitive gel 710, those constituent parts 711 remain bound to or trapped in the color changing absorbent material 707, and thus that color changing absorbent material 707 permanently remains colored the second color 717.

It should be noted that it is not necessary for the swollen stimulus sensitive gel 710 to collapse or shrink entirely in order for the color change in the color changing absorbent material 707 to be visible to the user. Instead, even if a portion of the color changing absorbent material 707 changes color so as to be visible to the user through the indicator window 712, that is enough to signal to the user that the product attached to the stimulus indicating device 700 had been exposed to a potentially harmful stimulus. More specifically, although the decrease in volume of the swollen stimulus sensitive gel 710 in all of the embodiment of the stimulus indicating device 700 discussed herein can be by any amount so long as it is registerable, preferably the decrease in volume of the swollen stimulus sensitive gel 710 would be between at least a 1/10 reduction in original volume, and up to a 500 times decrease in original volume. In regard to all embodiments of the stimulus indicating device 700 discussed herein as they pertain to the decrease in the volume being "registerable" what is meant is that the volume change of the swollen stimulus sensitive gel 710 expels enough liquid 714 and constituent parts 711 from the swollen stimulus sensitive gel 710 to cause the swollen stimulus sensitive gel 710 to collapse or shrink enough so that it permanently causes at least a partial color change in the color changing absorbent material 707 from a first color 713 to a second color 717 (e.g., a change in color from a first color to a second color) or indication (e.g., a portion of the color changing absorbent material 707 is covered by the swollen stimulus sensitive gel 320 and contains a glyph, such as an "X" or "skull and cross bones" that is revealed either because of a color change or because the swollen stimulus sensitive gel 710 collapses or shrinks and reveals that glyph) occurs in the stimulus indicating device 700, and is visible via the indicator window 712, and indicates to the user that the product had been exposed to a predetermined stimulus.

In regard to all the embodiments of the stimulus indicating device discussed herein being "irreversible" and "permanent," what is meant is that once the stimulus indicating device provides an indication of exposure to an adverse stimulus extreme (which is also referred to herein as a predetermined stimulus), that exposure indication does not change, even though the adverse stimulus extreme or predetermined stimulus might be removed in the future.

In this alternative to the preferred version of this embodiment, the color changing absorbent material 707 could be pH-indicator strips manufactured by EMD Chemicals Inc. These pH-indicator strips can react to and indicate exposure to constituent parts 711 such as and by way of example only, varying concentration of $H^+$ ions, by permanently changing from a first color 713 to a second color 717. Preferably the pH-indicator strips are manufactured in such a way that there is a noticeable spectrum of colors that match the range of possible pH concentrations. For example, the first color 713 of the color changing absorbent material 707 could be colored red prior to the stimulus indicating device 700 being exposed to a predetermined stimulus. Then upon exposure to a predetermined stimulus, the swollen stimulus sensitive gel 710 would expel liquid 714 and constituent parts 711 (by way of example only $H^+$) which, upon contact with the color changing absorbent material 707, causes the color changing absorbent material 707 to change to a second color 717, such as blue. Altering the pH of the expelled liquid 715 and the content of the constituent parts 711 (by way of example only $H^{2+}$) will allow the first color 713 and second color 717 of the color changing absorbent material 707 to be manipulated. For example, if the swollen stimulus sensitive gel 710 was manufactured so that it was swollen with an aqueous solution of either high pH (for example a pH of 14), or low pH (for example a pH of 1), the most significant color contrast can be achieved between the first color 713 and second color 717 of the color changing absorbent material 707.

Figure 7A:
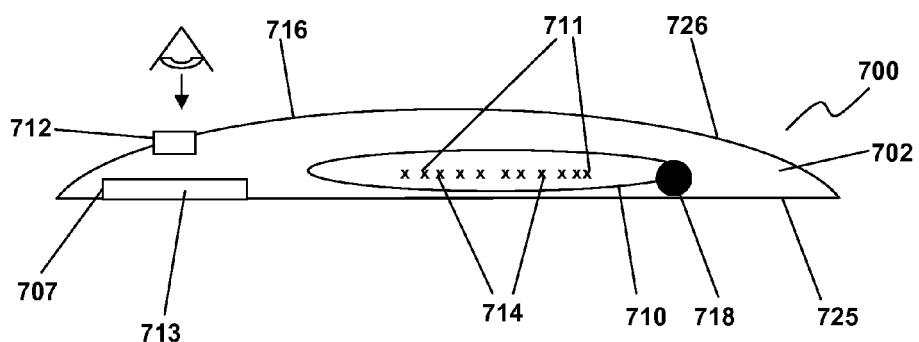
FIG. 7A is a side cross-sectional view of an embodiment of the invention before exposure to a predetermined trigger stimulus.
Figure 7B:
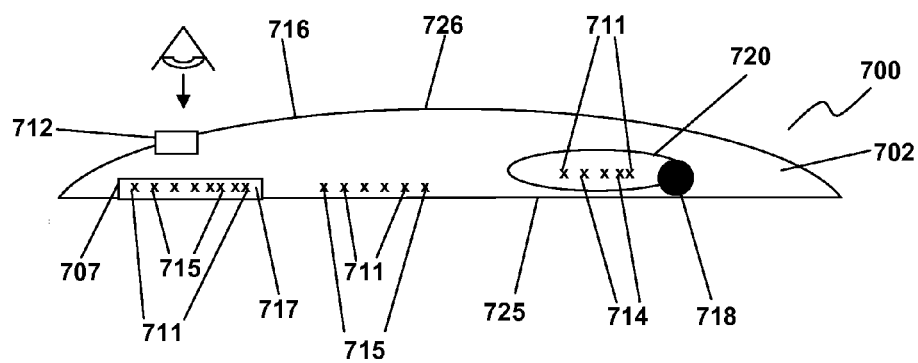
FIG. 7B is a side cross-sectional view of the embodiment in FIG. 7A after exposure to a predetermined trigger stimulus.

As shown in FIG. 7A the irreversible stimulus indicating device 700 would preferably have a single compartment 702. Within the single compartment 702 is the stimulus sensitive gel in its expanded or swollen state 710, and the color changing absorbent material 707. At least a portion of this color changing absorbent material 707 would be visible to a user through the indicator window 712. Although the swollen stimulus sensitive gel 710 is preferably hidden from the user below the paint applied to the top portion 716 of the stimulus sensitive device 700, it could also be visible to the user. If the swollen stimulus sensitive gel 710 were visible to the user, it is preferred that it be the same color as the color changing absorbent material 707 prior to the color changing absorbent material 707 coming into contact with the constituent parts 711.

If the color changing absorbent material 707 has the ability to wick liquid 714 and/or constituent parts 711 from the swollen stimulus sensitive gel 710 simply by the color changing absorbent material 707 being in contact with the swollen stimulus sensitive gel 710, then it is preferred that the color changing absorbent material 707 and the swollen stimulus sensitive gel 710 not be in physical contact with each other. Thus, in the preferred embodiment the swollen stimulus sensitive gel 710 is physically separated from the color changing absorbent material 707 so as to prevent the liquid 714 and the constituent parts 711 contained in the swollen stimulus sensitive gel 710 from being wicked into the color changing absorbent material 707. Doing so prevents the stimulus sensitive device 700 from giving a false indication of exposure to a predetermined stimulus.

Figure 7C:
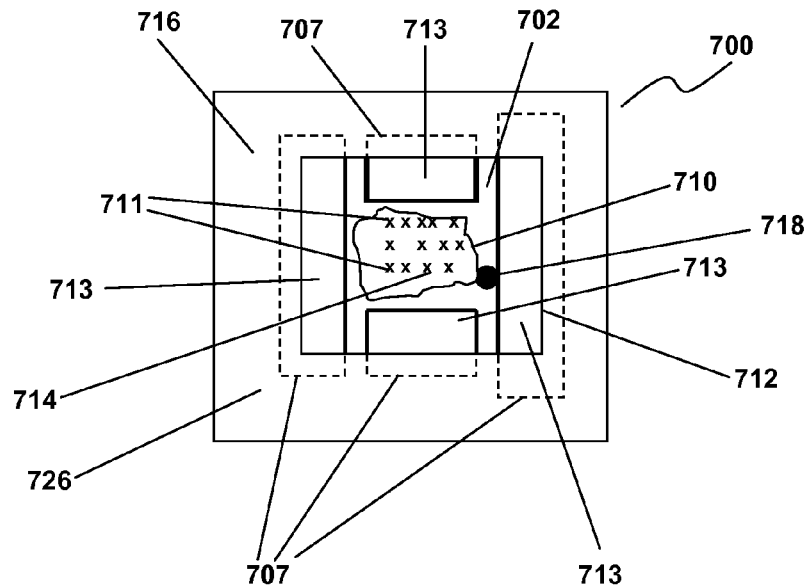
FIG. 7C is a side cross-sectional view of an alternate embodiment of the embodiment shown in FIG. 7A before exposure to a predetermined trigger stimulus.
Figure 7D:
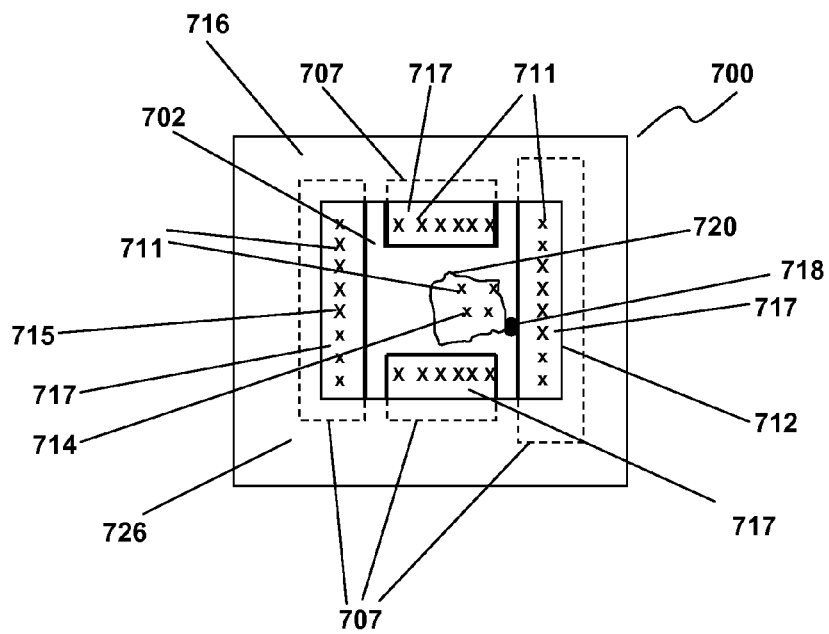
FIG. 7D is a side cross-sectional view of the embodiment in FIG. 7C after exposure to a predetermined trigger stimulus.
Figure 7E:
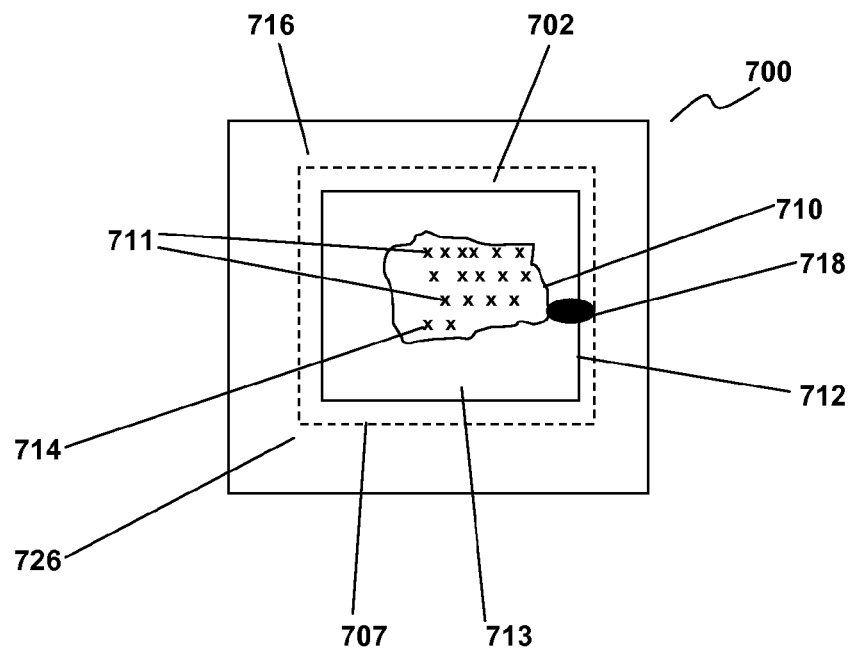
FIG. 7E is a side cross-sectional view of an alternate embodiment of the embodiment shown in FIG. 7A before exposure to a predetermined trigger stimulus.
Figure 7F:
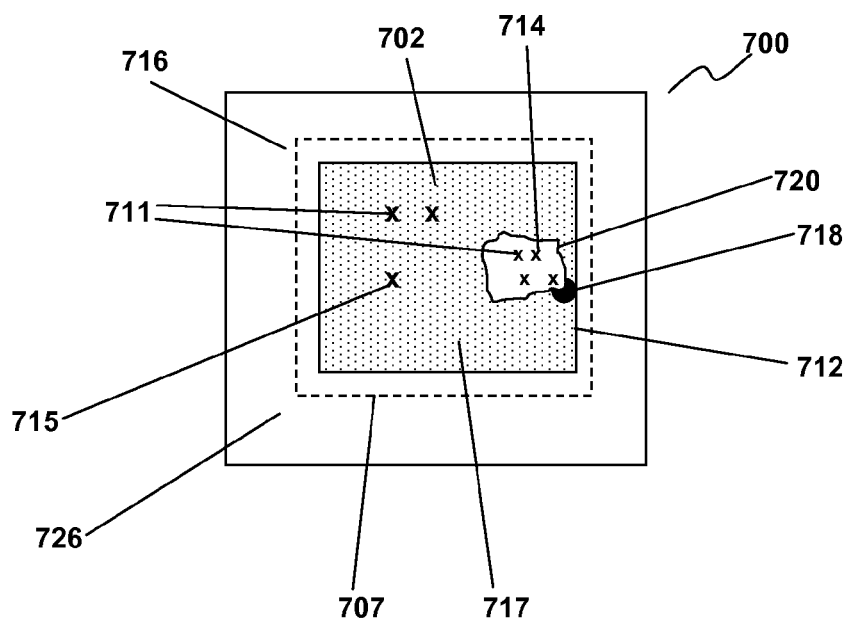
FIG. 7F is a side cross-sectional view of the embodiment in FIG. 7E after exposure to a predetermined trigger stimulus.

For all embodiments of the stimulus indicating device 700 discussed herein, an alternative way to position the swollen stimulus sensitive gel 710 would be, as shown in FIG. 7C and FIG. 7D, to surround the swollen stimulus sensitive gel 710 with the color changing absorbent material 707. Doing so helps to ensure that the constituent parts 711 and the expelled liquid 715 can more easily come into contact with the color changing absorbent material 707 once the swollen stimulus sensitive gel 710 undergoes its phase transition upon being exposed to a predetermined stimulus. Positioning the swollen stimulus sensitive gel 710 so that it is surrounded by color changing absorbent material 707 would help to eliminate or minimize problems that might be caused by gravity preventing the constituent parts 711 and the expelled liquid 715 from contacting the color changing absorbent materials 707 and providing an indication that the stimulus indicating device 700 had been exposed to a predetermined stimulus. An alternative to the structure/arrangement taught by FIG. 7C and FIG. 7D is shown in FIG. 7E and FIG. 7F, wherein the swollen stimulus sensitive gel 710 is positioned directly atop the color changing absorbent material 707 prior to the stimulus indicating device being exposed to a predetermined stimulus. Note this alternative structure/embodiment shown in FIG. 7E and FIG. 7F works best if the color changing absorbent material 707 does not wick the liquid 714 and constituent parts 711 out of the stimulus sensitive gel 710 and 720 as discussed herein in regard to other embodiments. It is also possible that an impermeable membrane could separate the color changing absorbent material 707 from the stimulus sensitive gel 710 and 720 in FIG. 7E and FIG. 7F to prevent such wicking.

For the embodiment shown in FIG. 7E it would be necessary that the first color 713 of the color changing absorbent material 707 be the same or similar to the coloring of the swollen stimulus sensitive gel 710 prior to exposure to a predetermined stimulus; then after exposure of the stimulus indicating device 700 to the predetermined stimulus the color changing absorbent material 707 would change to a second color 717 that is visible through the indicator window 712, as shown in FIG. 7F. Alternatively, for the embodiment shown in FIG. 7E and FIG. 7F the swollen stimulus sensitive gel 710 could be translucent so that it does not have a color component to it, so long as it contained enough constituent parts to cause the color changing absorbent material 707 to change from a first color 713 to a second color 717.

Preferably, the stimulus sensitive gel 710 and 720 would be fixed or secured at the attachment point 718, or at more than one attachment point if desired. The stimulus sensitive gel 710 and 720 may be fixed to the attachment point 718 with a suitable epoxy, glue, or it could be heat stamped upon creation of the stimulus indicating device 700. Attaching the stimulus sensitive gel 700 collapses or shrinks in a desired direction—preferably away from the color changing absorbent material 707 and the indicator window 712. Moreover, securing or fixing the stimulus sensitive gel 710 and 720 to the attachment point ensures that the stimulus sensitive gel 710 and 720 does not cover the color changing absorbent material 707 after it had changed from a first color to a second color. Securing or fixing the stimulus sensitive gel 710 and 720 to the attachment point 718 prevents the stimulus sensitive gel 710 and 720 from floating or moving within the compartment and covering up the color changing absorbent material 707 at all times.

It should be noted that the predetermined temperature discussed herein that causes the swollen stimulus sensitive gel 710 to undergo its phase transition is only one example of a predetermined stimulus or trigger stimulus that will cause the inventive stimulus sensitive gel 710 and 720 to undergo its phase transition. For example, the swollen stimulus sensitive gel 710 of this preferred embodiment could trigger or undergo its phase transition upon exposure to a predetermined stimulus such as a predetermined pH level, or the swollen stimulus sensitive gel 710 of this preferred embodiment could trigger or undergo its phase transition upon exposure to a predetermined level of electromagnetic radiation.

All embodiments discussed herein of the stimulus indicating device 700 containing the swollen stimulus sensitive gel 710 and the shrunken stimulus sensitive gel 720 may be based on any type of stimulus sensitive gel that undergoes a phase transition upon exposure of the stimulus sensitive gel to a predetermined stimulus. The preferred types of stimulus sensitive gels include poly(acrylamide-co-acrylic acid) (PAAm-co-AA) gel, a poly(acrylamide-co-sodium vinyl acrylate) (PAAm-co-SVA) gel, and/or its variations such as poly(N-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the direction of the volume change in the stimulus sensitive gel 710 and 720 used in all the embodiments of the stimulus indicating device 700 discussed herein can be selected so as to correlate to a specific situation. For example, one of ordinary skill will appreciate and understand that if the stimulus sensitive gel in this embodiment is swollen at the beginning of its use as it undergoes its phase transition, it will collapse or shrink, thereby causing a change in color or indication in the stimulus indicator 700. Alternatively, the stimulus sensitive gel could start out collapsed or shrunken, but upon exposure to its predetermined stimulus it would permanently expand or swell and cause a change in color or indication in the stimulus indicator 100. By way of example only and as disclosed herein and in prior applications, a stimulus sensitive gel 710 and 720 can be of the "Upper Critical Solution Temperature" or UCST type gel, or can be of the "Lower Critical Solution Temperature" or LCST type gel. As one of ordinary skill in the art will appreciate, a UCST type stimulus sensitive gel, such as PAAm-co-SVA gels, could be used when one wishes to have an initially swollen stimulus sensitive gel collapse or shrink when cooled below a predetermined or trigger temperature and thereby: i) reveal an indicator spot; or ii) expel liquid and/or constituent parts, both of which result in the stimulus indicating device exhibiting a change in color or indication. A UCST type gel could also be used when one wishes to have an initially shrunken stimulus sensitive gel expand or swell when it is heated beyond a predetermined stimulus, and thereby: i) cover an indicator spot; or ii) collect liquid and/or constituent parts, both of which result in the stimulus indicating device exhibiting a change in color or indication. Alternatively, an LCST type stimulus sensitive gel, such as PNIPAAm gels, could be used when one wishes to have an initially swollen stimulus sensitive gel collapse or shrink when heated above a predetermined or trigger temperature and thereby: i) reveal an indicator spot; or ii) expel liquid and/or constituent parts, both of which result in the stimulus indicating device exhibiting a change in color or indication. An LCST type gel could also be used when one wishes to have an initially shrunken stimulus sensitive gel expand or swell when it is cooled below a predetermined stimulus, and thereby: i) cover an indicator spot; or ii) collect liquid and/or constituent parts, both of which result in the stimulus indicating device exhibiting a change in color or indication.

One of ordinary skill in the art will understand that although the stimulus sensitive gel 710 and 720 discussed herein in regard to all embodiments of the stimulus indicating device 700 may be of the UCST type of gel (i.e., the swollen stimulus sensitive gel 710 will collapse or shrink upon exposure to its predetermined stimulus of a cooler temperature, and become the shrunken stimulus sensitive gel 720; as well as expand or swell upon exposure to its predetermined stimulus of a warmer temperature, and become the swollen stimulus sensitive gel 710), the range and scope of this invention includes and envisions the swollen stimulus sensitive gel 710 and the shrunken stimulus sensitive gel 720 also being of the LCST type of gel. Moreover, it should be noted that all the variations of the different embodiments discussed herein can be combined with the variations of other embodiments described herein and that are known in the art, as would be understood to one of ordinary skill in the art.

The behavior of the UCST gels and the LCST gels depends on their chemical structure. Many examples of both kinds of polymers are known in the literature. For example, if the stimulus sensitive gel 710 and 720 employed in all the embodiments of the stimulus indicating device 700 discussed herein were made of UCST type stimulus sensitive gels, it could be any number of such UCST gels, including: i) an interpenetrating network of polyacrylamide (PAAm) and polyacrylic acid (PAAc) or IPN-PAAm-PAAc; or ii) Acrylamide copolymerized with sodium vinyl acrylate (SVA) gel to result in the creation of PAAm-co-SVA gel; or iii) their derivates, and as described in Tanaka, "Gels," Scientific American 244 (1981) at 124-138 and Tanaka, "Phase Transitions in Ionic Gels," Physical Review Letters 45 (1980) at 1636-1639, the predetermined "trigger" stimulus at which a UCST gel undergoes its phase transition, and thereby expels the liquid 714 and constituent parts 711 and thus collapses or shrinks in volume, can be "tuned" to a particular value by changing the solvent trapped in the gel polymer matrix in addition to introducing salts, surfactants, or other substances to the gel matrix. Such "tuning" in regard to UCST type gels is discussed herein and in U.S. Pat. No. 5,100,933. Similarly, if the stimulus sensitive gel 710 and 720 employed in all the embodiments of the stimulus indicating device 700 discussed herein were made of LSCT type stimulus sensitive gels, it could be any number of such LCST gels, including PNIPAAm gels, and as described in U.S. Pat. No. 4,732,930 in regard to PNIPAAm LCST type gels, the predetermined stimulus, such as temperature at which a stimulus sensitive gel 710 and 720 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Nonionic poly(N-isopropylacrylamide) Gel" Macromolecules volume 26 at 5045 to 5048.

Regardless of whether LCST type stimulus sensitive gels or UCST type stimulus sensitive gels are used to indicate exposure to a predetermined stimulus, what is important is that the change in volume of the stimulus sensitive gel be tailored to the application in which the stimulus indicator is being used. For example, a change in volume of the stimulus sensitive gel 710 and 720, and thus the corresponding expulsion of liquid 714 and constituent parts 711 can be insignificant or it can be dramatic. If the desired visual indication as the result of the swollen stimulus sensitive gel 710 expelling its liquid 714 and its constituent parts 711 is to cause most or all of the color changing absorbent material 707 to turn a second color, then a large change in volume is preferred.

Figure 8A:
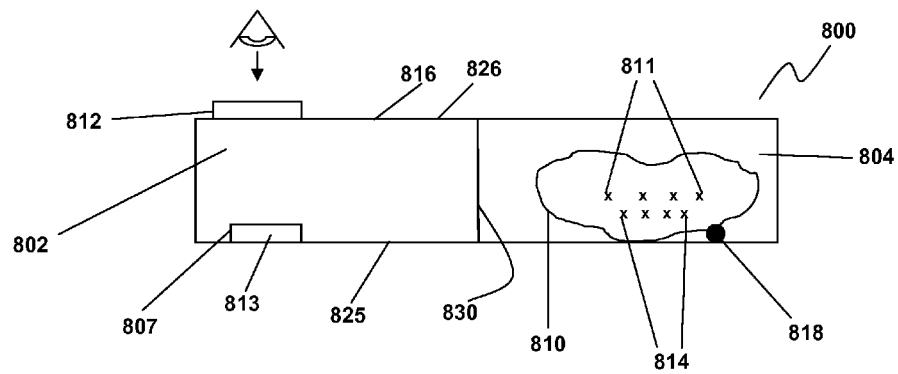
FIG. 8A is a side cross-sectional view of an embodiment of the invention before exposure to a predetermined trigger stimulus.
Figure 8B:
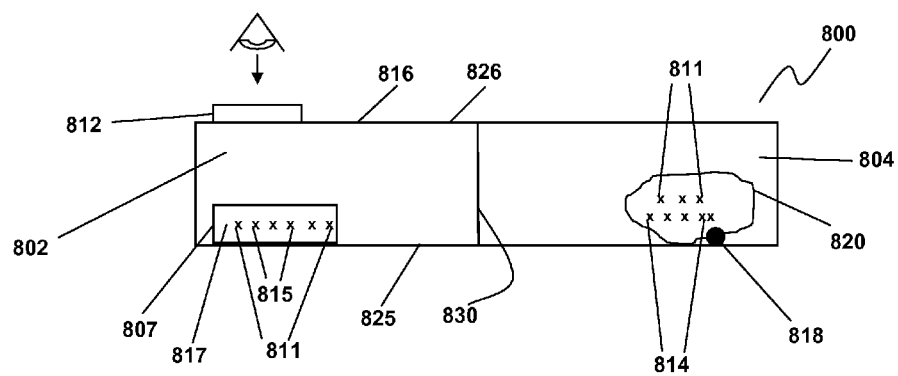
FIG. 8B is a side cross-sectional view of the embodiment in FIG. 8A after exposure to a predetermined trigger stimulus.

7. Embodiments with Two Compartments with Permeable Membrane and Absorbent Material In accordance with the purpose of certain embodiments of the invention, as embodied and broadly described herein and in conjunction with FIG. 8A through 8C as well as FIG. 2A through FIG. 2F, an alternative embodiment of the inventive stimulus indicating device preferably has a multi-compartment stimulus indicating device 800 that could be used to keep the color changing absorbent material 807 and both the liquid 814 and constituent parts 811 contained in the swollen stimulus sensitive gel 810, separate from each other, and preferably it does not contain the liquid bath of the preferred embodiment. More specifically, as shown in FIG. 8A and FIG. 8B, the color changing absorbent material 807 is in the first compartment 802 and can be viewed through an indicator window 812. The swollen stimulus sensitive gel 810 is in the second compartment 804. Although this embodiment is described in terms of the stimulus sensitive gel preferably being swollen initially, as discussed herein in regard to stimulus sensitive gels, one of ordinary skill in the art would appreciate that the same invention can be achieved with an initially shrunken stimulus sensitive gel that draws out constituent parts from the color changing absorbent material and uses them to expand or swell upon exposure to a predetermined stimulus so as to result in a color change.

The first compartment 802 and the second compartment 804 are formed by the backing layer 825 on the bottom of the stimulus indicating device 800 and an upper layer 826 on the top of the stimulus indicating device 800. The first compartment 802 and the second compartment 804 are additionally formed and differentiated from one another by a permeable membrane 830. The permeable membrane is designed to allow the expelled liquid 815 and constituent parts 811 to pass from the second compartment 804 into the first compartment 802, and from the first compartment 802 to the second compartment 804.

Figure 8C:
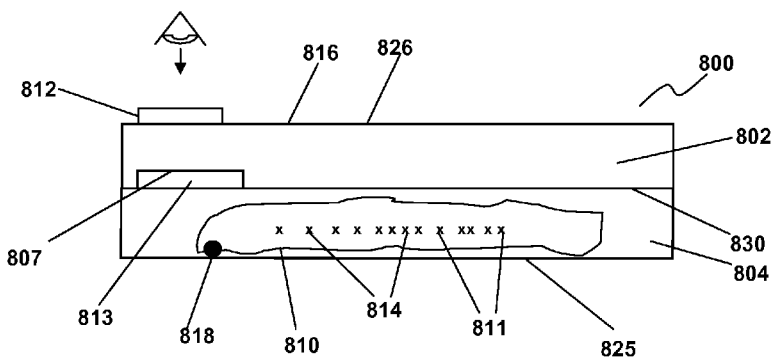
FIG. 8C is a side cross-sectional view of an additional embodiment of the invention before exposure to a predetermined stimulus.

Alternatively, as shown in FIG. 8C an alternate embodiment could position the first compartment 802 above the second compartment 804 separated by the permeable membrane 830. Other shapes are contemplated within the scope of the invention as previously described in prior applications.

Prior to exposure to a predetermined stimulus, in this embodiment a swollen stimulus sensitive gel 820 is contained in only the second compartment 804. And prior to exposure of the stimulus indicating device 800 to a predetermined stimulus, the color changing absorbent material 807 is a first color, visible through the indicator window 812 or display portion 812.

Both the backing layer 825 and the upper layer 826 may be constructed of a strong, resilient leak-proof material, such as plastic or other polymer material, so as to provide for the twisting or bending that might occur during transportation of the stimulus sensitive product without tearing, breaking or leaking. The backing layer 825 and the upper layer 826 may also be made of a material that preferably allows them to be joined and sealed together, such as by heat stamping or other suitable means. The backing layer 825 and the upper layer 826 can both approximate the length and width of the first compartment 802 plus the length and width of the second compartment 804, although variations in these dimensions are within the scope of the present invention. The upper layer 826 can preferably be made of a clear material, such as plastic, so that the user of the stimulus indicating device 800 can view at least some portion of the backing material or color changing absorbent material 807. The upper layer 826 can also be able to accept paint or ink so as to allow for coloring or concealing at least some portion of the first compartment 802.

Although some portion of the upper layer 826 can also accept paint or ink for coloring, it is preferable that the indicator window 812 portion of the upper layer 826 remains free from ink or coloring so that the user of the stimulus indicating device 800 can observe the first compartment 802 through the indicator window 812 as explained herein. The backing layer 825 should also be able to accept paste, glue or other suitable adhesive on the surface not facing the first compartment 802, so as to allow it to be directly or indirectly attached to a stimulus sensitive product.

By way of example only, the color changing absorbent material 807 could be divalent cation indicator paper, litmus paper or any equivalent absorbent material that is reactive to a certain ion, element or similar substance. In regard to all the embodiments of the stimulus indicating device discussed herein being "reactive," what is meant is that the color changing absorbent material 807 should change its observable properties (by way of example only, its size, its color, etc.) in reaction to coming into contact with the constituent parts 811 expelled from the swollen stimulus sensitive gel 810 as described herein. Thus it is important that the color changing absorbent material 807 has both an affinity for the expelled liquid 815 and constituent parts 811 previously contained in, and expelled from, the swollen stimulus sensitive gel 810; and that at least a portion of the color changing absorbent material 807 changes properties upon coming into contact with the expelled liquid 815 and constituent parts 811, so as to change from a first color to a second color. Preferably the color changing absorbent material 807 can operate in a semi-quantitative capacity.

In this alternative embodiment, the color changing absorbent material 807 is a divalent cationic paper that is reactive to constituent parts 811 such as by way of example only, divalent cations (by way of example only, $Mg^{2+}$ or $Ca^{2+}$). As discussed herein, a suitable color changing absorbent material 807, such as a total-hardness indicator paper or test stick will indicate a change from a first color 813 to a second color 817 upon exposure to constituent parts 811 carried by the expelled liquid 815 after both are expelled from the swollen stimulus sensitive gel 810. Examples of such divalent cationic paper that can be used as the color changing absorbent material 807 includes a total-hardness indicator paper or test stick that is available from Sigma-Aldrich under the tradename QUANTOFIX®, is manufactured by Macherey-Nagel under the tradename Aquadur®, and that changes color from blue to red upon coming into contact with expelled liquid 815 containing the constituent parts 811 (by way of example only, $Mg^{2+}$ or $Ca^{2+}$). Preferably the color changing absorbent material 807 operates in at least a semi-quantitative capacity.

As discussed herein, one method for incorporating the constituent parts 811 that are reactive with the color changing absorbent material 807 is to swell the swollen stimulus sensitive gel 810 in a bath containing constituent parts 811 that are specifically reactive with the selected color changing absorbent material 807, including by way of example only, divalent cation salts (by way of example only, $Mg^{2+}$ or $Ca^{2+}$ salts), and/or varying concentrations of $H^+$.

In this alternative embodiment, as the swollen stimulus sensitive gel 810 undergoes its phase transition in reaction to exposure to a predetermined stimulus, its volume changes by collapsing or shrinking due at least to a portion of the liquid 814 and constituent parts 811 (by way of example only, $Mg^{2+}$) contained in the polymer network of the swollen stimulus sensitive gel 810 being expelled. As the swollen stimulus sensitive gel 810 expels even a portion of the liquid 814 and the constituent parts 811, it collapses and shrinks so that it resembles the shrunken stimulus sensitive gel 820 shown in FIG. 8B. Once a portion of the liquid 814 and the constituent parts 811 are expelled from the swollen stimulus sensitive gel 810, the expelled liquid 815 and the expelled constituent parts 811 subsequently come into contact with and are absorbed by the color changing absorbent material 807.

Once the liquid 814 and the constituent parts 811 are expelled from the swollen stimulus sensitive gel 810, they pass through the permeable membrane 830 of the stimulus indicating device 800, they come into contact with and are absorbed by the color changing absorbent material 807. Because of the design of the color changing absorbent material 807, as the constituent parts 811 are absorbed by the color changing absorbent material 807, the color changing absorbent material 807 changes from a first color 813 to a second color 817 due to the reaction between chemical moieties on the color changing absorbent material 807 and the constituent parts 811 carried by the expelled liquid 815. Because of the design of the color changing absorbent material 807, at least part of the color changing absorbent material 807, and preferably all of the color changing absorbent material 807, will change from a first color 813 to a second color 817 upon coming into contact with the constituent parts 811.

Moreover, upon being absorbed by the color changing absorbent material 807, the constituent parts 811 are permanently bound to the color changing absorbent material 807 thereafter. Thus, even if the predetermined stimulus is removed and the expelled liquid 815 is subsequently reabsorbed by the shrunken stimulus sensitive gel 820 so as to become a partially or fully re-swollen stimulus sensitive gel 810, those constituent parts 811 remain bound to or trapped in the color changing absorbent material 807, and thus that color changing absorbent material 807 permanently remains colored the second color 817.

It should be noted that by manipulating the permeability of the permeable membrane 830 connecting the first compartment 802 to the second compartment 804, the time required for expelled liquid 815 to move from the second compartment 804 into the first compartment 802 can be varied. Such manipulation of the permeable membrane 830 includes increasing or decreasing its thickness and/or increasing or decreasing its surface area facing the first compartment 802 and/or second compartment 804 and/or increasing or decreasing its wicking ability, so as to control the speed at which the expelled liquid 815 and the constituent parts 811 travel from the second compartment 804, through the permeable membrane 830, and enter the first compartment 802.

An advantage of using such an embodiment of the stimulus indicating device 800 is that both the exposure to a predetermined stimulus as well as the time of exposure can be indicated. As an example, if the predetermined stimulus occurs for just a short period of time, and is removed before the expelled liquid 815 and constituent parts 811 have completely moved from the second compartment 804 through the permeable membrane 830 and into the first compartment 802, then the expelled liquid 815 and constituent parts 811 will be wicked or drawn back into the second compartment 804 by the shrunken stimulus sensitive gel 820 as the shrunken stimulus sensitive gel 820 re-expands or swells as a result of simply removing the predetermined stimulus. The reason this happens is because the permeable membrane 830 allows the expelled liquid and expelled constituent parts to pass into both directions. And so in this case, no irreversible indication of exposure to the predetermined stimulus will be indicated by color changing absorbent material 807 because the time of exposure to the predetermined stimulus was too brief to enable enough expelled liquid 815 and enough constituent parts 811 to pass completely through the permeable membrane 830, react with the color changing absorbent material 807, and cause it to change from a first color 813 to a second color 817.

It should be noted that it is not necessary for the swollen stimulus sensitive gel 810 to collapse or shrink entirely in order for the color change in the color changing absorbent material 807 to be visible to the user. Instead, even if a portion of the color changing absorbent material 807 changes color so as to be visible to the user through the indicator window 812, that is enough to signal to the user that the product attached to the stimulus indicating device 800 had been exposed to a potentially harmful stimulus. More specifically, although the decrease in volume of the swollen stimulus sensitive gel 810 in all of the embodiments of the stimulus indicating device 800 discussed herein can be by any amount so long as it is registerable, preferably the decrease in volume of the swollen stimulus sensitive gel 810 would be between at least a $\frac{1}{10}$ reduction in original volume, and up to a 500 times decrease in original volume. In regard to all embodiments of the stimulus indicating device 800 discussed herein as they pertain to the decrease in the volume being "registerable" what is meant is that the volume change of the swollen stimulus sensitive gel 810 expels enough liquid 814 and constituent parts 811 from the swollen stimulus sensitive gel 810 to cause the swollen stimulus sensitive gel 810 to collapse or shrink enough so that it permanently causes at least a partial color change in the color changing absorbent material 807 from a first color 813 to a second color 817 (e.g., a change in color from a first color to a second color) or indication (e.g., a portion of the color changing absorbent material 807 contains a glyph, such as an "X" or "skull and cross bones" that is revealed because of a color change) occurs in the stimulus indicating device 800, and is visible via the indicator window 812, and indicates to the user that the product had been exposed to a predetermined stimulus.

In regard to all the embodiments of the stimulus indicating device discussed herein being "irreversible" and "permanent," what is meant is that once the stimulus indicating device provides an indication of exposure to an adverse stimulus extreme (which is also referred to herein as a predetermined stimulus), that exposure indication does not change, even though the adverse stimulus extreme or predetermined stimulus might be removed in the future. In an alternative of this embodiment with a permeable membrane 830, the color changing absorbent material 807 could be pH-indicator strips manufactured by EMD Chemicals Inc. These pH-indicator strips can react to and indicate exposure to constituent parts 811 such as and by way of example only, $H^+$ ion, by permanently changing from a first color 813 to a second color 817. Preferably the pH-indicator strips are manufactured in such a way that there is a noticeable spectrum of colors that match the range of possible pH concentrations. For example, the first color 813 of the color changing absorbent material 807 could be colored red prior to the stimulus indicating device 800 being exposed to a predetermined stimulus. Then upon exposure to the predetermined stimulus, the swollen stimulus sensitive gel 810 would expel liquid 814 and constituent parts 811 (by way of example only $H^+$) which, upon contact with the color changing absorbent material 807, causes the color changing absorbent material 807 to change to a second color 817, such as blue. Altering the pH of the expelled liquid 815 and the content of the constituent parts 811 (by way of example only $H^+$) will allow the first color 813 and second color 817 of the color changing absorbent material 807 to be manipulated. For example, if the swollen stimulus sensitive gel 810 was manufactured so that it was swollen with an aqueous solution of either high pH (for example a pH of 14), or low pH (for example a pH of 1), the most significant color contrast can be achieved between the first color 813 and second color 817 of the color changing absorbent material 807.

As shown in FIG. 8A and discussed herein, this embodiment of the irreversible stimulus indicating device 800 would have at least two compartments 802 and 804. In this alternative embodiment the color changing absorbent material 807 is preferably located within the first compartment 802 and is positioned below the indicator window 812, so that at least a portion of the color changing absorbent material 807 can be seen through the indicator window 812. Preferably the swollen stimulus sensitive gel 810 is located in the second compartment 804 and is kept separate from the color changing absorbent material 807 by the permeable membrane 830. Although the swollen stimulus sensitive gel 810 is preferably hidden from the user below the paint applied to the top portion 816 of the stimulus sensitive device 800, it could also be visible to the user. If the swollen stimulus sensitive device 800 were visible to the user, it is preferred that it be the same color as the color changing absorbent material 807 prior to the color changing absorbent material 807 coming into contact with the constituent parts 811.

If the color changing absorbent material 807 has the ability to wick liquid 814 and/or constituent parts 811 from the swollen stimulus sensitive gel 810 simply by the color changing absorbent material 807 being in contact with the swollen sensitive gel 810, then it is preferred that the permeable membrane 830 be used to keep the color changing absorbent material 807 and the swollen stimulus sensitive gel 810 physically apart from each other. Thus, in this alternative embodiment the swollen stimulus sensitive gel 810 is physically separated from the color changing absorbent material 807 by the permeable membrane 830 to prevent the liquid 814 and the constituent parts 811 contained in the swollen stimulus sensitive gel 810 from being wicked into the color changing absorbent material 807. Doing so prevents the stimulus sensitive device 800 from giving a false indication of exposure to a predetermined stimulus.

Although employing an embodiment with a permeable membrane 830 reduces, or depending on the size of the shrunken stimulus sensitive gel 820, eliminates the need for attaching or securing the stimulus sensitive gel 810 and 820 within the stimulus indicating device 800, it may still be preferable for the stimulus sensitive gel 810 and 820 to be fixed or secured at the attachment point 818 in the second compartment 804, or at more than one attachment point if desired. Preferably, the stimulus sensitive gel 810 and 820 would be fixed or secured at the attachment point 818, or at more than one attachment point if desired. The stimulus sensitive gel 810 and 820 may be fixed to the attachment point 818 with a suitable epoxy, glue, or it could be heat stamped upon creation of the stimulus indicating device 800. Attaching the stimulus sensitive gel 810 and 820 to the attachment point 818 helps to ensure that the stimulus sensitive gel 810 and 820 collapses or shrinks in a desired direction—preferably away from the color changing absorbent material 807 and the indicator window 812. Moreover, by securing or fixing the stimulus sensitive gel 810 and 820 to the attachment point ensures that the stimulus sensitive gel 810 and 820 does not cover the color changing absorbent material 807 after it had changed from a first color to a second color. Securing or fixing the stimulus sensitive gel 810 and 820 to the attachment point 818 prevents the stimulus sensitive gel 810 and 820 from floating or moving within the compartment and covering up the color changing absorbent material 807 at all times.

It should be noted that the predetermined temperature discussed herein that causes the swollen stimulus sensitive gel 810 to undergo its phase transition is only one example of a predetermined stimulus or trigger stimulus that will cause the inventive stimulus sensitive gel 810 and 820 to undergo its phase transition. For example, the swollen stimulus sensitive gel 810 of this preferred embodiment could trigger or undergo its phase transition upon exposure to a predetermined stimulus such as a predetermined pH level, or the swollen stimulus sensitive gel 810 of this preferred embodiment could trigger or undergo its phase transition upon exposure to a predetermined level of electromagnetic radiation.

All embodiments discussed herein of the stimulus indicating device 800 containing the swollen stimulus sensitive gel 810 and the shrunken stimulus sensitive gel 820 may be based on any type of stimulus sensitive gel that undergoes a phase transition upon exposure of the stimulus sensitive gel to a predetermined stimulus. The preferred types of stimulus sensitive gels include poly(acrylamide-co-acrylic acid) (PAAm-co-AA) gel, a poly(acrylamide-co-sodium vinyl acrylate) (PAAm-co-SVA) gel, and/or its variations such as Poly(N-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the direction of the volume change in the stimulus sensitive gel 810 and 820 used in all the embodiments of the stimulus indicating device 800 discussed herein can be selected so as to correlate to a specific situation. For example, one of ordinary skill will appreciate and understand that if the stimulus sensitive gel in this embodiment is swollen at the beginning of its use as it undergoes its phase transition, it will collapse or shrink, thereby causing a change in color or indication in the stimulus indicator 800. Alternatively, the stimulus sensitive gel could start out collapsed or shrunken, but upon exposure to its predetermined stimulus it would permanently expand or swell and cause a change in color or indication in the stimulus indicator 100. By way of example only and as disclosed herein and in prior applications, a stimulus sensitive gel 810 and 820 can be of the "Upper Critical Solution Temperature" or UCST type gel, or can be of the "Lower Critical Solution Temperature" or LCST type gel. As one of ordinary skill in the art will appreciate, a UCST type stimulus sensitive gel, such as PAAm-co-SVA gels, could be used when one wishes to have an initially swollen stimulus sensitive gel collapse or shrink when cooled below a predetermined or trigger temperature and thereby: i) reveal an indicator spot; or ii) expel liquid and/or constituent parts, both of which result in the stimulus indicating device exhibiting a change in color or indication. A UCST type gel could also be used when one wishes to have an initially shrunken stimulus sensitive gel expand or swell when it is heated beyond a predetermined stimulus, and thereby: i) cover an indicator spot; or ii) collect liquid and/or constituent parts, both of which result in the stimulus indicating device exhibiting a change in color or indication. Alternatively, an LCST type stimulus sensitive gel, such as PNIPAAm gels, could be used when one wishes to have an initially swollen stimulus sensitive gel collapse or shrink when heated above a predetermined or trigger temperature and thereby: i) reveal an indicator spot; or ii) expel liquid and/or constituent parts, both of which result in the stimulus indicating device exhibiting a change in color or indication. An LCST type gel could also be used when one wishes to have an initially shrunken stimulus sensitive gel expand or swell when it is cooled below a predetermined stimulus, and thereby: i) cover an indicator spot; or ii) collect liquid and/or constituent parts, both of which result in the stimulus indicating device exhibiting a change in color or indication.

One of ordinary skill in the art will understand that although the stimulus sensitive gel 810 and 820 discussed herein in regard to all embodiments of the stimulus indicating device 800 may be of the UCST type of gel (i.e., the swollen stimulus sensitive gel 810 will collapse or shrink upon exposure to its predetermined stimulus of a cooler temperature, and become the shrunken stimulus sensitive gel 820; as well as expand or swell upon exposure to its predetermined stimulus of a warmer temperature, and become the swollen stimulus sensitive gel 810), the range and scope of this invention includes and envisions the swollen stimulus sensitive gel 810 and the shrunken stimulus sensitive gel 820 also being of the LCST type of gel. Moreover, it should be noted that all the variations of the different embodiments discussed herein can be combined with the variations of other embodiments described herein and that are known in the art, as would be understood to one of ordinary skill in the art.

The behavior of the UCST gels and the LCST gels depends on their chemical structure. Many examples of both kinds of polymers are known in the literature. For example, if the stimulus sensitive gel 810 and 820 employed in all the embodiments of the stimulus indicating device 800 discussed herein were made of UCST type stimulus sensitive gels, it could be any number of such UCST gels, including: i) i) an interpenetrating network of polyacrylamide (PAAm) and polyacrylic acid (PAAc) or IPN-PAAm-PAAc; or ii) Acrylamide copolymerized with sodium vinyl acrylate (SVA) gel to result in the creation of PAAm-co-SVA gel; or iii) their derivates, and as described in Tanaka, "Gels," Scientific American 244 (1981) at 124-138 and Tanaka, "Phase Transitions in Ionic Gels," Physical Review Letters 45 (1980) at 1636-1639, the predetermined "trigger" stimulus at which a UCST gel undergoes its phase transition, and thereby expels the liquid 814 and constituent parts 811 and thus collapses or shrinks in volume, can be "tuned" to a particular value by changing the solvent trapped in the gel polymer matrix in addition to introducing salts, surfactants, or other substances to the gel matrix. Such "tuning" in regard to UCST type gels is discussed herein and in U.S. Pat. No. 5,100,933. Similarly, if the stimulus sensitive gel 810 and 820 employed in all the embodiments of the stimulus indicating device 800 discussed herein were made of LSCT type stimulus sensitive gels, it could be any number of such LCST gels, including PNIPAAm gels, and as described in U.S. Pat. No. 4,732,930 in regard to PNIPAAm LCST type gels, the predetermined stimulus, such as temperature at which a stimulus sensitive gel 810 and 820 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Nonionic Poly(N-isopropylacrylamide) Gel" Macromolecules volume 26 at 5045 to 5048.

Regardless of whether LCST type stimulus sensitive gels or UCST type stimulus sensitive gels are used to indicate exposure to a predetermined stimulus, what is important is that the change in volume of the stimulus sensitive gel be tailored to the application in which the stimulus indicator is being used. For example, a change in volume of the stimulus sensitive gel 810 and 820, and thus the corresponding expulsion of liquid 814 and constituent parts 811 can be insignificant or it can be dramatic. If the desired visual indication as the result of the swollen stimulus sensitive gel 810 expelling its liquid 814 and its constituent parts 811 is to cause most or all of the color changing absorbent material 807 to turn a second color, then a large change in volume is preferred.

Figure 9A:
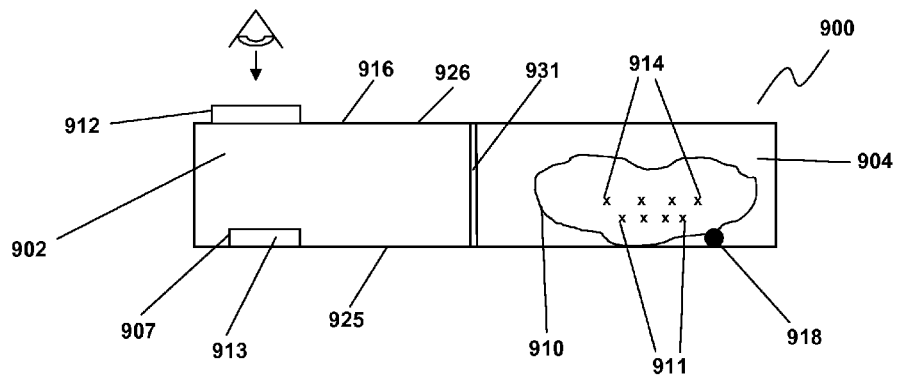
FIG. 9A is a side cross-sectional view of an embodiment of the invention before exposure to a predetermined trigger stimulus.
Figure 9B:
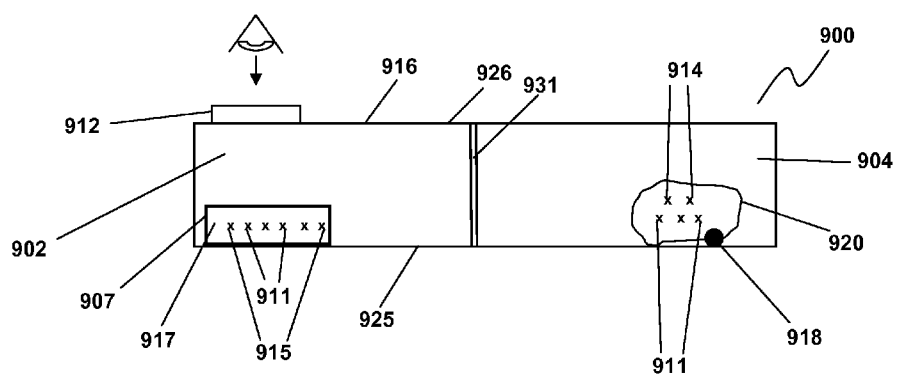
FIG. 9B is a side cross-sectional view of the embodiment in FIG. 9A after exposure to a predetermined trigger stimulus.
Figure 9C:
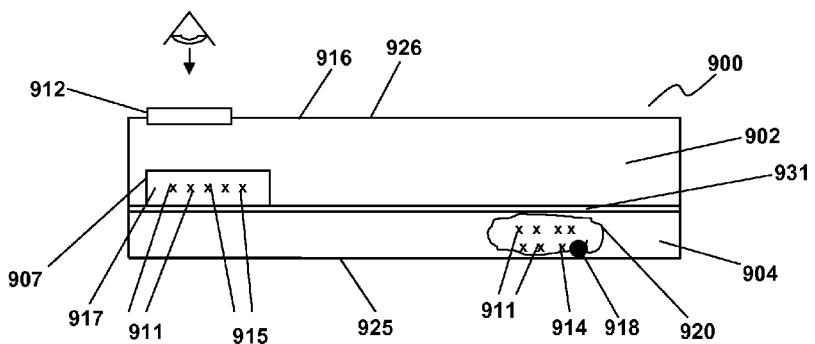
FIG. 9C is an alternate side cross-sectional view of the embodiment in FIG. 9A after exposure to a predetermined trigger stimulus.

8. Embodiments with Two Compartments with Semi-Permeable Membrane and Absorbent Material In accordance with the purpose of certain embodiments of the invention, as embodied and broadly described herein and in conjunction with FIG. 9A through FIG. 9C as well as FIG. 2A through FIG. 2F, an alternative embodiment of the inventive stimulus indicating device could be a multi-compartment device 900 could be used to keep the color changing absorbent material 907 and the liquid 914 and constituent parts 911 contained in the swollen stimulus sensitive gel 910, separate from each other, and preferably it does not contain the liquid bath of the preferred embodiment. More specifically, as shown in FIG. 9A and FIG. 9C, the color changing absorbent material 907 is in the first compartment 902 and can be viewed through an indicator window 912. The swollen stimulus sensitive gel 910 is in the second compartment 904. Although this embodiment is described in terms of the stimulus sensitive gel preferably being swollen initially, as discussed herein in regard to stimulus sensitive gels, one of ordinary skill in the art would appreciate that the same invention can be achieved with an initially shrunken stimulus sensitive gel that draws out constituent parts from the color changing absorbent material and uses them to expand or swell upon exposure to a predetermined stimulus so as to result in a color change.

The first compartment 902 and the second compartment 904 are formed by the backing layer 925 on the bottom of the stimulus indicating device 900 and an upper layer 926 on the top of the stimulus indicating device 900. The first compartment 902 and the second compartment 904 are additionally formed and differentiated from one another by a semi-permeable membrane 931. The semi-permeable membrane 931 is designed to allow the expelled liquid 915 and constituent parts 911 to pass from the second compartment 904 into the first compartment 902, but as explained herein, only allow the expelled liquid 915 to return to the second compartment 904 from the first compartment 902, thereby trapping the constituent parts 911 in the first compartment 902.

Alternatively, as shown in FIG. 9C an alternate embodiment could position the first compartment 902 above the second compartment 904 separated by the permeable membrane 930. Other shapes are contemplated within the scope of the invention as previously described in prior applications.

Prior to exposure to a predetermined stimulus, in this embodiment a swollen stimulus sensitive gel 920 is contained in only the second compartment 904. And prior to exposure of the stimulus indicating device 900 to a predetermined stimulus, the color changing absorbent material 907 is a first color, visible through the indicator window 912 or display portion 912.

Both the backing layer 925 and the upper layer 926 may be constructed of a strong, resilient leak-proof material, such as plastic or other polymer material, so as to provide for the twisting or bending that might occur during transportation of the stimulus sensitive product without tearing, breaking or leaking. The backing layer 925 and the upper layer 926 may also be made of a material that preferably allows them to be joined and sealed together, such as by heat stamping or other suitable means. The backing layer 925 and the upper layer 926 can both approximate the length and width of the first compartment 902 plus the length and width of the second compartment 904, although variations in these dimensions are within the scope of the present invention. The upper layer 926 can preferably be made of a clear material, such as plastic, so that the user of the stimulus indicating device 900 can view at least some portion of the backing material or color changing absorbent material 907. The upper layer 926 can also be able to accept paint or ink so as to allow for coloring or concealing at least some portion of the first compartment 902.

Although some portion of the upper layer 926 can also accept paint or ink for coloring, it is preferable that the indicator window 912 portion of the upper layer 926 remains free from ink or coloring so that the user of the stimulus indicating device 900 can observe the first compartment 902 through the indicator window 912 as explained herein. The backing layer 925 should also be able to accept paste, glue or other suitable adhesive on the surface not facing the first compartment 902, so as to allow it to be directly or indirectly attached to a stimulus sensitive product.

By way of example only, the color changing absorbent material 907 could be divalent cation indicator paper, litmus paper or any equivalent absorbent material that is reactive to a certain ion, element or similar substance. In regard to all the embodiments of the stimulus indicating device discussed herein being "reactive," what is meant is that the color changing absorbent material 907 should change its observable properties (by way of example only, its size, its color, etc.) in reaction to coming into contact with the constituent parts 911 expelled from the swollen stimulus sensitive gel 910 as described herein. Thus it is important that the color changing absorbent material 907 has both an affinity for the expelled liquid 915 and constituent parts 911 previously contained in, and expelled from, the swollen stimulus sensitive gel 910; and that at least a portion of the color changing absorbent material 907 changes properties upon coming into contact with the expelled liquid 915 and constituent parts 911, so as to change from a first color to a second color. Preferably the color changing absorbent material 907 can operate in a semi-quantitative capacity.

In this alternative embodiment, the color changing absorbent material 907 is a divalent cationic paper that is reactive to constituent parts 911 such as by way of example only, divalent cations (by way of example only, $Mg^{2+}$ or $Ca^{2+}$). As discussed herein, a suitable color changing absorbent material 907, such as a total-hardness indicator paper or test stick will indicate a change from a first color 913 to a second color 917 upon exposure to constituent parts 911 carried by the expelled liquid 915 after both are expelled from the swollen stimulus sensitive gel 910. Examples of such divalent cationic paper that can be used as the color changing absorbent material 907 includes a total-hardness indicator paper or test stick that is available from Sigma-Aldrich under the tradename QUANTOFIX®, is manufactured by Macherey-Nagel under the tradename Aquadur®, and that changes color from blue to red upon coming into contact with expelled liquid 915 containing the constituent parts 911 (by way of example only, $Mg^{2+}$ or $Ca^{2+}$). Preferably the color changing absorbent material 907 operates in at least a semi-quantitative capacity.

As discussed herein, one method for incorporating the constituent parts 911 that are reactive with the color changing absorbent material 907 is to swell the swollen stimulus sensitive gel 910 in a bath containing constituent parts 911 that are specifically reactive with the selected color changing absorbent material 907, including by way of example only, divalent cation salts (by way of example only, $Mg^{2+}$ or $Ca^{2+}$ salts), and/or varying concentrations of $H^+$.

In this alternative embodiment, as the swollen stimulus sensitive gel 910 undergoes its phase transition in reaction to exposure to a predetermined stimulus, its volume changes by collapsing or shrinking due at least to a portion of the liquid 914 and constituent parts 911 (by way of example only, $Mg^{2+}$) contained in the polymer network of the swollen stimulus sensitive gel 910 being expelled. As the swollen stimulus sensitive gel 910 expels even a portion of the liquid 914 and the constituent parts 911, it collapses and shrinks so that it resembles the shrunken stimulus sensitive gel 920 shown in FIG. 9. Once a portion of the liquid 914 and the constituent parts 911 are expelled from the swollen stimulus sensitive gel 910, the expelled liquid 915 and the expelled constituent parts 911 subsequently come into contact with and are absorbed by the color changing absorbent material 907.

Once the liquid 914 and the constituent parts 911 are expelled from the swollen stimulus sensitive gel 910, they pass through the semi-permeable membrane 931 of the stimulus indicating device 900, they come into contact with and are absorbed by the color changing absorbent material 907. Because of the design of the color changing absorbent material 907, as the constituent parts 911 are absorbed by the color changing absorbent material 907, the color changing absorbent material 907 changes from a first color 913 to a second color 917 due to the reaction between chemical moieties on the color changing absorbent material 907 and the constituent parts 911 carried by the expelled liquid 915. Because of the design of the color changing absorbent material 907, at least part of the color changing absorbent material 907, and preferably all of the color changing absorbent material 907, will change from a first color 913 to a second color 917 upon coming into contact with the constituent parts 911.

Moreover, upon being absorbed by the color changing absorbent material 907, the constituent parts 911 are permanently bound to the color changing absorbent material 907 thereafter. Thus, even if the predetermined stimulus is removed and the expelled liquid 915 is subsequently reabsorbed by the shrunken stimulus sensitive gel 920 so as to become a partially or fully re-swollen stimulus sensitive gel 910, those constituent parts 911 remain bound to or trapped in the color changing absorbent material 907, and thus that color changing absorbent material 907 permanently remains colored the second color 917.

It should be noted that by manipulating the permeability of the semi-permeable membrane 931 connecting the first compartment 902 to the second compartment 904, the time required for the expelled liquid 915 to move from the second compartment 904 into the first compartment 902 can b varied. Such manipulation of the semi-permeable membrane 931 includes increasing or decreasing its thickness and/or increasing or decreasing its surface area facing the first compartment 902 and/or second compartment 904 and/or increasing or decreasing its wicking ability, so as to control the speed at which the expelled liquid 915 and the constituent parts 911 travel from the second compartment 904, through the semi-permeable membrane 931, and enter the first compartment 902.

There is a difference between the permeable membrane 930 discussed herein and the semi-permeable membrane 931 discussed herein that needs to be appreciated. The permeable membrane 930 allows the expelled liquid 915 and constituent parts 911 to repeatedly travel freely from the second compartment 904 into the first compartment 902, and then back again into the second compartment 904. In comparison, the semi-permeable membrane 931 would preferably be designed so that it not only allows the constituent parts 911 (by way of example only, the $Mg^{2+}$) contained in the expelled liquid 915 to pass from the at least second compartment 904 into the first compartment 902, but it would prevent the constituent parts 911 (by way of example only, the $Mg^{2+}$) from passing back into the at least second compartment 904 from the first compartment 902. The semi-permeable membrane 931 could also prohibit the expelled liquid 915 from traveling back into the second compartment 904, but doing so is not as important as trapping the constituent parts 911 in the first compartment 902.

An advantage of using such an embodiment of the stimulus indicating device 900 is that both the exposure to a predetermined stimulus as well as the time of exposure can be indicated. As an example, if the predetermined stimulus occurs for just a short period of time, and is removed before the expelled liquid 915 and constituent parts 911 have completely moved from the second compartment 904 through the semi-permeable membrane 931 and into the first compartment 902, semi-permeable membrane 931 will not allow the expelled liquid 915 and constituent parts 911 to be wicked or drawn back into the second compartment 904 by the shrunken stimulus sensitive gel 920 as the shrunken stimulus sensitive gel 920 re-expands or swells as a result of the predetermined stimulus being removed.

The reason this happens is because the semi-permeable membrane 931 does not allow the expelled liquid 915 and expelled constituent parts 911 to pass in both directions. And so in this case, an irreversible indication of exposure to the predetermined stimulus will be indicated by color changing absorbent material 907, even though the entire amount of constituent parts 911 did not pass entirely through the semi-permeable membrane 931, react with the color changing absorbent material 907, and cause it to change from a first color 913 to a second color 917.

It should be noted that it is not necessary for the swollen stimulus sensitive gel 910 to collapse or shrink entirely in order for the color change in the color changing absorbent material 907 to be visible to the user. Instead, if even a portion of the color changing absorbent material 907 changes color so as to be visible to the user through the indicator window 912, that is enough to signal to the user that the product attached to the stimulus indicating device 900 had been exposed to a potentially harmful stimulus. More specifically, although the decrease in volume of the swollen stimulus sensitive gel 910 in all of the embodiments of the stimulus indicating device 900 discussed herein can be by any amount so long as it is registerable, preferably the decrease in volume of the swollen stimulus sensitive gel 910 would be between at least a 1/10 reduction in original volume, and up to a 500 times decrease in original volume. In regard to all embodiments of the stimulus indicating device 900 discussed herein as they pertain to the decrease in the volume being "registerable" what is meant is that the volume change of the swollen stimulus sensitive gel 910 expels enough liquid 914 and constituent parts 911 from the swollen stimulus sensitive gel 910 to cause the swollen stimulus sensitive gel 910 to collapse or shrink enough so that it permanently causes at least a partial color change in the color changing absorbent material 907 from a first color 913 to a second color 917 (e.g., a change in color from a first color to a second color) or indication (e.g., a portion of the color changing absorbent material 907 contains a glyph, such as an "X" or "skull and cross bones" that is revealed because of a color change) occurs in the stimulus indicating device 900, and is visible via the indicator window 912, and indicates to the user that the product had been exposed to a predetermined stimulus.

In regard to all the embodiments of the stimulus indicating device discussed herein being "irreversible" and "permanent," what is meant is that once the stimulus indicating device provides an indication of exposure to an adverse stimulus extreme (which is also referred to herein as a predetermined stimulus), that exposure indication does not change, even though the adverse stimulus extreme or predetermined stimulus might be removed in the future.

In an alternative of this embodiment with a permeable membrane 930, the color changing absorbent material 907 could be pH-indicator strips manufactured by EMD Chemicals Inc. These pH-indicator strips can react to and indicate exposure to constituent parts 911 such as and by way of example only, $H^+$ ion, by permanently changing from a first color 913 to a second color 917. Preferably the pH-indicator strips are manufactured in such a way that there is a noticeable spectrum of colors that match the range of possible pH concentrations. For example, the first color 913 of the color changing absorbent material 907 could be colored red prior to the stimulus indicating device 900 being exposed to a predetermined stimulus. Then upon exposure to the predetermined stimulus, the swollen stimulus sensitive gel 910 would expel liquid 914 and constituent parts 911 (by way of example only $H^+$) which, upon contact with the color changing absorbent material 907, causes the color changing absorbent material 907 to change to a second color 917, such as blue. Altering the pH of the expelled liquid 915 and the content of the constituent parts 911 (by way of example only $H^+$) will allow the first color 913 and second color 917 of the color changing absorbent material 907 to be manipulated. For example, if the swollen stimulus sensitive gel 910 was manufactured so that it was swollen with an aqueous solution of either high pH (for example a pH of 14), or low pH (for example a pH of 1), the most significant color contrast can be achieved between the first color 913 and second color 917 of the color changing absorbent material 907.

As shown in FIG. 9A and discussed herein, this embodiment of the irreversible stimulus indicating device 900 would have at least two compartments 902 and 904. In this alternative embodiment the color changing absorbent material 907 is preferably located within the first compartment 902 and is positioned below the indicator window 912, so that at least a portion of the color changing absorbent material 907 can be seen through the indicator window 12. Preferably the swollen stimulus sensitive gel 910 is located in the second compartment 904 and is kept separate from the color changing absorbent material 907 by the semi-permeable membrane 931. Although the swollen stimulus sensitive gel 910 is preferably hidden from the user below the paint applied to the top portion 916 of the stimulus sensitive device 900, it could also be visible to the user. If the swollen stimulus sensitive gel 910 were visible to the user, it is preferred that it be the same color as the color changing absorbent material 907 prior to the color changing absorbent material 907 coming into contact with the constituent parts 911.

If the color changing absorbent material 907 has the ability to wick liquid 914 and/or constituent parts 911 from the swollen stimulus sensitive gel 910 simply by the color changing absorbent material 907 being in contact with the swollen sensitive gel 910, then it is preferred that the permeable membrane 930 be used to keep the color changing absorbent material 907 and the swollen stimulus sensitive gel 910 physically apart from each other. Thus, in this alternative embodiment the swollen stimulus sensitive gel 910 is physically separated from the color changing absorbent material 907 by the permeable membrane 930 to prevent the liquid 914 and the constituent parts 911 contained in the swollen stimulus sensitive gel 910 from being wicked into the color changing absorbent material 907. Doing so prevents the stimulus sensitive device 900 from giving a false indication of exposure to a predetermined stimulus.

Although employing an embodiment with a semi-permeable membrane 930 reduces, or depending on the size of the shrunken stimulus sensitive gel 920, eliminates the need for attaching or securing the stimulus sensitive gel 910 and 920 within the stimulus indicating device 900, it may still be preferable for the stimulus sensitive gel 910 and 920 to be fixed or secured at the attachment point 918 in the second compartment 904, or at more than one attachment point if desired. Preferably, the stimulus sensitive gel 910 and 920 would be fixed or secured at the attachment point 918, or at more than one attachment point if desired. The stimulus sensitive gel 910 and 920 may be fixed to the attachment point 918 with a suitable epoxy, glue, or it could be heat stamped upon creation of the stimulus indicating device 900. Attaching the stimulus sensitive gel 910 and 920 to the attachment point 918 helps to ensure that the stimulus sensitive gel 910 and 920 collapses or shrinks in a desired direction—preferably away from the color changing absorbent material 907 and the indicator window 912. Moreover, by securing or fixing the stimulus sensitive gel 910 and 920 to the attachment point ensures that the stimulus sensitive gel 910 and 920 does not cover the color changing absorbent material 907 after it had changed from a first color to a second color. Securing or fixing the stimulus sensitive gel 910 and 920 to the attachment point 918 prevents the stimulus sensitive gel 910 and 920 from floating or moving within the compartment and covering up the color changing absorbent material 907 at all times.

It should be noted that the predetermined temperature discussed herein that causes the swollen stimulus sensitive gel 910 to undergo its phase transition is only one example of a predetermined stimulus or trigger stimulus that will cause the inventive stimulus sensitive gel 910 and 920 to undergo its phase transition. For example, the swollen stimulus sensitive gel 910 of this preferred embodiment could trigger or undergo its phase transition upon exposure to a predetermined stimulus such as a predetermined pH level, or the swollen stimulus sensitive gel 910 of this preferred embodiment could trigger or undergo its phase transition upon exposure to a predetermined level of electromagnetic radiation.

All embodiments discussed herein of the stimulus indicating device 900 containing the swollen stimulus sensitive gel 910 and the shrunken stimulus sensitive gel 920 may be based on any type of stimulus sensitive gel that undergoes a phase transition upon exposure of the stimulus sensitive gel to a predetermined stimulus. The preferred types of stimulus sensitive gels include poly(acrylamide-co-acrylic acid) (PAAm-co-AA) gel, a poly(acrylamide-co-sodium vinyl acrylate) (PAAm-co-SVA) gel, and/or its variations such as Poly(N- isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the direction of the volume change in the stimulus sensitive gel 910 and 920 used in all the embodiments of the stimulus indicating device 900 discussed herein can be selected so as to correlate to a specific situation. For example, one of ordinary skill will appreciate and understand that if the stimulus sensitive gel in this embodiment is swollen at the beginning of its use as it undergoes its phase transition, it will collapse or shrink, thereby causing a change in color or indication in the stimulus indicator 900. Alternatively, the stimulus sensitive gel could start out collapsed or shrunken, but upon exposure to its predetermined stimulus it would permanently expand or swell and cause a change in color or indication in the stimulus indicator 100. By way of example only and as disclosed herein and in prior applications, a stimulus sensitive gel 910 and 920 can be of the "Upper Critical Solution Temperature" or UCST type gel, or can be of the "Lower Critical Solution Temperature" or LCST type gel. As one of ordinary skill in the art will appreciate, a UCST type stimulus sensitive gel, such as PAAm-co-SVA gels, could be used when one wishes to have an initially swollen stimulus sensitive gel collapse or shrink when cooled below a predetermined or trigger temperature and thereby: i) reveal an indicator spot; or ii) expel liquid and/or constituent parts, both of which result in the stimulus indicating device exhibiting a change in color or indication. A UCST type gel could also be used when one wishes to have an initially shrunken stimulus sensitive gel expand or swell when it is heated beyond a predetermined stimulus, and thereby: i) cover an indicator spot; or ii) collect liquid and/or constituent parts, both of which result in the stimulus indicating device exhibiting a change in color or indication. Alternatively, an LCST type stimulus sensitive gel, such as PNIPAAm gels, could be used when one wishes to have an initially swollen stimulus sensitive gel collapse or shrink when heated above a predetermined or trigger temperature and thereby: i) reveal an indicator spot; or ii) expel liquid and/or constituent parts, both of which result in the stimulus indicating device exhibiting a change in color or indication. An LCST type gel could also be used when one wishes to have an initially shrunken stimulus sensitive gel expand or swell when it is cooled below a predetermined stimulus, and thereby: i) cover an indicator spot; or ii) collect liquid and/or constituent parts, both of which result in the stimulus indicating device exhibiting a change in color or indication.

One of ordinary skill in the art will understand that although the stimulus sensitive gel 910 and 920 discussed herein in regard to all embodiments of the stimulus indicating device 900 may be of the UCST type of gel (i.e., the swollen stimulus sensitive gel 910 will collapse or shrink upon exposure to its predetermined stimulus of a cooler temperature, and become the shrunken stimulus sensitive gel 920; as well as expand or swell upon exposure to its predetermined stimulus of a warmer temperature, and become the swollen stimulus sensitive gel 910), the range and scope of this invention includes and envisions the swollen stimulus sensitive gel 910 and the shrunken stimulus sensitive gel 920 also being of the LCST type of gel. Moreover, it should be noted that all the variations of the different embodiments discussed herein can be combined with the variations of other embodiments described herein and that are known in the art, as would be understood to one of ordinary skill in the art.

The behavior of the UCST gels and the LCST gels depends on their chemical structure. Many examples of both kinds of polymers are known in the literature. For example, if the stimulus sensitive gel 910 and 920 employed in all the embodiments of the stimulus indicating device 900 discussed herein were made of UCST type stimulus sensitive gels, it could be any number of such UCST gels, including: i) an interpenetrating network of polyacrylamide (PAAm) and polyacrylic acid (PAAc) or IPN-PAAm-PAAc; or ii) Acrylamide copolymerized with sodium vinyl acrylate (SVA) gel to result in the creation of PAAm-co-SVA gel; or iii) their derivates, and as described in Tanaka, "Gels," Scientific American 244 (1981) at 124-138 and Tanaka, "Phase Transitions in Ionic Gels," Physical Review Letters 45 (1980) at 1636-1639, the predetermined "trigger" stimulus at which a UCST gel undergoes its phase transition, and thereby expels the liquid 914 and constituent parts 911 and thus collapses or shrinks in volume, can be "tuned" to a particular value by changing the solvent trapped in the gel polymer matrix in addition to introducing salts, surfactants, or other substances to the gel matrix. Such "tuning" in regard to UCST type gels is discussed herein and in U.S. Pat. No. 5,100,933. Similarly, if the stimulus sensitive gel 910 and 920 employed in all the embodiments of the stimulus indicating device 900 discussed herein were made of LSCT type stimulus sensitive gels, it could be any number of such LCST gels, including PNIPAAm gels, and as described in U.S. Pat. No. 4,732,930 in regard to PNIPAAm LCST type gels, the predetermined stimulus, such as temperature at which a stimulus sensitive gel 910 and 920 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Nonionic Poly(N-isopropylacrylamide) Gel" Macromolecules volume 26 at 5045 to 5048.

Regardless of whether LCST type stimulus sensitive gels or UCST type stimulus sensitive gels are used to indicate exposure to a predetermined stimulus, what is important is that the change in volume of the stimulus sensitive gel be tailored to the application in which the stimulus indicator is being used. For example, a change in volume of the stimulus sensitive gel 910 and 920, and thus the corresponding expulsion of liquid 914 and constituent parts 911 can be insignificant or it can be dramatic. If the desired visual indication as the result of the swollen stimulus sensitive gel 910 expelling its liquid 914 and its constituent parts 911 is to cause most or all of the color changing absorbent material 907 to turn a second color, then a large change in volume is preferred.

9. Embodiments with Absorbent Material as the Permeable or Semi-Permeable Membrane In accordance with the purpose of certain embodiments of the invention, as embodied and broadly described herein and in conjunction with FIG. 10A through FIG. 10C as well as FIG. 2A through FIG. 2F, in an alternative embodiment of the inventive stimulus indicating device 1000 the semi-permeable membrane 1033 could act as the color changing absorbent material in that its wicking ability could be set so as to allow the expelled liquid 1015 and constituent parts 1011 to not only migrate through it at a controlled pace, but to signal exposure to a predetermined stimulus by having the semi-permeable membrane 1033 change color as well, either due to reacting to the expelled liquid 1015 or due to reacting to the constituent parts 1011 or due to absorbing the colored constituent parts 1011 that causes a change in the color of the semi-permeable membrane 1033 from a first color 1013 to a second color 1017, even if it is only a partial change in color as shown in FIG. 10B. An example of such an embodiment, which is incorporated herein by reference, is U.S. Pat. No. 3,962,920. Although this embodiment is described in terms of the stimulus sensitive gel preferably being swollen initially, as discussed herein in regard to stimulus sensitive gels, one of ordinary skill in the art would appreciate that the same invention can be achieved with an initially shrunken stimulus sensitive gel that draws out constituent parts from the color changing absorbent material and uses them to expand or swell upon exposure to a predetermined stimulus so as to result in a color change.

In this alternative embodiment, a device with at least a first compartment 1002 could contain the color changing absorbent material in the form of a semi-permeable membrane 1033. As discussed herein the semi-permeable membrane 1033 only allows the constituent parts 1011 and/or expelled liquid 1015 to pass in one direction, although other embodiments are envisioned to include aspects or components of other embodiments discussed herein or in prior applications.

Preferably the semi-permeable membrane 1033 fits snugly within the at least first component 1002 of the stimulus indicating device 1000 so as to prevent the expelled liquid 1015 and constituent parts 1011 (both of which are expelled from the swollen stimulus sensitive gel 1010 as it undergoes its phase transition in response to exposure to a predetermined stimulus) from passing onto the top of the semi-permeable membrane 1033 and prematurely turning the semi-permeable membrane 1033 to its second color 1017. Preferably, the end of the semi-permeable membrane 1033 that faces away from the indicator window 1012 will be large enough so as to create a water-tight seal 650 between the top of the semi-permeable membrane 1033 with the top portion 1026; and between the bottom of the semi-permeable membrane 1033 with the backing layer 1025.

Figure 10A:
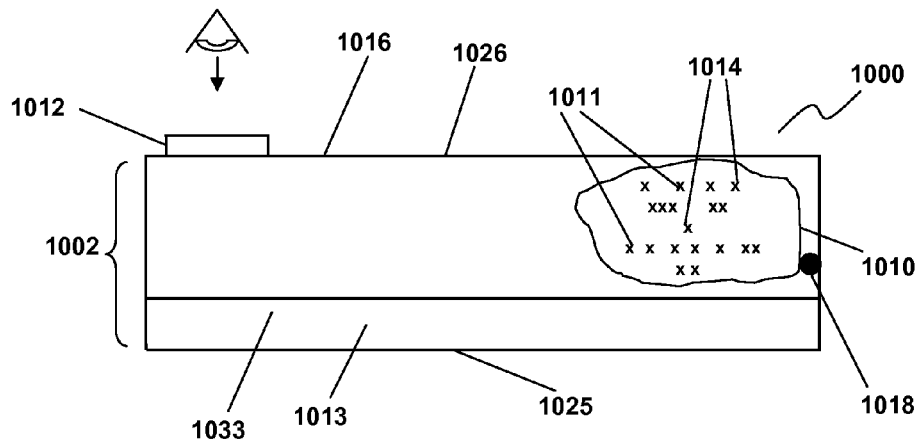
FIG. 10A is a side cross-sectional view of an embodiment of the invention before exposure to a predetermined trigger stimulus.
Figure 10B:
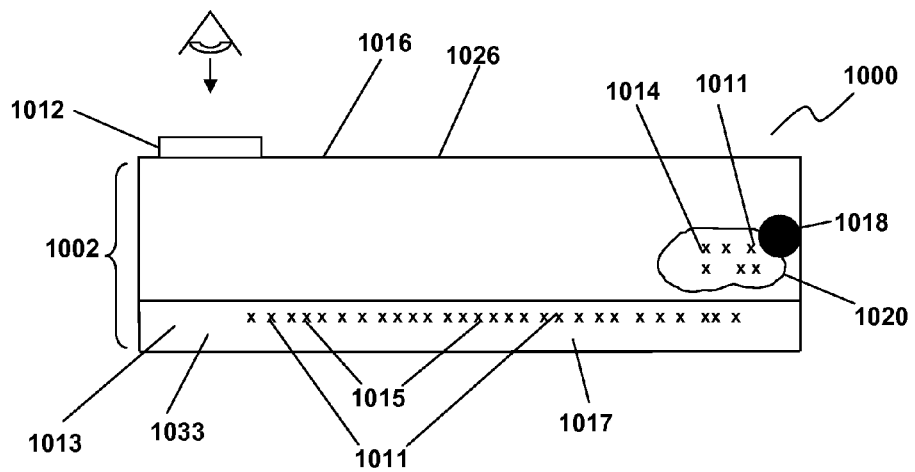
FIG. 10B is a side cross-sectional view of the embodiment in FIG. 10A after exposure to a predetermined trigger stimulus.
Figure 10C:
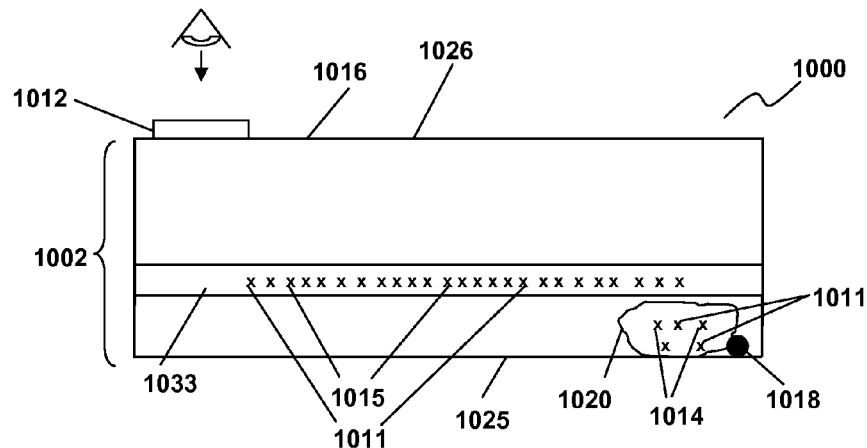
FIG. 10C is an alternate side cross-sectional view of an embodiment of the invention after exposure to a predetermined trigger stimulus.

As shown in FIG. 10A and FIG. 10B, the color changing absorbent material 1007 in the at least first compartment 1002 is initially a first color and can be viewed through an indicator window 1012. The first compartment 1002 is formed by the backing layer 1025 on the bottom of the stimulus indicating device 1000 and an upper layer 1026 on the top of the stimulus indicating device 1000. Preferably the semi-permeable membrane 1033 does not wick the liquid 1014 or the constituent parts 1011 out of the swollen stimulus sensitive gel 1010; alternately the semi-permeable membrane 1033 is not in physical contact with the swollen stimulus sensitive gel 1010 and thus cannot wick the liquid 1014 or the constituent parts 1011 out of the swollen stimulus sensitive gel 1010.

The semi-permeable membrane 1033 in both structures of this embodiment is designed to allow the expelled liquid 1015 and constituent parts 1011 to migrate through the semi-permeable membrane 1033 and in doing so cause the semi-permeable membrane to change from a first color to a second color as discussed herein.

Prior to exposure of the stimulus indicating device 1000 to a predetermined stimulus, the color changing absorbent material 1007 is a first color 1013, visible through the indicator window 1012 or display portion 1012.

Both the backing layer 1025 and the upper layer 1026 may be constructed of a strong, resilient leak-proof material, such as plastic or other polymer material, so as to provide for the twisting or bending that might occur during transportation of the stimulus sensitive product without tearing, breaking or leaking. The backing layer 1025 and the upper layer 1026 may also be made of a material that preferably allows them to be joined and sealed together, such as by heat stamping or other suitable means. The backing layer 1025 and the upper layer 1026 can both approximate the length and width of the first compartment 1002 plus the length and width of the second compartment 1004, although variations in these dimensions are within the scope of the present invention. The upper layer 1026 can preferably be made of a clear material, such as plastic, so that the user of the stimulus indicating device 1000 can view at least some portion of the backing material or semi-permeable membrane 1033. The upper layer 1026 can also be able to accept paint or ink so as to allow for coloring or concealing at least some portion of the first compartment 1002.

Although some portion of the upper layer 1026 can also accept paint or ink for coloring, it is preferable that the indicator window 1012 portion of the upper layer 1026 remains free from ink or coloring so that the user of the stimulus indicating device 1000 can observe the semi-permeable membrane 1033 through the indicator window 1012 as explained herein. The backing layer 1025 should also be able to accept paste, glue or other suitable adhesive on the surface not facing the first compartment 1002, so as to allow it to be directly or indirectly attached to a stimulus sensitive product.

By way of example only, the semi-permeable material 1033 (which is equivalent to the color changing absorbent material discussed herein) could be any material so long as it is reactive to the constituent parts 1011 expelled from the swollen stimulus sensitive gel 1010 as it undergoes its phase transition. In regard to all the embodiments of the stimulus indicating device discussed herein being "reactive," what is meant is that the semi-permeable membrane 1033 should change its observable properties (by way of example only, its size, its color, etc.) in reaction to coming into contact with the constituent parts 1011 expelled from the swollen stimulus sensitive gel 1010 as described herein. Thus it is important that the semi-permeable membrane 1033 has both an affinity for the expelled liquid 1015 and constituent parts 1011 previously contained in, and expelled from, the swollen stimulus sensitive gel 1010; and that at least a portion of the semi-permeable membrane 1033 changes properties upon coming into contact with the expelled liquid 1015 and constituent parts 1011, so as to change from a first color to a second color, as shown by the partial color change in FIG. 10B. Preferably the semi-permeable membrane 1033 can operate a semi-quantitative capacity.

In this alternative embodiment, as the swollen stimulus sensitive gel 1010 undergoes its phase transition in reaction to exposure to a predetermined stimulus, its volume changes by collapsing or shrinking due at least to a potion of the liquid 1014 and constituent parts 1011 contained in the polymer network of the swollen stimulus sensitive gel 1010 being expelled. As the swollen stimulus sensitive gel 1010 expels even a portion of the liquid 1014 and the constituent parts 1011, it collapses and shrinks so that it resembles the shrunken stimulus sensitive gel 1020 shown in FIG. 10B. Once a portion of the liquid 1014 and the constituent parts 1011 are expelled from the swollen stimulus sensitive gel 1010, the expelled liquid 1015 and the expelled constituent parts 1011 subsequently come into contact with and are absorbed by the semi-permeable membrane 1033.

Upon being absorbed by the semi-permeable membrane 1033, the constituent parts 1011 are permanently bound to the semi-permeable membrane 1033 thereafter. Thus, even if the predetermined stimulus is removed and the expelled liquid 1015 is subsequently reabsorbed by the shrunken stimulus sensitive gel 1020 so as to become a partially or fully re-swollen stimulus sensitive gel 1010, those constituent parts 1011 remain bound to or trapped in the color changing absorbent material 1007, and thus that color changing absorbent material 1007 permanently remains colored the second color 1017.

It should be noted that by manipulating the permeability of the semi-permeable membrane 1033, the time required for the expelled liquid 1015 to move the length of the semi-permeable membrane 1033 into the indicator window 1012 can be varied. Such manipulation of the semi-permeable membrane 1033 includes increasing or decreasing its thickness and/or increasing or decreasing its surface area facing the indicator window 1012 by increasing or decreasing its wicking ability, so as to control the speed at which the expelled liquid 1015 and the constituent parts 1011 travel through the semi-permeable membrane 1033.

The semi-permeable membrane 1033 would preferably be designed so that it not only allows the constituent parts 1011 contained in the expelled liquid 1015 to pass through the semi-permeable membrane 1033, but also would prevent the constituent parts 1011 from being reabsorbed by the shrunken stimulus sensitive gel 1020.

An advantage of using such an embodiment of the stimulus indicating device 1000 is that both the exposure to a predetermined stimulus as well as the time of exposure can be indicated. As an example, if the predetermined stimulus occurs for just a short period of time, and is removed before the all of the constituent parts 1011 contained in the swollen stimulus sensitive gel 1010 have been completely expelled, then only a portion of the semi-permeable membrane 1033 will have changed from a first color 1013 to a second color 1017.

One reason this happens is because the semi-permeable membrane 1033 does not allow the expelled liquid 1015 and expelled constituent parts 1011 to pass in both directions. And so in this case, an irreversible indication of exposure to the predetermined stimulus will be indicated by color changing absorbent material 1007 even though the time of exposure to the predetermined stimulus was brief. It will still result in a color change because enough expelled liquid 1015 and enough constituent parts 1011 passed through the semi-permeable membrane 1033 to become visible in the indicator window 1012 to indicate a change from a first color 1013 to a second color 1017.

It should be noted that it is not necessary for the swollen stimulus sensitive gel 1010 to collapse or shrink entirely in order for the color change in the semi-permeable membrane 1033 to be visible to the user. Instead, if even a portion of the semi-permeable membrane 1033 changes color so as to be visible to the user through the indicator window 1012, that is enough to signal to the user that the product attached to the stimulus indicating device 1000 had been exposed to a potentially harmful stimulus. More specifically, although the decrease in volume of the swollen stimulus sensitive gel 1010 in all of the embodiments of the stimulus indicating device 1000 discussed herein can be by any amount so long as it is registerable, preferably the decrease in volume of the swollen stimulus sensitive gel 1010 would be between at least a ⅒ reduction in original volume, and up to a 500 times decrease in original volume. In regard to all embodiments of the stimulus indicating device 1000 discussed herein as they pertain to the decrease in the volume being "registerable" what is meant is that the volume change of the swollen stimulus sensitive gel 1010 expels enough liquid 1014 and constituent parts 1011 from the swollen stimulus sensitive gel 1010 to cause the swollen stimulus sensitive gel 1010 to collapse or shrink enough so that it permanently causes at least a partial color change in the color changing absorbent material 1007 from a first color 1013 to a second color 1017 (e.g., a change in color from a first color to a second color) or indication (e.g., a portion of the semi-permeable membrane 1033 contains a glyph, such as an "X" or "skull and cross bones" that is revealed because of a color change) occurs in the stimulus indicating device 1000, and is visible via the indicator window 1012, and indicates to the user that the product had been exposed to a predetermined stimulus.

In regard to all the embodiments of the stimulus indicating device discussed herein being "irreversible" and "permanent," what is meant is that once the stimulus indicating device provides an indication of exposure to an adverse stimulus extreme (which is also referred to herein as a predetermined stimulus), that exposure indication does not change, even though the adverse stimulus extreme or predetermined stimulus might be removed in the future.

As shown in FIG. 10A and discussed herein, this embodiment of the irreversible stimulus indicating device 1000 would have at least one compartment 1002, but could have others. In this alternative embodiment the semi-permeable membrane 1033 is preferably located within the first compartment 1002 and is positioned below the indicator window 1012, so that at least a portion of the semi-permeable membrane 1033 can be seen through the indicator window 1012. Preferably the swollen stimulus sensitive gel 1010 is located in the back half of the first compartment 1002 and is kept separate from the semi-permeable membrane 1033. Although the swollen stimulus sensitive gel 1010 is preferably hidden from the user below the paint applied to the top portion 1016 of the stimulus sensitive device 1000, it could also be visible to the user. If the swollen stimulus sensitive gel 1010 were visible to the user, it is preferred that it be the same color as the semi-permeable membrane 1033 prior to the semi-permeable membrane 1033 coming into contact with the constituent parts 1011.

If the semi-permeable membrane 1033 has the ability to wick liquid 1014 and/or constituent parts 1011 from the swollen stimulus sensitive gel 1010 simply by the semi-permeable membrane 1033 being in contact with the swollen stimulus sensitive gel 1010, then it is preferred that the semi-permeable membrane 1033 and the swollen stimulus sensitive gel 1010 be physically kept apart from each other. Thus, in this alternative embodiment the swollen stimulus sensitive gel 1010 is physically separated from the semi-permeable membrane 1033 to prevent the liquid 1014 and the constituent parts 1011 contained in the swollen stimulus sensitive gel 1010 from being wicked into the semi-permeable membrane 1033. Doing so prevents the stimulus sensitive device 1000 from giving a false indication of exposure to a predetermined stimulus. If the semi-permeable membrane 1033 does not wick the constituent parts 1011 out of the swollen stimulus sensitive gel 1010, then the semi-permeable membrane 1033 can be in physical contact with the swollen stimulus sensitive gel 1010.

Preferably, the stimulus sensitive gel 1010 and 1020 would be fixed or secured at the attachment point 1018, or at more than one attachment point if desired. The stimulus sensitive gel 1010 and 1020 may be fixed to the attachment point 1018 with a suitable epoxy, glue, or it could be heat stamped upon creation of the stimulus indicating device 1000. Attaching the stimulus sensitive gel 1010 and 1020 to the attachment point 1018 helps to ensure that the stimulus sensitive gel 1010 and 1020 collapses or shrinks in a desired direction—preferably away from the indicator window 1012. Moreover, by securing or fixing the stimulus sensitive gel 1010 and 1020 to the attachment point ensures that the stimulus sensitive gel 1010 and 1020 does not cover the color changing absorbent material 1007 after it had changed from a first color to a second color. Securing or fixing the stimulus sensitive gel 1010 and 1020 to the attachment point 1018 prevents the stimulus sensitive gel 1010 and 1020 from floating or moving within the compartment and covering up the color changing absorbent material 1007 at all times.

It should be noted that the predetermined temperature discussed herein that causes the swollen stimulus sensitive gel 1010 to undergo its phase transition is only one example of a predetermined stimulus or trigger stimulus that will cause the inventive stimulus sensitive gel 1010 and 1020 to undergo its phase transition. For example, the swollen stimulus sensitive gel 1010 of this preferred embodiment could trigger or undergo its phase transition upon exposure to a predetermined stimulus such as a predetermined pH level, or the swollen stimulus sensitive gel 1010 of this preferred embodiment could trigger or undergo its phase transition upon exposure to a predetermined level of electromagnetic radiation.

All embodiments discussed herein of the stimulus indicating device 1000 containing the swollen stimulus sensitive gel 1010 and the shrunken stimulus sensitive gel 1020 may be based on any type of stimulus sensitive gel that undergoes a phase transition upon exposure of the stimulus sensitive gel to a predetermined stimulus. The preferred types of stimulus sensitive gels include poly(acrylamide-co-acrylic acid) (PAAm-co-AA)) gel, a poly(acrylamide-co-sodium vinyl acrylate) (PAAm-co-SVA)) gel, and/or its variations such as poly(N-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the direction of the volume change in the stimulus sensitive gel 1010 and 1020 used in all the embodiments of the stimulus indicating device 1000 discussed herein can be selected so as to correlate to a specific situation. For example, one of ordinary skill will appreciate and understand that if the stimulus sensitive gel in this embodiment is swollen at the beginning of its use as it undergoes its phase transition, it will collapse or shrink, thereby causing a change in color or indication in the stimulus indicator 1000. Alternatively, the stimulus sensitive gel could start out collapsed or shrunken, but upon exposure to its predetermined stimulus it would permanently expand or swell and cause a change in color or indication in the stimulus indicator 100. By way of example only and as disclosed herein and in prior applications, a stimulus sensitive gel 1010 and 1020 can be of the "Upper Critical Solution Temperature" or UCST type gel, or can be of the "Lower Critical Solution Temperature" or LCST type gel. As one of ordinary skill in the art will appreciate, a UCST type stimulus sensitive gel, such as PAAm-co-SVA gels, could be used when one wishes to have an initially swollen stimulus sensitive gel collapse or shrink when cooled below a predetermined or trigger temperature and thereby: i) reveal an indicator spot; or ii) expel liquid and/or constituent parts, both of which result in the stimulus indicating device exhibiting a change in color or indication. A UCST type gel could also be used when one wishes to have an initially shrunken stimulus sensitive gel expand or swell when it is heated beyond a predetermined stimulus, and thereby: i) cover an indicator spot; or ii) collect liquid and/or constituent parts, both of which result in the stimulus indicating device exhibiting a change in color or indication. Alternatively, an LCST type stimulus sensitive gel, such as PNIPAAm gels, could be used when one wishes to have an initially swollen stimulus sensitive gel collapse or shrink when heated above a predetermined or trigger temperature and thereby: i) reveal an indicator spot; or ii) expel liquid and/or constituent parts, both of which result in the stimulus indicating device exhibiting a change in color or indication. An LCST type gel could also be used when one wishes to have an initially shrunken stimulus sensitive gel expand or swell when it is cooled below a predetermined stimulus, and thereby: i) cover an indicator spot; or ii) collect liquid and/or constituent parts, both of which result in the stimulus indicating device exhibiting a change in color or indication.

One of ordinary skill in the art will understand that although the stimulus sensitive gel 1010 and 1020 discussed herein in regard to all embodiments of the stimulus indicating device 1000 may be of the UCST type of gel (i.e., the swollen stimulus sensitive gel 1010 will collapse or shrink upon exposure to its predetermined stimulus of a cooler temperature, and become the shrunken stimulus sensitive gel 1020; as well as expand or swell upon exposure to its predetermined stimulus of a warmer temperature, and become the swollen stimulus sensitive gel 1010), the range and scope of this invention includes and envisions the swollen stimulus sensitive gel 1010 and the shrunken stimulus sensitive gel 1020 also being of the LCST type of gel. Moreover, it should be noted that all the variations of the different embodiments discussed herein can be combined with the variations of other embodiments described herein and that are known in the art, as would be understood to one of ordinary skill in the art.

The behavior of the UCST gels and the LCST gels depends on their chemical structure. Many examples of both kinds of polymers are known in the literature. For example, if the stimulus sensitive gel 1010 and 1020 employed in all the embodiments of the stimulus indicating device 1000 discussed herein were made of UCST type stimulus sensitive gels, it could be any number of such UCST gels, including: i) i) an interpenetrating network of polyacrylamide (PAAm) and polyacrylic acid (PAAc) or IPN-PAAm-PAAc; or ii) Acrylamide copolymerized with sodium vinyl acrylate (SVA) gel to result in the creation of PAAm-co-SVA gel; or iii) their derivates, and as described in Tanaka, "Gels," Scientific American 244 (1981) at 124-138 and Tanaka, "Phase Transitions in Ionic Gels," Physical Review Letters 45 (1980) at 1636-1639, the predetermined "trigger" stimulus at which a UCST gel undergoes its phase transition, and thereby expels the liquid 1014 and constituent parts 1011 and thus collapses or shrinks in volume, can be "tuned" to a particular value by changing the solvent trapped in the gel polymer matrix in addition to introducing salts, surfactants, or other substances to the gel matrix. Such "tuning" in regard to UCST type gels is discussed herein and in U.S. Pat. No. 5,100,933. Similarly, if the stimulus sensitive gel 1010 and 1020 employed in all the embodiments of the stimulus indicating device 1000 discussed herein were made of LSCT type stimulus sensitive gels, it could be any number of such LCST gels, including PNIPAAm gels, and as described in U.S. Pat. No. 4,732,930 in regard to PNIPAAm LCST type gels, the predetermined stimulus, such as temperature at which a stimulus sensitive gel 1010 and 1020 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Nonionic Poly(N-isopropylacrylamide) Gel" Macromolecules volume 26 at 5045 to 5048.

Regardless of whether LCST type stimulus sensitive gels or UCST type stimulus sensitive gels are used to indicate exposure to a predetermined stimulus, what is important is that the change in volume of the stimulus sensitive gel be tailored to the application in which the stimulus indicator is being used. For example, a change in volume of the stimulus sensitive gel 1010 and 1020, and thus the corresponding expulsion of liquid 1014 and constituent parts 1011 can be insignificant or it can be dramatic. If the desired visual indication as the result of the swollen stimulus sensitive gel 1010 expelling its liquid 1014 and its constituent parts 1011 is to cause all of the semi-permeable membrane 1033 to turn a second color, then a large change in volume is preferred.

10. Embodiments with Capillaries

Figure 11A:
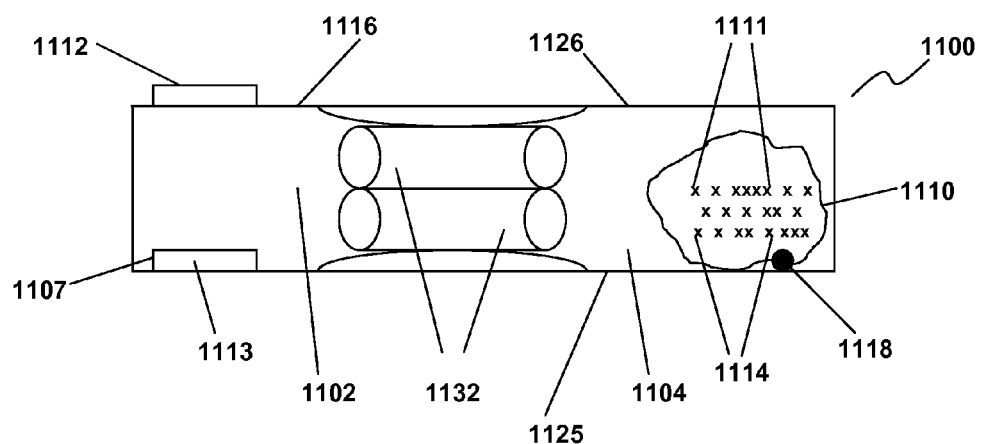
FIG. 11A is a side cross-sectional view of an embodiment of the invention before exposure to a predetermined trigger stimulus.
Figure 11B:
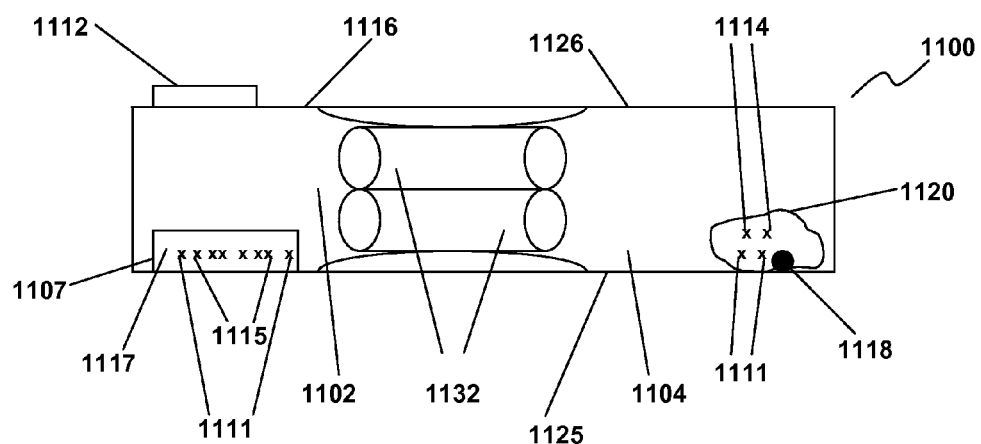
FIG. 11B is a side cross-sectional view of the embodiment in FIG. 11A after exposure to a predetermined trigger stimulus

In accordance with the purpose of certain embodiments of the invention, as embodied and broadly described herein and in conjunction with FIG. 11A through FIG. 11B as well as FIG. 2A through FIG. 2F, an alternative embodiment of the inventive stimulus indicating device 1100 preferably is a multi-compartment device that could keep the color changing absorbent material 1107 and the liquid 1114 and constituent parts 1111 contained in the swollen stimulus sensitive gel 1110, separate from each other, and preferably it does not contain the liquid bath of the preferred embodiment. More specifically, as shown in FIG. 11A and FIG. 11B, the color changing absorbent material 1107 is in the first compartment 1102 and can be viewed through an indicator window 1112. The swollen stimulus sensitive gel 1110 is in the second compartment 1104. Although this embodiment is described in terms of the stimulus sensitive gel preferably being swollen initially, as discussed herein in regard to stimulus sensitive gels, one of ordinary skill in the art would appreciate that the same invention can be achieved with an initially shrunken stimulus sensitive gel that draws out constituent parts from the color changing absorbent material and uses them to expand or swell upon exposure to a predetermined stimulus so as to result in a color change.

The first compartment 1102 and the second compartment 1104 are formed by the backing blacking layer 1125 on the bottom of the stimulus indicating device 1100 and an upper layer 1126 on the top of the stimulus indicating device 1100. The first compartment 1102 and the second compartment 1104 are additionally formed and differentiated from one another by small channel(s) 1132, capillary(-ies) 1132 or tube(s) 1132, such as capillary tube(s) 1132 that are strong and resilient to twisting, bending and breaking. The capillary tube(s) 1132 is/are designed to allow the expelled liquid 1115 and constituent parts 1111 to pass from the second compartment 1104 into the first compartment 1102, and from the first compartment 1102 to the second compartment 1104.

Prior to exposure to a predetermined stimulus, in this embodiment a swollen stimulus sensitive gel 1110 is contained in only the second compartment 1104. And prior to exposure of the stimulus indicating device 1100 to a predetermined stimulus, the color changing absorbent material 1107 is a first color, visible through the indicator window 1112 or display portion 1112.

Both the backing layer 1125 and the upper layer 1126 may be constructed of a strong, resilient leak-proof material, such as plastic or other polymer material, so as to provide for the twisting or bending that might occur during transportation of the stimulus sensitive product without tearing, breaking or leaking. The backing layer 1125 and the upper layer 1126 may also be made of a material that preferably allows them to be joined and sealed together, such as by heat stamping or other suitable means. The backing layer 1125 and the upper layer 1126 can both approximate the length and width of the first compartment 1102 plus the length and width of the second compartment 1104 combined with the capillaries 1132, although variations in these dimensions are within the scope of the present invention. The upper layer 1126 can preferably be made of a clear material, such as plastic, so that the user of the stimulus indicating device 1100 can view at least some portion of the backing material or color changing absorbent material 1107. The upper layer 1126 can also be able to accept paint or ink so as to allow for coloring or concealing at least some portion of the first compartment 1102.

Although some portion of the upper layer 1126 can also accept paint or ink for coloring, it is preferable that the indicator window 1102 portion of the upper layer 1126 remains free from ink or coloring so that the user of the stimulus indicating device 1100 can observe the first compartment 1102 through the indicator window 1112 as explained herein. The backing layer 1125 should also be able to accept paste, glue or other suitable adhesive on the surface not facing the first compartment 1102, so as to allow it to be directly or indirectly attached to a stimulus sensitive product.

By way of example only, the color changing absorbent material 1107 could be divalent cation indicator paper, litmus paper or any equivalent absorbent material that is reactive to a certain ion, element or similar substance. In regard to all the embodiments of the stimulus indicating device discussed herein being "reactive," what is meant is that the color changing absorbent material 1107 should change its observable properties (by way of example only, its size, its color, etc.) in reaction to coming into contact with the constituent parts 1111 expelled from the swollen stimulus sensitive gel 1110 as described herein. Thus it is important that the color changing absorbent material 1107 has both an affinity for the expelled liquid 1115 and constituent parts 1111 previously contained in, and expelled from, the swollen stimulus sensitive gel 1110; and that at least a portion of the color changing absorbent material 1107 changes properties upon coming into contact with the expelled liquid 1115 and constituent parts 1111, so as to change from a first color to a second color. Preferably the color changing absorbent material 1107 can operate in a semi-quantitative capacity.

In this alternative embodiment, the color changing absorbent material 1107 is a divalent cationic paper that is reactive to constituent parts 1111 such as by way of example only, divalent cations (by way of example only, $Mg^{2+}$ or $Ca^{2+}$). As discussed herein, a suitable color changing absorbent material 1107, such as a total-hardness indicator paper or test stick will indicate a change from a first color 1113 to a second color 1117 upon exposure to constituent parts 1111 carried by the expelled liquid 1115 after both are expelled from the swollen stimulus sensitive gel 1110. Examples of such divalent cationic paper that can be used as the color changing absorbent material 1107 includes a total-hardness indicator paper or test stick that is available from Sigma-Aldrich under the tradename QUANTOFIX®, is manufactured by Macherey-Nagel under the tradename Aquadur®, and that changes color from blue to red upon coming into contact with expelled liquid 1115 containing the constituent parts 1111 (by way of example only, $Mg^{2+}$ or $Ca^{2+}$). Preferably the color changing absorbent material 1107 operates in at least a semi-quantitative capacity.

As discussed herein, one method for incorporating the constituent parts 1111 that are reactive with the color changing absorbent material 1107 is to swell the swollen stimulus sensitive gel 1110 in a bath containing constituent parts 1111 that are specifically reactive with the selected color changing absorbent material 1107, including by way of example only, divalent cation salts (by way of example only, $Mg^{2+}$ or $Ca^{2+}$ salts), and/or varying concentrations of $H^+$.

In this alternative embodiment, as the swollen stimulus sensitive gel 1110 undergoes its phase transition in reaction to exposure to a predetermined stimulus, its volume changes by collapsing or shrinking due at least to a portion of the liquid 1114 and constituent parts 1111 (by way of example only, $Mg^{2+}$) contained in the polymer network of the swollen stimulus sensitive gel 1110 being expelled. As the swollen stimulus sensitive gel 1110 expels even a portion of the liquid 1114 and the constituent parts 1111, it collapses and shrinks so that it resembles the shrunken stimulus sensitive gel 1120 shown in FIG. 11B. Once a portion of the liquid 1114 and the constituent parts 1111 are expelled from the swollen stimulus sensitive gel 1110, the expelled liquid 1115 and the expelled constituent parts 1111 subsequently come into contact with and are absorbed by the color changing absorbent material 1107.

Once the liquid 1114 and the constituent parts 1111 are expelled from the swollen stimulus sensitive gel 1110, they pass through the capillary tube(s) 1132 of the stimulus indicating device 1100, they come into contact with and are absorbed by the color changing absorbent material 1107. Because of the design of the color changing absorbent material 1107, as the constituent parts 1111 are absorbed by the color changing absorbent material 1107, the color changing absorbent material 1107 changes from a first color 1113 to a second color 1117 due to the reaction between chemical moieties on the color changing absorbent material 1107 and the constituent parts 1111 carried by the expelled liquid 1115. Because of the design of the color changing absorbent material 1107, at least part of the color changing absorbent material 1107, and preferably all of the color changing absorbent material 1107, will change from a first color 1113 to a second color 1117 upon coming into contact with the constituent parts 1111.

Moreover, upon being absorbed by the color changing absorbent material 1107, the constituent parts 1111 are permanently bound to the color changing absorbent material 1107 thereafter. Thus, even if the predetermined stimulus is removed and the expelled liquid 1115 is subsequently reabsorbed by the shrunken stimulus sensitive gel 1120 so as to become a partially or fully re-swollen stimulus sensitive gel 1110, those constituent parts 1111 remain bound to or trapped in the color changing absorbent material 1107, and thus that color changing absorbent material 1107 permanently remains colored the second color 1117.

It should be noted that by manipulating the permeability of the capillary tube(s) 1132 connecting the first compartment 1102 to the second compartment 1104, the time required for the expelled liquid 1115 to move from the second compartment 1104 into the first compartment 1102 can be varied. Such manipulation of the capillary tube(s) 1132 includes increasing or decreasing its thickness and/or increasing or decreasing its surface area facing the first compartment 1102 and/or second compartment 1104 and/or increasing or decreasing its wicking ability, so as to control the speed at which the expelled liquid 1115 and the constituent parts 1111 travel from the second compartment 1104, through the capillary tube(s) 1132, and enter the first compartment 1102.

As will be appreciated by one of ordinary skill in the art, the geometry of the capillary tubes 1132 can be manipulated so as to control the speed at which the expelled liquid 1115 and the constituent parts 1111 move from the second compartment 1104 into the first compartment 1102. Such manipulation of the geometry of the capillary tubes 1132 includes increasing or decreasing its/their length and/or increasing or decreasing its/their width and/or increasing or decreasing the wicking ability of the material that makes up the capillary tubes 1132, so as to control the speed at which the expelled liquid 1115 and the constituent parts 1111 travel from the second compartment 1104, through the capillary tubes 1132, and enter the first compartment 1102.

An advantage of using such embodiment is that both the exposure to a predetermined stimulus as well as the time of exposure can be indicated. As an example, if the predetermined stimulus occurs for just a short period of time, and is removed before the expelled liquid 1115 and constituent parts 1111 have completely moved from the second compartment 1104 through the capillary tubes 1132 and into the first compartment 1102, then the expelled liquid 1115 and constituent parts 1111 will be wicked or drawn back into the second compartment 1104 by the shrunken stimulus sensitive gel 1120 as the shrunken stimulus sensitive gel 1120 re-expands or swells as a result of undergoing the reverse phase transition. In this case, no irreversible indication of exposure to the predetermined stimulus will be indicated by color changing absorbent material 1107 because the time of exposure to the predetermined stimulus was too brief to enable enough expelled liquid 1115 and constituent parts 1111 to pass completely through the capillary tubes 1132, react with the color changing absorbent material 1107, and cause it to change from a first color 1113 to a second color 1117. It should be noted that it is not necessary for the swollen stimulus sensitive gel 1110 to collapse or shrink entirely in order for the color change in the color changing absorbent material 1107 to be visible to the user. Instead, if even a portion of the color changing absorbent material 1107 changes color so as to be visible to the user through the indicator window 1112, that is enough to signal to the user that the product attached to the stimulus indicating device 1100 had been exposed to a potentially harmful stimulus. More specifically, although the decrease in volume of the swollen stimulus sensitive gel 1110 in all of the embodiments of the stimulus indicating device 1100 discussed herein can be by any amount so long as it is registerable, preferably the decrease in volume of the swollen stimulus sensitive gel 1110 would be between at least a 1/10 reduction in original volume, and up to a 500 times decrease in original volume. In regard to all embodiments of the stimulus indicating device 1100 discussed herein as they pertain to the decrease in the volume being "registerable" what is meant is that the volume change of the swollen stimulus sensitive gel 1110 expels enough liquid 1114 and constituent parts 1111 from the swollen stimulus sensitive gel 1110 to cause the swollen stimulus sensitive gel 1110 to collapse or shrink enough so that it permanently causes at least a partial color change in the color changing absorbent material 1107 from a first color 1113 to a second color 1117 (e.g., a change in color from a first color to a second color) or indication (e.g., a portion of the color changing absorbent material contains a glyph, such as an "X" or "skull and cross bones" that is revealed because of a color change) occurs in the stimulus indicating device 1100, and is visible via the indicator window 1112, and indicates to the user that the product had been exposed to a predetermined stimulus.

In regard to all the embodiments of the stimulus indicating device discussed herein being "irreversible" and "permanent," what is meant is that once the stimulus indicating device provides an indication of exposure to an adverse stimulus extreme (which is also referred to herein as a predetermined stimulus), that exposure indication does not change, even though the adverse stimulus extreme or predetermined stimulus might be removed in the future. In an alternative of this embodiment with a permeable membrane 1132, the color changing absorbent material 1107 could be pH-indicator strips manufactured by EMD Chemicals Inc. These pH-indicator strips can react to and indicate exposure to constituent parts 1111 such as and by way of example only, $H^+$ ion, by permanently changing from a first color 1113 to a second color 1117. Preferably the pH-indicator strips are manufactured in such a way that there is a noticeable spectrum of colors that match the range of possible pH concentrations. For example, the first color 1113 of the color changing absorbent material 1107 could be colored red prior to the stimulus indicating device 1100 being exposed to a predetermined stimulus. Then upon exposure to the predetermined stimulus, the swollen stimulus sensitive gel 1110 would expel liquid 1114 and constituent parts 1111 (by way of example only $H^+$) which, upon contact with the color changing absorbent material 1107, causes the color changing absorbent material 1107 to change to a second color 1117, such as blue. Altering the pH of the expelled liquid 1115 and the content of the constituent parts 1111 (by way of example only $H^+$) will allow the first color 1113 and second color 1117 of the color changing absorbent material 1107 to be manipulated. For example, if the swollen stimulus sensitive gel 1110 was manufactured so that it was swollen with an aqueous solution of either high pH (for example a pH of 14), or low pH (for example a pH of 1), the most significant color contrast can be achieved between the first color 1113 and second color 1117 of the color changing absorbent material 1107.

As shown in FIG. 11A and discussed herein, this embodiment of the irreversible stimulus indicating device 1100 would have at least two compartments 1102 and 1104. In the alternative embodiment the color changing absorbent material 1107 is preferably located within the first compartment 1102 and is positioned below the indicator window 1112, so that at least a portion of the color changing absorbent material 1107 can be seen through the indicator window 1112. Preferably the swollen stimulus sensitive gel 1110 is located in the second compartment 1104 and is kept separate from the color changing absorbent material 1107 by the capillary tube(s) 1132. Although the swollen stimulus sensitive gel 1110 is preferably hidden from the user below the paint applied to the top portion 1116 of the stimulus sensitive device 1100, it could also be visible to the user. If the swollen stimulus sensitive gel 1110 were visible to the user, it is preferred that it be the same color as the color changing absorbent material 1107 prior to the color changing absorbent material 1107 coming into contact with the constituent parts 1111.

If the color changing absorbent material 1107 has the ability to wick liquid 1114 and/or constituent parts 1111 from the swollen stimulus sensitive gel 1110 simply by the color changing absorbent material 1107 being in contact with the swollen sensitive gel 1110, then it is preferred that the permeable membrane 1130 be used to keep the color changing absorbent material 1107 and the swollen stimulus sensitive gel 1110 physically apart from each other. Thus, in this alternative embodiment the swollen stimulus sensitive gel 1110 is physically separated from the color changing absorbent material 1107 by the permeable membrane 1130 to prevent the liquid 1114 and the constituent parts 1111 contained in the swollen stimulus sensitive gel 1110 from being wicked into the color changing absorbent material 1107. Doing so prevents the stimulus sensitive device 1100 from giving a false indication of exposure to a predetermined stimulus.

Although employing an embodiment with a permeable membrane 1130 reduces, or depending on the size of the shrunken stimulus sensitive gel 1120, eliminates the need for attaching or securing the stimulus sensitive gel 1110 and 1120 within the stimulus indicating device 1100, it may still be preferable for the stimulus sensitive gel 1110 and 1120 to be fixed or secured at the attachment point 1118 in the second compartment 1104, or at more than one attachment point if desired. Preferably, the stimulus sensitive gel 1110 and 1120 would be fixed or secured at the attachment point 1118, or at more than one attachment point if desired. The stimulus sensitive gel 1110 and 1120 may be fixed to the attachment point 1118 with a suitable epoxy, glue, or it could be heat stamped upon creation of the stimulus indicating device 1100. Attaching the stimulus sensitive gel 1110 and 1120 to the attachment point 1118 helps to ensure that the stimulus sensitive gel 1110 and 1120 collapses or shrinks in a desired direction—preferably away from the color changing absorbent material 1107 and the indicator window 1112. Moreover, by securing or fixing the stimulus sensitive gel 1110 and 1120 to the attachment point ensures that the stimulus sensitive gel 1110 and 1120 does not cover the color changing absorbent material 1107 after it had changed from a first color to a second color. Securing or fixing the stimulus sensitive gel 1110 and 1120 to the attachment point 1118 prevents the stimulus sensitive gel 1110 and 1120 from floating or moving within the compartment and covering up the color changing absorbent material 1107 at all times.

It should be noted that the predetermined temperature discussed herein that causes the swollen stimulus sensitive gel 1110 to undergo its phase transition is only one example of a predetermined stimulus or trigger stimulus that will cause the inventive stimulus sensitive gel 1110 and 1120 to undergo its phase transition. For example, the swollen stimulus sensitive gel 1110 of this preferred embodiment could trigger or undergo its phase transition upon exposure to a predetermined stimulus such as a predetermined pH level, or the swollen stimulus sensitive gel 1110 of this preferred embodiment could trigger or undergo its phase transition upon exposure to a predetermined level of electromagnetic radiation.

All embodiments discussed herein of the stimulus indicating device 1100 containing the swollen stimulus sensitive gel 1110 and the shrunken stimulus sensitive gel 1120 may be based on any type of stimulus sensitive gel that undergoes a phase transition upon exposure of the stimulus sensitive gel to a predetermined stimulus. The preferred types of stimulus sensitive gels include poly(acrylamide-co-acrylic acid) (PAAm-co-AA) gel, a poly(acrylamide-co-sodium vinyl acrylate) (PAAm-co-SVA) gel, and/or its variations such as Poly(N-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the direction of the volume change in the stimulus sensitive gel 1110 and 1120 used in all the embodiments of the stimulus indicating device 1100 discussed herein can be selected so as to correlate to a specific situation. For example, one of ordinary skill will appreciate and understand that if the stimulus sensitive gel in this embodiment is swollen at the beginning of its use as it undergoes its phase transition, it will collapse or shrink, thereby causing a change in color or indication in the stimulus indicator 1100. Alternatively, the stimulus sensitive gel could start out collapsed or shrunken, but upon exposure to its predetermined stimulus it would permanently expand or swell and cause a change in color or indication in the stimulus indicator 100. By way of example only and as disclosed herein and in prior applications, a stimulus sensitive gel 1110 and 1120 can be of the "Upper Critical Solution Temperature" or UCST type gel, or can be of the "Lower Critical Solution Temperature" or LCST type gel. As one of ordinary skill in the art will appreciate, a UCST type stimulus sensitive gel, such as PAAm-co-SVA gels, could be used when one wishes to have an initially swollen stimulus sensitive gel collapse or shrink when cooled below a predetermined or trigger temperature and thereby: i) reveal an indicator spot; or ii) expel liquid and/or constituent parts, both of which result in the stimulus indicating device exhibiting a change in color or indication. A UCST type gel could also be used when one wishes to have an initially shrunken stimulus sensitive gel expand or swell when it is heated beyond a predetermined stimulus, and thereby: i) cover an indicator spot; or ii) collect liquid and/or constituent parts, both of which result in the stimulus indicating device exhibiting a change in color or indication. Alternatively, an LCST type stimulus sensitive gel, such as PNIPAAm gels, could be used when one wishes to have an initially swollen stimulus sensitive gel collapse or shrink when heated above a predetermined or trigger temperature and thereby: i) reveal an indicator spot; or ii) expel liquid and/or constituent parts, both of which result in the stimulus indicating device exhibiting a change in color or indication. An LCST type gel could also be used when one wishes to have an initially shrunken stimulus sensitive gel expand or swell when it is cooled below a predetermined stimulus, and thereby: i) cover an indicator spot; or ii) collect liquid and/or constituent parts, both of which result in the stimulus indicating device exhibiting a change in color or indication.

One of ordinary skill in the art will understand that although the stimulus sensitive gel 1110 and 1120 discussed herein in regard to all embodiments of the stimulus indicating device 1100 may be of the UCST type of gel (i.e., the swollen stimulus sensitive gel 1110 will collapse or shrink upon exposure to its predetermined stimulus of a cooler temperature, and become the shrunken stimulus sensitive gel 1120; as well as expand or swell upon exposure to its predetermined stimulus of a warmer temperature, and become the swollen stimulus sensitive gel 1110), the range and scope of this invention includes and envisions the swollen stimulus sensitive gel 1110 and the shrunken stimulus sensitive gel 1120 also being of the LCST type of gel. Moreover, it should be noted that all the variations of the different embodiments discussed herein can be combined with the variations of other embodiments described herein and that are known in the art, as would be understood to one of ordinary skill in the art.

The behavior of the UCST gels and the LCST gels depends on their chemical structure. Many examples of both kinds of polymers are known in the literature. For example, if the stimulus sensitive gel 1110 and 1120 employed in all the embodiments of the stimulus indicating device 1100 discussed herein were made of UCST type stimulus sensitive gels, it could be any number of such UCST gels, including: i) i) an interpenetrating network of polyacrylamide (PAAm) and polyacrylic acid (PAAc) or IPN-PAAm-PAAc; or ii) Acrylamide copolymerized with sodium vinyl acrylate (SVA) gel to result in the creation of PAAm-co-SVA gel; or iii) their derivates, and as described in Tanaka, "Gels," Scientific American 244 (1981) at 124-138 and Tanaka, "Phase Transitions in Ionic Gels," Physical Review Letters 45 (1980) at 1636-1639, the predetermined "trigger" stimulus at which a UCST gel undergoes its phase transition, and thereby expels the liquid 1114 and constituent parts 1111 and thus collapses or shrinks in volume, can be "tuned" to a particular value by changing the solvent trapped in the gel polymer matrix in addition to introducing salts, surfactants, or other substances to the gel matrix. Such "tuning" in regard to UCST type gels is discussed herein and in U.S. Pat. No. 5,100,933. Similarly, if the stimulus sensitive gel 1110 and 1120 employed in all the embodiments of the stimulus indicating device 1100 discussed herein were made of LSCT type stimulus sensitive gels, it could be any number of such LCST gels, including PNIPAAm gels, and as described in U.S. Pat. No. 4,732,930 in regard to PNIPAAm LCST type gels, the predetermined stimulus, such as temperature at which a stimulus sensitive gel 1110 and 1120 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Nonionic Poly(N-isopropylacrylamide) Gel" Macromolecules volume 26 at 5045 to 5048.

Regardless of whether LCST type stimulus sensitive gels or UCST type stimulus sensitive gels are used to indicate exposure to a predetermined stimulus, what is important is that the change in volume of the stimulus sensitive gel be tailored to the application in which the stimulus indicator is being used. For example, a change in volume of the stimulus sensitive gel 1110 and 1120, and thus the corresponding expulsion of liquid 1114 and constituent parts 1111 can be insignificant or it can be dramatic. If the desired visual indication as the result of the swollen stimulus sensitive gel 1110 expelling its liquid 1114 and its constituent parts 1111 is to cause most or all of the color changing absorbent material 1107 to turn a second color, then a large change in volume is preferred.

Method for Manufacturing; Doping and Setting the Trigger Temperature of a Stimulus Sensitive Gel For all the embodiments of the stimulus sensitive gel discussed herein, the stimulus sensitive gel can be manufactured to undergo its phase transition at any predetermined stimulus. By way of example only, the stimulus sensitive gel discussed herein could be of the UCST type and could be made to trigger or undergo its phase transition (i.e., collapse or shrink and expel liquid and/or constituent parts) upon exposure to a temperature of less than 2° C. Alternatively, and by way of example only, the stimulus sensitive gel discussed herein could be of the LCST type and could be made to trigger or undergo its phase transition (i.e., collapse or shrink and expel liquid and/or constituent parts) upon exposure to a temperature greater than 8° C. It will be understood by one of ordinary skill in the art that other temperatures and/or stimuli can be set as the predetermined stimulus by varying the method and/or ingredients disclosed herein.

By way of example only, the discussion below will disclose how to make a swollen stimulus sensitive gel of the UCST type, which undergoes its phase transition (i.e., collapses or shrinks and thereby expels the liquid and/or constituent parts contained in the stimulus sensitive gel) upon being exposed to a temperature cooler than 2° C.

The method of manufacturing such a swollen stimulus sensitive gel comprises at least two steps, and depending on the embodiment being employed there are variations in the second step that are dependent upon the particular embodiment.

In the first step, acrylamide and sodium vinyl acrylate are polymerized at room temperature to form a poly(acrylamide-co-sodium vinyl acrylate) gel (abbreviated PAAm-co-SVA gel, the co means that both Acrylamide and Sodium Vinyl Acrylate are polymerized together.) (The gel remains swollen in water at a temperature of 0° C. so we can say the trigger temperature of the PAAm-co-SVA gel in water occurs at a temperature below 0° C.).

In the second step, the transition temperature of the PAAm-co-SVA gel is adjusted to the desired transition temperature via the addition of salts or solvents. Once the amounts of additives required to obtain gel formulations that trigger at the desired transition temperature are well established, the steps described herein for determining those amounts need not be repeated for the manufacture of future gels.

Depending on the embodiment employed, there could be a variation in the second step wherein the PAAm-co-SVA gels are dried and immersed in solutions containing salts or solvents required for the desired transition temperature as well as simultaneously doped with the constituent parts that are later expelled as the swollen stimulus sensitive gel collapses or shrinks in response to a predetermined stimulus. The purpose of such doping is to impregnate the PAAm-co-SVA gel with constituent parts, so that the constituent parts will permanently cause the embodiments containing color changing absorbent material to change from a first color to a second color.

The resulting polymer gel (i.e., the doped swollen stimulus sensitive gel) will initially have had a transition temperature below 0° C., but by the completion of the second step in any of its variations, the transition temperature of the resulting polymer gel (i.e, the doped swollen stimulus sensitive gel) is shifted to the desired temperature (e.g., 2° C.).

The first two steps taken together including any variations of the second step comprise the process of preparing a swollen stimulus sensitive gel that will undergo its phase transition upon being exposed to a predetermined stimulus as well as provide foolproof, permanent and irreversible indication of the stimulus sensitive product's exposure to such stimulus.

1. Preparation of PAAm-co-SVA Polymer Gels by Polymerization of Acrylamide (AAm) and Sodium Vinyl Acrylate (SVA)

By way of example only, the swollen stimulus sensitive gel is prepared as a UCST type of polymer gel, and by way of example only, this UCST type of polymer gel is created via the polymerization of acrylamide and sodium vinyl acrylate, so as to form a Poly(acrylamide-co-sodium vinyl acrylate) gel (abbreviated PAAm-co-SVA) This polymerization of acrylamide and sodium vinyl acrylate is accomplished by employing the following ingredients, although one of ordinary skill in the art will recognize that certain of the following ingredients can be replaced by other similar types of ingredients, and recognizes/understands that the amounts of the ingredients are exemplary only. Accordingly, the amounts of the ingredients can be varied by any amount so long as the desired gel is created. Moreover, the amounts can be increased or decreased proportionally so that larger or smaller amounts of swollen stimulus sensitive gel can be created. The ingredients include:

i) 0.4622 grams of vinylacetic acid (preferably 98% purity from Aldrich)
ii) 0.2148 grams of sodium hydroxide (preferably 99.8% purity from Fisher) or alternatively 0.5691 grams of sodium carbonate (preferably 99.8% from Aldrich)
iii) 20 milliliters of distilled and deionized water;
iv) 1.0 grams of acrylamide (preferably electrophoresis grade from Aldrich)
v) between 0.0267 and 0.267 grams of N,N'-methylenebisacrylamide (preferably electrophoresis grade from Aldrich)
vi) 0.04 grams of ammonium persulfate (preferably 98% purity from Aldrich)
vii) 0.1 grams of Red 110 M (from LanXess Corporation).

In order to manufacture such gel, the following method is preferably followed, although one of ordinary skill in the art will recognize that certain steps can be performed in varying order, and the amounts can be varies as described herein or as known to one of ordinary skill in the art:

i) place the 20 milliliters of distilled and deionized water into a scintillation vial and purge that distilled and deionized water with nitrogen gas for 15 to 20 minutes so as to remove all possible amounts of oxygen;
ii) add the 0.4622 grams of vinylacetic acid into the scintillation vial, and stir extensively for 5 minutes or until all of the vinylacetic acid is completely dissolved;
iii) add the 0.2148 grams of sodium hydroxide or 0.5691 grams of sodium carbonate to the scintillation vial and stir extensively until the salt is completely dissolved. The purpose of adding the sodium hydroxide or sodium carbonate to the mixture in the scintillation vial is so that it can react with the vinylacetic acid to form the salt sodium vinyl acrylate. Because the sodium vinyl acrylate salt is an ionic water soluble monomer, when it is copolymerized with the acrylamide, the resultant hydrogel will exhibit a large degree of expansion and/or swelling in size and/or volume;
iv) add the 1.0 grams of acrylamide to the scintillation vial and stir extensively for 5 minutes or until all the components in the scintillation vial are completely dissolved;
v) add between 0.0267 and 0.267 grams of N,N'-methylenebisacrylamide to the scintillation vial and stir extensively for 5 minutes or until all the components in the scintillation vial are completely dissolved. Here we may use varying amounts of crosslinker—N,N'-methylenebisacrylamide since the crosslinking density affects the mechanical properties of the gel as well as the resolution of the phase transition. For example, holding all other parameters constant, a gel with a low cross-link density, which is equivalent to incorporating low amounts of N,N'-methylenebisacrylamide in the gel, will exhibit good resolution around the trigger temperature. What is meant by good resolution around the transition temperature is that the gel will only transition when the harmful stimulus is in very close proximity to the trigger temperature of the gel. However, gels prepared with a low cross-link density have poor mechanical integrity, which makes it difficult to process or handle them. On the other hand, the cross-link density may be high corresponding to large amounts of N,N'-methylenebisacrylamide incorporated in the gel. Whereas the mechanical integrity of these gels is improved, the resolution of the gel response around the transition temperature is poor compared to the case with low cross-link density. Hence, it is desirable to optimize the N,N'-methylenebisacrylamide concentration to obtain good resolution and ease of handling the gel material for the preparation of all embodiments.

vi) add the 0.04 grams of ammonium persulfate to the scintillation vial and stir extensively for 5 minutes or until all the components in the scintillation vial are completely dissolved;

vii) add the 0.1 grams of Red 110 M added to the scintillation vial and stir extensively for 5 minutes or until all the components in the scintillation vial are completely dissolved. The addition of Red 110 M to the gel allows the gel to be better observed, because otherwise the gel would be transparent. As discussed herein and as understood by one of ordinary skill, for all the embodiments disclosed herein, one embodiment may work better with a transparent stimulus sensitive gel, while others will work better with a stimulus sensitive gel that is dyed a given color. One of ordinary skill will also understand that different color dyes can be used to make the stimulus sensitive gel color different from, or the same as, the indicator spot.

The pre-gel mixture of AAm and SVA is rapidly transferred from the scintillation vial into molds to allow the polymerization process to occur and/or so as to allow gels to form into the desired shape. The pre-gel mixture is preferably cast between glass plates since the pre-gel does not stick on glass surfaces and hence can be removed from the plates easily. Some of the types of molds employed are described below although one of ordinary skill in the art will recognize that the gels can be case in any shape and size. Glass pipettes can be used which preferably have an inner diameter about 7 mm (7 mm does not work out to be ¼ of an inch; it is actually a little bit less than a ⅓). Similarly, rectangular or round glass capillaries (from Fiber Optic Center, MA for instance) having an inner diameter of 0.4 mm or 1/64 inches could be used as well. In addition, the gel may be cast between glass plates in a protein electrophoresis gel casting unit (Mimi PROTEAN® 3 system from Bio-Rad for instance). The space between two glass plates can be 1.0 mm or 1.5 mm.

As will be appreciated by one of ordinary skill in the art, the molds employed to form the stimulus sensitive gels can vary in length, height and/or width, and as will be appreciated by one of ordinary skill in the art, the desired speed with which the transition of the resulting gel occurs is limited by the smallest dimension of that stimulus sensitive gel. Because there is an inverse relation between the transition speed and the smallest dimension of the gel, between two stimulus sensitive gels that have the same dimensions (e.g., length, height or width) except for one of the dimensions, the gel with the smallest dimensions will undergo its phase transition faster than the other one. According to the theory of gel swelling (Tanaka and Fillmore "Kinetics of Swelling of Gels," in Journal of Chemical Physics, volume 70 at 1214 to 1218), the time depends on the inverse of the length squared. For example, a stimulus sensitive gel that is 1 cm long, 1.0 mm high, and 0.5 cm wide will take four times as long to completely undergo its phase transition after exposure to its predetermined stimulus than a stimulus sensitive gel that is 1 cm long, 0.5 mm high, and 0.5 cm wide. So if between two gels which are the same in all dimensions except for one, the gel that has a smallest dimension which is half of the second gel other one then will show a contraction that is four times faster than the contraction of the second stimulus sensitive gel.

Next the ends of the glass molds are sealed, either by flame sealing or by putting epoxy at the ends. The reason for sealing the pre-gel mixture in the glass molds is to prevent the pre-gel mixture from coming in contact with air during the polymerization process. It is important to prevent the pre-gel mixture from coming into contact with oxygen in the air during the polymerization process, because oxygen retards and may even stop the polymerization reaction. This is the same reason that the distilled and deionized water is purged with nitrogen at the beginning of the manufacture of the gel.

The final step in transforming the pre-gel mixture into a robust stimulus sensitive gel mixture is to immerse the sealed glass molds containing the pre-gel mixture in a water bath at a temperature of 50° C. for at least one hour, but preferably the pre-gel mixture is immersed in the 50° C. water bath for two hours. After this period of two hours, polymerization is complete, and the stimulus sensitive gel can be removed from the glass molds.

An alternative to this final step of transforming the pre-gel mixture into a robust stimulus sensitive gel mixture is to add 50 microliters of N,N,N'N'-tetramethylethylenediamine (abbreviated TEMED, preferably 98% purity from Aldrich) into the pre-gel mixture and stirring the mixture for 5 minutes or until it completely dissolves in the pre-gel mixture. TEMED catalyzes the polymerization reaction such that the reaction may occur at room temperature or even at lower temperatures although one of ordinary skill in the art will recognize that TEMED may be substituted with another redox polymerization catalyst such as sodium metabisulfite. After the addition of TEMED, the polymerization is allowed to proceed for approximately one hour. One of ordinary skill in the art will recognize, in addition to the two polymerization methods discussed above, the polymerization of the pre-gel mixture can be accomplished in many different ways.

Once polymerization is complete, the polymerized gels are taken out from the glass molds by breaking the glass molds or by removing the glass plates if using a protein electrophoresis gel casting unit. Immersing the polymerized gels in deionized water is a necessary step so as to remove unreacted components because during the process of forming the stimulus sensitive gel, there is always the possibility that some acrylamide, sodium vinylacrylate and N,N'-methylenebisacrylamide are not incorporated into the polymer chains that form the stimulus sensitive gel. During the polymerization of the stimulus sensitive gel, there is always the possibility that some polymer chains are formed but which do not incorporate into the polymer chains that form the gel, and as such can be washed from the gel.

In the case that the gel is formed at room temperature via the addition of a catalyst, that catalyst also needs to be removed from the gel. The removal of TEMED and unreacted monomers is achieved, as mentioned above, by simply immersing the gel in distilled and deionized water. The polymerized gels are washed extensively by immersing the gels in distilled and deionized water for at least two days, with the water changed at least once a day. Immersing the polymerized gels in deionized water is a necessary step so as to remove the components not being incorporated into the gel.

Moreover, if the polymerization process used TEMED, that TEMED also needs to be removed from the polymerized gel. The removal of TEMED, unbound polymer chains and unreacted monomers is achieved, as mentioned above, by simply immersing the polymerized gel is distilled and deionized water. Doing so completes the method for manufacturing PAAm-co-SVA gels, although any gel that exhibits UCST qualities would work for these embodiments.

After the polymerization of the stimulus sensitive gel is complete, the stimulus sensitive gel is denoted or referred to as PAAm-co-SVA gels.

2. Shifting the Transition Point of the Gel to the Predetermined Stimulus

Because of the ingredients and method used to prepare the PAAm-co-SVA swollen stimulus sensitive gel discussed above in Step 1, the polymerized gel will undergo its phase transition at a predetermined stimulus of less than 0° C. That predetermined stimulus can be altered, however, so as to cause the swollen stimulus sensitive gel to collapse or shrink upon cooling to any temperature. This altering of the predetermined stimulus can be accomplished because of the underlying physical interactions that govern the volume phase transition in stimulus sensitive gels. Various forces have been recognized as responsible for the swelling of polymer gels: polymer-solvent interactions, polymer chain elasticity and monomer counterion pressure. Whether a gel is shrunken or collapsed depends on the competition amongst the three interactions. PAAm-co-SVA gels swell to a large extent in water due to the presence of the ionic monomer SVA, whose sodium counterions contribute to the ionic pressure, and the favorable interaction between the polymer chains and water. To induce these gels to undergo a volume transition, the interaction between polymer chains should preferably be more favorable than the interaction between the surrounding solvent and polymer chains. In a swollen gel, the interaction between the polymer chains forming the gel and the surrounding water is more favorable than the interaction between the polymer chains themselves such that the polymer chains extend as much as possible to maximize contact with water. However, when the solvent surrounding the gels is a poor solvent, such that the polymer chains forming the gels prefer to interact amongst them rather than with the poor solvent, then the polymer chains will contract in order to minimize their exposure to the poor solvent leading the gel to collapse. Compared to pure water, an acetone solution in water is a poor solvent for the PAAm-co-SVA gel and so these gels can be made to collapse in an acetone solution in water. However, as may be recognized by someone who is ordinary skilled in the art, solutions of other non-polar solvents in water can also cause unfavorable interactions with the polymer chains such that the gels can be made to collapse.

In water, PAAm-co-SVA chains become greatly extended such that the contact between polymer chains and water is maximized, thereby resulting in a swollen gel. In order to induce PAAm-co-SVA gels to undergo a volume transition, the interaction between the polymer chains and the surrounding solvent needs to be made unfavorable such that the PAAm-co-SVA chains contract to avoid contact with the surrounding solvent and lead the gel to shrink. This can also be accomplished by cooling the gel below its transition temperature since the interaction between the solvent and the polymer chains can be made unfavorable and hence lead to collapse of the gel by lowering the temperature.

A further concept inherent in these polymer gels is the directionality of the temperature-induced volume changes. As discussed herein, certain polymer gels (e.g., Poly(N-isopropylacrylamide) abbreviated PNIPAAm) shrink when heated above a trigger temperature. These polymer gels are said to show a "Lower Critical Solution Temperature" or LCST. LCST behavior depends on the chemical structure. Many examples of LCST polymer gels are known in the literature. In polymer physics, LCST polymer-solvent systems are those in which the solubility of the polymer is enhanced at low temperatures and diminished at high temperatures. Because PNIPAAm gels are LCST gels, when the PNIPAAm gel is below its predetermined stimulus (i.e., its transition temperature), it is swollen; but above its predetermined stimulus the PNIPAAm gel is in the collapsed state.

As also discussed herein, there are certain polymer gels (e.g., PAAm-co-SVA) that shrink when cooled below a trigger temperature. These polymer gels are said to show an "Upper Critical Solution Temperature" or UCST. UCST behavior depends on the chemical structure. Many examples of UCST polymer gels are known in the literature. In polymer physics, UCST polymer-solvent systems are those in which the solubility of the polymer is enhanced at high temperatures and diminished at low temperatures. Because PAAm-co-SVA gels are UCST gels, when the PAAm-co-SVA gel is below its predetermined stimulus (i.e., its transition temperature), it is shrunken; but above its predetermined stimulus the PAAm-co-SVA gel is in the swollen state.

As is known in the art, the transition temperature of both PNIPAAm and PAAm-co-SVA gels can be changed significantly by immersing the gel in solutions of water with other components (such as salt or solvents). In regard to the PNIPAAm gels, see for example Tae Gwan Park et al. "Sodium Chloride-induced phase transition in nonionic Poly (n-isopropylacrylamide) gels" Macromolecules 1993 or Yanhie Zhang et al. "Specific Ion Effects on the Waer Solubility of Macromolecules: PNIPAAm and the Hofmeister Series" Journal of the American Chemical Society 2005. The salt used in these solutions can be, by way of example only, sodium chloride although one of ordinary skill in the art will recognize that sodium chloride may be substituted with other sodium salts. Similarly, in regard to PAAm-co-SVA gels see Seiji Katayama "Chemical Condition Responsible for Thermoswelling or Thermoshrinking Type of Volume Phase Transition in Gels. Effect of Relative Amounts of Hydrophobic to Hydrophilic Groups in the Side Chain" Journal of Physical Chemistry 1992.

Temperature and solvent concentration play a similar role in dictating whether the gel is swollen or not. For example the stimulus sensitive gel is kept above a certain temperature, the stimulus sensitive gel will remain swollen. But when the stimulus sensitive gel is exposed to a stimulus that equals or exceeds its predetermined stimulus, for example a lower temperature, the swollen stimulus sensitive gel will undergo its phase transition and collapse or shrink. Alternatively, by keeping the temperature of the stimulus sensitive gel fixed during its manufacture, so long as the stimulus sensitive gel is not exposed to a predetermined stimulus, for example the swollen stimulus sensitive gel is kept at a constant solvent concentration, the swollen stimulus sensitive gel will remain swollen. When the concentration surrounding the swollen stimulus sensitive gel changes to such a degree that it equals the predetermined stimulus for that swollen stimulus sensitive gel, for example, the concentration of the solution surrounding the swollen stimulus sensitive gel rises to a predetermined level, at that point the solution surrounding swollen stimulus sensitive gel becomes such a poor solvent for the swollen stimulus sensitive gel that the swollen stimulus sensitive gel collapses or shrinks. This relationship between certain types of stimuli, such as solvent concentration and transition temperature, is what allows for the control of the phase transition of the stimulus sensitive gel at its predetermined stimulus, by way of example only, its transition temperature.

One of the embodiments of this invention includes a swollen stimulus sensitive gel that goes through its phase transition at a predetermined level of stimulus. By way of example only, malaria vaccine spoils after exposure to a temperature lower than 2° C. Therefore, a swollen stimulus sensitive gel used in conjunction with any embodiment of the stimulus indicating device described herein, can be set to trigger at 2°

C. or cooler. By way of example only, a PAAm-co-SVA gel as the swollen stimulus sensitive gel can be manufactured so that as the phase transition of the swollen stimulus sensitive gel, and therefore the expulsion of the expelled liquid and the constituent parts in the form of a salt solution, occurs at approximately 2° C. As one of ordinary skill in the art can appreciate, the solvent concentration that causes a swollen stimulus sensitive gel to trigger or undergo its phase transition at a predetermined level of stimulus, can be determined for any stimulus, and more particularly at any level of stimulus.

To determine the solvent concentration that is needed to cause a given swollen stimulus sensitive gel to trigger or undergo its phase transition at a predetermined stimulus such as temperature, one needs to first start with gross variations of solvent concentration then determine from those gross variations the level of stimulus that causes the swollen stimulus sensitive gel to trigger or go through its phase transition. Then by narrowing that variation of solvent concentration and again noting the level of stimulus that caused the swollen stimulus sensitive gel to trigger or undergo its phase transition, the swollen stimulus sensitive gel with the proper or desired trigger of phase transition characteristics will become evident. Once the solvent concentration required to obtain gels that trigger at the desired transition temperature are well established, this procedure needs not be repeated for all manufactured gels.

By way of illustration only, to determine the proper acetone concentration for a stimulus sensitive gel to trigger at 2° C., similarly sized pieces of washed stimulus sensitive gel films are immersed and saturated in acetone-water mixtures prepared whereby the concentrations of the acetone-water mixture vary by 10%, resulting in acetone-water mixtures having the following acetone concentrations: 80%, 70%, 60%, 50% and 40%. By using similarly sized pieces of washed gels, the determination is much more reliable. The saturation of the gels with acetone-water mixtures is done by immersing washed gel films in the corresponding acetone-water mixtures and replacing the acetone-water mixtures once daily for two days at room temperature.

The swollen gels immersed in the acetone-water mixtures are then placed in a constant temperature environment (such as a constant temperature water cooling bath) at 2° C. After some time it will be observed that gel films saturated at 60% acetone concentration or above go through a phase transition, but the swollen stimulus sensitive gel films saturated at 50% acetone concentration or below failed to trigger and undergo their phase transition, and thus did not collapse or shrink. Accordingly, it is known that the desired acetone concentration for the swollen stimulus sensitive gel that will trigger and undergo its phase transition between 2° C. and room temperature lies below 60% concentration of acetone, but above 50% acetone concentration.

Thus, the next round of similarly sized pieces of washed swollen stimulus sensitive gel are immersed in the acetone-water mixtures having concentrations that vary by 2% between the known range of 50% and 60% acetone-water concentration, and are thereby saturated at 52%, 54%, 56%, and 58% acetone-water concentration. Next, upon being exposed to the predetermined stimulus, for example, a temperature of 2° C., after some time it will be observed that all of the swollen stimulus sensitive gels that were previously immersed in the acetone-water mixtures containing concentrations 52%, 54%, 56% and 58% acetone-water remained swollen and failed to trigger and undergo their phase transition, and thus did not collapse or shrink. Accordingly, it is known that the desired acetone-water concentration for a swollen stimulus sensitive gel that will trigger and undergo its phase transition at 2° C. lies between 58% and 60% acetone-water concentration.

Thus, the next round of similarly sized pieces of washed swollen stimulus sensitive gels are immersed in the acetone-water mixtures having concentrations that vary by 0.5% between the known range of 58.0% and 60.0% acetone-water concentration, and are thereby saturated at 58.5%, 59.0%, and 59.5% acetone-water concentration. Next, upon being exposed to the predetermined stimulus, for example, a temperature of 2° C., it is observed that the stimulus sensitive gels that were previously immersed in the acetone-water mixtures containing 58.5%, 59.0%, and 59.5% acetone-water concentration remained swollen and failed to trigger and undergo their phase transition, and thus did not collapse or shrink. Accordingly, it is known that the desired acetone-water concentration for a swollen stimulus sensitive gel that will trigger and undergo its phase transition at 2° C. lies between 59.5% and 60% acetone-water concentration.

At this point, it may not be necessary to determine with any more specificity the concentration of the acetone-water mixture necessary to cause the swollen stimulus sensitive gel to undergo its phase transition at 2° C., although following this method would allow such additional specificity.

3. Method to Dope the Gels with Constituent Parts

As discussed herein the swollen stimulus sensitive gel expels, among other things, constituent parts as it undergoes its phase transition in reaction to a predetermined stimulus. To ensure that change in color of the color changing absorbent material embodiment of the stimulus indicating device occurs, the stimulus sensitive gel should preferably be doped with constituent parts that are known to be reactive with and permanently bind to the color changing absorbent material. By way of example only, if divalent cationic paper is selected as the color changing absorbent material, then the stimulus sensitive gel should be doped with divalent cations, such as $Mg^{2+}$ or $Ca^{2+}$. Similarly, if litmus paper is selected as the color changing absorbent material, then the stimulus sensitive gel should be doped with hydrogen or hydroxyl ions ($H^+$ or $OH^-$).

Once the acetone-water concentrations required to obtain stimulus sensitive gels that trigger at the desired transition temperatures are well established, this procedure need not be repeated for all manufactured gels. In order to dope the stimulus sensitive gels, the pieces of swollen stimulus sensitive gel are swollen in a solution containing both the necessary acetone-water concentration to achieve the desired transition temperature, and containing the constituent parts. That is, after washing the PAAm-co-SVA gel with distilled and deionized water as discussed above, the swollen stimulus sensitive gel is soaked in a solution containing 30 mM $MgCl_2$ and the required acetone-water concentration for the desired transition temperature overnight. For example, if the stimulus indicating device was to trigger and have the color changing absorbent material change from a first color to a second color upon exposure to a temperature of about 2° C. or cooler, the required acetone-water concentration would be between 59.5% and 60%, as described herein. Then the swollen, doped and stimulus sensitive gel is removed from the doping solution and is patted dry with Kimwipes tissue. In this way the doped, swollen stimulus sensitive gel contains the constituent parts (e.g., divalent cations such as $Mg^{2+}$) that will be expelled from the swollen stimulus sensitive gel and react with the color changing absorbent material (e.g., divalent cationic indicator paper) once the swollen stimulus sensitive gel undergoes its phase transition upon being exposed to a predetermined stimulus, thereby causing the color changing absorbent material in the color changing absorbent material embodiments to change from a first color to a second color. Alternatively, the swollen stimulus sensitive gels can be doped with OH$^-$ by submerging and soaking the stimulus sensitive gel in a pH 10 solution containing the required solvent concentration for the desired transition temperature overnight. Then the swollen and doped stimulus sensitive gel is removed from the doping solution and is patted dry with Kimwipes tissue. In this way the doped, swollen stimulus sensitive gel contains the constituent parts (e.g., OH$^-$) that will react with the color changing absorbent material (e.g., litmus paper) once the swollen stimulus sensitive gel undergoes its phase transition upon being exposed to a predetermined stimulus.

Alternate Embodiment of the Gel

Method for Manufacturing a Stimulus Sensitive Gel

For all the embodiments of the stimulus sensitive gel discussed herein, the stimulus sensitive gel can be manufactured to undergo its phase transition at any predetermined stimulus. By way of example only, the stimulus sensitive gel discussed herein could be of the UCST type and could be made to trigger or undergo its phase transition (i.e., collapse or shrink and expel liquid and/or constituent parts) upon exposure to a predetermined temperature that decreases from a first temperature to a second temperature. Alternatively, and by way of example only, the stimulus sensitive gel discussed herein could be of the LCST type and could be made to trigger or undergo its phase transition (i.e., collapse or shrink and expel liquid and/or constituent parts) upon exposure to a predetermined temperature that rises in temperature from a first temperature to a second temperature. It will be understood by one of ordinary skill in the art that other temperatures and/or stimuli can be set as the predetermined stimulus by varying the method and/or ingredients disclosed herein.

By way of example only, the discussion below will disclose how to make a swollen stimulus sensitive gel of the UCST type, which undergoes its phase transition (i.e., collapses or shrinks and thereby expels the liquid and/or constituent parts contained in the stimulus sensitive gel) upon being exposed to a temperature cooler than 2° C.

The method of manufacturing such a swollen stimulus sensitive gel comprises at least two steps. In the first step, an interpenetrating polymer network is formed from polyacrylamide (PAAm) and polyacrylic acid (PAAc). This gel is referred to as IPN-PAAm-PAAc. During the synthesis of the interpenetrating network gel, a portion of the acrylic acid groups on the PAAc gels are ionized through the addition of sodium hydroxide. By controlling the degree of ionization, the transition temperature of the gel can be adjusted to the desired transition temperature. Once the amount of ionization required to obtain gel formulations that trigger at the desired transition temperature are well established, the steps described herein for determining those amounts need not be repeated for the manufacture of future gels.

In the second step, the interpenetrating network gel is doped with the constituent parts that are later expelled as the swollen stimulus sensitive gel collapses or shrinks in response to a predetermined stimulus. The purpose of such doping is to impregnate the IPN-PAAm-PAAc gel with constituent parts, so that the constituent parts will permanently cause the embodiments containing color changing absorbent material to change from a first color to a second color. The resulting polymer gel (i.e., the doped swollen stimulus sensitive gel) will initially have had a transition temperature near 0° C., but by the completion of the second step, the transition temperature of the resulting polymer gel (i.e, the doped swollen stimulus sensitive gel) is shifted to the desired temperature (e.g., 2° C.).

The first two steps taken together comprise the process of preparing a swollen stimulus sensitive gel that will undergo its phase transition upon being exposed to a predetermined stimulus as well as provide foolproof, permanent and irreversible indication of the stimulus sensitive product's exposure to such stimulus.

1. Preparation of Interpenetrating Polymer Gels by Polymerization of Acrylamide and Acrylic Acid By way of example only, the swollen stimulus sensitive gel is prepared as a UCST type of polymer gel, and by way of example only, this UCST type of polymer gel is created through the formation of an interpenetrating polymer network of polyacrylamide (PAAm) and polyacrylic acid (PAAc) so as to form an IPN-PAAm-PAAc. This polymerization of acrylamide and acrylic acid is accomplished in several steps: first, the PAAm gel is formed. After that, the PAAm gel is washed extensively in water. Then the PAAm gel is dried completely and later swollen in an acrylic acid solution. The acrylic acid is then polymerized and the IPN-PAAm-PAA is formed. The polymerization is done by employing the following ingredients, although one of ordinary skill in the art will recognize that certain of the following ingredients can be replaced by other similar types of ingredients, and recognizes/understands that the amounts of the ingredients are exemplary only. Accordingly, the amounts of the ingredients can be varied by any amount so long as the desired gel is created. Moreover, the amounts can be increased or decreased proportionally so that larger or smaller amounts of swollen stimulus sensitive gel can be created. The ingredients include:

i) 1.0 grams of acrylic acid (preferably 98% purity from Aldrich)
ii) 1.0 grams of acrylamide (preferably electrophoresis grade from Aldrich)
iii) 40 milliliters of distilled and deionized water;
iv) 0.0533 grams of N,N'-methylenebisacrylamide (preferably electrophoresis grade from Aldrich).
v) 0.008 grams of ammonium persulfate (preferably 98% purity from Aldrich)
vi) 0.1 grams of Red 110 M (from LanXess Corporation).
vii) Sodium hydroxide In order to manufacture such gel, the following method is preferably followed, although one of ordinary skill in the art will recognize that certain steps can be performed in varying order, and the amounts can be varied as described herein or as known to one of ordinary skill in the art:

i) place 20 milliliters of distilled and deionized water into a scintillation vial and purge that distilled and deionized water with nitrogen gas for 15 to 20 minutes so as to remove all possible amounts of oxygen;
ii) add the 1.0 grams of acrylamide into the scintillation vial, and stir extensively for 5 minutes or until all of the acrylamide is completely dissolved;
iii) add the 0.0267 grams of N,N'-methylenebisacrylamide to the scintillation vial and stir extensively for 5 minutes or until all the components in the scintillation vial are completely dissolved.

iv) add the 0.004 grams of ammonium persulfate to the scintillation vial and stir extensively for 5 minutes or until all the components in the scintillation vial are completely dissolved;
v) add the 0.1 grams of Red 110 M added to the scintillation vial and stir extensively for 5 minutes or until all the components in the scintillation vial are completely dissolved. The addition of Red 110 M to the gel allows the gel to be better observed, because otherwise the gel would be transparent. As discussed herein and as understood by one of ordinary skill, for all the embodiments disclosed herein, one embodiment may work better with a transparent stimulus sensitive gel, while others will work better with a stimulus sensitive gel that is dyed a given color. One of ordinary skill will also understand that different color dyes can be used to make the stimulus sensitive gel color different from, or the same as, the indicator spot.

The pre-gel mixture of AAm and SVA is rapidly transferred from the scintillation vial into molds to allow the polymerization process to occur and/or so as to allow gels to form into the desired shape. The pre-gel mixture is preferably cast between glass plates since the pre-gel does not stick on glass surfaces and hence can be removed from the plates easily. Some of the types of molds employed are described below although one of ordinary skill in the art will recognize that the gels can be cast in any shape and size. Glass pipettes can be used which preferably have an inner diameter about 7 mm). Similarly, rectangular or round glass capillaries (from Fiber Optic Center, MA for instance) having an inner diameter of 0.4 mm or 1/64 inches could be used as well. In addition, the gel may be cast between glass plates in a protein electrophoresis gel casting unit (Mimi PROTEAN® 3 system from Bio-Rad for instance). The space between two glass plates can be 1.0 mm or 1.5 mm.

As will be appreciated by one of ordinary skill in the art, the molds employed to form the stimulus sensitive gels can vary in length, height and/or width, and as will be appreciated by one of ordinary skill in the art, the desired speed with which the transition of the resulting gel occurs is limited by the smallest dimension of that stimulus sensitive gel. Because there is an inverse relation between the transition speed and the smallest dimension of the gel, between two stimulus sensitive gels that are the same in all dimensions except for one, the gel which has the larger dimension (e.g., length, height or width) will undergo its phase transition slower than a stimulus sensitive gel that has a larger size on that same given dimension. For example, a stimulus sensitive gel that is 1 cm long, 1.0 mm high, and 0.5 cm wide will take 4 times as long to contract than a stimulus sensitive gel that is 1 cm long, 0.5 mm high, and 0.5 cm wide.

Next the ends of the glass molds are sealed, either by flame sealing or by putting epoxy at the ends. The reason for sealing the pre-gel mixture in the glass molds is to prevent the pre-gel mixture from coming in contact with air during the polymerization process. It is important to prevent the pre-gel mixture from coming into contact with oxygen in the air during the polymerization process, because oxygen retards and may even stop the polymerization reaction. This is the same reason that the distilled and deionized water is purged with nitrogen at the beginning of the manufacture of the gel.

The final step in transforming the pre-gel mixture into a robust stimulus sensitive gel mixture is to immerse the sealed glass molds containing the pre-gel mixture in a water bath at a temperature of 50° C. for at least one hour, but preferably the pre-gel mixture is immersed in the 50° C. water bath for two hours. After this period of two hours, polymerization is complete, and the stimulus sensitive gel can be removed from the glass molds.

An alternative to this final step of transforming the pre-gel mixture into a robust stimulus sensitive gel mixture is to add 50 microliters of N,N,N'N'-tetramethylethylenediamine (abbreviated TEMED, preferably 98% purity from Aldrich) into the pre-gel mixture and stirring the mixture for 5 minutes or until it completely dissolves in the pre-gel mixture. TEMED catalyzes the polymerization reaction such that the reaction may occur at room temperature or even at lower temperatures although one of ordinary skill in the art will recognize that TEMED may be substituted with another redox polymerization catalyst such as sodium metabisulfite. After the addition of TEMED, the polymerization is allowed to proceed for approximately one hour. One of ordinary skill in the art will recognize, in addition to the two polymerization methods discussed above, the polymerization of the pre-gel mixture can be accomplished in many different ways.

Once polymerization is complete, the polymerized gels are taken out from the glass molds by breaking the glass molds or by removing the glass plates if using a protein electrophoresis gel casting unit. Immersing the polymerized gels in deionized water is a necessary step so as to remove unreacted components because during the process of forming the stimulus sensitive gel, there is always the possibility that some acrylamide and bisacrylamide do not incorporate into the polymer chains that form the stimulus sensitive gel. During the polymerization of the stimulus sensitive gel, there is always the possibility that some polymer chains are formed but which do not incorporate into the polymer chains that form the gel, and as such can be washed from the gel.

In the case that the gel is formed at room temperature via the addition of a catalyst, that catalyst also needs to be removed from the gel. The removal of TEMED and unreacted monomers is achieved, as mentioned above, by simply immersing the gel in distilled and deionized water. The polymerized gels are washed extensively by immersing the gels in distilled and deionized water for at least two days seven days, with the water changed at least every day. Immersing the polymerized gels in deionized water is a necessary step so as to remove the components not being incorporated into the gel.

Moreover, if the polymerization process used TEMED, that TEMED also needs to be removed from the polymerized gel. The removal of TEMED, unbound polymer chains and unreacted monomers is achieved, as mentioned above, by simply immersing the polymerized gel is distilled and deionized water.

After washing the gel in distilled and deionized water, the gels are dried overnight at a temperature of 35° C. When the gels are completely dried, then the gels are inserted into molds identical to those in which they were initially formed. For instance, if the gels were prepared between glass plates in a protein electrophoresis gel casting unit (Mimi PROTEAN® 3 system from Bio-Rad for instance), then the dry gel would be again inserted in the gel casting unit. At this point, it is ready to be swollen in an acrylic acid solution that can be polymerized resulting in an interpenetrating network of PAAm and PAAc.

To prepare the acrylic acid solution the following steps are taken:
i) place the remaining 20 milliliters of distilled and deionized water into a scintillation vial and purge it with nitrogen gas for 15 to 20 minutes so as to remove all possible amounts of oxygen;

ii) add the 1.0 grams of acrylic acid into the scintillation vial, and stir extensively for 5 minutes or until all of the acrylic acid is completely dissolved;

iv) add the remaining 0.0266 grams of N,N'-methylenebisacrylamide to the scintillation vial and stir extensively for 5 minutes or until all the components in the scintillation vial are completely dissolved;

vi) add the remaining 0.004 grams of ammonium persulfate to the scintillation vial and stir extensively for 5 minutes or until all the components in the scintillation vial are completely dissolved;

vii) add the sodium hydroxide. The amount of sodium hydroxide added dictates the degree of ionization of the PAAc chains which in turn dictates the transition temperature of the gel. By increasing the degree of ionization of the PAAc chains, the transition temperature is lowered. For instance, a degree of ionization of three percent by mole of the PAAc chains corresponds to a transition temperature of 17° C. whereas a six percent by mole ionization corresponds to 12° C. To prepare a gel with a degree of ionization of three percent by mole, the required amount of sodium hydroxide is 0.0167 grams whereas if a six percent by mole degree of ionization is required then 0.0334 grams are needed.

Once all the ingredients are combined, then the solution is added into the mold containing the dry PAAm gel. Next the ends of the glass molds are sealed, either by flame sealing or by putting epoxy at the ends. The reason for sealing the pre-gel mixture in the glass molds is to prevent the pre-gel mixture from coming in contact with air during the polymerization process. It is important to prevent the pre-gel mixture from coming into contact with oxygen in the air during the polymerization process, because oxygen retards and may even stop the polymerization reaction. This is the same reason that the distilled and deionized water is purged with nitrogen at the beginning of the manufacture of the gel.

The dry PAAm gel is allowed to swell completely in the acrylic acid solution. Typically, complete swelling of the PAAm in the acrylic acid solution is achieved in two days. In the final step in the preparation of the interpenetrating network of PAAm and PAAc, the sealed glass molds containing the PAAm gel swollen in an acrylic acid solution are immersed in a water bath at a temperature of 50° C. for at least one hour, but preferably the PAAm gel swollen in an acrylic acid solution is immersed in the 50° C. water bath for two hours. After this period of two hours, polymerization is complete, and the stimulus sensitive gel can be removed from the glass molds.

Once polymerization is complete, the polymerized gels are taken out from the glass molds by breaking the glass molds or by removing the glass plates if using a protein electrophoresis gel casting unit. Immersing the polymerized gels in deionized water is a necessary step so as to remove unreacted components because during the process of forming the stimulus sensitive gel, there is always the possibility that some acrylic acid and bisacrylamide do not incorporate into the polymer chains that form the stimulus sensitive gel. During the polymerization of the stimulus sensitive gel, there is always the possibility that some polymer chains are formed but which do not incorporate into the polymer chains that form the gel, and as such can be washed from the gel.

Performing all the above mentioned steps results in the formation of interpenetrating networks of PAAm and PAAc or IPN-PAAm-PAAc for short.

2. Method to Dope the Gels with Constituent Parts

As discussed herein the swollen stimulus sensitive gel expels, among other things, constituent parts as it undergoes its phase transition in reaction to a predetermined stimulus. To ensure the color change of the color changing absorbent material embodiment of the stimulus indicating device occurs, the stimulus sensitive gel should preferably be doped with constituent parts that are known to be reactive with and permanently bind to the color changing absorbent material. By way of example only, if cationic paper is selected as the color changing absorbent material, then the stimulus sensitive gel should be doped with cations, such as $Mg^{3+}$ or $Ca^{2+}$. Similarly, if litmus paper is selected as the color changing absorbent material, then the stimulus sensitive gel should be doped with ions, such as $H^+$.

Once the degree of ionization required to obtain stimulus sensitive gels that trigger at the desired transition temperatures are well established, this procedure need not be repeated for all manufactured gels. In order to dope the stimulus sensitive gels, the pieces of swollen stimulus sensitive gel are swollen in a solution containing the constituent parts. That is, after washing the IPN-PAAm-PAAc gel with distilled and deionized water as discussed above, the swollen stimulus sensitive gel is soaked in a solution containing 30 mM $MgCl_2$ overnight. Then the swollen, doped and stimulus sensitive gel is removed from the doping solution and is patted dry with Kimwipes tissue. In this way the doped, swollen stimulus sensitive gel contains the constituent parts (e.g., $Mg^{2+}$) that will be expelled from the swollen stimulus sensitive gel and react with the color changing absorbent material (e.g., cationic paper) once the swollen stimulus sensitive gel undergoes its phase transition upon being exposed to a predetermined stimulus, thereby causing the color changing absorbent material in the color changing absorbent material embodiments to change from a first color to a second color.

Although the invention has been particularly shown and described with reference to preferred and alternate embodiments thereof, it will be understood by those skilled in the art that various changes in form and detail may be made to it without departing from the spirit and scope of the invention.

We claim:

1. A stimulus indicating device that is capable of providing an irreversible indication of exposure to a predetermined stimulus comprising:
   a first compartment;
   a stimulus sensitive gel contained inside said first compartment that has a chemical composition such that said stimulus sensitive gel permanently contracts from a first volume to a second volume in response to exposure to the predetermined stimulus regardless of whether the predetermined stimulus is removed;
   an indicator spot positioned inside said first compartment and that is positioned below said stimulus sensitive gel and that is physically covered by and is visibly blocked by said stimulus sensitive gel prior to exposure to the predetermined stimulus;
   an indicator window integral with said first compartment and that is positioned above said stimulus sensitive gel, and that is positioned above said indicator spot, for viewing into said first compartment; and
   wherein said stimulus sensitive gel has a chemical composition of poly(AAm-co-SB) gel.

2. A stimulus indicating device that is capable of providing an irreversible indication of exposure to a predetermined stimulus comprising:
   a first compartment comprising an upper layer and a backing layer;
   a stimulus sensitive gel contained in said first compartment that has a chemical composition such that said stimulus sensitive gel permanently contracts from a first volume to a second volume in response to exposure to the predetermined stimulus regardless of whether the predetermined stimulus is removed;

an indicator spot positioned inside of said first compartment and that is positioned on said backing layer and that is positioned below said stimulus sensitive gel, and that is physically covered by and is visibly blocked by said stimulus sensitive gel;

an indicator window integral with said upper layer for viewing into said first compartment, and that is positioned above said stimulus sensitive gel, and that is positioned above said indicator spot; and wherein said stimulus sensitive gel has a chemical composition of poly(AAm-co-SB) gel.

3. A stimulus indicating device that is capable of providing an irreversible indication of exposure to a predetermined stimulus comprising:

a first compartment comprising an upper layer and a backing layer;

a stimulus sensitive gel contained in said first compartment that has a chemical composition such that said stimulus sensitive gel permanently contracts from a first volume to a second volume in response to exposure to the predetermined stimulus regardless of whether the predetermined stimulus is removed;

a portion of said backing layer that is capable of providing an indication that said stimulus indicating device had been exposed to a predetermined stimulus, wherein said portion of said backing layer is positioned inside said first compartment and that is positioned below said stimulus sensitive gel, and that is physically covered by and is visibly blocked by said stimulus sensitive gel prior to exposure to the predetermined stimulus;

an indicator window integral with said upper layer for viewing into said first compartment, and said indicator window is positioned above said stimulus sensitive gel, and is positioned above said portion of said backing layer; and wherein said stimulus sensitive gel has a chemical composition of poly(AAm-co-SB) gel.

4. A stimulus indicating device that is capable of providing an irreversible indication of exposure to a predetermined stimulus comprising:

a first compartment comprising an upper layer and a backing layer;

a stimulus sensitive gel contained in said first compartment that has a chemical composition such that said stimulus sensitive gel permanently contracts from a first volume to a second volume in response to exposure to the predetermined stimulus regardless of whether the predetermined stimulus is removed;

an indicator spot positioned inside said first compartment and positioned below said stimulus sensitive gel, and that is physically covered by and is visibly blocked by said stimulus sensitive gel prior to exposure to the predetermined stimulus, wherein said upper layer is positioned above said stimulus sensitive gel, and is positioned above said portion of said backing layer, and that allows viewing into said first compartment and wherein said stimulus sensitive gel has a chemical composition of poly(AAm-co-SB) gel.

5. A stimulus indicating device that is capable of providing an irreversible indication of exposure to a predetermined stimulus comprising:

a first compartment comprising an upper layer and a backing layer;

a stimulus sensitive gel contained in said first compartment that has a chemical composition such that said stimulus sensitive gel permanently contracts from a first volume to a second volume in response to exposure to the predetermined stimulus regardless of whether the predetermined stimulus is removed;

a portion of said backing layer that is capable of providing an indication that said stimulus indicating device had been exposed to a predetermined stimulus, said portion of said backing layer is positioned inside said first compartment and that is positioned below said stimulus sensitive gel, and that is physically covered by and is visibly blocked by said stimulus sensitive gel prior to exposure to the predetermined stimulus, wherein said upper layer is positioned above said stimulus sensitive gel, and is positioned above said portion of said backing layer, and that allows viewing into said first compartment and wherein said stimulus sensitive gel has a chemical composition of poly(AAm-co-SB) gel.

6. The stimulus indicating device of claim 1, 2, 3, 4 or 5 further comprising:

an attachment point attaching said stimulus sensitive gel to said first compartment.

7. The stimulus indicating device of claim 1 further comprising:

said stimulus sensitive gel having a position relative to said indicator spot such that at least a portion of said indicator spot is capable of being permanently exposed and visible through said indicator window when said stimulus sensitive gel permanently contracts due to exposure to the predetermined stimulus.

8. The stimulus indicating device of claim 2 further comprising:

said stimulus sensitive gel having a position relative to said indicator spot such that at least a portion of said indicator spot is capable of being permanently exposed and visible through said indicator window when said stimulus sensitive gel permanently contracts due to exposure to the predetermined stimulus.

9. The stimulus indicating device of claim 4 further comprising:

said stimulus sensitive gel having a position relative to said indicator spot such that at least a portion of said indicator spot is capable of being permanently exposed and visible through said upper layer when said stimulus sensitive gel permanently contracts due to exposure to the predetermined stimulus.

10. The stimulus indicating device of claim 3 further comprising:

said stimulus sensitive gel having a position relative to said portion of said backing layer such that at least a part of said portion of said backing layer is capable of being permanently exposed and visible through said indicator window when said stimulus sensitive gel permanently contracts due to exposure to the predetermined stimulus.

11. The stimulus indicating device of claim 5 further comprising:

said stimulus sensitive gel having a position relative to said portion of said backing layer such that at least a part of said portion of said backing layer is capable of being permanently exposed and visible through said upper layer when said stimulus sensitive gel permanently contracts due to exposure to the predetermined stimulus.

12. The stimulus indicating device of claim 7, 8, 9, 10 or 11 further comprising: wherein the contraction of said stimulus sensitive gel from the first volume to the second volume is only a partial contraction.

13. The stimulus indicating device of claim 7, 8 or 9 further comprising: said indicator spot is a glyph.

14. The stimulus indicating device of claim 7, 8 or 9 further comprising:
said indicator spot is a first color and said stimulus sensitive gel is a second color.

15. The stimulus indicating device of claim 10 or 11 further comprising:
said portion of said backing layer is an indicator spot.

16. The stimulus indicating device of claim 10 or 11 further comprising:
said portion of said backing layer contains a glyph.

17. The stimulus indicating device of claim 10 or 11 further comprising:
said portion of said backing layer is a first color and said stimulus sensitive gel is a second color.

18. The stimulus indicating device of claim 1 wherein said stimulus sensitive gel is of the Upper Critical Solution Temperature class of stimulus sensitive gel.

19. The stimulus indicating device of claim 3 wherein said stimulus sensitive gel is of the Upper Critical Solution Temperature class of stimulus sensitive gel.

20. The stimulus indicating device of claim 4 wherein said stimulus sensitive gel is of the Upper Critical Solution Temperature class of stimulus sensitive gel.

21. The stimulus indicating device of claim 5 wherein said stimulus sensitive gel is of the Upper Critical Solution Temperature class of stimulus sensitive gel.

22. The stimulus indicating device of claim 7 further comprising:
wherein said stimulus sensitive gel contracts by a predetermined amount of volume over a predetermined amount of time.

23. The stimulus indicating device of claim 8 further comprising:
wherein said stimulus sensitive gel contracts by a predetermined amount of volume over a predetermined amount of time.

24. The stimulus indicating device of claim 9 further comprising:
wherein said stimulus sensitive gel contracts by a predetermined amount of volume over a predetermined amount of time.

25. The stimulus indicating device of claim 10 further comprising:
wherein said stimulus sensitive gel contracts by a predetermined amount of volume over a predetermined amount of time.

26. The stimulus indicating device of claim 11 further comprising:
wherein said stimulus sensitive gel contracts by a predetermined amount of volume over a predetermined amount of time.

* * * * *